United States Patent
Chen et al.

(10) Patent No.: US 12,448,382 B2
(45) Date of Patent: Oct. 21, 2025

(54) HETEROCYCLIC COMPOUNDS FOR MEDIATING TYROSINE KINASE 2 ACTIVITY

(71) Applicant: GUANGZHOU INNOCARE PHARMA TECH CO., LTD., Guangzhou (CN)

(72) Inventors: Xiangyang Chen, Beijing (CN); Yucheng Pang, Beijing (CN)

(73) Assignee: Guangzhou Innocare Pharma Tech Co. Ltd., Guangzhou (CN)

( * ) Notice: Subject to any disclaimer, the term of this patent is extended or adjusted under 35 U.S.C. 154(b) by 884 days.

(21) Appl. No.: 17/559,330

(22) Filed: Dec. 22, 2021

(65) Prior Publication Data

US 2022/0112200 A1    Apr. 14, 2022

Related U.S. Application Data

(63) Continuation of application No. PCT/CN2020/098105, filed on Jun. 24, 2020.

(30) Foreign Application Priority Data

Jun. 28, 2019  (CN) .......................... 201910572091.9

(51) Int. Cl.
C07D 487/04    (2006.01)
(52) U.S. Cl.
CPC .................. C07D 487/04 (2013.01)
(58) Field of Classification Search
CPC ................................................ C07D 487/04
See application file for complete search history.

(56) References Cited

U.S. PATENT DOCUMENTS

| 10,493,073 B2 | 12/2019 | Qiu et al. |
| 2017/0008857 A1 | 1/2017 | Qiu et al. |

FOREIGN PATENT DOCUMENTS

| CN | 105622638 A | 6/2016 |
| CN | 108137559 A | 6/2018 |
| CN | 112142743 A | 12/2020 |
| EP | 2832734 A1 | 2/2015 |
| WO | 2012/062704 A1 | 5/2012 |
| WO | 2012145581 A1 | 10/2012 |
| WO | 2017/007987 A1 | 1/2017 |
| WO | 2019060365 A1 | 3/2019 |

OTHER PUBLICATIONS

International Search Report for PCT Application No. PCT/CN2020/098105. Mail Date: Oct. 12, 2020. 6 pages.
EP Application No. 20832538.1, Extended European Search Report dated Jun. 26, 2023, 1 page.

*Primary Examiner* — Kamal A Saeed

(74) *Attorney, Agent, or Firm* — Viola Kung; Perkins Coie LLP

(57) ABSTRACT

Heterocyclic compounds shown in Formula (I) suitable for inhibiting or regulating the activity of Janus kinase (JAK), particularly tyrosine kinase 2 (TYK2). The compounds are useful for preventing and/or treating relevant JAK-mediated diseases, such as autoimmune diseases, inflammatory diseases, and cancers.

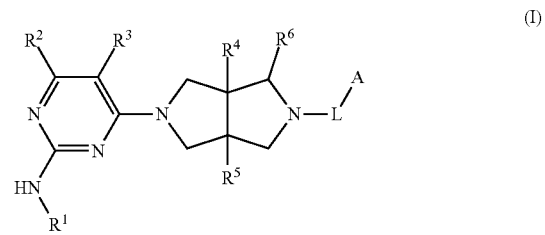

21 Claims, No Drawings

HETEROCYCLIC COMPOUNDS FOR MEDIATING TYROSINE KINASE 2 ACTIVITY

This application is a continuation of PCT/CN2020/098105, filed Jun. 24, 2020; which claims the benefit of Chinese Application No. 201910572091.9, filed Jun. 28, 2019. The contents of the above-identified applications are incorporated herein by reference in their entirety.

TECHNICAL FIELD

The present, invention relates to heterocyclic compounds or pharmaceutically acceptable salts thereof, suitable for regulating or inhibiting the activity of Janus kinase (JAK), particularly tyrosine kinase 2 (TYK2). The present invention also relates to methods for preparing the heterocyclic compounds. The present invention further relates to methods for treating and/or preventing diseases mediated by the kinase, particularly autoimmune diseases, inflammatory diseases and cancers.

BACKGROUND ART

JAK is a non-receptor tyrosine protein kinase composed of four family members, namely: JAK1, JAK2, JAK3 and TYK2. JAK has 7 homology domains in structure (JAK homology domain, JH), of which JH1 is a kinase domain, JH2 is a pseudo-kinase domain (which regulates the kinase activity of JH1), and JH6 and JH7 are receptor binding domains. When the cell surface area of the cytokine receptor is bound to cytokine, its intracellular area where JAKs are bound to is phosphorylated, thereby creating a docking site for the signal transducer and activator of transcription proteins (STAT's). The STAT proteins are further phosphorylated by activated JAKs to form a dimer, which enters the nucleus, regulates the expression and transcription of related genes, and enables signal transduction from the cell membrane to the nucleus (Lionard et. al, Ann. Rev. Immunol. 1998, 16, 293-322). Therefore, JAK transduces cytokine-mediated signals through the JAK-STAT pathway and plays an important role in many-cellular functions such as cytokine-dependent regulation of cell proliferation, differentiation, apoptosis and immune response, and is a popular target for the treatment of inflammatory diseases, autoimmune diseases and cancers (Alicea-Velazquez et. al, Curr. Drug Targets 2011, 12, 546-55). Several pharmaceuticals that regulate JAKs have been approved for marketing or have been submitted for approval, including JAK1/JAK2 inhibitor ruxolitinib and JAK2 inhibitor fedratinib for treating myelofibrosis, and pan-JAK inhibitor tofacitinib, JAK1/JAK2 inhibitor baricitimb, pan-JAK inhibitor peficitinib and JAK1 inhibitor upadacitinib for treating rheumatoid arthritis, etc.

Gene knockout studies have shown that JAKs and STATs play a highly specific role in controlling different immune responses. A JAK enzyme can participate in the signal transduction processes induced by multiple cytokines, and a cytokine signaling pathway can also activate multiple JAK enzymes, but cytokine itself has certain selectivity for STAT activation. For example, interleukin-4 (IL-4) activates STAT6, while IL-12 specifically activates STAT4. JAK1, JAK2 and TYK2 are widely present in various tissues and cells. JAK1 is closely related to the activation of inflammatory factors such as IL-6 and interferon (IFN), so JAK1 selective inhibitor is considered having a potential therapeutic effect on autoimmune diseases such as rheumatoid arthritis (RA) and psoriasis. JAK2 independently mediates cytokines such as erythropoietin (EPG) and thrombopoietin (TPO) (Won et. al, BMC Bioinformatics 2009, 10, S53), and is closely related to the proliferation and differentiation of blood cells. JAK3 is present only in the bone marrow and lymphatic system, and mediates the signal transduction of IL-2, IL-4, IL-7, IL-9, IL-15 and IL-21. These cytokines play an important role in inducing the proliferation and differentiation of T cells, activating B cells to produce antibodies, activating macrophages, enhancing the activity of natural killer cells (NK cells), and inducing other cytokines such as IFN. Therefore, JAK3 selective inhibitor is expected to play an important role in organ transplantation and treating autoimmune diseases and inflammatory pneumonia.

The JAK/STAT pathway can be over-activated by autocrine and paracrine cytokines, as well as some mutations, and is associated with a variety of malignant tumors, such as breast cancer, liver cancer, prostate cancer, colon cancer, lung cancer, pancreatic cancer, bladder cancer, and diffuse large B-cell lymphoma (Tan et. al, Curr. Drug Targets 2014, 15, 1341-53; Lam et. al, Blood 2008, 111, 3701-13). The JAK2 mutant JAK2/V617F occurs in the JH2 pseudo-kinase domain, causing change in JAK2 conformation, resulting in continuous activation of the JH1 kinase domain independent on extracellular cytokine signals, which in turn causes cell hyperplasia and blood cancer, and is closely related to polycythaemia vera (PV), essential thrombocythemia and myelofibrosis (MF) (O'Shea et. al, Ann. Rev. Med. 2015, 66, 311-28). JAK2 inhibitor ruxolitinib can be used for the treatment of such blood diseases, but the efficacy is not related to the presence of JAK2/V617F mutation, indicating that anti-tumor activity is not solely based on the inhibition of signal transmission participated in by JAK2/V617F and may also come from the regulation to JAK1-STAT.

TYK2 is involved in the signal transduction of inflammatory cytokines such as interferons (IFNs), IL-12 and IL-23, and plays a key role in congenital immunity and adaptive immunity. TYK2 knockout mice have normal red blood cell counts and can survive, but JAK3-deficient mice have severe immunodeficiency, and JAK1 or JAK2 knockout mice may die during the embryonic period. However, the diseases caused by JAK1/2 malfunctions have not been found in human, indirectly indicating the importance of physiological functions of JAK1/2. One patient with a null mutation of TYK2 gene has hyperimmunoglobulin E syndrome, but seven other cases with null mutation of TYK2 homozygote do not have hyperimmunoglobulin E syndrome, while due to reduced response to IL-12 and INF-α/β, sensitivity to mycobacterial or viral infections increases. Therefore, inhibiting TYK2 does not cause acute toxicity. The lack of TYK2 expression is manifested as weakened signaling of multiple proinflammatory cytokines and severe imbalance of T helper cell differentiation. In addition, evidences from genetically related research support TYK2 as a common susceptibility gene of autoimmune diseases. The importance of TYK2 regulated pathways has been further confirmed by effectiveness of antibody therapies in disease treatment in clinical settings, such as ustekinumab targeting IL-12/IL-23 for treating psoriasis and anifrolumab targeting type-I interferon receptor for treating systemic lupus erythematosus (SLE). Therefore, TYK2 has received great attention as a drug target for autoimmune diseases. For example, TYK2 inhibitor can be used for potential treatment of psoriasis, SLE, and inflammatory bowel disease (IBD), etc.

TYK2 is also associated with some cancers. For example, the abnormal survival of acute lymphoblastic leukemia (T-ALL) cells is related to the activation of TYK2. Gene knockout experiments have showed that 88% of T-ALL cell lines and 63% of patient-derived T-ALL cells are dependent on TYK2, so TYK2 is an oncogene of T-ALL (Sanda et. al, Cancer Disc. 2013, 3, 64-77). TYK2 selective inhibitor NDI-031301 can induce apoptosis to inhibit the growth of human T-ALL cell lines and has desirable safety and efficacy in mouse models with KOPT-K1 T-ALL tumor cells (Akahane et. al, British J. Haematol. 2017, 177, 271-82), showing a prospect of TYK2 selective inhibitor in the treatment, of T-ALL.

In addition to many inhibitors mainly targeting JAK1/2/3, TYK2 specific inhibitor BMS-986165 and JAK1/TYK2 dual inhibitor PF-06700841 have also entered the advanced stage of clinical trials. Since JAK regulates different immune responses in JAK-STAT, different JAK selective inhibitors exhibit different toxic and side effects in the clinical applications and have different clinical uses. Ruxolitinib is used to treat bone marrow fibrosis, shows good safety, and has no toxic and side effects on non-target organs. Tofacitinib inhibits the activity of JAK2 in addition to JAK1, affects the production of blood cells and lymphocytes, and exhibits certain toxic side effect of anemia, thereby limiting its clinical efficacy in RA. Due to the prospect of JAK inhibitors in the treatment of inflammatory diseases, autoimmune diseases and cancers, the development of selective JAK inhibitors has attracted great attention from the pharmaceutical industry. However, due to the high sequence similarity of the active sites of the JAK kinase family, it is difficult to develop a selective JAK inhibitor. Despite that some patent applications of TYK2 selective inhibitors have been disclosed, including WO2010142752, WO2012062704, WO2013180265, WO2015032423, WO2015131080 and WO2017040757, there is a continuous need to develop new compounds that have better druggability, stronger efficacy, and higher selectivity to TYK2 or TYK2/JAK1.

DETAILED DESCRIPTION OF THE INVENTION

Definitions

Unless otherwise stated, the following terms used in this application have the following meanings.

"$C_{x-y}$" refers to a range of the number of carbon atoms, where x and y are both integers, for example, $C_{3-8}$ cycloalkyl stands for cycloalkyl having 3 to 8 carbon atoms. It should be also understood that "$C_{3-8}$" further comprises any of sub-ranges, such as $C_{3-7}$, $C_{3-6}$, $C_{4-7}$, $C_{4-6}$ and $C_{5-6}$.

"Alkyl" refers to a saturated straight-chain or branched-chain hydrocarbyl substituent containing 1 to 20 carbon atoms, for example, 1 to 8 carbon atoms, 1 to 6 carbon atoms, or 1 to 4 carbon atoms. Unrestricted examples of alkyl include but are not limited to methyl, ethyl, n-propyl, isopropyl, n-butyl, isobutyl, tert-butyl, sec-butyl, n-pentyl, 1,1-dimethylpropyl, 1,2-dimethylpropyl, 2,2-dimethyl propyl, 1-ethylpropyl, 2-methylbutyl, 3-methylbutyl, n-hexyl, 1-ethyl-2-methylpropyl, 1,1,2-trimethylpropyl, 1,1-dimethylbutyl, 1,2-dimethylbutyl, 2,2-dimethylbutyl, 1,3-dimethylbutyl, 2-ethylbutyl.

"Alkylene" refers to a saturated straight-chain or branched-chain hydrocarbyl divalent substituent containing 1 to 20 carbon atoms, for example, 1 to 6 carbon atoms or 1 to 4 carbon atoms. Unrestricted examples of alkylene include but are not limited to —CH$_2$—, —CH(CH$_3$)—, —CH$_2$CH$_2$—, —CH$_2$CH$_2$CH$_2$—, —(CH$_3$)C(CH$_3$)—, —CH$_2$CH$_2$CH$_2$CH$_2$— and —CH$_2$CH$_2$(CH$_3$)CH$_2$—.

"Cycloalkyl" refers to a saturated cyclic hydrocarbyl substituent containing 3 to 14 annular carbon atoms. Cycloalkyl can be a mono carbon ring substituent, typically containing 3 to 8, 3 to 7, or 3 to 6 carbon atoms. Unrestricted examples of monocyclic cycloalkyl include but are not limited to cyclopropyl, cyclobutyl, cyclopentyl, cyclohexyl and cycloheptyl. Cycloalkyl can also be a substituent with two or three mono carbon rings that are fused together, such as decahydronaphthyl.

"Heterocyclyl or heterocycle" refers to a saturated or partially unsaturated monocyclic or polycyclic group containing 3 to 20 annular atoms, for example, 3 to 14, 3 to 12, 3 to 10, 3 to 8, 3 to 6, or 5 to 6 annular atoms in which one or more of the annular atoms are selected from N, O and S(O)$_m$ (where m is an integer from 0 to 2), but does not include —O—O—, —O—S— or —S—S— in the ring structure and the rest are carbon atoms. Preferably, it can have 3 to 12 annular atoms, 3 to 10 annular atoms, 4 to 7 annular atoms, and 4 to 6 annular atoms, wherein 1 to 4 are heteroatoms, 1 to 3 are heteroatoms, or 1 to 2 are heteroatoms. Unrestricted examples of monocyclic heterocyclyl include but are not limited to pyrrolidinyl, oxetanyl, piperidyl, piperazinyl, tetrahydrofuranyl, tetrahydropyranyl, tetrahydrothiopyranyl, morpholinyl, thiomorpholinyl, homopiperazinyl and azetidinyl. Polycyclic heterocyclyl includes fused, bridged or spiro polycyclic heterocycle, such as octahydrocyclopenta[c]pyrrole, octahydropyrrole[1,2-a]pyrazine, 3,8-diazabicyclo[3.2.1]octane, 5-azaspiro[2.4]heptane and 2-oxa-7-azaspiro[3.5]nonane.

"Aryl or aryl ring" refers to an aromatic monocyclic or fused polycyclic group containing 6 to 14 carbon atoms, preferably 6- to 10-membered, such as phenyl and naphthyl, most preferably phenyl. The aryl ring can be fused with a heteroaryl, heterocyclyl or cycloalkyl ring, and unrestricted examples include but are not limited to:

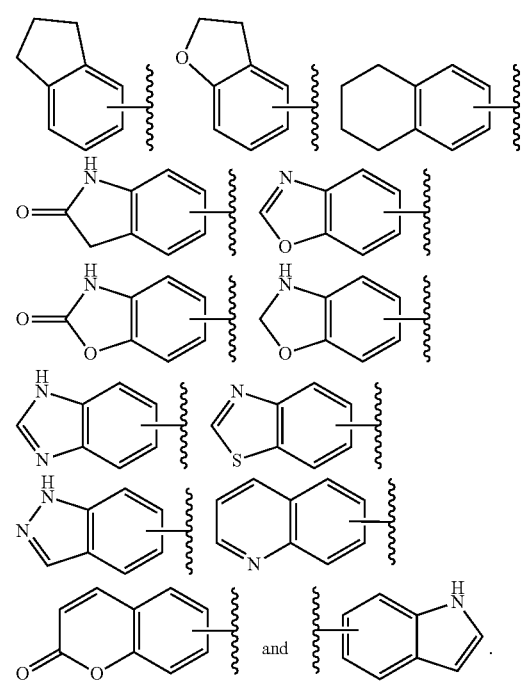

"Heteroaryl or heteroaryl ring" refers to a heteroaromatic system containing 5 to 14 annular atoms, of which 1 to 4 annular atoms are selected from heteroatoms including O, S and N. Heteroaryl preferably is 5- to 10-membered, and more preferably 5- or 6-membered, such as furyl, thienyl, pyridyl, pyrrolyl, pyrimidyl, pyrazinyl, pyrazolyl, imidazolyl, tetrazolyl, oxazolyl, isoxazolyl, thiazolyl, isothiazolyl, quinolinyl, isoquinolinyl, indolyl and isoindolyl. The heteroaryl ring can be fused with an aryl, heterocyclyl or cycloalkyl ring, and unrestricted examples include but are not limited to:

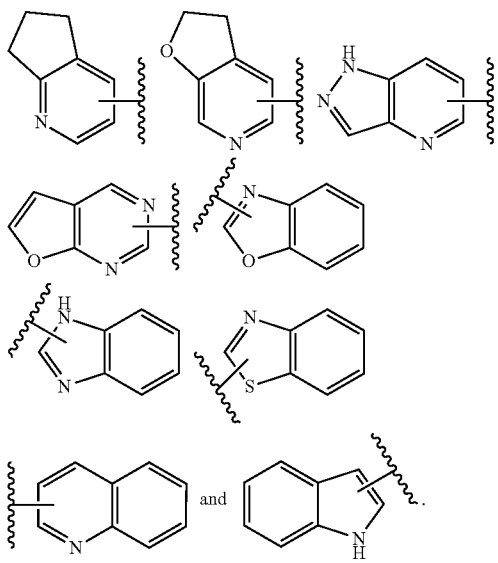

"Halogen" refers to F, Cl, Br or I
"Cyano" refers to —CN.
"Oxo" refers to =O.
"Carbonyl" refers to —C(=O)— group.
"Sulfonyl" refers to a —S(O)$_2$— group.
"Sulfinyl" refers to a —S(O)— group.
"Optional substitution or optionally substituted" refers to that one or more hydrogen atoms in a group, preferably 5, more preferably 1 to 3 hydrogen atoms, are independently substituted by a corresponding number of substituents, it goes without saying, the substituents are located only in the chemical positions where they may be located, and those skilled in the art can determine possible or impossible substitutions without, making much effort, (by experiment or theory). For example, amino or hydroxyl groups with free hydrogen may be unstable when bound with carbon atoms with unsaturated bonds (such as olefinic). The substituents include but are not limited to halogen, cyano, nitro, oxo, —SF$_5$, C$_{1-4}$ alkyl, C$_{3-7}$ cycloalkyl, etc.

"Isomers" refer to compounds that have the same molecular formula but the nature or sequence of their atomic binding or spatial arrangement, is different. Isomers with different arrangement of their atoms in space are called "stereoisomers". Stereoisomers include optical isomers, geometric isomers and conformational isomers.

The compounds of the present invention can exist in form of optical isomers. Optical isomers include enantiomers and diastereoisomers. An enantiomer is one of two stereoisomers that are mirror images of each other that are non-superposable. A racemic mixture, or racemate is one that has equal amounts of left- and right-handed enantiomers of a chiral molecule. Diastereomers are stereoisomers that are not mirror images of one another and are non-superimposable on one another. Methods for preparing and separating optical isomers are known in the art. When a compound is a single isomer and its absolute configuration is determined, it is referred as a "R" or "S" isomer according to the configuration of the substituents around the chiral carbon atom; when its absolute configuration is not determined, it is referred as a (+) or (−) isomer according to its measured optical rotation value.

The compounds of the present invention may also have geometric isomers resulting from the distribution of substituents around carbon-carbon double bonds, carbon-nitrogen double bonds, cycloalkyl or heterocyclyl groups. The substituents around the carbon-carbon double bond or carbon-nitrogen bond are designated to be in a Z or E configuration, and the substituents around the cycloalkyl or heterocycle are designated to be in a cis or trans configuration.

The compounds of the present invention may also show tautomerism, such as keto-enol tautomerism.

The present invention includes any tautomeric or stereoisomeric forms and mixtures thereof and is not limited to any tautomeric or stereoisomeric forms used in the compound nomenclature or chemical structural formulae.

"Isotopes" include all isotopes of the atoms appearing in the compounds of the present invention. Isotopes include those atoms with the same atomic number but in different masses. Examples of isotopes suitable for incorporation into the compounds of the present invention are isotopes of hydrogen, carbon, nitrogen, oxygen, phosphorus, fluorine and chlorine, for example but not limited to $^2$H (D), $^3$H, $^{13}$C, $^{14}$C, $^{15}$N, $^{18}$O, $^{17}$O, $^{31}$P, $^{32}$P, $^{35}$S, $^{18}$F and $^{36}$Cl. The isotopically labeled compounds of the present invention can generally be prepared by conventional techniques known to those skilled in the art or by methods similar to those described in the embodiments using appropriate isotopically labeled reagents instead of non-isotopically labeled reagents. Such compounds have various potential uses, for example, as standards and reagents in the determination of biological activities. In the case of stable isotopes such as deuterium $^2$H (D), $^{13}$C and $^{15}$N, such compounds have the potential to beneficially alter biological, pharmacological or pharmacokinetic properties. Deuterium $^2$H (D) is a preferable isotope of the present invention. For example, the hydrogens of —CH$_3$ can be substituted by D to —CD$_3$. For example, one or more hydrogens of cyclopropyl can be substituted by D.

The compounds of the present invention can be administered in form of prodrugs. "Prodrugs" refer to derivatives that are converted into biologically active compounds under the physiological condition in vivo, for example, by oxidation, reduction and hydrolysis (each of which occurs with or without the participation of enzymes). Examples of a prodrug are a compound of the present invention in which an amino is acylated, alkylated or phosphorylated, for example eicosanoyl amino, alanyl amino and pivaloyloxymethyl amino; a hydroxyl is acylated, alkylated or phosphorylated or converted into borate, for example acetoxy, palmitoyloxy, pivaloyloxy, succinyloxy, fumaroyloxy and alanyloxy; a carbonyl is esterified or amidated; and a thiol forms a disulfide bridge with a carrier molecule that selectively delivers the drug to the target and/or to the cytosol of cells, such as peptide. Prodrugs can be prepared from the compounds of the present invention according to well-known methods.

"Pharmaceutically acceptable salts" refer to the salts made from the compounds of the present invention with pharmaceutically acceptable bases or acids, including inorganic alkalis or acids and organic bases or acids, under the condition that the compounds contain one or more acidic or basic groups. Therefore, the compounds of the present invention that contain acidic groups can exist in form of salts, for example, as alkali metal salts, alkaline earth metal salts, or ammonium salts. For example, such salts include sodium salts, potassium salts, calcium salts, magnesium salts or ammonia or organic amine salts such as salts of ethylamine, ethanol amine, triethanolamine or amino acids. The compounds of the present invention that contain basic groups can exist in form of salts as inorganic or organic acid salts. Examples of suitable acids include hydrochloric acid, hydrobromic acid, phosphoric acid, sulfuric acid, nitric acid, methanesulfonic acid, p-toluenesulfonic acid, naphthalene disulfonic acid, oxalic acid, acetic acid, tartaric acid, lactic acid, salicylic acid, benzoic acid, formic acid, propanoic acid, pivalic acid, malonic acid, succinic acid, pimelic acid, fumaric acid, maleic acid, malic acid, sulfamic acid, phenylpropionic acid, gluconic acid, ascorbic acid, isonicotinic acid, citric acid, adipic acid and other acids known to those skilled in the art. If the compounds of the present invention contain both acidic and basic groups in the molecule, the present invention further includes internal salts in addition to the mentioned salt forms. Each salt can be obtained by conventional methods known to those skilled in the art, for example by mixing a compound of the present, invention with an organic or inorganic acid or base in a solvent or dispersant or by anion exchange or cation exchange with another salt.

"Pharmaceutical composition" refers to a composition containing one or more of the compounds described herein or pharmaceutically acceptable salts, prodrugs, stable isotope derivatives and isomers thereof, and other components such as pharmaceutically acceptable carriers and excipients.

When "compounds" are mentioned in the present application, all the compound forms are included, such as pharmaceutically acceptable salts, prodrugs, stable isotope derivatives and isomers thereof as well as mixtures thereof.

"Autoimmune diseases or inflammatory diseases" include but are not limited to arthritis, Hashimoto's thyroiditis, autoimmune hemolytic anemia, autoimmune atrophic gastritis of pernicious anemia, autoimmune encephalomyelitis, autoimmune orchitis, Goodpasture's disease, autoimmune thrombocytopenia, sympathetic ophthalmia, myasthenia gravis, Graves' disease, primary biliary cirrhosis, hepatitis, primary sclerosing cholangitis, chronic invasive hepatitis, non-alcoholic fatty liver disease, non-alcoholic steatohepatitis, ulcerative colitis, membranous glomerulopathy, systemic lupus erythematosus, rheumatoid arthritis, psoriasis arthritis, Sjogren's syndrome, Reiter's syndrome, polymyositis, dermatomyositis, I-type interferon disease including Aicardi-Goutières syndrome and other systemic sclerosis that overexpresses I-type interferon, Mendelian disease, polyarteritis nodosa, multiple sclerosis, relapsing multiple sclerosis, primary progressive multiple sclerosis, secondary progressive multiple sclerosis, and bullous pemphigoid; further, autoimmune diseases based on O-cell (body fluid) or T-cell include Cogan's syndrome, ankylosing spondylitis, Wegener's granulomatosis, autoimmune alopecia, type 1 or juvenile diabetes, and thyroiditis.

In this document, term "enteritis" includes but is not limited to Crohn's disease, ulcerative colitis, inflammatory bowel disease, celiac disease, proctitis, eosinophilic gastroenteritis, and mastocytosis.

"Cancers/tumors" include but are not limited to digestive/gastrointestinal cancer, colon cancer, liver cancer, skin cancer (including mast cell tumor and squamous cell carcinoma), breast cancer, ovarian cancer, prostate cancer, lymphoma, leukemia (including acute myeloid leukemia and chronic myelogenous leukemia), kidney cancer, lung cancer, muscle cancer, hone cancer, bladder cancer, brain cancer, melanoma (including oral and metastatic melanoma), Kaposi's sarcoma (myeloma including multiple myeloma), myeloproliferative diseases, proliferative diabetic retinopathy, and vascular hyperplasia-related disorders/tumors.

"Skin diseases" include but are not limited to atopic dermatitis, eczema, psoriasis, scleroderma, pruritus or other itching symptoms, vitiligo, and hair loss.

"Diabetes" include but are not limited to type I diabetes and diabetic complications.

"Eye diseases" include but are not limited to keratoconjunctivitis, uveitis (including uveitis associated with Behcet's disease and uveitis caused by the lens), keratitis, herpetic keratitis, keratoconus, dystrophia epithelialis corneae, corneal leukopenia, anterior uveitis, Mooren's ulcer, scleritis, Graves' eye disease, Vogt-Koyanagi-Harada syndrome, keratoconjunctivitis sicca (dry eye), blisters, iridocyclitis sarcoidosis, endocrine ophthalmopathy, sympathetic ophthalmia, allergic conjunctivitis and ocular neovascularization.

"Neurodegenerative diseases" include but are not limited to motor neuron disease, Alzheimer's disease, Parkinson's disease, amyotrophic lateral sclerosis, Huntington's disease, cerebral ischemia; neurodegenerative disease caused by trauma, injury, glutamate neurotoxicity or hypoxia; ischemia/reperfusion injury in stroke, myocardial ischemia, renal ischemia, heart attack, cardiac hypertrophy, atherosclerosis and arteriosclerosis, organ hypoxia or platelet aggregation.

"Anaphylaxis" includes but is not limited to allergic dermatitis in mammals (including anaphylactic diseases of horses, such as bite hypersensitivity), summer eczema, itchy horseshoes, spasm, inflammatory airway diseases, repeated airway obstruction, airway hyperresponsiveness, and chronic obstructive pulmonary disease.

"Asthma and other obstructive airway diseases" include but are not limited to chronic or excessive asthma, delayed asthma, bronchitis, bronchial asthma, allergic asthma, endogenous asthma, exogenous asthma, and dusty asthma.

"Transplant rejection" includes but is not limited to islet transplant rejection, bone marrow transplant rejection, graft versus host disease, organ and cell transplant rejection (such as bone marrow, cartilage, cornea, heart, intervertebral disc, islet, kidney, limb, liver, lung, muscle, myoblast, nerve, pancreas, skin, small intestine or trachea), and xenotransplantation.

"Therapeutically effective amount" refers to the amount of the compound of the present invention that can effectively inhibit the function of JAK, in particular TYK2, and/or treat or prevent the disease mediated by the kinase.

"Patients" refer to mammals, preferably humans.

The present invention provides compounds useful as inhibitors of JAK, in particular TYK2. The compounds are shown in Formula (I), or prodrugs, stable isotope derivatives, pharmaceutically acceptable salts and isomers thereof.

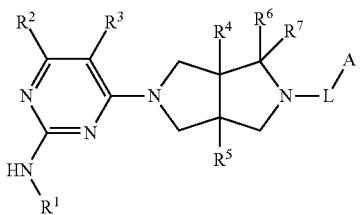

(I)

where:
R$^1$ is aryl or heteroaryl, where one or more hydrogens of the aryl and heteroaryl are optionally substituted by D, halogen, cyano, —OR$^b$, —NR$^b$R$^c$, —COOR$^b$, —C(O)R$^b$, —NR$^b$C(O)R$^c$, —C(O)NR$^b$R$^c$, —S(O)$_2$R$^b$, —S(O)$_2$ NR$^b$R$^c$, —S(O)(NR$^b$)R$^c$, —P(O)(CH$_3$)$_2$, C$_{1-6}$ alkyl, C$_{3-6}$ cycloalkyl, 3- to 8-membered heterocyclyl or 5- to 6-membered heteroaryl;

R$^2$ is H, D or —NHR$^a$;

R$^3$ is H, D, halogen, cyano, C$_{1-6}$ alkyl, C$_{3-6}$ cycloalkyl or OC$_{1-6}$ alkyl, where one or more hydrogens of the alkyl and cycloalkyl are optionally substituted by D or F;

R$^4$ and R$^5$ are independently selected from H, D, halogen, C$_{1-6}$ alkyl or OC$_{1-6}$ alkyl, where one or more hydrogens of the alkyl are optionally substituted by D or F;

R$^6$ and R$^7$ are independently selected from H, D, cyano or C$_{1-6}$ alkyl, where one or more hydrogens of the alkyl is optionally substituted by D or F, or R$^6$ and R$^7$ combine as oxo;

L is a bond, C$_{1-6}$ alkylene, —C(O)—, —C(O)O—, —C(O)N(R$^a$)—, —S(O)$_2$— or —S(O)$_2$N(R$^a$)—;

A is H, C$_{1-6}$ alkyl, C$_{3-6}$ cycloalkyl, 3- to 8-membered heterocyclyl, aryl or heteroaryl, where one or more hydrogens of the alkyl, cycloalkyl, heterocyclyl, aryl and heteroaryl are optionally substituted by D, halogen, cyano, —OR$^d$, —NR$^d$R$^e$, C$_{1-6}$ alkyl, C$_{3-6}$ cycloalkyl or 3- to 8-membered heterocyclyl;

R$^3$ is H, C$_{1-6}$ alkyl or C$_{3-6}$ cycloalkyl, where one or more hydrogens of the alkyl and cycloalkyl are optionally substituted by D or F;

R$^b$ and R$^c$ are independently selected from H, C$_{1-6}$ alkyl. C$_{3-6}$ cycloalkyl or 3- to 8-membered heterocyclyl containing N and/or O, where one or more hydrogens of the alkyl, cycloalkyl and heterocyclyl are optionally further substituted by D, halogen, CN, —OH, —NH$_2$, C$_{1-6}$ alkyl and —OC$_{1-6}$ alkyl, and R$^d$ and R$^e$ are independently selected from H, C$_{1-6}$ alkyl, C$_{3-6}$ cycloalkyl or 3- to 8-membered heterocyclyl, where one or more hydrogens of the alkyl, cycloalkyl and heterocyclyl are optionally further substituted by D or F.

In one embodiment R$^1$ is phenyl.

In one embodiment, R$^1$ is 5- to 6-membered heteroaryl, for example, R$^1$ is pyridyl, pyrimidyl, or pyrazolyl.

In one embodiment, one or more hydrogens of the phenyl and heteroaryl of R$^1$ are optionally substituted by halogen, —COOR$^b$, —C(O)R$^b$, —C(O)NR$^b$R$^c$, C$_{1-6}$ alkyl, C$_{3-6}$ cycloalkyl or 4- to 6-membered heterocyclyl containing N and/or O, preferably, by C$_{1-6}$ alkyl, 4- to 6-membered heterocyclyl, —C(O)R$^b$ or —C(O)NR$^b$R$^c$, where one or more hydrogens of the alkyl, cycloalkyl and heterocyclyl are optionally further substituted by D, halogen, CN, —OH, —NH$_2$, C$_{1-6}$ alkyl and —OC$_{1-6}$ alkyl, preferably, by D, F, CN, —OH or C$_{1-6}$ alkyl.

In one embodiment, R$^b$ and R$^c$ are independently selected from H, C$_{1-6}$ alkyl, C$_{3-6}$ cycloalkyl or 4- to 6-membered heterocyclyl containing N and/or O, where one or more hydrogens of the alkyl, cycloalkyl and heterocyclyl are optionally further substituted by C$_{1-6}$ alkyl.

In one preferred embodiment, R$^2$ is H.

In one preferred embodiment, R$^3$ is H, halogen, cyano, C$_{1-6}$ alkyl or OC$_{1-6}$ alkyl.

In one preferred embodiment, R$^4$ and R$^5$ are independently H or C$_{1-6}$ alkyl.

In one preferred embodiment, R$^6$ and R$^7$ are H, or R$^6$ and R$^7$ combine as oxo.

In one preferred embodiment, L is a bond, C$_{1-6}$ alkylene, —C(O)—, —C(O)O—, —C(O)NH— or —S(O)$_2$—.

In one embodiment, A is C$_{1-6}$ alkyl or C$_{3-6}$ cycloalkyl, where one or more hydrogens of the alkyl and cycloalkyl are optionally substituted by halogen, cyano, —OH, —OC$_{1-2}$ alkyl or C$_{1-2}$ alkyl.

In one embodiment, A is pyridyl, pyrimidyl, 5-membered heteroaryl or 4- to 6-membered heterocyclyl, where one or more hydrogens of the heterocyclyl and heteroaryl are optionally substituted by halogen, cyano, —OH, —OC$_{1-2}$ alkyl or C$_{1-2}$ alkyl, preferably, by C$_{1-2}$ alkyl.

In some embodiments, the compounds shown in Formula (I) has the following Formula (II):

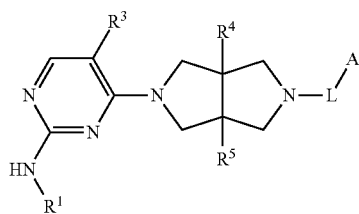

(II)

where:
R$^1$ is phenyl, pyridyl or pyrazolyl, where one or more hydrogens of the phenyl, pyridyl and pyrazolyl are optionally substituted by halogen, C$_{1-6}$ alkyl, 4- to 6-membered heterocycyl containing N and/or O (e.g., morpholine, piperazine, piperidine, pyrrolidine, and oxetane), —C(O)R$^b$ or —C(O)NR$^b$R$^c$, and one or more hydrogens of the alkyl and heterocyclyl are optionally further substituted by D, F, CN, —OH or C$_{1-6}$ alkyl;

R$^b$ and R$^c$ are independently selected from H, C$_{1-6}$ alkyl, C$_{3-6}$ cycloalkyl or 4- to 6-membered heterocyclyl containing N and/or O (e.g., morpholine, piperazine, piperidine, pyrrolidine, and oxetane), where one or more hydrogens of the alkyl, cycloalkyl and heterocyclyl are optionally further substituted by C$_{1-2}$ alkyl;

R$^3$ is H, halogen, cyano, C$_{1-6}$ alkyl or OC$_{1-6}$ alkyl;

R$^4$ and R$^5$ are independently H or C$_{1-6}$ alkyl;

L is a bond, C$_{1-6}$ alkylene, —C(O)—, —C(O)O—, —C(O)NH— or —S(O)$_2$—, and

A is C$_{1-6}$ alkyl, C$_{3-6}$ cycloalkyl, 4- to 6-membered heterocyclyl containing N and/or O (e.g., morpholine, piperazine, piperidine, pyrrolidine, and oxetane), pyridyl, pyrimidyl or 5-membered heteroaryl (e.g., isoxazole and pyrazole), where one or more hydrogens of the alkyl and cycloalkyl are optionally substituted by halogen, cyano, —OH, —OC$_{1-2}$ alkyl or C$_{1-2}$ alkyl, and those of the heterocyclyl and heteroaryl are optionally substituted by C$_{1-2}$ alkyl.

In one preferred embodiment, R$^1$ is pyrazolyl.

In one preferred embodiment, R$^3$ is H, halogen or C$_{1-6}$ alkyl.

In one preferred embodiment, R⁴ is H or methyl.
In one preferred embodiment, R³ is H or methyl.
In one preferred embodiment, L is —C(O)—.
In one preferred embodiment, A is $C_{1-6}$ alkyl or $C_{3-6}$ cycloalkyl, where one or more hydrogens of the alkyl and cycloalkyl are optionally substituted by halogen, cyano, —OH or —$OC_{1-2}$ alkyl.

In some embodiments, the compounds shown in Formula (II) has the following Formula (III):

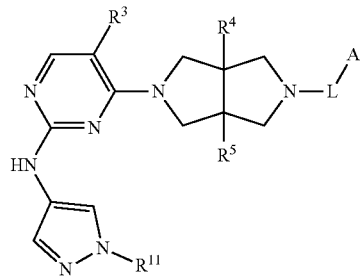

(III)

where:
R³ is H, halogen, cyano, $C_{1-6}$ alkyl, or $OC_{1-6}$ alkyl;
R⁴ and R⁵ are independently H or $C_{1-6}$ alkyl;
L is a bond, $C_{1-6}$ alkylene, —C(O)—, —C(O)O—, —C(O)NH—, or —S(O)₂—;
A is $C_{1-6}$ alkyl, $C_{3-6}$ cycloalkyl, 4- to 6-membered heterocyclyl containing N and/or O (e.g., morpholine, piperazine, piperidine, pyrrolidine, and oxetane), pyridyl, pyrimidyl, or 5-membered heteroaryl (e.g., isoxazole and pyrrazole), where one or more hydrogens of the alkyl and cycloalkyl are optionally substituted by D, halogen, cyano, —OH, —$OC_{1-2}$ alkyl or $C_{1-2}$ alkyl, and one or more hydrogens of the heterocyclyl and heteroaryl are optionally substituted by $C_{1-2}$ alkyl, and
R¹¹ is H, $C_{1-6}$ alkyl or 4- to 6-membered heterocyclyl containing N and/or O (e.g., morpholine, piperazine, piperidine, pyrrolidine, and oxetane), where one or more hydrogens of the alkyl and heterocyclyl are optionally substituted by D, F, CN, —OH or $C_{1-6}$ alkyl.

Preferred A of Formula III is $C_{1-6}$ alkyl or $C_{3-6}$ cycloalkyl, where one or more hydrogens of the alkyl and cycloalkyl are optionally substituted by halogen, cyano, —OH or —$OC_{1-2}$ alkyl.

Preferred R¹¹ is $C_{1-6}$ alkyl (e.g., methyl), wherein one or more hydrogens of the alkyl are optionally substituted by D, F, CN, —OH, or $C_{1-6}$ alkyl.

The present invention further relates to the following Compounds 1-100, or their pharmaceutically acceptable salts, prodrugs, stable isotope derivatives, isomers and mixtures thereof.

| Compound No. | Compound Structure and Chemical Name |
|---|---|
| 1. | cyclopropyl((3aR,6aS)-3a,6a-dimethyl-5-(2((1-methyl-1H-pyrazol-4-yl)amino)pyrimidin-4-yl)hexahydropyrrolo[3,4-c]pyrrol-2(1H)-yl)methanone |
| 2. | 4-((4(3aR,6aS)-5-(cyclopropanecarbonyl)-3a,6a-dimethylhexahydropyrrolo[3,4-c]pyrrol-2(1H)-yl)pyrimidin-2-yl)amino)benzoic acid |

-continued

| Compound No. | Compound Structure and Chemical Name |
|---|---|
| 3. | 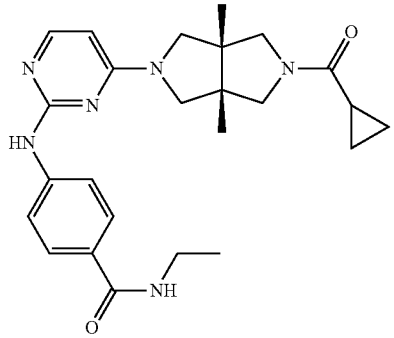 [SMILES: CCNC(=O)c1ccc(Nc2nccc(N3C[C@]4(C)CN(C(=O)C5CC5)C[C@]4(C)C3)n2)cc1]<br>4-((4(3aR,6aS)-5-(cyclopropanecarbonyl)-3a,6a-dimethylhexahydropyrrolo[3,4-c]pyrrol-2(1H)-yl)pyrimidin-2-yl)amino)-N-ethylbenzamide |
| 4. | 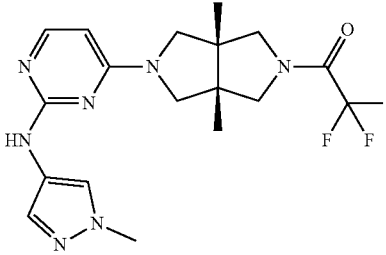<br>1-((3aR,6aS)-3a,6a-dimethyl-5-(2((1-methyl-1H-pyrazol-4-yl)amino)pyrimidin-4-yl)hexahydropyrrolo[3,4-c]pyrrol-2(1H)-yl)-2,2,2-trifluoroethan-1-one |
| 5. | 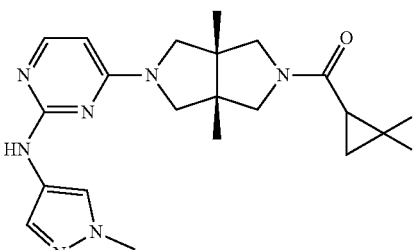<br>(2,2-difluorocyclopropyl)((3aR,6aS)-3a,6a-dimethyl-5-(2-((1-methyl-1H-pyrazol-4-yl)amino)pyrimidine-4-yl)hexahydropyrrolo[3,4-c]pyrrole-2(1H)-yl)methanone |
| 6. | 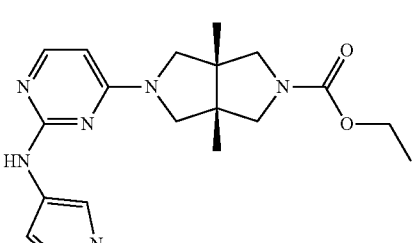<br>ethyl (3aR,6aS)-3a,6a-dimethyl-5-(2-((1-methyl-1H-pyrazol-4-yl)amino)pyrimidin-4-yl)hexahydropyrrol[3,4-c]pyrrole-2(1H)-carboxylate |

-continued

| Compound No. | Compound Structure and Chemical Name |
|---|---|
| 7. | 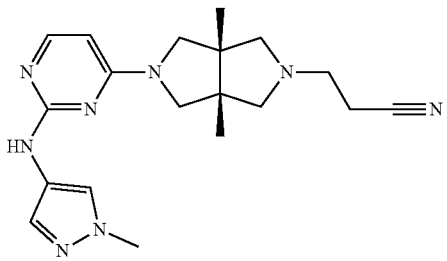 [SMILES: Cn1cc(Nc2nccc(N3C[C@]4(C)CN(CCC#N)C[C@]4(C)C3)n2)cn1]<br>3-((3aR,6aS)-3a,6a-dimethyl-5-(2-((1-methyl-1H-pyrazol-4-yl)amino)pyrimidin-4-yl)hexahydropyrrolo[3,4-c]pyrrol-2(1H)-yl)propanenitrile |
| 8. | 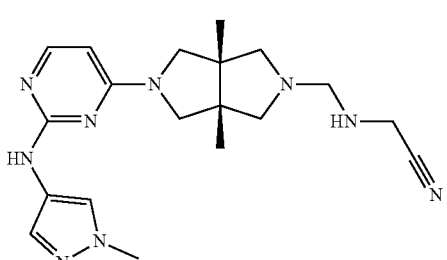<br>(3aR,6aS)-N-(cyanomethyl)-3a,6a-dimethyl-5-(2-((1-methyl-1H-pyrazol-4-yl)amino)pyrimidin-4-yl)hexahydropyrrolo[3,4-c]pyrrole-2(1H)-carboxamide |
| 9. | 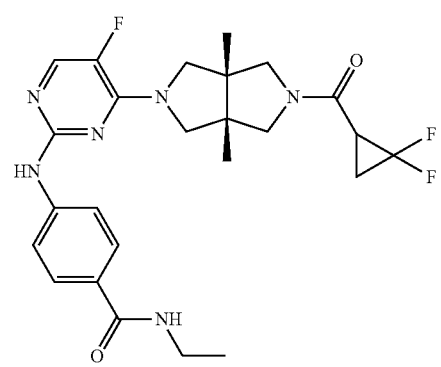 [SMILES: CCNC(=O)c1ccc(Nc2ncc(F)c(N3C[C@]4(C)CN(C(=O)C5CC5(F)F)C[C@]4(C)C3)n2)cc1]<br>4-((4-(3aR,6aS)-5-(2,2-difluorocyclopropane-1-carbonyl)hexahydropyrrolo[3,4-c]pyrrol-2(1H)-yl)-5-fluoropyrimidin-2-yl)amino)-N-ethylbenzaide |
| 10. | 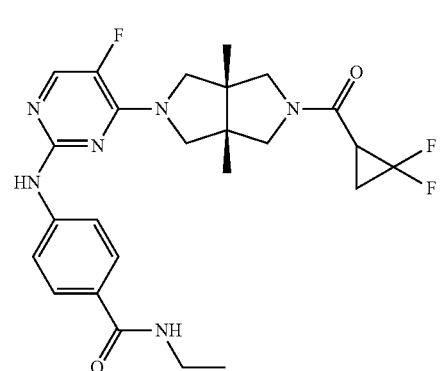 [SMILES: CCNC(=O)c1ccc(Nc2ncc(F)c(N3C[C@]4(C)CN(C(=O)C5CC5(F)F)C[C@]4(C)C3)n2)cc1]<br>4-((4-((3aR,6aS)-5-(2,2-difluorocyclopropane-1-carbonyl)-3a,6a-dimethylhexahydropyrrolo[3,4-c]pyrrol-2(1H)-yl)-5-fluoropyrimidin-2-yl)amino)-N-ethylbenzamide |

| Compound No. | Compound Structure and Chemical Name |
|---|---|
| 11. | 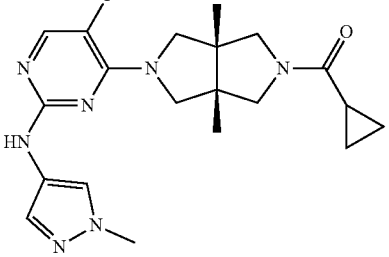
cyclopropyl((3aR,6aS)-5-(5-fuoro-2-((1-methyl-1H-pyrazol-4-ylamino)pyrimidin-4-yl)-3a,6a-dimethylhexahydropyrrolo[3,4-c]pyrrol-2(1H)-yl)methanone |
| 12. | 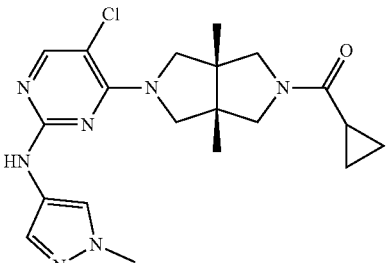
((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)(cyclopropyl)methanone |
| 13. | 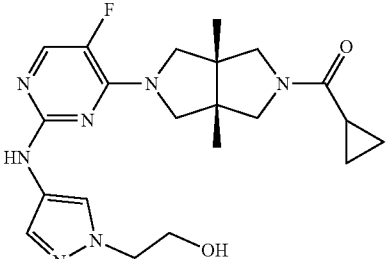
cyclopropyl((3aR,6aS)-5-5-fluoro-2-((1-(2-hydroxyethyl)-1H-pyrazol-4-yl)amino)pyrimidin-4-yl)-3a,6a-dimethylhexahydropyrrolo[3,4-c]pyrrol-2(1H)-yl)methanone |
| 14. | 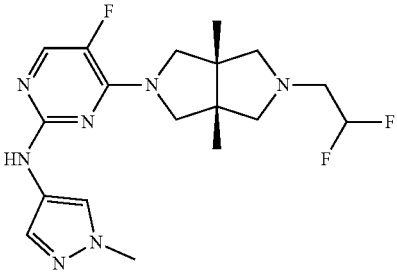 [SMILES: Cn1cc(Nc2ncc(F)c(N3C[C@]4(C)CN(CC(F)F)C[C@]4(C)C3)n2)cn1]
4-((3aR,6aS)-5-(2,2-difluoroethyl)-3a,6a-dimethylhexahydropyrrolo[3,4-c]pyrrol-2(1H)-yl)-5-fluoro-N-(1-methyl-1H-pyrazol-4-yl)pyrimidin-2-amine |

-continued

| Compound No. | Compound Structure and Chemical Name |
|---|---|
| 15. | 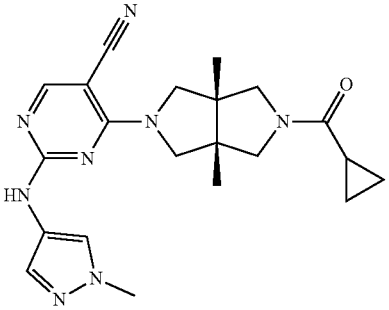 [SMILES: Cn1cc(Nc2ncc(C#N)c(N3C[C@]4(C)CN(C(=O)C5CC5)C[C@]4(C)C3)n2)cn1]<br>4-((3aR,6aS)-5-(cyclopropanecarbonyl)-3a,6a-dimethlhexahydropyrrolo[3,4-c]pyrrol-2(1H)-yl)-2-((1-methyl-1H-pyrazol-4-yl)amino)pyrimidine-5-carbonitrile |
| 16. | 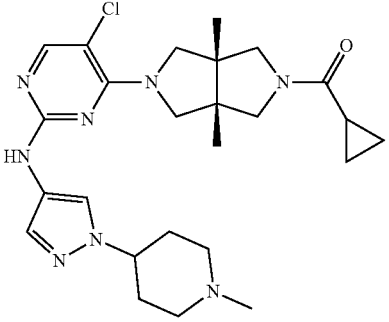 [SMILES: CN1CCC(n2cc(Nc3ncc(Cl)c(N4C[C@]5(C)CN(C(=O)C6CC6)C[C@]5(C)C4)n3)cn2)CC1]<br>((3aR,6aS)-5-(5-chloro-2-((1-(1-methylpiperidin-4-yl)-1H-pyrazol-4-yl)amino)pyrimidin-4-yl)-3a,6a-dimethylhexahydropyrrolo[3,4-c]pyrrol-2(1H)-yl)(cyclopropyl)methanone |
| 17. | 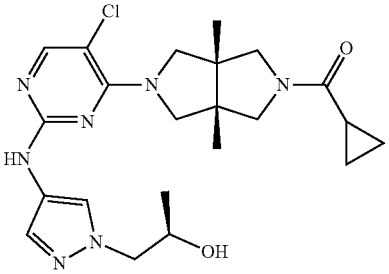 [SMILES: C[C@@H](O)Cn1cc(Nc2ncc(Cl)c(N3C[C@]4(C)CN(C(=O)C5CC5)C[C@]4(C)C3)n2)cn1]<br>((3aR,6aS)-5-(5-chloro-2-((1-((R)-2-hydroxypropyl)-1H-pyrazol-4-yl)amino)pyrimidin-4-yl)-3a,6a-dimethylhexahydropyrrolo[3,4-c]pyrrol-2(1H)-yl)(cyclopropyl)methanone |
| 18. | 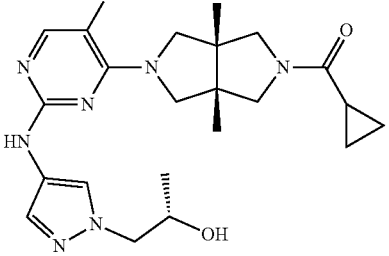<br>(3aR,6aS)-5-(5-chloro-2-((1-((S)-2-hydroxypropyl)-1H-pyrazol-4-yl)amino)pyrimidin-4-yl)-3a,6a-dimethylhexahydropyrrolo[3,4-c]pyrrol-2(1H)-yl)(cyclopropyl)methanone |

| Compound No. | Compound Structure and Chemical Name |
|---|---|
| 19. | 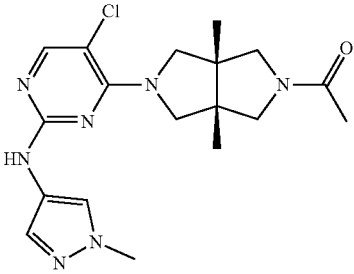 [SMILES: CC(=O)N1C[C@@]2(C)CN(c3nc(Nc4cnn(C)c4)ncc3Cl)C[C@@]2(C)C1]<br>1-((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)ethan-1-one |
| 20. | 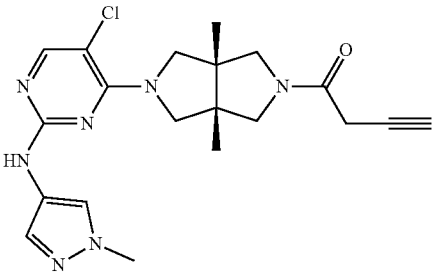 [SMILES: C#CCC(=O)N1C[C@@]2(C)CN(c3nc(Nc4cnn(C)c4)ncc3Cl)C[C@@]2(C)C1]<br>3-((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)-3-oxopropanenittile |
| 21. | 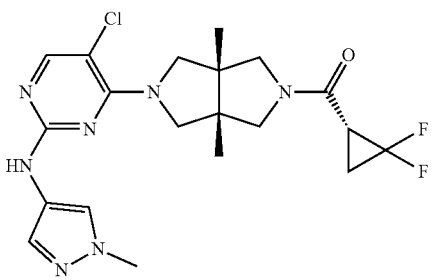 [SMILES: Cn1cc(Nc2ncc(Cl)c(N3C[C@]4(C)CN(C(=O)[C@H]5CC5(F)F)C[C@]4(C)C3)n2)cn1]<br>((3aR,6aS)-5-(5-chloro-2-((1-methyl-1H-pyrazol-4-yl)amino)pyrimidin-4-yl))-3a,6a-dimethylhexahydropyrrolo[3,4-c]pyrrol-2(1H)-yl)((R)-2,2-difluorocyclopropyl)methanone |
| 22. | 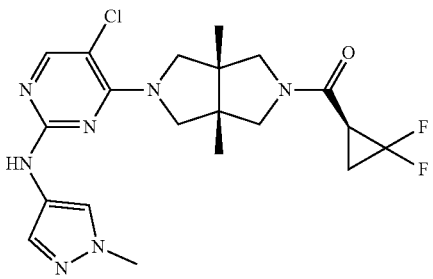<br>((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)((S)-2,2-difluorocyclopropyl)methanone |

-continued

| Compound No. | Compound Structure and Chemical Name |
|---|---|
| 23. | 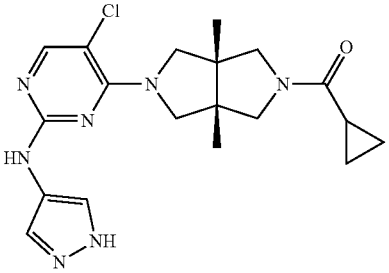 [SMILES: C[C@@]12CN(C(=O)C3CC3)C[C@]1(C)CN(c1nc(Nc3cn[nH]c3)ncc1Cl)C2]<br>((3aR,6aS)-5-(2-((1H-pyrazol-4-yl)amino)-5-chloropyrimidin-4-yl)-3a,6a-dimethylhexahydropyrrolo[3,4-c]pyrrol-2(1H)-yl)(cyclopropyl)methanone |
| 24. | 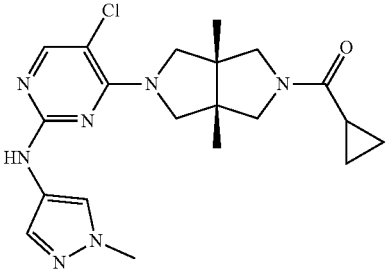<br>cyclopropyl((3aR,6aS)-3a,6a-dimethyl-5-(5-methyl-2((1-methyl-1H-pyrazol-4-yl)amino)pyriraidin-4-yl)hexahydropyrrolo[3,4-c]pyrrol-2(1H)-yl)methanone |
| 25. | 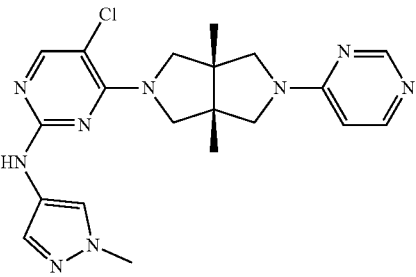 [SMILES: Cn1cc(Nc2ncc(Cl)c(N3C[C@]4(C)CN(c5ccncn5)C[C@]4(C)C3)n2)cn1]<br>5-chloro-4-((3aR,6aS)-3a,6a-dimethyl-5-(pyrimidin-4-yl)hexahydropyrrolo[3,4-c]pyrrol-2(1H)-yl)-N-(1-methyl-1H-pyrazol-4-yl)pyrimidin-2-amine |
| 26. | 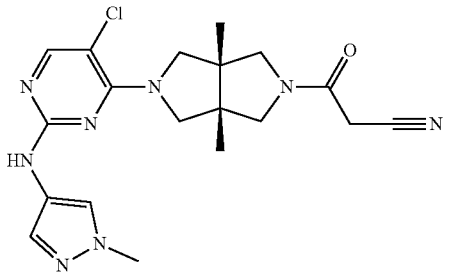 [SMILES: Cn1cc(Nc2ncc(Cl)c(N3C[C@]4(C)CN(C(=O)CC#N)C[C@]4(C)C3)n2)cn1]<br>3-((3aR,6aS)-5-(5-chloro-2-((1-methyl-H-pyrazol-4-yl)amino)pyrimidin-4-yl)hexahydropyrrolo[3,4-c]pyrrol-2(1H)-yl)-3-oxopropanenitrile |

-continued

| Compound No. | Compound Structure and Chemical Name |
|---|---|
| 27. | 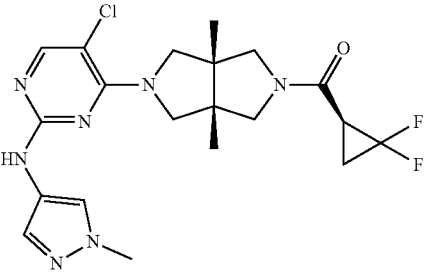 [SMILES: Cn1cc(Nc2ncc(Cl)c(N3C[C@]4(C)CN(C(=O)[C@@H]5CC5(F)F)C[C@]4(C)C3)n2)cn1]<br>((3aR,6aS)-5-(5-chloro-2-((1-methyl-1H-pyrazol-4-yl)amino)pyrimidin-4-yl)hexahydropyrrolo[3,4-c]pyrrol-2(1H)-yl)((S)-2,2-difluorocyclopropyl)methanone |
| 28. | 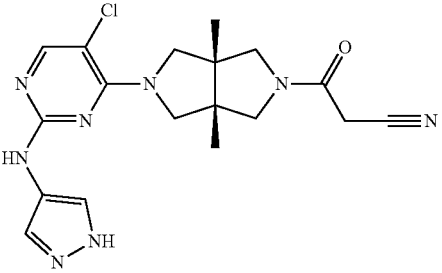 [SMILES: C[C@@]12CN(C(=O)CC#N)C[C@]1(C)CN(c1nc(Nc3cn[nH]c3)ncc1Cl)C2]<br>3-((3aR,6aS)-5-(2-((1H-pyrazol-4-yl)amino)-5-chloropyrimidin-4-yl)-3a,6a-dimethylhexahydropyrrolo[3,4-c]pyrrol-2(1H)-yl)-3-oxopropanenitrile |
| 29. | 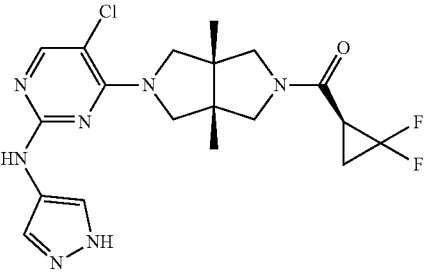 [SMILES: C[C@@]12CN(C(=O)[C@@H]3CC3(F)F)C[C@]1(C)CN(c1nc(Nc3cn[nH]c3)ncc1Cl)C2]<br>((3aR,6aS)-5-(2((1H-pyrazol-4-yl)amino)-5-chloropyrimidin-4-yl)-3a,6a-dimethylhexahydropyrrolo[3,4-c]pyrrol-2(1H)-yl)((S)-2,2-difluorocyclopropyl)methanone |
| 30. | 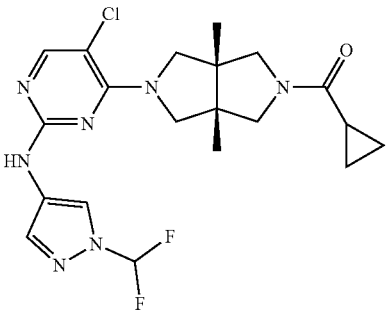 [SMILES: C[C@@]12CN(C(=O)C3CC3)C[C@]1(C)CN(c1nc(Nc3cnn(C(F)F)c3)ncc1Cl)C2]<br>((3aR,6aS)-5-(5-chloro-2-((1-(difluoromethyl)-1H-pyrazol-4-yl)amino)pyrimidin-4-yl)-3a,6a-dimethylhexahydropyrrolo[3,4-c]pyrrol-2(1H)-yl)(cyclopropyl)methanone |

| Compound No. | Compound Structure and Chemical Name |
|---|---|
| 31. | 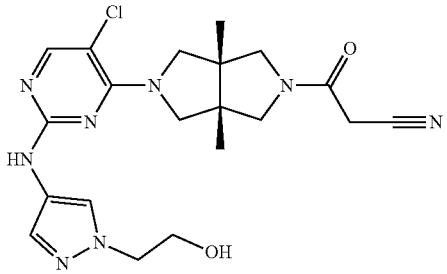 [SMILES: C[C@@]12CN(C(=O)CC#N)C[C@]1(C)CN(c1nc(Nc3cnn(CCO)c3)ncc1Cl)C2]<br>3-((3aR,6aS)-5-(5-chloro-2-((1-(2-hydroxyethyl)-1H-pyrazol-4-yl)amino)pyrimidin-4-yl)-3a,6a-dimethylhexahydropyrrolo[3,4-c]pyrrol-2(1H)-yl)-3-oxopropanenitrile |
| 32. | 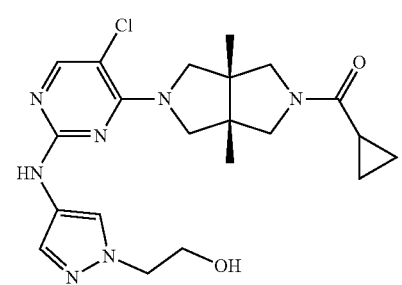<br>((3aR,6aS)-5-(5-chloro-2-((1-(2-hydroxyethyl)-1H-pyrazol-4-yl)amino)pyrimidin-4-yl)-3a,6a-dimethylhexahydropyrrolo[3,4-c]pyrrol-2(1H)-yl)(cyclopropyl)methanone |
| 33. | 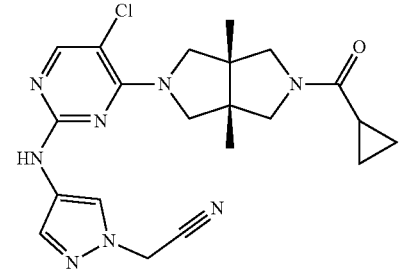 [SMILES: C[C@@]12CN(C(=O)C3CC3)C[C@]1(C)CN(c1nc(Nc3cnn(CC#N)c3)ncc1Cl)C2]<br>2-(4-((5-chloro-4-((3aR,6aS)-5-(cyclopropanecarbonyl)-3a,6a-dimethylhexahydropyrrolo[3,4-c]pyrrol-2(1H)-yl)pyrimidin-2-yl)amino)-1H-pyrazol-1-yl)acetonitrile |
| 34. | 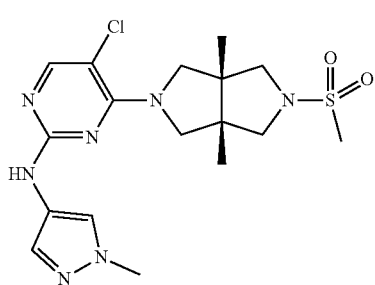 [SMILES: Cn1cc(Nc2ncc(Cl)c(N3C[C@@]4(C)CN(S(C)(=O)=O)C[C@@]4(C)C3)n2)cn1]<br>5-chloro-4-((3aR,6aS)-3a,6a-dimethyl-5-(methylsulfonyl)hexahydropyrrolo[3,4-c]pyrrol-2(1H)-yl)-N-(1-methyl-1H-pyrazol-4-yl)pyrimidin-2-amine |

-continued

| Compound No. | Compound Structure and Chemical Name |
|---|---|
| 35. | 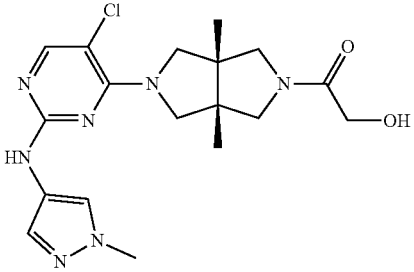 [SMILES: Cn1cc(Nc2ncc(Cl)c(N3C[C@]4(C)CN(C(=O)CO)C[C@]4(C)C3)n2)cn1]<br>1-((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)-2-hydroxyethan-1-one |
| 36. | 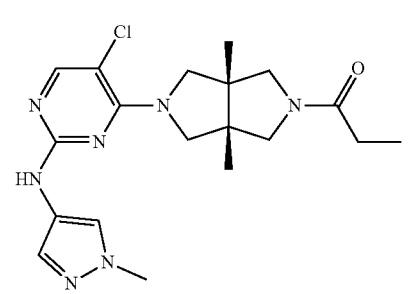 [SMILES: CCC(=O)N1C[C@@]2(C)CN(c3nc(Nc4cnn(C)c4)ncc3Cl)C[C@@]2(C)C1]<br>1-((3aR.,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)propan-1-one |
| 37. | 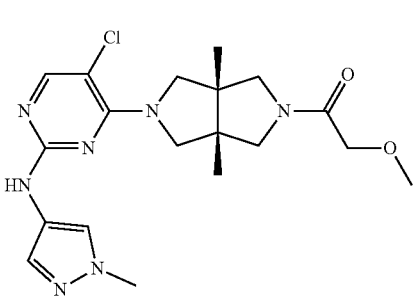<br>1-((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)-2-methoxyethan-1-one |
| 38. | 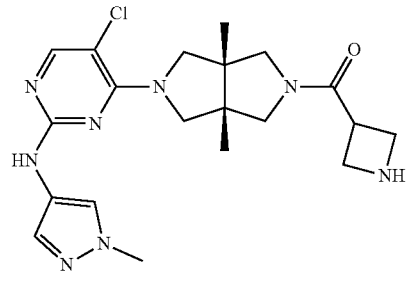 [SMILES: Cn1cc(Nc2ncc(Cl)c(N3C[C@]4(C)CN(C(=O)C5CNC5)C[C@]4(C)C3)n2)cn1]<br>azetidin-3-yl((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)methanone |

-continued

| Compound No. | Compound Structure and Chemical Name |
|---|---|
| 39. | 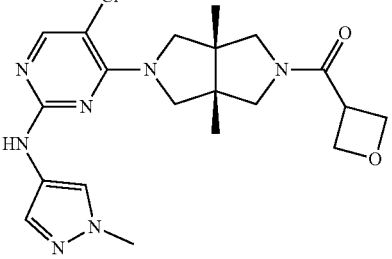<br>((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)(oxetan-3-yl)methanone |
| 40. | 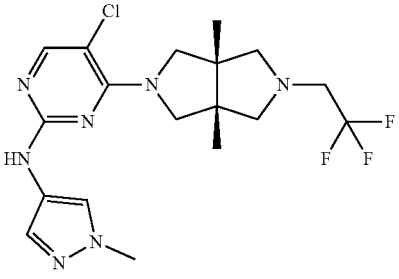 [SMILES: Cn1cc(Nc2ncc(Cl)c(N3C[C@]4(C)CN(CC(F)(F)F)C[C@]4(C)C3)n2)cn1]<br>5-chloro-4-((3aR,6aS)-3a,6a-dimethyl-5-(2,2,2-trifluoroethyl)hexahydropyrrolo[3,4-c]pyrrol-2(1H)-yl)-N-(1-methyl-1H-pyrazol-4-yl)pyrimidin-2-amine |
| 41. | 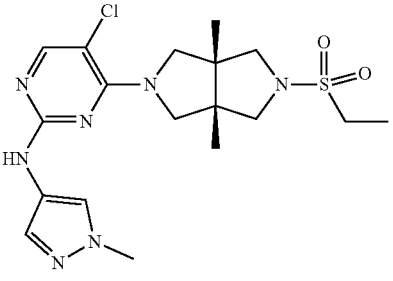 [SMILES: CCS(=O)(=O)N1C[C@]2(C)CN(c3nc(Nc4cnn(C)c4)ncc3Cl)C[C@]2(C)C1]<br>5-chloro-4-((3aR,6aS)-5-(ethylsulfonyl)-3a,6a-dimethylhexahydropyrrolo[3,4-c]pyrrol-2(1H)-yl)-N-(1-methyl-1H-pyrazol-4-yl)pyrimidin-2-amine |
| 42. | 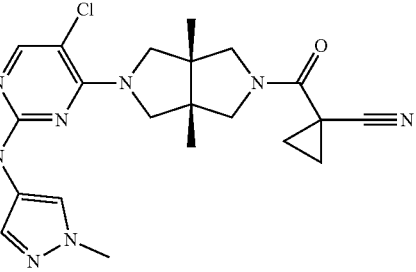<br>1-((3aR,6aS)-5-(5-chloro-2-((1-methyl-1H-pyrazol-4-yl)amino)pyrimidin-4-yl)-3a,6a-dimethyloctahydropyrrolo[3,4-c]pyrrole-2-carbonyl)cyclopropane-1-carbonitrile |

| Compound No. | Compound Structure and Chemical Name |
|---|---|
| 43. | 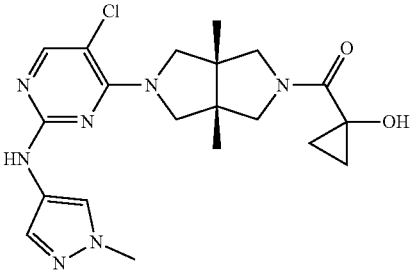 [SMILES: Cn1cc(Nc2ncc(Cl)c(N3C[C@]4(C)CN(C(=O)C5(O)CC5)C[C@]4(C)C3)n2)cn1]<br>((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)(1-hydroxycyclopropyl)methanone |
| 44. | 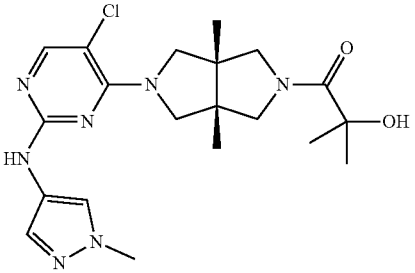 [SMILES: Cn1cc(Nc2ncc(Cl)c(N3C[C@]4(C)CN(C(=O)C(C)(C)O)C[C@]4(C)C3)n2)cn1]<br>1-((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)-2-hydroxy-2-methylpropan-1-one |
| 45. | 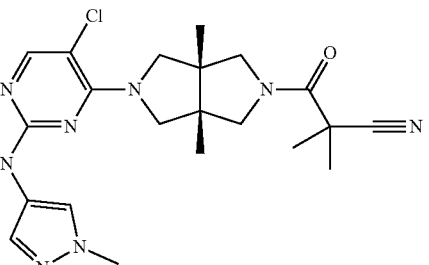<br>3-((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)-2,2-dimethyl-3-oxopropanenitrile |
| 46. | 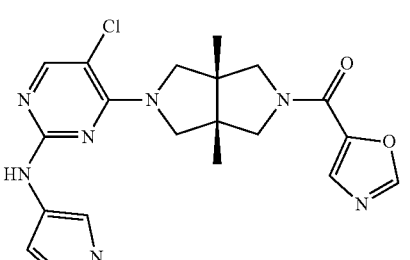<br>((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)(isoxazol-5-yl)methanone |

| Compound No. | Compound Structure and Chemical Name |
|---|---|
| 47. | 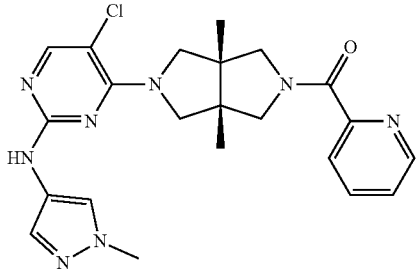 [SMILES: Cn1cc(Nc2ncc(Cl)c(N3C[C@]4(C)CN(C(=O)c5ccccn5)C[C@]4(C)C3)n2)cn1]<br>((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)(pyridin-2-yl)methanone |
| 48. | 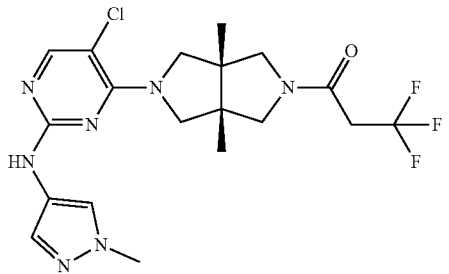 [SMILES: Cn1cc(Nc2ncc(Cl)c(N3C[C@]4(C)CN(C(=O)CC(F)(F)F)C[C@]4(C)C3)n2)cn1]<br>1-((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)-3,3,3-trifluoropropan-1-one |
| 49. | 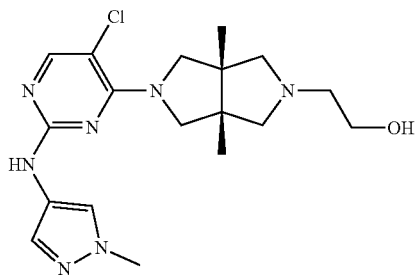 [SMILES: Cn1cc(Nc2ncc(Cl)c(N3C[C@]4(C)CN(CCO)C[C@]4(C)C3)n2)cn1]<br>2-((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)ethan-1-ol |
| 50. | 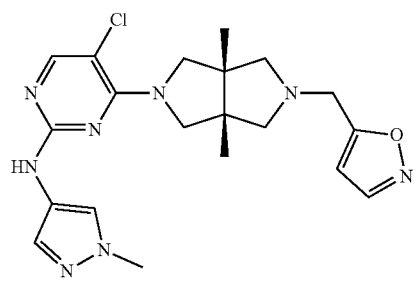 [SMILES: Cn1cc(Nc2ncc(Cl)c(N3C[C@]4(C)CN(Cc5ccno5)C[C@]4(C)C3)n2)cn1]<br>5-chloro-4-((3aR,6aS)-5-(isoxazol-5-ylmethyl)-3a,6a-dimethylhexahydropyrrolo[3,4-c]pyrrol-2(1H)-yl)-N-(1-methyl-1H-pyrazol-4-yl)pyrimidin-2-amine |

| Compound No. | Compound Structure and Chemical Name |
|---|---|
| 51. | 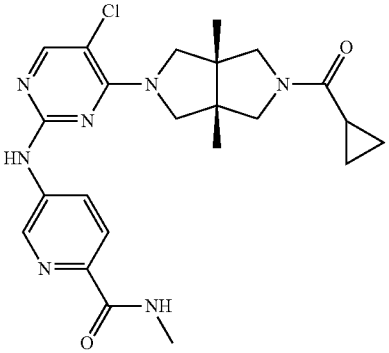 [SMILES: CNC(=O)c1ccc(Nc2ncc(Cl)c(N3C[C@]4(C)CN(C(=O)C5CC5)C[C@]4(C)C3)n2)cn1]<br>5-((5-chloro-4-((3aR,6aS)-5-(cyclopropanecarbonyl)-3a,6a-dimethylhexahydropyrrolo[3,4-c]pyrrol-2(1H)-yl)pyrimidin-2-yl)amino)-N-methylpicolinamide |
| 52. | 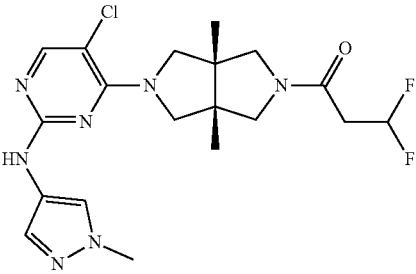 [SMILES: Cn1cc(Nc2ncc(Cl)c(N3C[C@]4(C)CN(C(=O)CC(F)F)C[C@]4(C)C3)n2)cn1]<br>1-(3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)-3,3-difluoropropan-1-one |
| 53. | 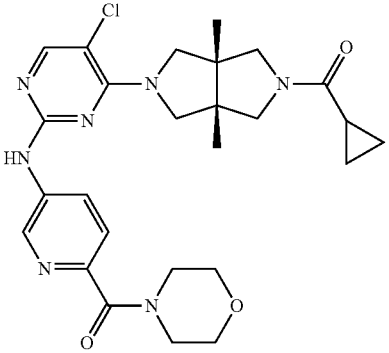 [SMILES: C[C@@]12CN(C(=O)C3CC3)C[C@]1(C)CN(c1nc(Nc3ccc(C(=O)N4CCOCC4)nc3)ncc1Cl)C2]<br>((3aR,6aS)-5-(5-chloro-2-((6-(morpholine-4-carbonyl)pyridin-3-yl)amino)pyrimidin-4-yl)-3a,6a-dimethylhexahydropyrrolo[3,4-c]pyrrol-2(1H)-yl)(cyclopropyl)methanone |
| 54. | 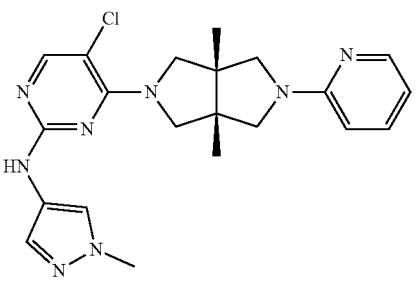 [SMILES: Cn1cc(Nc2ncc(Cl)c(N3C[C@]4(C)CN(c5ccccn5)C[C@]4(C)C3)n2)cn1]<br>5-chloro-4-((3aR,6aS)-3a,6a-dimethyl-5-(pyridin-2-yl)hexahydropyrrolo[3,4-c]pyrrol-2(1H)-yl)-N-(1-methyl-1H-pyrazol-4-yl)pyrimidin-2-amine |

| Compound No. | Compound Structure and Chemical Name |
|---|---|
| 55. | 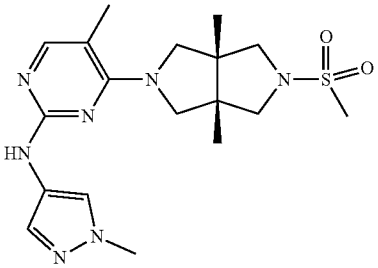 [SMILES: Cc1cnc(Nc2cnn(C)c2)nc1N1C[C@@]2(C)CN(S(C)(=O)=O)C[C@@]2(C)C1]
4-((3aR,6aS)-3a,6a-dimethyl-5-(methylsulfonyl)hexahydropyrrolo[3,4-c]pyrrol-2(1H)-yl)-5-methyl-N-(1-methyl-1H-pyrazol-4-yl)pyrimidin-2-amine |
| 56. | 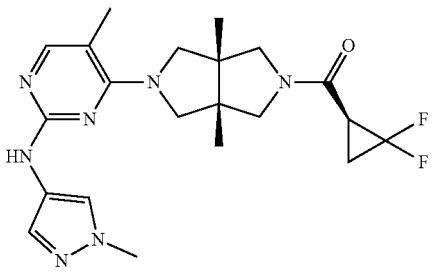 [SMILES: Cc1cnc(Nc2cnn(C)c2)nc1N1C[C@]2(C)CN(C(=O)[C@@H]3CC3(F)F)C[C@]2(C)C1]
((S)-2,2-difluorocyclopropyl)((3aR,6aS)-3a,6a-dimethyl-5-(5-methyl-2-((1-methyl-1H-pyrazol-4-yl)amino)pyrimidin-4-yl)hexahydropyrrolo[3,4-c]pyrrol-2(1H)-yl)methanone |
| 57. | 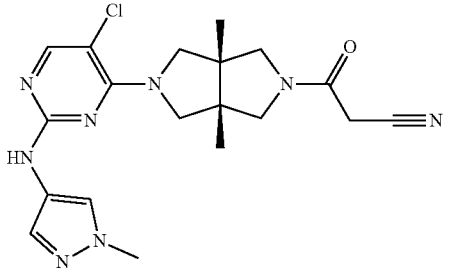 [SMILES: Cn1cc(Nc2ncc(Cl)c(N3C[C@]4(C)CN(C(=O)CC#N)C[C@]4(C)C3)n2)cn1]
3-((3aR,6aS)-3a,6a-dimethyl-5-5-methyl-2-((1-methyl-1H-pyrazol-4-yl)amino)pyrimidin-4-yl)hexahydropyrrolo[3,4-c]pyrrol-2(1H)-yl)-3-oxopropanenitrile |
| 58. | 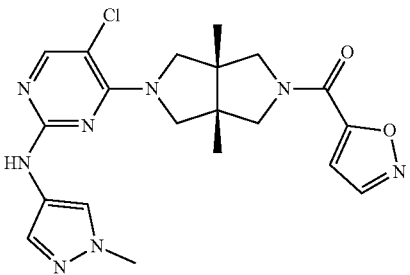 [SMILES: Cn1cc(Nc2ncc(Cl)c(N3C[C@]4(C)CN(C(=O)c5ccno5)C[C@]4(C)C3)n2)cn1]
((3aR,6aS)-3a,6a-dimethyl-5-(5-methyl-2-((1-methyl-1H-pyrazol-4-yl)amino)pyrimidin-4-yl)hexahydropyrrolo[3,4-c]pyrrol-2(1H)-yl)(isoxazol-5-yl)methanone |

-continued

| Compound No. | Compound Structure and Chemical Name |
|---|---|
| 59. | 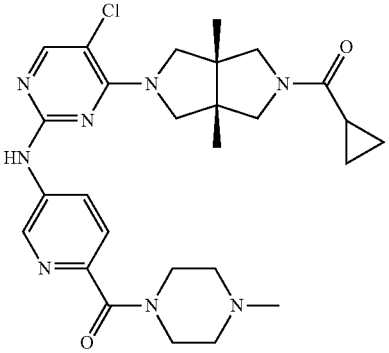 [SMILES: CN1CCN(C(=O)c2ccc(Nc3ncc(Cl)c(N4C[C@]5(C)CN(C(=O)C6CC6)C[C@]5(C)C4)n3)cn2)CC1]<br>((3aR,6aS)-5-(5-chloro-2-((6-(4-methylpiperazine-1-carbonyl)pyridin-3-yl)amino)pyrimidin-4-yl)-3a,6a-dimethylhexahydropyrrolo[3,4-c]pyrrol-2(1H)-yl)(cyclopropyl)methanone |
| 60. | 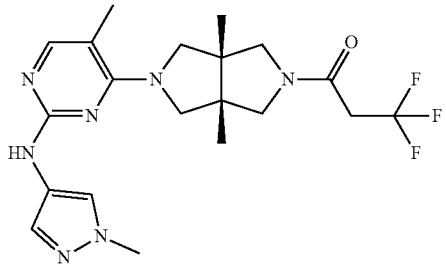 [SMILES: Cc1cnc(Nc2cnn(C)c2)nc1N1C[C@]2(C)CN(C(=O)CC(F)(F)F)C[C@]2(C)C1]<br>1-((3aR,6aS)-3a,6a-dimethyl-5-(5-methyl-2-((1-methyl-1H-pyrazol-4-yl)amino)pyrimidin-4-yl)hexahydropyrrolo[3,4-c]pyrrol-2(1H)-yl)-3,3,3-trifluoropropan-1-one |
| 61. | 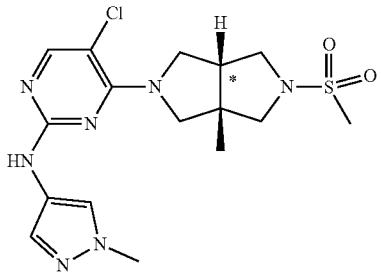 [SMILES: Cn1cc(Nc2ncc(Cl)c(N3C[C@@H]4CN(S(C)(=O)=O)C[C@]4(C)C3)n2)cn1]<br>cis-5-chloro-N-(1-methyl-1H-pyrazol-4-yl)-4-(3a-methyl-5-(methylsulfonyl)hexahydropyrrolo[3,4-c]pyrrol-2(1H)-yl)pyrimidin-2-amine |
| 62. | 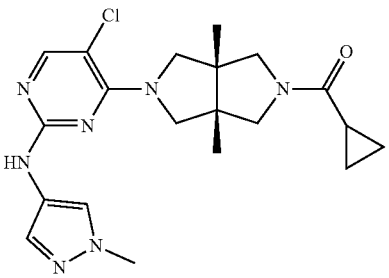<br>cis-(5-(5-chloro-2-((1-methyl-1H-pyrazol-4-yl)amino)pyrimidin-4-yl)-3a-methylhexahydropyrrolo[3,4-c]pyrrol-2(1H)-yl)(cyclopropyl)methanone |

-continued

| Compound No. | Compound Structure and Chemical Name |
|---|---|
| 63. | 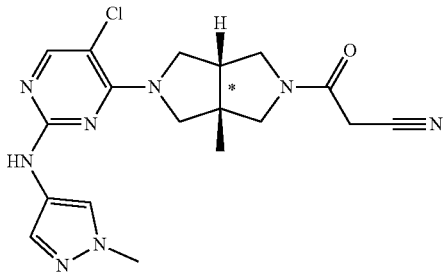 [SMILES: Cn1cc(Nc2ncc(Cl)c(N3C[C@@H]4CN(C(=O)CC#N)C[C@]4(C)C3)n2)cn1]<br>cis-3-(5-(5-chloro-2-((1-methyl-1H-pyrazol-4-yl)amino)pyrimidin-4-yl)-<br>3a-methylhexahydropyrrolo[3,4-c]pyrrol-2(1H)-yl)-3-oxopropanenitrile |
| 64. | 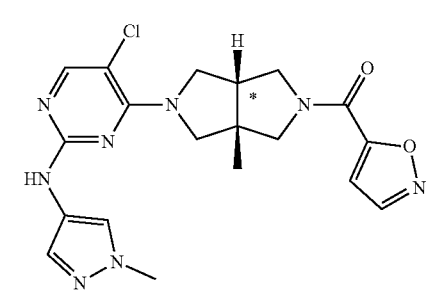 [SMILES: Cn1cc(Nc2ncc(Cl)c(N3C[C@@H]4CN(C(=O)c5ccno5)C[C@]4(C)C3)n2)cn1]<br>cis-(5-(5-chloro-2-((1-methyl-1H-pyrazol-4-yl)amino)pyrimidin-4-yl)-3a-<br>methylhexahydropyrrolo[3,4-c]pyrrol-2(1H)-yl)(isoxazol-5-yl)methanone |
| 65. | 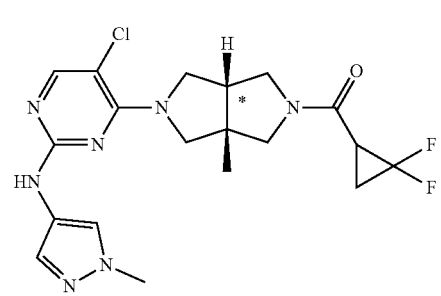 [SMILES: Cn1cc(Nc2ncc(Cl)c(N3C[C@@H]4CN(C(=O)C5CC5(F)F)C[C@]4(C)C3)n2)cn1]<br>cis-(5-(5-chloro-2-((1-methyl-1H-pyrazol-4-yl)amino)pyrimidin-4-yl)-3a-<br>methylhexahydropyrrolo[3,4-c]pyrrol-2(1H)-yl)((S)-2,2-<br>difluorocyclopropyl)methanone |
| 66. | 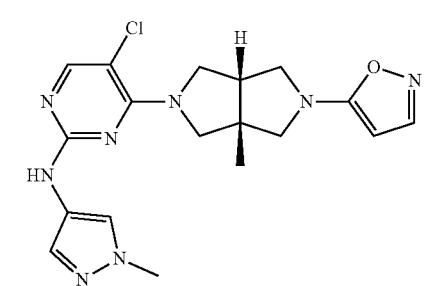 [SMILES: Cn1cc(Nc2ncc(Cl)c(N3C[C@@H]4CN(c5ccno5)C[C@]4(C)C3)n2)cn1]<br>5-chloro-4-((3aR,6aS)-5-(isoxazol-5-yl)-3a,6a-<br>diethylhexahydropyrrolo[3,4-c]pyrrol-2(1H)-yl)-N-(1-methyl-1H-pyrazol-4-yl)pyrimidin-2-amine |

| Compound No. | Compound Structure and Chemical Name |
|---|---|
| 67. | 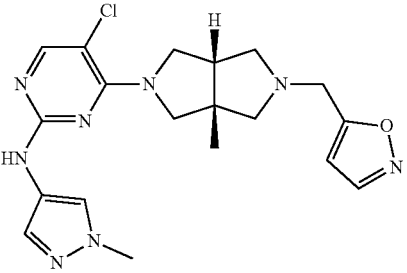 [SMILES: Cn1cc(Nc2ncc(Cl)c(N3C[C@@H]4CN(Cc5ccno5)C[C@]4(C)C3)n2)cn1]

4-(3aR,6aS)-5-(isoxazol-5-ylmethyl)-3a,6a-dimethylhexahydropyrrolo[3,4-c]pyrrol-2(1H)-yl)-5-methyl-N-(1-methyl-1H-pyrazol-4-yl)pyrimidin-2-amine |
| 68. | 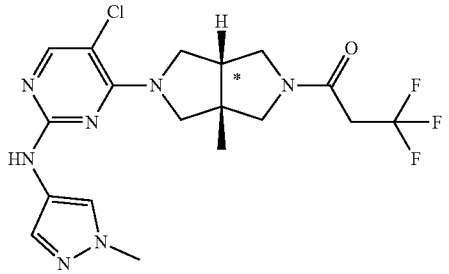 [SMILES: Cn1cc(Nc2ncc(Cl)c(N3C[C@@H]4CN(C(=O)CC(F)(F)F)C[C@]4(C)C3)n2)cn1]

cis-1-(5-(5-chloro-2-((1-methyl-1H-pyrazol-4-yl)amino)pyrimidin-4-yl)-3a-methylhexahydropyrrolo[3,4-c]pyrrol-2(1H)-yl)-3,3,3-trifluoropropan-1-one |
| 69. | 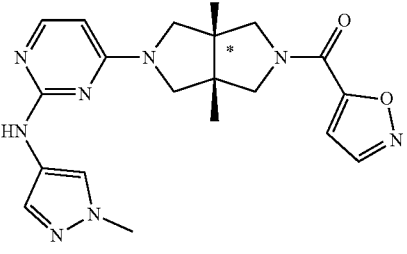

cis-4-(5-(isoxazol-5-ylmethyl)-3a-methylhexahydropyrrolo[3,4-c]pyrrol-2(1H)-yl)-N-(1-methyl-1H-pyrazol-4-yl)pyrimidin-2-amine |
| 70. | 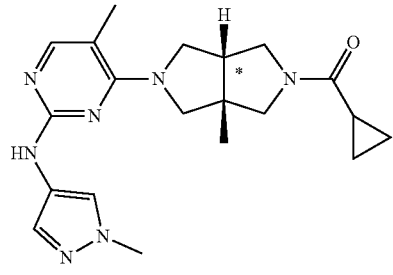 [SMILES: Cc1cnc(Nc2cnn(C)c2)nc1N1C[C@@H]2CN(C(=O)C3CC3)C[C@]2(C)C1]

cis-cyclopropyl(3a-methyl-5-(5-methyl-2-((1-methyl-1H-pyrazol-4-yl)amino)pyrimidin-4-yl)hexahydropyrrolo[3,4-c]pyrrol-2(1H)-yl)methanone |

| Compound No. | Compound Structure and Chemical Name |
|---|---|
| 71. | 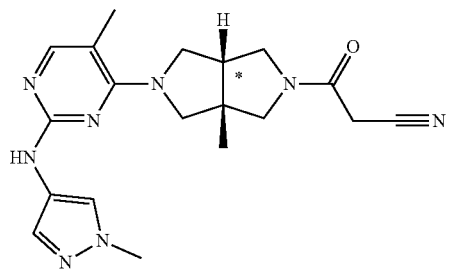 [SMILES: Cc1cnc(Nc2cnn(C)c2)nc1N1C[C@@H]2CN(C(=O)CC#N)C[C@]2(C)C1]<br>cis-3-(3a-methyl-5-(5-methyl-2-((1-methyl-1H-pyrazol-4-yl)amino)pyrimidin-4-yl)hexahydropyrrolo[3,4-c]pyrrol-2(1H)-yl)-3-oxopropanenitrile |
| 72. | 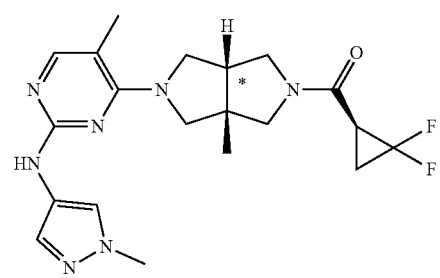 [SMILES: Cc1cnc(Nc2cnn(C)c2)nc1N1C[C@@H]2CN(C(=O)[C@@H]3CC3(F)F)C[C@]2(C)C1]<br>cis-((S)-2,2-difluorocyclopropyl)(3a-methyl-5-5-methyl-2-((1-methyl-1H-pyrazol-4-yl)amino)pyrimidin-4-yl)hexahydropyrrolo[3,4-c]pyrrol-2(1H)-yl)methanone |
| 73. | 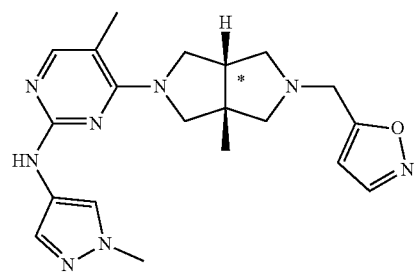 [SMILES: Cc1cnc(Nc2cnn(C)c2)nc1N1C[C@@H]2CN(Cc3ccno3)C[C@]2(C)C1]<br>cis-4-(5-(isoxazol-5-ylmethyl)-3a-methylhexahydropyrrolo[3,4-c]pyrrol-2(1H)-yl)-5-methyl-N-(1-methyl-1H-pyrazol-4-yl)pyrimidin-2-amine |
| 74. | 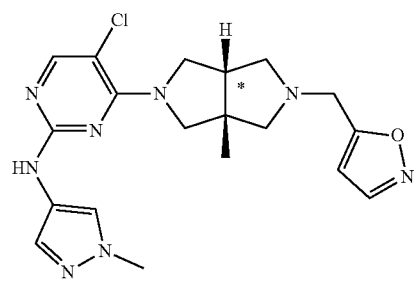 [SMILES: Cn1cc(Nc2ncc(Cl)c(N3C[C@@H]4CN(Cc5ccno5)C[C@]4(C)C3)n2)cn1]<br>cis-5-chloro-4-(5-(isoxazol-5-ylmethyl)-3a-methylhexahydropyrrolo[3,4-c]pyrrol-2(1H)-yl)-N-(1-methyl-1H-pyrazol-4-yl)pyrimidin-2-amine |

-continued

| Compound No. | Compound Structure and Chemical Name |
|---|---|
| 75. | 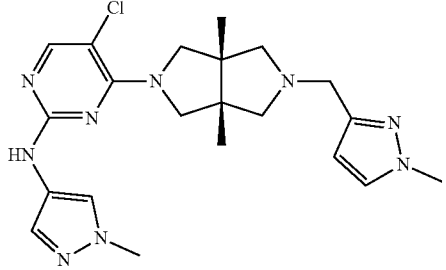 [SMILES: Cn1cc(Nc2ncc(Cl)c(N3C[C@]4(C)CN(Cc5ccn(C)n5)C[C@]4(C)C3)n2)cn1]<br>5-chloro-4-((3aR,6aS)-3a,6a-dimethyl-5-((1-methyl-1H-pyrazol-3-yl)methyl)hexahydropyrrolo[3,4-c]pyrrol-2(1H)-yl)-N-(1-methyl-1H-pyrazol-4-yl)pyrimidin-2-amine |
| 76. | 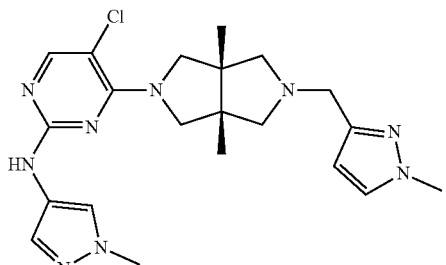<br>5-chloro-4-((3aR,6aS)-3a,6a-dimethyl-5-((1-methyl-IH-pyrazol-4-yl)methyl)hexahydropyrrolo[3,4-c]pyrrol-2(1H)-yl)-N-(1-methyl-1H-pyrazol-4-yl)pyrimidin-2-amine |
| 77. | 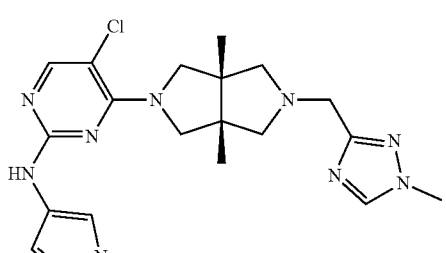<br>5-chloro-4-((3aR,6aS)-3a,6a-dimethyl-5-((1-methyl-1H-1,2,4-triazol-3-yl)methyl)hexahydropyrrolo[3,4-c]pyrrol-2(1H)-yl)-N-(1-methyl-1H-pyrazol-4-yl)pyrimidin-2-amine |
| 78. | 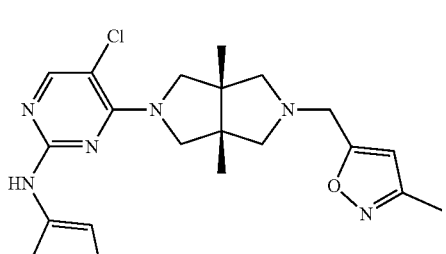<br>5-chloro-4-((3aR,6aS)-3a,6a-dimethyl-5-((3-methylisoxazol-5-yl)methyl)hexahydropyrrolo[3,4-c]pyrrol-2(1H)-yl)-N-(1-methyl-1H-pyrazol-4-yl)pyrimidin-2-amine |

-continued

| Compound No. | Compound Structure and Chemical Name |
|---|---|
| 79. | 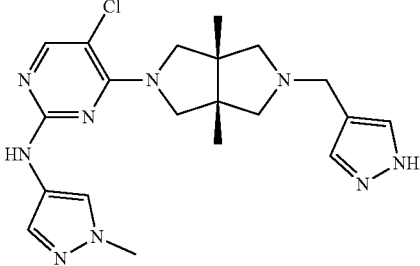 [SMILES: Cn1cc(Nc2ncc(Cl)c(N3C[C@]4(C)CN(Cc5cn[nH]c5)C[C@]4(C)C3)n2)cn1]<br>4-((3aR,6aS)-5-((1H-pyrazol-4-yl)methyl)-3a,6a-dimethylhexahydropyrrolo[3,4-c]pyrrol-2(1H)-yl)-5-chloro-N-(1-methyl-1H-pyrazol-4-yl)pyrimidin-2-amine |
| 80. | 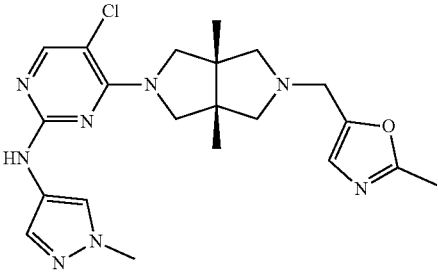 [SMILES: Cc1ncc(CN2C[C@@]3(C)CN(c4nc(Nc5cnn(C)c5)ncc4Cl)C[C@@]3(C)C2)o1]<br>5-chloro-4-((3aR,6aS)-3a,6a-dimethyl-5-((2-methyloxazol-5-yl)methyl)hexahydropyrrolo[3,4-c]pyrrol-2(1H)-yl)-N-(1-methyl-1H-pyrazol-4-yl)pyrimidin-2-amine |
| 81. | 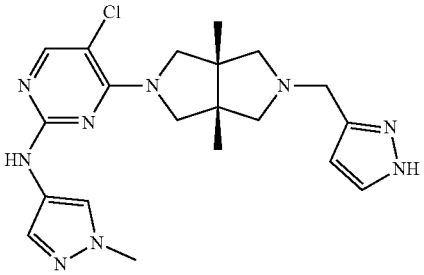 [SMILES: Cn1cc(Nc2ncc(Cl)c(N3C[C@]4(C)CN(Cc5cc[nH]n5)C[C@]4(C)C3)n2)cn1]<br>4-((3aR,6aS)-5-((1H-pyrazol-3-yl)methyl)-3a,6a-dimethylhexahydropyrrolo[3,4-c]pyrrol-2(1H)-yl)-5-chloro-N-(1-methyl-1H-pyrazol-4-yl)pyrimidin-2-amine |
| 82. | 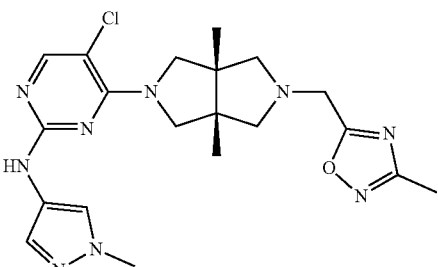<br>5-chloro-4-((3aR,6aS)-3a,6a-dimethyl-5-((3-methyl-1,2,4-oxadiazol-5-yl)methyl)hexahydropyrrolo[3,4-c]pyrrol-2(1H)-yl)-N-(1-methyl-1H-pyrazol-4-yl)pyrimidin-2-amine |

| Compound No. | Compound Structure and Chemical Name |
|---|---|
| 83. | 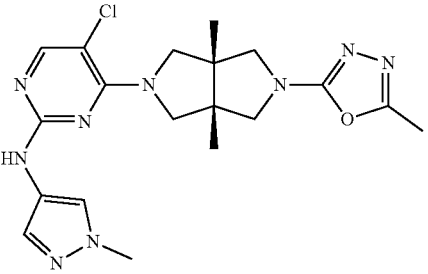 [SMILES: Cc1nnc(N2C[C@@]3(C)CN(c4nc(Nc5cnn(C)c5)ncc4Cl)C[C@@]3(C)C2)o1]<br>5-chloro-4-((3aR,6aS)-3a,6a-dimethyl-5-(5-methyl-1,3,4-oxadiazol-2-yl)hexahydropyrrolo[3,4-c]pyrrol-2(1H)-yl)-N-(1-methyl-1H-pyrazol-4-yl)pyrimidin-2-amine |
| 84. | 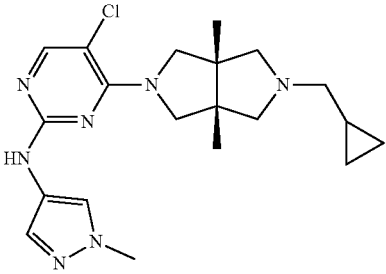 [SMILES: Cn1cc(Nc2ncc(Cl)c(N3C[C@]4(C)CN(CC5CC5)C[C@]4(C)C3)n2)cn1]<br>5-chloro-4-((3aR,6aS)-5-(cyyclopropylmethyl)-3a,6a-dimethylhexahydropyrrolo[3,4-c]pyrrol-2(1H)-yl)-N-(1-methyl-1H-pyrazol-4-yl)pyrimidin-2-amine |
| 85. | 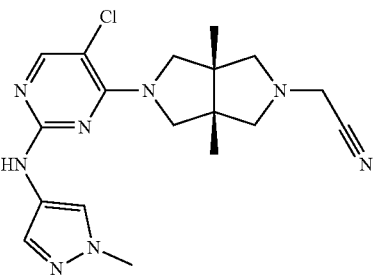 [SMILES: Cn1cc(Nc2ncc(Cl)c(N3C[C@]4(C)CN(CC#N)C[C@]4(C)C3)n2)cn1]<br>2-((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)acetonitrile |
| 86. | 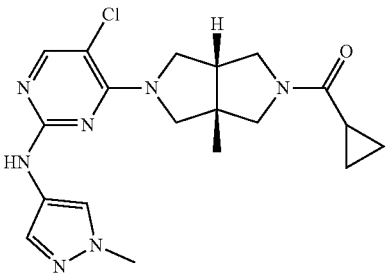 [SMILES: Cn1cc(Nc2ncc(Cl)c(N3C[C@@H]4CN(C(=O)C5CC5)C[C@]4(C)C3)n2)cn1]<br>((3aS,6aR)-5-(5-chloro-2-((1-methyl-1H-pyrazol-4-yl)amino)pyrimidin-4-yl)-3a-methylhexahydropyrrolo[3,4-c]pyrrol-2(1H)-yl)(cyclopropyl)methanone |

| Compound No. | Compound Structure and Chemical Name |
|---|---|
| 87. | 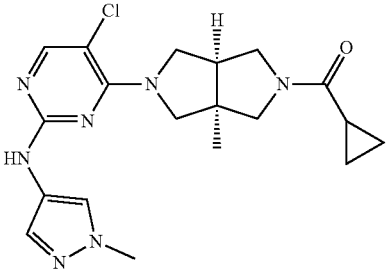 [SMILES: Cn1cc(Nc2ncc(Cl)c(N3C[C@H]4CN(C(=O)C5CC5)C[C@@]4(C)C3)n2)cn1]<br>((3aR,6aS)-5-(5-chloro-2-((1-methyl-1H-pyrazol-4-yl)amino)pyrimidin-4-yl)-3a-methylhexahydropyrrolo[3,4-c]pyrrol-2(1H)-yl)(cyclopropyl)methanone |
| 88. | 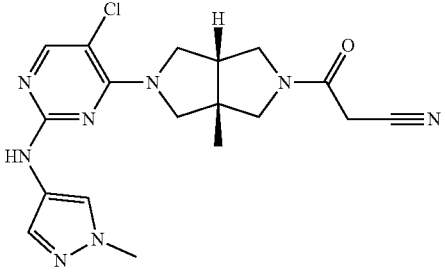 [SMILES: Cn1cc(Nc2ncc(Cl)c(N3C[C@@H]4CN(C(=O)CC#N)C[C@]4(C)C3)n2)cn1]<br>3-((3aS,6aR)-5-(5-chloro-2-((1-methyl-1H-pyrazol-4-yl)amino)pyrimidin-4-yl)-3a-methylhexahydropyrrolo[3,4-c]pyrrol-2(1H)-yl)-3-oxopropanenitrile |
| 89. | 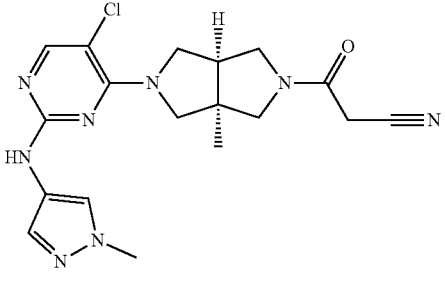 [SMILES: Cn1cc(Nc2ncc(Cl)c(N3C[C@H]4CN(C(=O)CC#N)C[C@@]4(C)C3)n2)cn1]<br>3-((3aR,6aS)-5-(5-chloro-2-((1-methyl-1H-pyrazol-4-yl)amino)pyrimidin-4-yl)-3a-methylhexahydropyrrolo[3,4-c]pyrrol-2(1H)-yl)-3-oxopropanenitrile |
| 90. | 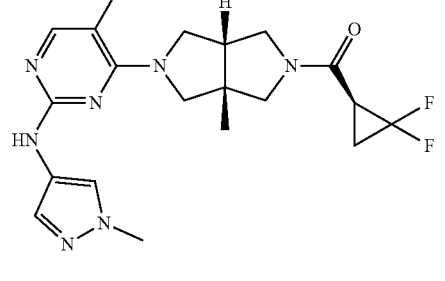<br>((3aS,6aR)-5-(5-chloro-2-((1-methyl-1H-pyrazol-4-yl)amino)pyrimidin-5-yl)-3a-methylhexahydropyrrolo[3,4-c]pyrrol-2(1H)-yl)((S)-2,2-difluorocyclopropyl)methanone |

| Compound No. | Compound Structure and Chemical Name |
|---|---|
| 91. | 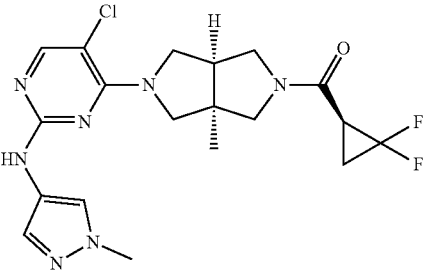 [SMILES: Cn1cc(Nc2ncc(Cl)c(N3C[C@H]4CN(C(=O)[C@@H]5CC5(F)F)C[C@@]4(C)C3)n2)cn1]<br>((3aR,6aS)-5-(5-chloro-2-((1-methyl-1H-pyrazol-4-yl)amino)pyrimidin-4-yl)-3a-methylhexahydropyrrolo[3,4-c]pyrrol-2(1H)-yl)((S)-2,2-difluorocyclopropyl)methanone |
| 92. | 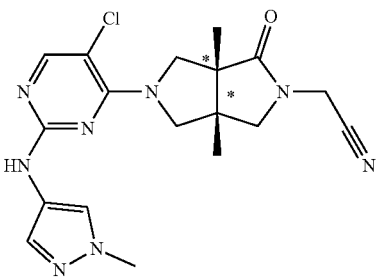 [SMILES: Cn1cc(Nc2ncc(Cl)c(N3C[C@@]4(C)CN(CC#N)C(=O)[C@@]4(C)C3)n2)cn1]<br>cis-2-(5-(5-Chloro-2-((1-methyl-1H-pyrazol-4-yl)amino)pyrimidin-4-yl)-3a,6a-dimethyl-1-oxohexahydropyrrolo[3,4-c]pyrrol-2(1H)-yl)acetonitrile |
| 93. | 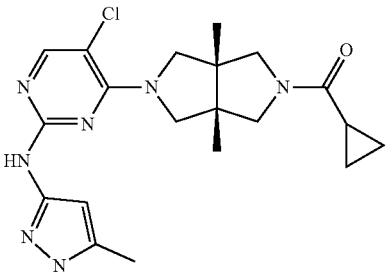 [SMILES: Cc1cc(Nc2ncc(Cl)c(N3C[C@]4(C)CN(C(=O)C5CC5)C[C@]4(C)C3)n2)n[nH]1]<br>((3aR,6aS)-5-(5-chloro-2-((5-methylisoxazol-3-yl)amino)pyrimidin-4-yl)-3a,6a-dimethylhexahydropyrrolo[3,4-c]pyrrol-2(1H)-yl)(cyclopropyl)methanone |
| 94. | 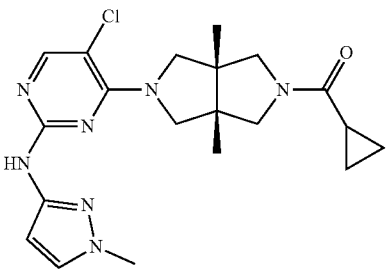 [SMILES: Cn1ccc(Nc2ncc(Cl)c(N3C[C@]4(C)CN(C(=O)C5CC5)C[C@]4(C)C3)n2)n1]<br>((3aR,6aS)-5-(5-chloro-2-((1-methyl-1H-pyrazol-3-yl)amino)pyrimidin-4-yl)-3a,6a-dimethylhexahydropyrrolo[3,4-c]pyrrol-2(1H)-yl)(cyclopropyl)methanone |

-continued

| Compound No. | Compound Structure and Chemical Name |
| --- | --- |
| 95. | 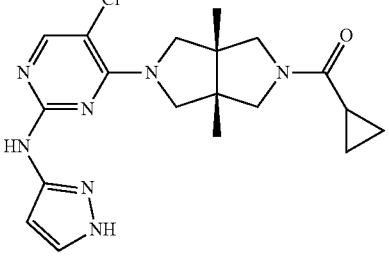<br>((3aR,6aS)-5-(2-((1H-pyrazol-3-yl)amino)-5-chloropyrimidin-4-yl)-3a,6a-dimethylhexahydropyrrolo-[3,4-c]pyrrol-2(1H)-yl)(cyclopropyl)methanone |
| 96. | 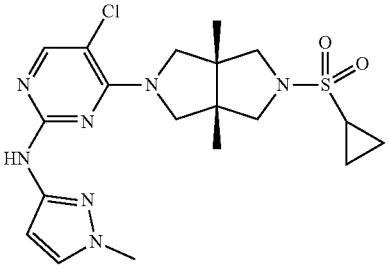 [SMILES: Cn1ccc(Nc2ncc(Cl)c(N3C[C@@]4(C)CN(S(=O)(=O)C5CC5)C[C@@]4(C)C3)n2)n1]<br>5-chloro-4-((3aR,6aS)-5-(cyclopropylsulfonyl)-3a,6a-dimethylhexahydropyrrolo[3,4-c]pyrrol-2(1H)-yl)-N-(1-methyl-1H-pyrazol-4-yl)pyrimidin-2-amine |
| 97. | 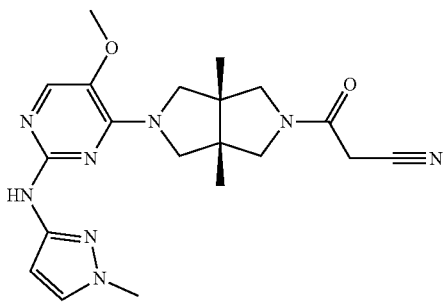 [SMILES: COc1cnc(Nc2ccn(C)n2)nc1N1C[C@]2(C)CN(C(=O)CC#N)C[C@]2(C)C1]<br>3-((3aR,6aS)-5-(5-methoxy-2-((1-methyl-1H-pyrazol-4-yl)amino)pyrimidin-4-yl)-3a,6a-dimethylhexahydropyrrolo[3,4-c]pyrrol-2(1H)-yl)-3-oxopropanenitrile |
| 98. | 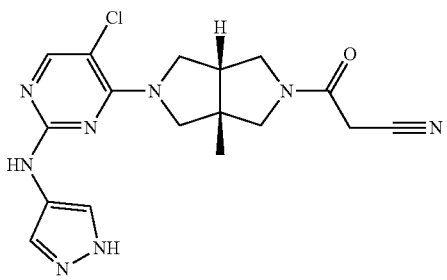 [SMILES: C[C@]12CN(C(=O)CC#N)C[C@H]1CN(c1nc(Nc3cn[nH]c3)ncc1Cl)C2]<br>3-((3aS,6aR)-5-(2-((1H-pyrazol-4-yl)amino)-5-chloropyrimidin-4-yl)-3a-methylhexahydropyrrolo[3,4-c]pyrrol-2(1H)-yl)-3-oxopropanenitrile |

| Compound No. | Compound Structure and Chemical Name |
| --- | --- |
| 99. | 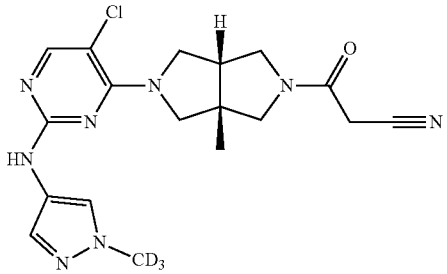 [SMILES: [2H]C([2H])([2H])n1cc(Nc2ncc(Cl)c(N3C[C@@H]4CN(C(=O)CC#N)C[C@]4(C)C3)n2)cn1]<br>3-((3aS,6aR)-5-(5-chloro-2-((1-(methyl-d₃)-1H-pyrazol-4-yl)amino)pyrimidin-4-yl)-3a-methylhexahydropyrrolo[3,4-c]pyrrol-2(1H)-yl)-3-oxopropanenitrile |
| 100. | 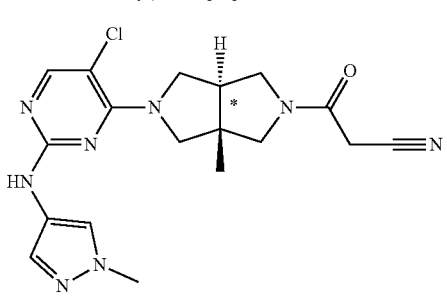<br>trans-3-(5-(5-chloro-2((1-methyl-1H-pyrazol-4-yl)amino)pyrimidin-4-yl)-3a-methylhexahydropyrrolo[3,4-c]pyrrol-2(1H)-yl)-3-oxopropanenitrile |

Compounds 61, 62, 63, 64, 65, 68, 69, 70, 71, 72, 73, 74, 92 and 100 are racemates or a pair of diastereoisomers. Compounds 86, 87, 88, 89, 90, 91, 98 and 99 are single optical isomers. Compounds 86/87 and compounds 88/89 are a pair of enantiomers, respectively. Compounds 90 and 91 are a pair of diastereoisomers.

The compounds of the present invention effectively inhibit the activity of JAK, particularly TYK2, preferably having an $IC_{50}$ of 10 to 100 nM, and more preferably having an $IC_{50}$ of less than 10 nM. The compounds of the present invention have a significant inhibitory effect on IFN-γ secretion induced by IL-12 in NK92 cells, preferably having an $IC_{50}$ of less than 1,000 nM.

The present invention further relates to pharmaceutical compositions comprising compounds of Formula (I) or pharmaceutically acceptable salts, prodrugs, stable isotope derivatives, or isomers thereof, and pharmaceutically acceptable carriers or excipients. The pharmaceutical compositions are useful for the treatment or prevention of JAK, in particular TYK2 mediated diseases, including but not limited to autoimmune diseases, inflammatory diseases including intestinal diseases, cancers, skin diseases, diabetes, eye diseases, neurodegenerative diseases, anaphylaxis, asthma, obstructive airway diseases, and transplant rejection.

The present invention further provides a method for treating or preventing diseases mediated by JAK, in particular TYK2. The method comprises administering to a patient in need thereof a therapeutically effective amount of the compounds shown in Formula (I) or pharmaceutically acceptable salts, prodrugs, stable isotope derivatives or isomers thereof. The diseases include but are not limited to autoimmune diseases, inflammatory diseases including intestinal diseases, cancers, skin diseases, diabetes, eye diseases, neurodegenerative diseases, anaphylaxis, asthma and other obstructive airway diseases such as COPD, and transplant rejection. The present compounds are particularly useful in treating psoriasis, psoriatic arthritis, ulcerative colitis, Crohn's disease, SLE, lupus nephritis, vitiligo, areata alopecia, dermatitis, asthma, atopic eczema.

According to the present invention, the pharmaceuticals can be in any dosage form, including but not limited to tablets, capsules, a solution, a freeze-drying preparation and injectable.

The pharmaceutical formulation of the present invention can be administered in form of a dosage unit containing a predetermined amount, of active ingredient. Such a unit may contain 0.5 mg to 1 g, preferably 1 mg to 700 mg, more preferably 5 mg to 300 mg of a compound of the present invention, depending on the disease being treatment, the method of administration, as well as age, weight and condition of the patients. Furthermore, the pharmaceutical formulation can be prepared using methods well known in the pharmaceutical field, for example, by formulating the active ingredient with one or more excipients or one or more adjuvants.

The pharmaceutical formulation of the present invention is suitable for administration by any appropriate method, for example by oral (including buccal or sublingual), rectal, nasal, topical (including buccal, sublingual or transdermal), vaginal or parenteral (including subcutaneous, intramuscular, intravenous or intradermal).

The present invention further provides a method for preparing the compounds. The preparation of the compounds of the present invention as shown in Formula (I) can be accomplished by the following exemplary methods and embodiments, but these methods and embodiments should not be considered as limitations to the scope of the present invention in any way. Alternatively, the compounds provided by the present invention can be synthesized by the synthetic techniques known to those skilled in the art, or by comprehensively using the methods known in the art and the methods described in the present invention. The products obtained at each step of reaction are isolated by the separation techniques known in the art, including but not limited to extraction, filtration, distillation, crystallization and chromatographic separation. The starting materials and chemical reagents used for the synthesis can be conventionally made based on literature (can be searched from SciFinder) or purchased.

The heterocyclic compounds shown in Formula (I) of the present invention can be synthesized according to the route shown below: 1) substitution reaction between starting materials A1 and A2 catalyzed by an organic base to give intermediate A3; 2) acid-catalyzed substitution reaction or Buchwald-Hartwig coupling of A3 with a primary amine ($R_1$—$NH_2$) to give A4; 3) deprotection of A4 in acid (e.g. PG is Boc) or under hydrogenation (e.g. PG is Bn) to give A5; 4) derivatization of A5 to give target compounds, for example, by amidation with an acyl chloride or anhydride, amide coupling with an acid, sulfonation with an sulfonyl chloride, urea formation with an amine, Buchwald-Hartwig coupling with a (hetero)aryl halide, etc.

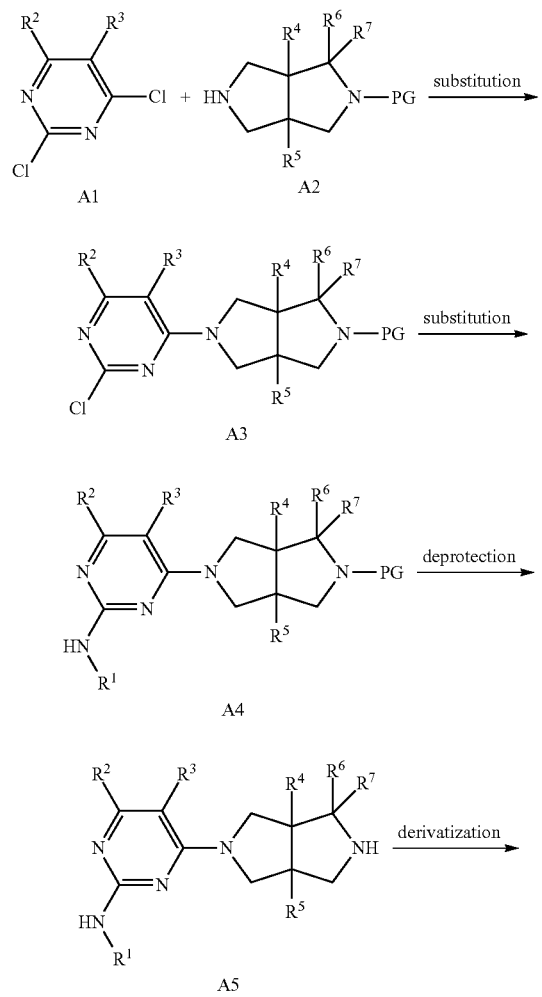

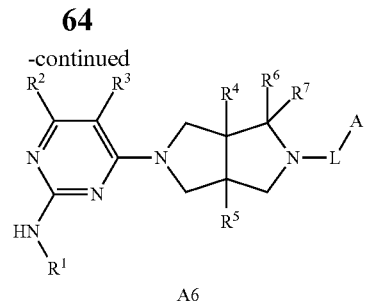

The structures of the compounds were determined by nuclear magnetic resonance (NMR) or mass spectrometry (MS). NMR determination used a Bruker ASCEND-400 NMR spectrometer, the solvent for the determination was deuterated dimethyl sulfoxide (DMSO-$d_6$), deuterated chloroform (CDCl$_3$), or deuterated methanol (CD$_3$OD), the internal standard was tetramethyl silane (IMS), and the chemical shift was given in a unit of $10^{-6}$ (ppm).

MS determination used an Agilent SQD (ESI) mass spectrometer (Agilent 6120).

HPLC determination used an Agilent 1260 DAD high pressure liquid chromatograph (column: Poroshell 120 EC-C18, 50×3.0 mm, 2.7 μm) or a Waters Arc high pressure liquid chromatograph (column: Sunfire C18, 150×4.0 mm, 5 μm).

The thin layer chromatography (TLC) used GF254 silica gel plates from Qingdao Haiyang Chemical Co., Ltd. with a thickness of 0.15 to 0.2 mm, and the separation/purification of products by thin layer chromatography used silica plates with a thickness 0.4 to 0.5 mm.

Column chromatography generally used 200 to 300 mesh silica gel from Qingdao Haiyang Chemical Co., Ltd.

Known starting materials in the present invention were synthesized according to the methods known in the art, or purchased from ABCR GmbH&Co. KG, Acros Organics, Aldrich Chemical Company, Accela ChemBio Inc., Beijing Ouhe Technology Co., Ltd., etc.

Unless otherwise stated in the embodiments, the reactions were carried out under an atmosphere of argon or nitrogen using a balloon with a volume of about 1 L.

Hydrogenation was carried out under an atmosphere of hydrogen using a balloon with a volume of about 1 L that is attached to the reaction vessel after being vacuumed and filled with hydrogen repeatedly for 3 times.

The microwave reaction used a CEM Discover-SP microwave reactor.

Unless otherwise stated in the embodiments, the reaction was run at room temperature.

The reaction was monitored using an Agilent LCMS (1260/6120) or by thin layer chromatography. The solvent eluting systems for column chromatography and TLC included a) dichloromethane/methanol, b) petroleum ether/ethyl acetate, or other systems as indicated. The ratio of the solvents was adjusted according to the polarity of the compound, and further adjusted by addition of a small amount of TEA and an acidic or alkaline reagent as needed. The compound purification was alternatively done using Waters' MS-guided automated preparation system (abbreviated as prep-HPLC) with a MS detector (SQD2), eluting at a flow rate of 20 mL/min in an appropriate acetonitrile/water (containing 0.1% TFA or formic acid) or acetonitrile/water (containing 0.05% ammonia) gradient (XBridge-C18, 19×150 mm, 5 μm). Some examples were prepared as HCl salts after prep-HPLC purification by addition of 1 N HCl to the collected fractions, followed by drying under reduced pressure.

Example 1. Cyclopropyl((3aR,6aS)-3a,6a-dimethyl-5-(2-((1-methyl-1H-pyrazol-4-yl)amino)pyrimidin-4-yl)hexahydropyrrolo[3,4-c]pyrrol-2(1H)-yl)methanone

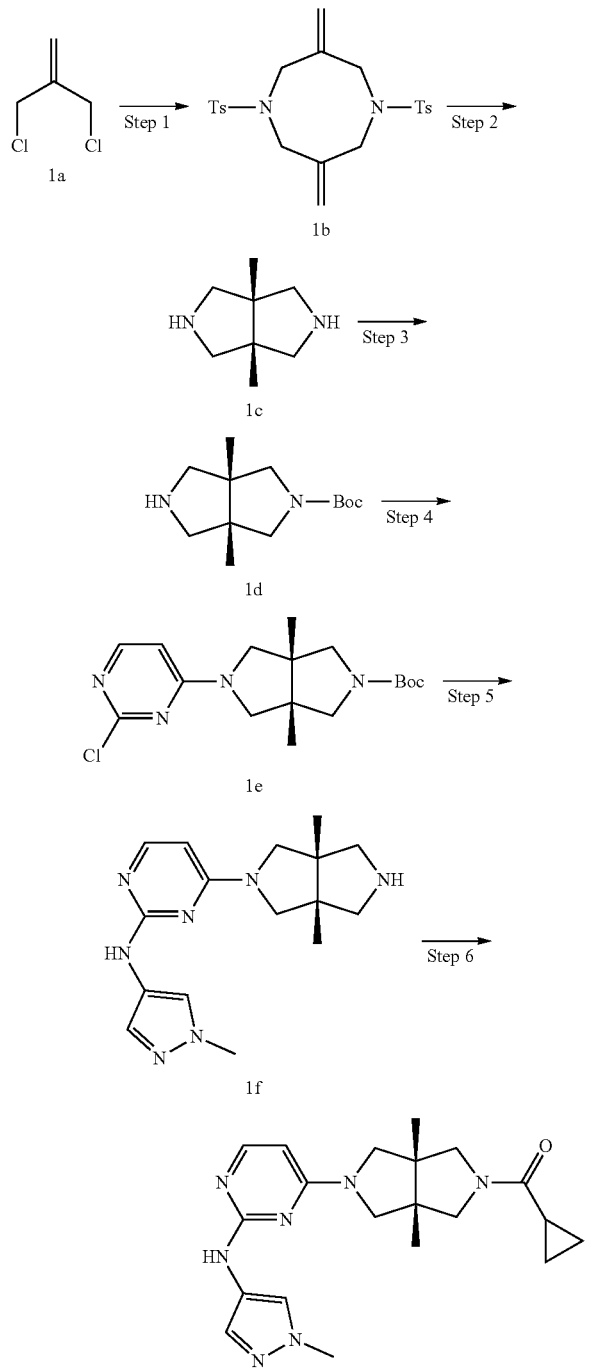

Step 1. 3,7-Dimethylene-1,5-ditosyl-1,5-diazocane (1b)

To a mixture of 4-methylbenzenesulfonamide (17.12 g, 100 mmol) and anhydrous potassium carbonate (27.6 g, 200 mmol) in MeCN (200 mL) was added slowly over 10 min a solution of 3-chloro-2-chloromethyl-1-propylene 1a (12.5 g, 100 mmol) in MeCN (20 mL). The mixture was then heated to reflux and stirred for 18 h. After cooling to room temperature, the mixture was added with water (250 mL) and stirred for 30 min. The resulting mixture was filtered, and the precipitate was collected and purified by silica gel column chromatography (petroleum ether/dichloromethane=100/0 to 0/100) to give the title compound 1b (10.8 g, 48%).

MS m/z (ESI): 447 [M+1]

$^1$H NMR (400 MHz, CDCl$_3$) δ 7.70-7.64 (m, 4H), 7.31 (d, J=8.0 Hz, 4H), 5.19 (s, 4H), 3.82 (s, 8H), 2.43 (s, 6H).

Step 2. (3ar,6ar)-3a,6a-dimethyloctahydropyrrolo[3,4-c]pyrrole (1c)

To a solution of 1b (10.8 g, 24.2 mmol) in THF (400 mL) at 0° C. was added LAH (9.2 g, 242 mmol) in batches. After stirring for 4 days, the mixture was cooled to 0° C. and added with a 20% sodium chloride aqueous solution (18 mL) drop wise. The resulting mixture was gradually warmed to room temperature and stirred for 1 h. The mixture was filtered through a pad of celite and the filter cake was washed with THF (3×200 mL). The combined filtrate was concentrated to dryness under vacuum to give the title compound 1c (2.25 g, 66%). The crude product was used directly in next step without further purification.

MS m/z (ESI): 141 [M+1]

$^1$H NMR (400 MHz, CDCl$_3$) δ 2.90 (d, J=11.0 Hz, 4H), 2.69 (d, J=11.0 Hz, 4H), 2.39 (brs, 2H), 0.98 (s, 6H).

Step 3. Tert-butyl (3aR,6aS)-3a,6a-dimethylhexahydropyrrolo[3,4-c]pyrrole-2(1H)-carboxylate (1d)

To a solution of 1c (2.25 g, 16 mmol) in CH$_2$Cl$_2$ (100 mL) at 0° C. were added TEA (4.8 g, 48 mmol) and a solution of di-tert-butyl decarbonate (3.5 g, 16 mmol) in CH$_2$Cl$_2$ (100 mL). The mixture was gradually warmed to room temperature and stirred for 1 h. The reaction mixture was quenched with water (0.100 mL) and extracted with CH$_2$Cl$_2$ (2×100 mL). The combined organic phase was dried over anhydrous sodium sulfate, filtered and concentrated to dryness. The residue was purified by silica gel column chromatography (dichloromethane/methanol=100/1 to 10/1) to give the title compound 1d (1.37 g, 36%).

MS m/z (ESI): 241 [M+1]

$^1$H NMR (400 MHz, CDCl$_3$) δ 3.47 (s, 2H), 3.20 (d, J=10.2 Hz, 2H), 3.09 (d, J=11.4 Hz, 2H), 2.90 (d, J=11.4 Hz, 2H), 1.45 (s, 9H), 1.06 (s, 6H).

Step 4. Tert-butyl (3aR,6aS)-5-(2-chloropyrimidin-4-yl)-3a,6a-dimethylhexahydropyrrolo[3,4-c]pyrrole-2(1H)-carboxylate (1e)

To a solution of 1d (1.37 g, 5.7 mmol) in MeCN (50 mL) were added 2,4-dichloropyrimidine (850 mg, 5.7 mmol) and DIEA (2.21 g, 17.1 mmol). The mixture was heated to reflux and stirred for 16 h. After cooling to room temperature, the mixture was concentrated to dryness under vacuum and the residue was diluted with water (50 mL). The mixture was then extracted with ethyl acetate (3×100 mL). The combined organic phase was dried over anhydrous sodium sulfate, filtered and concentrated to dryness. The residue was purified by silica gel column chromatography (petroleum ether/ethyl acetate=5/1 to 1/1) to give the title compound 1e (1.47 g, 73%).

MS m/z (ESI): 353 [M+1]

$^1$H NMR (400 MHz, CDCl$_3$) δ 8.03 (d, J=6.0 Hz, 1H), 6.17 (d, J=5.8 Hz, 1H), 3.77 (d, J=12.3 Hz, 1H), 3.57 (t, J=10.9 Hz, 1H), 3.53-3.39 (m, 3H), 3.35 (d, J=11.4 Hz, 1H), 3.32-3.24 (m, 2H), 1.45 (s, 9H), 1.15 (d, J=6.5 Hz, 6H).

Step 5. 4-((3aR,6aS)-3a,6a-dimethylhexahydropyrrolo[3,4-c]pyrrol-2(1H)-yl)-N-(1-methyl-1H-pyrazol-4-yl)pyrimidin-2-amine hydrochloride (1f)

To a 30-mL microwave reaction vessel were 1e (353 mg, 0.1 mmol), 1-methyl-1H-pyrazol-4-amine (102 mg, 1.05 mmol), pTsOH (4 mg, 0.02 mmol) and isopropanol (25 mL). The vessel was sealed and heated in a microwave reactor to 100° C. for 1 h. After cooling to room temperature, the mixture was added with a solution of HCl (33% in ethanol, 2 mL) and then heated in a microwave reactor at 80° C. for 30 min. The synthesis was repeated for another three batches following the same procedure as described above. Four batches were combined and filtered. The filter cake was collected to give the title compound 1f (1 g, 54%) as an HQ salt.

MS m/z (ESI): 314 [M+1]

Step 6. Cyclopropyl((3aR,6aS)-3a,6a-dimethyl-5-(2-((1-methyl-1H-pyrazol-4-yl)amino)pyrimidin-4-yl)hexahydropyrrolo[3,4-c]pyrrol-2(1H)-yl)methanone (1)

To a solution of 1f (46 mg, 0.1 mmol) and TEA (50 mg, 0.5 mmol) in CH$_2$Cl$_2$ (5 mL) at 0° C. was added cyclopropanecarbonyl chloride (11 mg, 0.1 mmol). The mixture was stirred at 0° C. for 20 min, then quenched with water (20 mL), and extracted with CH$_2$Cl$_2$ (2×20 mL). The combined organic phase was dried over anhydrous sodium sulfate, filtered, and concentrated to dryness under vacuum. The residue was purified by prep-HPLC to give the title compound 1 (23 mg, solid, 61%).

MS m/z (ESI): 382 [M+1]

$^1$H NMR (400 MHz, CD$_3$OD) δ 7.85 (d, J=6.3 Hz, 2H), 7.60 (s, 1H), 5.92 (d, J=6.0 Hz, 1H), 3.90 (d, J=10.0 Hz, 2H), 3.89 (s, 3H), 3.76 (d, J=10.8 Hz, 2H), 3.61 (d, J=12.4 Hz, 2H), 3.48 (d, J=12.3 Hz, 2H), 1.84-1.78 (m, 1H), 1.26 (s, 3H), 1.23 (s, 3H), 0.96-0.82 (m, 4H).

Example 2. 4-((4-((3aR,6aS)-5-(cyclopropanecarbonyl)-3a,6a-dimethylhexahydropyrrolo[3,4-c]pyrrole-2(1H)-yl)pyrimidine-2-yl)amino)benzoic acid

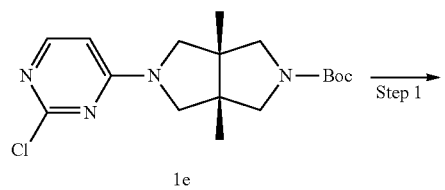

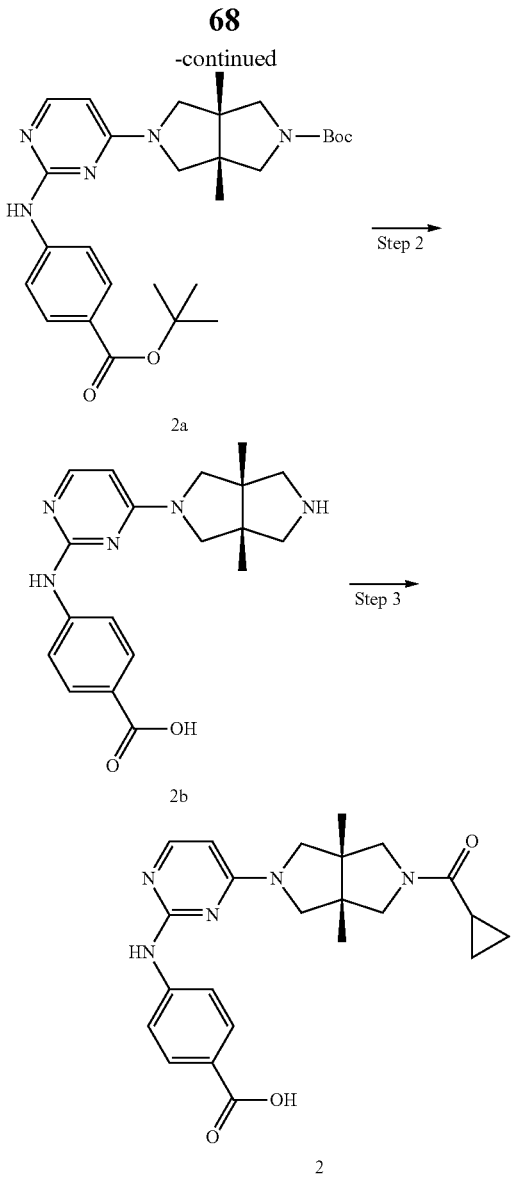

Step 1. Tert-butyl (3aR,6aS)-5-(2-((4-(tert-butoxycarbonyl)phenyl)amino)pyrimidin-4-yl)-3a,6a-dimethylhexahydropyrrolo[3,4-c]pyrrole-2(1H)-carboxylate (2a)

To a 10-mL microwave reaction vessel were added 1e (100 mg, 0.283 mmol), tert-butyl 4-aminobenzoate (55 mg, 0.283 mmol), pTsOH (5 mg, 0.0283 mmol) and isopropanol (4 mL). The vessel was stirred in a microwave reactor at 100° C. for 1 h. After cooling to room temperature, the mixture was concentrated to dryness under vacuum and the residue was purified by silica gel column chromatography (petroleum ether/ethyl acetate=2/1 to 1/2) to give the title compound 2a (102 mg, 71%).

MS m/z (ESI): 510 [M+1]

Step 2. 4-((4-((3aR,6aS)-3a,6a-dimethylhexahydropyrrolo[3,4-c]pyrrol-2(1H)-yl)pyrimidin-2-yl)amino)benzoic acid (2b)

To a solution of 2a (30 mg, 0.06 mmol) in ethanol (2 mL) was added an HCl solution (33% in ethanol, 2 mL). The mixture was stirred at room temperature for 2 h and then concentrated to dryness under vacuum to give the title compound 2b (36 mg). The crude product was used directly in next step without further purification.

MS m/z (ESI): 354 [M+1]

Step 3. 4-((4-((3aR,6aS)-5-(cyclopropanecarbonyl)-3a,6a-dimethylhexahydropyrrolo[3,4-c]pyrrol-2(1H)-yl)pyrimidin-2-yl)amino)benzoic acid (2)

To a solution of 2b (36 mg, crude) and TEA (30 mg, 0.3 mmol) in CH₂Cl₂ (5 mL) was added cyclopropanecarbonyl chloride (6 mg, 0.06 mmol). The mixture was stirred for 10 min and then quenched with water (0.5 mL). The mixture was concentrated to dryness and the residue was dissolved in THF (2 mL). The resulting mixture was added with a 20% sodium chloride aqueous solution (2 mL) and stirred at room temperature for 2 h. The mixture was adjusted to pH=3~4 with 1 N HCl and extracted with ethyl acetate (3°mL). The combined organic phase was dried over anhydrous sodium sulfate, filtered, concentrate to dryness under vacuum, and purified by prep-HPLC to give the title compound 2 (20 mg, solid, 79%).

MS m/z (ESI): 422 [M+1]

¹H NMR (400 MHz, CD₃OD) δ 7.96 (dd, J=10.3, 7.5 Hz, 3H), 7.81 (d, J=8.7 Hz, 2H), 6.07 (d, J=6.1 Hz, 1H), 3.92 (d, J=10.9 Hz, 2H), 3.76 (d, J=10.8 Hz, 2H), 3.62 (d, J=12.4 Hz, 2H), 3.49 (d, J=12.4 Hz, 2H), 1.84-1.77 (m, 1H), 1.27 (s, 3H), 1.24 (s, 3H), 0.95-0.84 (m, 4H).

Example 3. 4-((4-((3aR,6aS)-5-(cyclopropanecarbonyl)-3a,6a-dimethylhexahydropyrrolo[3,4-c]pyrrol-2(1H)-yl)pyrimidin-2-yl)amino)-N-ethylbenzamide

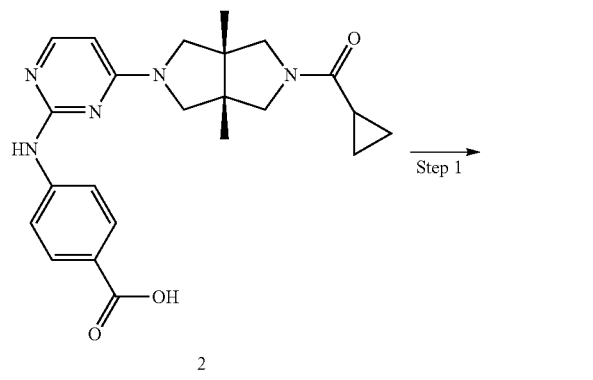

To solution of 2 (56 mg, 0.133 mmol) in CH₂Cl₂ (10 mL) were added DIEA (59 mg, 0.153 mmol) and HATU (58 mg, 0.153 mmol). The mixture was stirred at room temperature for 5 min, and then added with 3 drops of ethyl amine aqueous solution (65%-70% wt.). The mixture was stirred at room temperature for 30 min, concentrated and purified by prep-HPLC to give the title compound 3 (3.3 mg, solid, 6%).

MS m/z (ESI): 449 [M+1]

¹H NMR (400 MHz, CD₃OD) δ 7.94 (d, J=6.1 Hz, 1H), 7.84-7.77 (m, 4H), 6.04 (d, J=6.1 Hz, 1H), 3.90 (d, J=11.1 Hz, 2H), 3.76 (d, J=10.9 Hz, 2H), 3.62 (d, J=12.4 Hz, 2H), 3.48 (d, J=12.5 Hz, 2H), 3.43 (q, J 14.5, 7.3 Hz, 2H), 1.85-1.77 (m, 1H), 1.28-1.19 (m, 9H), 0.95-0.83 (m, 4H).

Example 4. 1-((3aR,6aS)-3a,6a-dimethyl-5-(2-((1-methyl-1H-pyrazol-4-yl)amino)pyrimidin-4-yl)hexahydropyrrolo[3,4-c]pyrrol-2(1H)-yl)-2,2,2-trifluoroethan-1-one hydrochloride

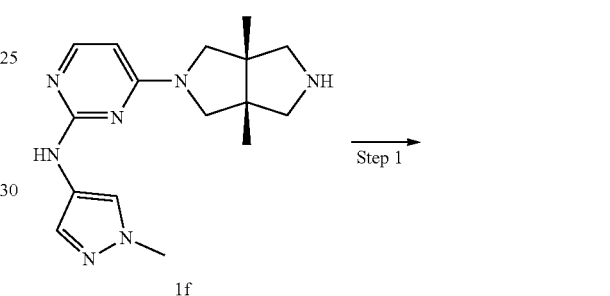

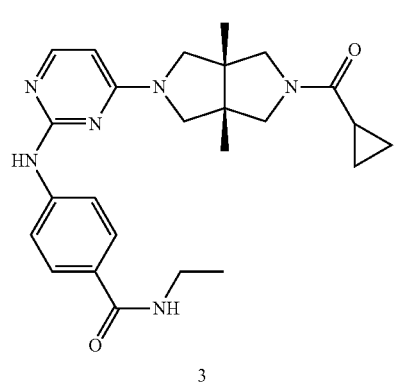

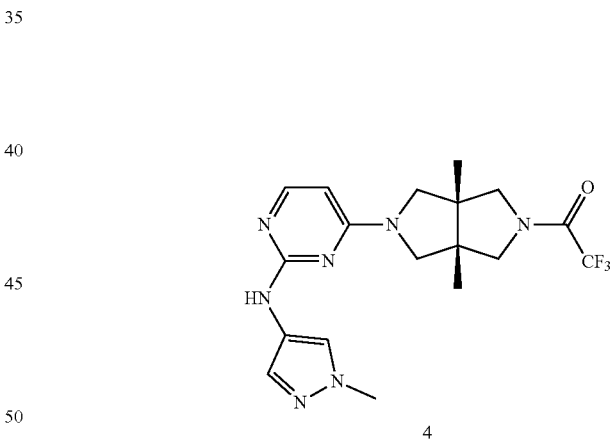

To a mixture of 1f (69 mg, 0.15 mmol) and DIEA (116 mg, 0.9 mmol) in CH₂Cl₂ (2 mL) was added a solution of trifluoroacetic anhydride (32 mg, 0.15 mmol) in CH₂Cl₂ (2 mL). The mixture was stirred for 20 min, concentrated and purified by prep-HPLC to give the title compound 4 (36.4 mg, solid, 54%) as an HCl salt.

MS m/z (ESI): 410 [M+1]

¹H NMR (400 MHz, CD₃OD) δ 7.89 (s, 1H), 7.74 (s, 1H), 7.65 (s, 1H), 6.31 (dd, J=7.4, 5.0 Hz, 1H), 4.00-3.73 (m, 9H), 3.70-3.61 (m, 2H), 1.27 (s, 6H).

Example 6 was prepared according to the procedure for Example 4 except that ethyl chloroformate was used instead of trifluoroacetic anhydride.

| Example | Acyl chloride or anhydride | $^1$H NMR | MS m/z (ESI) |
|---|---|---|---|
| ethyl (3aR,6aS)-3a,6a-dimethyl-5-(2-((1-methyl-1H-pyrazol-4-yl)amino)pyrimidin-4-yl)hexahydropyrrolo[3,4-c]pyrrole-2(1H)-carboxylate (6) | ethyl chloroformate | $^1$H NMR (400 MHz, CDCl$_3$) δ 7.85 (d, J = 6.0 Hz, 1H), 7.64 (s, 1H), 7.58 (s, 1H), 5.75 (d, J = 6.2 Hz, 1H), 4.13 (q, J = 7.1 Hz, 2H), 3.88 (s, 3H), 3.76 (s, 1H), 3.63-3.25 (m, 7H), 1.26 (t, J = 7.1 Hz, 3H), 1.16 (s, 6H). | 386 [M + 1] |

Example 5. (2,2-Difluorocyclopropyl)((3aR,6aS)-3a,6a-dimethyl-5-(2-((1-methyl-1H-pyrazol-4-yl)amino)pyrimidin-4-yl)hexahydropyrrolo[3,4-c]pyrrol-2(1H)-yl)methanone hydrochloride

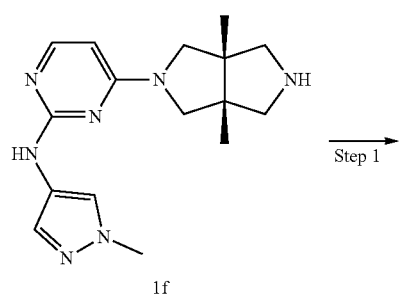

1f

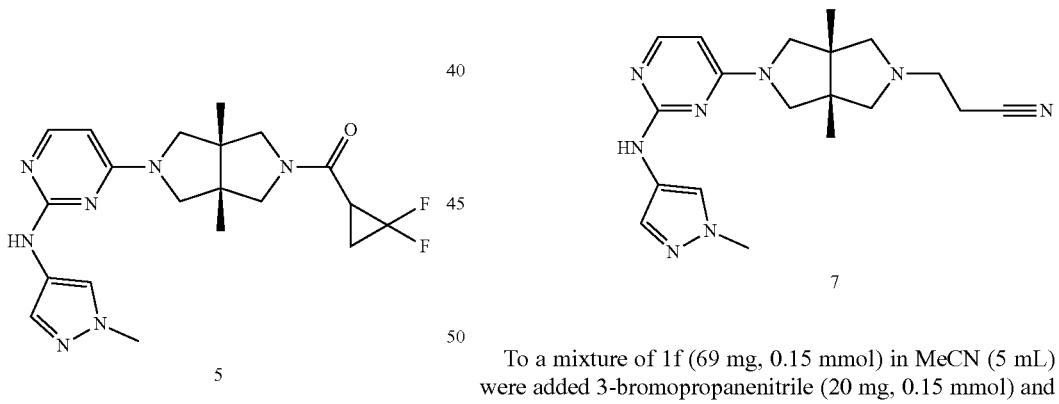

5

To a mixture of 1f (69 mg, 0.15 mmol) in CH$_2$Cl$_2$ (5 mL) were added DIEA (116 mg, 0.9 mmol), HATU (57 mg, 0.15 mmol) and 2,2-difluorocyclopropane-1-carboxylic acid (19 mg, 0.15 mmol). The mixture was stirred at room temperature for 20 min. followed by concentration and purification by prep-HPLC to give the title compound 5 (32.8 mg, solid, 52%) as an HCl salt.

MS m/z (ESI): 418 [M+1]

$^1$H NMR (400 MHz, CD$_3$OD) δ 7.85 (t, J=4.0 Hz, 2H), 7.59 (s, 1H), 5.92 (d, J=6.1 Hz, 1H), 3.90 (d, J=10.9 Hz, 4H), 3.78 (q, J=11.0 Hz, 2H), 3.66 (d, J=11.9 Hz, 3H), 3.52 (d, J=12.5 Hz, 2H), 2.89-2.79 (m, 1H), 2.09-2.01 (m, 1H), 1.85-1.74 (m, 1H), 1.28-1.19 (m, 6H).

Example 7. 3-((3aR,6aS)-3a,6a-dimethyl-5-(2-((1-methyl-1H-pyrazol-4-yl)amino)pyrimidin-4-yl)hexahydropyrrolo[3,4-c]pyrrol-2(1H)-yl)propanenitrile

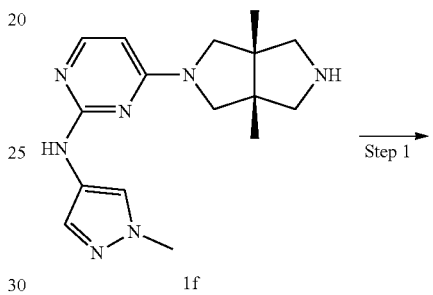

1f

7

To a mixture of 1f (69 mg, 0.15 mmol) in MeCN (5 mL) were added 3-bromopropanenitrile (20 mg, 0.15 mmol) and DIEA (116 mg, 0.9 mmol). The mixture was stirred for 20 h, and then heated to 90° C. for 24 h (LCMS showed that only trace amount of desired product was generated). The reaction mixture was transferred to a 15-mL sealed tube and heated to 120° C. for 72 h. After cooling to room temperature, the reaction mixture was concentrated to dryness under vacuum and purified by prep-HPLC to give the title compound 7 (3.2 mg, solid, 4%).

MS m/z (ESI): 367 [M+1]

$^1$H NMR (400 MHz, CD$_3$OD) δ 7.81 (d, J=5.6 Hz, 2H), 7.61 (s, 1H), 5.92 (d, J=6.1 Hz, 1H), 3.88 (s, 3H), 3.77 (dd, J=19.3, 12.2 Hz, 2H), 3.48-3.39 (m, 2H), 2.97 (d, J=9.3 Hz, 2H), 2.79 (t, J=6.8 Hz, 2H), 2.61 (dd, J=12.8, 8.0 Hz, 4H), 1.20 (s, 6H).

Example 8. (3aR,6aS)—N-(cyanomethyl)-3a,6a-dimethyl-5-(2-((1-methyl-1H-pyrazol-4-yl)amino)pyrimidin-4-yl)hexahydropyrrolo[3,4-c]pyrrole-2(1H)-carboxamide

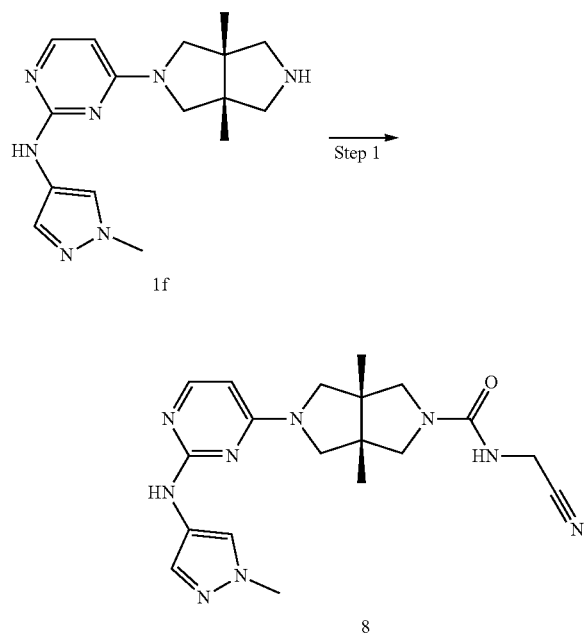 [SMILES: Cn1cc(Nc2nccc(N3C[C@]4(C)CNC[C@]4(C)C3)n2)cn1 ; Cn1cc(Nc2nccc(N3C[C@]4(C)CN(C(=O)NCC#N)C[C@]4(C)C3)n2)cn1]

To a solution of 2-aminoacetonitrile (14 mg, 0.24 mmol) in DMF (3 mL) was added N,N'-carbonyldiimidazole (49 mg, 0.3 mmol). The resulting mixture was heated to 65° C. and stirred for 2 h, and then added with 1f (69 mg, 0.15 mmol). The mixture was stirred at 65° C. for another 2 h and concentrated under vacuum. The residue was dispersed in a saturated sodium hydrogen carbonate aqueous solution (20 mL) and extracted with ethyl acetate (3×20 mL). The combined organic phase was dried over anhydrous sodium sulfate, filtered, concentrated and purified by prep-HPLC to give the title compound 8 (19.2 mg, solid, 32%).

MS m/z (ESI): 396 [M+1]

$^1$H NMR (400 MHz, CD$_3$OD) δ 7.81 (d, J=8.0 Hz, 2H), 7.57 (s, 1H), 5.88 (d, J=6.0 Hz, 1H), 4.09 (s, 2H), 3.85 (s, 3H), 3.76 (s, 1H), 3.59 (s, 1H), 3.51 (d, J=9.9 Hz, 3H), 3.37 (d, J=10.3 Hz, 3H), 1.19 (s, 6H).

Example 9. 4-((4-((3aR,6aS)-5-(2,2-difluorocyclopropane-1-carbonyl)hexahydropyrrolo[3,4-c]pyrrol-2(1H)-yl)-5-fluoropyrimidin-2-yl)amino)-N-ethylbenzamide

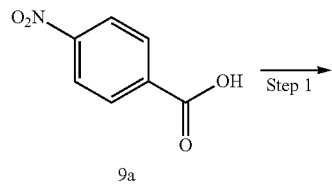

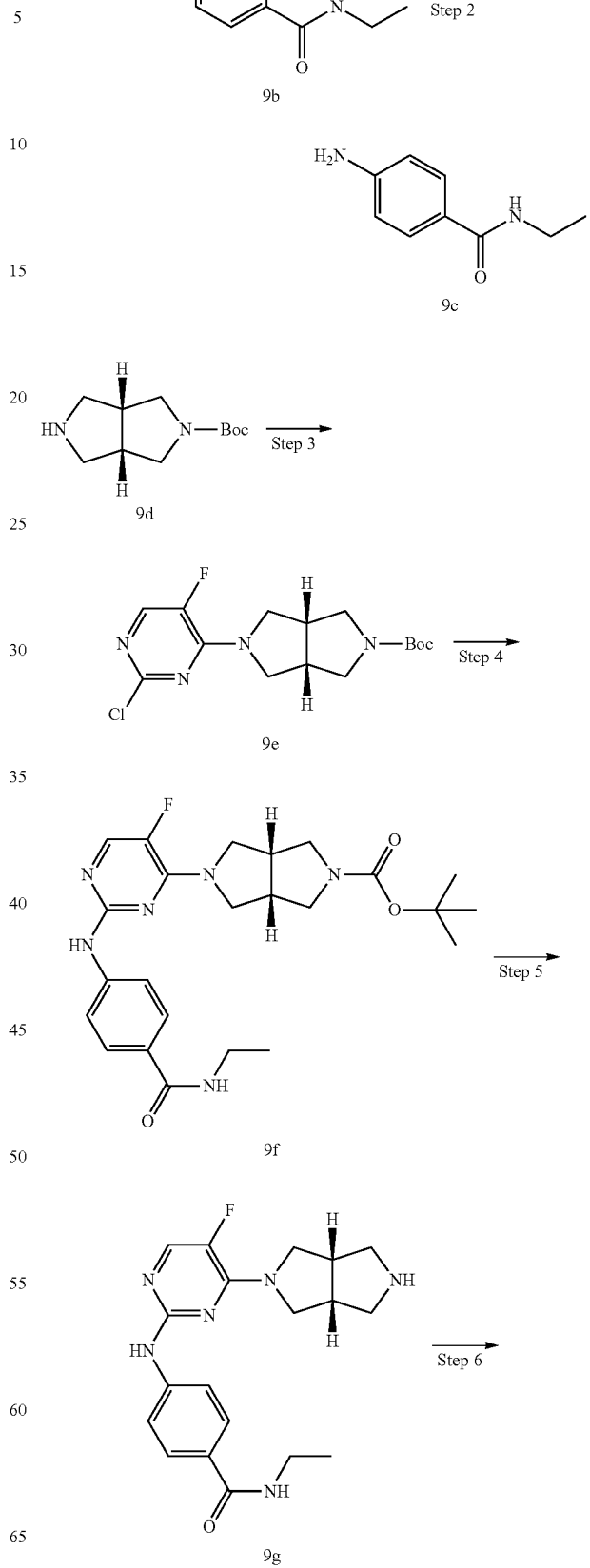

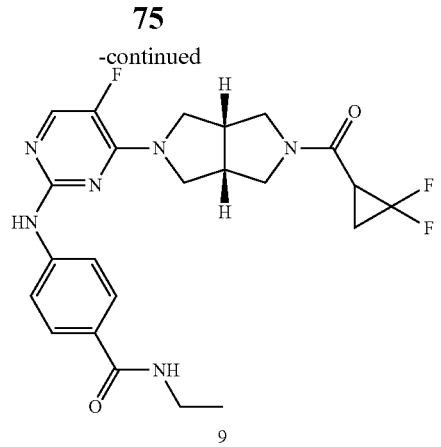

Step 1. N-ethyl-4-nitrobenzamide (9b)

To solution of 4-nitrobenzoic acid (5 g, 30 mmol) in CH$_2$Cl$_2$ (100 mL) was added oxalyl chloride (7.6 g, 60 mmol) dropwise, followed by DMF (0.1 mL). The mixture was stirred at for 30 min and then concentrated to dryness under vacuum. The residue was dissolved in THF (50 mL) and added with an aqueous solution of ethylamine (60 to 70% wt., 10 mL) dropwise. The mixture was stirred at room temperature for 30 min, poured into water (200 mL), and extracted with ethyl acetate (2×100 mL). The combined organic phase was dried over anhydrous sodium sulfate, filtered, concentrated and purified by silica gel column chromatography (petroleum ether/ethyl acetate=1/1 to 0/100) to give the title compound 9b (5.13 g, 88%).

MS m/z (ESI): 195 [M+1]

$^1$H NMR (400 MHz, CDCl$_3$) δ 8.33-8.23 (m, 2H), 7.98-7.85 (m, 2H), 6.16 (s, 1H), 3.54 (qd, J=7.3, 5.7 Hz, 2H), 1.29 (t, J=7.3 Hz, 3H).

Step 2. 4-amino-N-ethylbenzamide (9c)

To a mixture of water (40 mL), acetic acid (4 mL), ammonium chloride (14.13 g, 264.2 mmol), ethanol (100 mL) and 9b (5.13 g, 26.42 mmol) was added zinc powder (8.64 g, 132 mmol) in batches. The mixture was stirred for 1 h and added with zinc powder (8.64 g, 132 mmol) in batches again. The resulting mixture was stirred at 60° C. for 1 h. After cooling to room temperature, the mixture was filtered through a pad of celite. The filtrate was concentrated to dryness under vacuum and the residue was dispersed in a saturated aqueous solution of sodium hydrogen carbonate (50 mL) and extracted with ethyl acetate (4×50 mL). The combined organic phase was dried over anhydrous sodium sulfate, filtered, concentrated and purified by silica gel column chromatography (petroleum ether/ethyl acetate=1/1 to 0/100) to give the title compound 9c (3.25 g, 75%).

MS m/z (ESI): 165 [M+1]

$^1$H NMR (400 MHz, DMSO-d$_6$) δ 7.94 (t, J=5.2 Hz, 1H), 7.55 (dd, J=9.0, 2.2 Hz, 2H), 6.52 (dd, J=9.0, 2.2 Hz, 2H), 5.54 (s, 2H), 3.26-3.16 (m, 2H), 1.08 (t, J=7.2 Hz, 3H).

Step 3. Tert-butyl (3aR,6aS)-5-(2-chloro-5-fluoro-pyrimidin-4-yl)hexahydropyrrolo[3,4-c]pyrrole-2(1H)-carboxylate (9e)

To a solution of 9d (900 mg, 4.24 mmol) in MeCN (50 mL) were added 2,4-dichloro-5-fluoropyrimidine (708 mg, 4.24 mmol) and DIEA (1.64 g, 12.72 mmol). The mixture was stirred for 2 h and then concentrated to dryness under vacuum. The residue was purified by silica gel column chromatography (petroleum ether/ethyl acetate=1/1) to give the title compound 9e (1.13 g, 78%).

MS m/z (ESI): 343 [M+1]

Step 4. Tert-butyl (3aR,6aS)-5-(2-((4-(ethylcarbamoyl)phenyl)amino)-5-fluoropyrimidin-4-yl)hexahydropyrrolo[3,4-c]pyrrole-2(1H)-carboxylate (9f)

To a 10-mL microwave vessel containing 9e (68 mg, 0.2 mmol), 4-amino-N-ethylbenzamide (33 mg, 0.2 mmol), KOtBu (48 mg, 0.5 mmol), and 1,4-dioxane (3 mL) under nitrogen was added RuPhos-Pd-G2 (7 mg, 0.01 mmol). The vessel was then heated in a microwave reactor at 120° C. for 1 h. After cooling to room temperature, the reaction mixture was poured into water (20 mL) and extracted with ethyl acetate (3×20 mL). The combined organic phase was dried over anhydrous sodium sulfate, filtered, concentrated and purified by silica gel column chromatography (dichloromethane/methanol=10/1 to 5/1) to give the title product 9f (56 mg, 63%).

MS m/z (ESI): 471 [M+1]

Step 5. N-ethyl-4-((5-fluoro-4-((3aR,6aS)-hexahydropyrrolo[3,4-c]pyrrol-2(1H)-yl)pyrimidin-2-yl)amino)benzamide hydrochloride (9g)

To a solution of 9f (56 mg, 0.112 mmol) in ethanol (2 mL) was added a solution of HCl (33% in ethanol, 2 mL). The mixture was stirred for 14 h and then concentrated to dryness under vacuum to give the title compound 9g (57 mg). The crude product was used directly in the next step without further purification.

MS m/z (ESI): 371 [M+1]

Step 6. 4-((4-((3aR,6aS)-5-(2,2-difluorocyclopropane-1-carbonyl)hexahydropyrrolo[3,4-c]pyrrole-2(1H)-yl)-5-fluoropyrimidine-2-yl)amino)-N-ethylbenzamide (9)

To a mixture of 9g (57 mg, 0.112 mmol) in CH$_2$Cl$_2$ (5 mL) were added DIEA (91 mg, 0.696 mmol), 2,2-difluorocyclopropane-1-carboxylic acid (15 mg, 0.12 mmol) and HATU (46 mg, 0.12 mmol). The mixture was stirred for 1 h and concentrated to dryness under vacuum. The residue was purified by prep-HPLC to give the title compound 9 (21 mg, solid, 40%).

MS m/z (ESI): 475 [M+1]

$^1$H NMR (400 MHz, CD$_3$OD) δ 7.84 (d, J=5.8 Hz, 1H), 111-7.70 (m, 4H), 4.09-3.90 (m, 3H), 3.82-3.56 (m, 4H), 3.52-3.43 (m, 1H), 3.40 (q, J=1.2 Hz, 2H), 3.22-3.05 (m, 2H), 2.88-2.77 (m, 1H), 2.08-1.97 (m, 1H), 1.83-1.70 (m, 1H), 1.22 (t, J=7.2 Hz, 3H).

Example 10 was prepared according to the procedure for Example 9 except, that 1d was used instead of 9d.

| Example | Amine | ¹H NMR | MS m/z (ESI) |
|---|---|---|---|
| 4-((4-((3aR,6aS)-5-(2,2-Difluorocyclopropane-1-carbonyl)-3a,6a-dimethylhexahydropyrrolo[3,4-c]pyrrol-2(1H)-yl)-5-fluoropyrimidin-2-yl)amino)-N-ethylbenzamide (10) | 1d | ¹H NMR (400 MHz, CD₃OD) δ 7.84 (d, J = 5.8 Hz, 1H), 7.80-7.68 (m, 4H), 3.94-3.58 (m, 7H), 3.49 (d, J = 11.4 Hz, 1H), 3.40 (q, J = 7.3 Hz, 2H), 2.87-2.76 (m, 1H), 2.07-1.98 (m, 1H), 1.83-1.70 (m, 1H), 1.27-1.09 (m, 9H). | 503 [M + 1] |

Example 11. Cyclopropyl((3aR,6aS)-5-(5-fluoro-2-((1-methyl-1H-pyrazol-4-yl)amino)pyrimidin-4-yl)-3a,6a-dimethylhexahydropyrrolo[3,4-c]pyrrol-2(1H)-yl)methanone

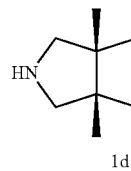

1d

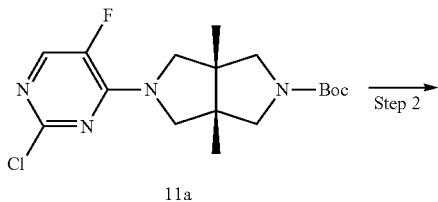

11a

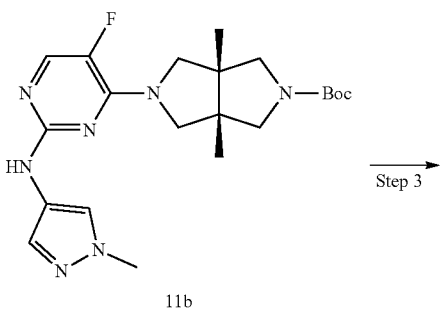

11b

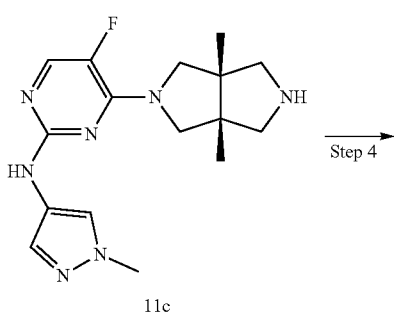

11c

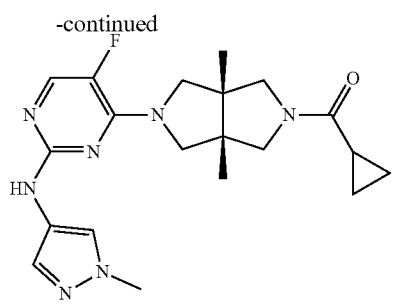

11

Step 1. Tert-butyl (3aR,6aS)-5-(2-chloro-5-fluoropyrimidin-4-yl)-3a,6a-dimethylhexahydropyrrolo[3,4-c]pyrrole-2(1H)-carboxylate (11a)

To a solution of 2,4-dichloro-5-fluoropyrimidine (680 mg, 4 mmol) and 1d (1.96 g, crude product, about 50% purity) in MeCN (40 mL) was added TEA (1.55 g, 12 mmol). The mixture was heated to 90° C. and stirred for 18 h. After cooling to room temperature, the mixture was added with saturated ammonium chloride aqueous solution (100 mL) and extracted with ethyl acetate (3×50 ml). The combined organic phase was washed with saturated brine (100 mL), dried over anhydrous sodium sulfate, filtered, and concentrated to dryness under vacuum. The residue was purified by silica gel column chromatography (petroleum ether/ethyl acetate=100/0 to 7/3) to give the title compound 11a (245 mg, 17%).

MS m/z (ESI): 371 [M+1]

¹H NMR (400 MHz, CDCl₃) δ 7.91 (d, J=4.9 Hz, 1H), 3.83 (s, 2H), 3.67 is, 2H), 3.46 (s, 2H), 3.33 (s, 2H), 1.46 (s, 9H), 1.15 (s, 6H).

Step 2. Tert-butyl (3aR,6aS)-5-(5-fluoro-2-((1-methyl-1H-pyrazol-4-yl)amino)pyrimidin-4-yl)-3a,6a-dimethylhexahydropyrrolo[3,4-c]pyrrole-2(1H) carboxylate (11b)

To a 30-mL microwave vessel were added 11a (245 mg, 0.66 mmol), 1-methyl-1H-pyrazol-4-amine (64 mg, 0.66 mmol), NaOtBu (159 mg, 1.65 mmol), 1,4-dioxane (8 mL) and RuPhos-Pd-G2 (24 mg, 0.033 mmol), and the reaction mixture was heated to 120° C. in a microwave reactor for 1 h under nitrogen. After cooling to room temperature, the reaction mixture was filtered through a pad of celite. The filtrate was concentrated to dryness under vacuum and the residue was purified by silica gel column chromatography (dichloromethane/ethyl acetate 100/0 to 0/1.00) to give the title compound 11b (147 mg, 52%).

MS m/z (ESI): 432 [M+1]

Step 3. 4-((3aR,6aS)-3a,6a-dimethylhexahydropyr-rolo[3,4-c]pyrrol-2(1H)-yl)-5-fluoro-N-(1-methyl-1H-pyrazol-4-yl)pyrimidin-2-amine hydrochloride (11c)

To a solution of 11b (147 mg, 0.34 mmol) in $CH_2Cl_2$ (10 mL) was added TFA (2 mL). The mixture was stirred for 18 h and then concentrated to dryness under vacuum. The residue was dissolved in $CH_2Cl_2$ (10 mL) and added with a solution of HCl in ethanol (9 M, 1 mL). The resulting mixture was concentrated to dryness to give the title compound lie as an HCl salt (160 mg, 98%).

MS m/z (ESI): 332 [M+1]

Step 4. Cyclopropyl((3aR,6aS)-5-(5-fluoro-2-((1-methyl-1H-pyrazol-4-yl)amino)pyrimidine-4-yl)-3a,6a-dimethylhexahydropyrrolo[3,4-c]pyrrole-2(1H)-yl)methanone (11)

To a mixture of 11c (160 mg, 0.34 mmol) and TEA (243 mg, 2.4 mol) in $CH_2Cl_2$ (10 mL) at 0° C. was added cyclopropanecarbonyl chloride (42 mg, 0.4 mmol). The mixture was stirred at 0° C. for 30 min, diluted with $CH_2Cl_2$ (20 mL) and washed with water (20 mL). The organic phase was dried over anhydrous sodium sulfate, filtered and concentrated to dryness. The residue was purified by prep-HPLC to give the title compound 11 (12.5 mg, solid, 9%).

MS m/z (ESI): 400 [M+1]

$^1$H NMR (400 MHz, $CDCl_3$) δ 7.76 (d, J=5.7 Hz, 1H), 7.61 (s, 1H), 7.53 (s, 1H), 6.80 (s, 1H), 3.87 (s, 3H), 3.81 (dd, J=20.0, 10.7 Hz, 3H), 3.64 (t, J=11.8 Hz, 4H), 3.48 (d, J=12.4 Hz, 1H), 1.60-1.52 (m, 1H), 1.20 (s, 3H), 1.16 (s, 3H), 1.05-0.96 (m, 2H), 0.83-0.73 (m, 2H).

Example 13 was synthesized according to the procedure for Example 11 except that in step 3, 2-(4-amino-1H-pyrazol-1-yl)ethan-1-ol was used instead of 1-methyl-1H-pyrazol-4-amine.

| Example | Compound replacing 1-methyl-1H-pyrazol-4-amine | $^1$H NMR | MS m/z (ESI) |
|---|---|---|---|
| cyclopropyl((3aR,6aS)-5-(5-fluoro-2-((1-(2-hydroxyethyl)-1H-pyrazol-4-yl)amino)pyrimidin-4-yl)-3a,6a-dimethylhexahydropyrrolo[3,4-c]pyrrol-2(1H)-yl)methanone (13) | 2-(4-amino-1H-pyrazol-1-yl)ethan-1-ol | $^1$H NMR (400 MHz, $CD_3OD$) δ 7.93 (s, 1H), 7.73 (d, J = 5.9 Hz, 1H), 7.52 (s, 1H), 4.17 (t, J = 5.2 Hz, 2H), 3.93-3.80 (m, 5H), 3.74-3.70 (m, 3H), 3.59 (d, J = 12.4 Hz, 1H), 3.44 (d, J = 12.4 Hz, 1H), 1.81-1.75 (m, 1H), 1.22 (s, 3H), 1.19 (s, 3H), 0.92-0.87 (m, 2H), 0.87-0.80 (m, 2H). | 430 [M + 1] |

Example 15 and Example 24 were synthesized according to the procedure for Example 11 except that in step 1, different compounds were used instead of 2,4-dichloro-5-fluoropyrimidine.

| Example | Compound replacing 2,4-dichloro-5-fluoropyrimidine | $^1$H NMR | MS m/z (ESI) |
|---|---|---|---|
| 4-((3aR,6aS)-5-(cyclopropanecarbonyl)-3a,6a-dimethylhexahydropyrrolo[3,4-c]pyrrol-2(1H)-yl)-2-((1-methyl-1H-pyrazol-4-yl)amino)pyrimidine-5-carbonitrile (15) | 2,4-dichloropyrimidine-5-carbonitrile | $^1$H NMR (400 MHz, $CD_3OD$) δ 8.14 (s, 1H), 7.83 (d, J = 6.6 Hz, 1H), 7.65 (d, J = 12.0 Hz, 1H), 3.85-3.74 (m, 4H), 3.72-3.58 (m, 3H), 3.58-3.44 (m, 3H), 3.34 (dd, J = 12.4, 4.2 Hz, 1H), 1.71-1.65 (m, 1H), 1.12(d, J = 7.4 Hz, 3H), 1.09(d, J = 8.0 Hz, 3H), 0.81-0.78 (m, 2H), 0.76-0.69 (m, 2H). | 407 [M + 1] |
| Cyclopropyl((3aR,6aS)-3a,6a-dimethyl-5-(5-methyl-2-((1-methyl-1H-pyrazol-4-yl)amino)pyrimidin-4-yl)hexahydropyrrolo[3,4-c]pyrrol-2(1H)-yl)methanone (24) | 2,4-dichloro-5-methylpyrimidine | $^1$H NMR (400 MHz, $CD_3OD$) δ 7.75 (s, 1H), 7.62 (s, 1H), 7.56 (s, 1H), 3.95-3.87 (m, 3H), 3.86 (s, 3H), 3.80-3.70 (m, 3H), 3.61 (d, J = 12.4 Hz, 1H), 3.44 (d, J = 12.4 Hz, 1H), 2.28 (s, 3H), 1.83-1.77 (m, 1H), 1.23 (s, 3H), 1.20 (s, 3H), 0.94-0.89 (m, 2H), 0.87-0.83 (m, 2H). | 396 [M + 1] |

Example 12. ((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)(cyclopropyl)methanone (12)

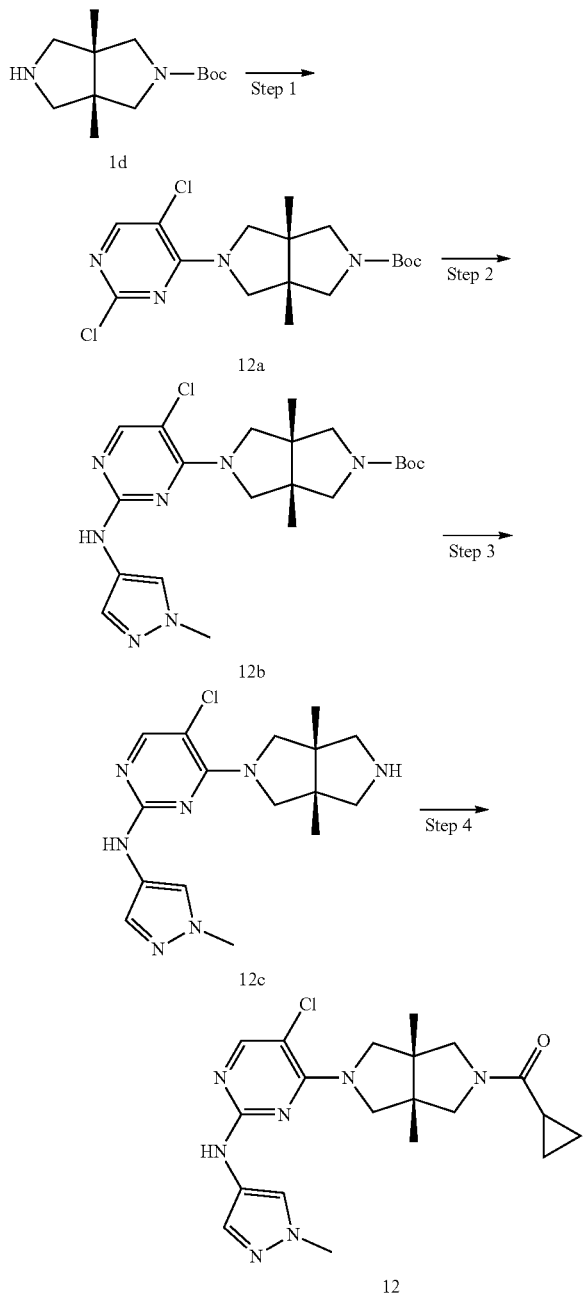

Step 1. Tert-butyl (3aR,6aS)-5-(2,5-dichloropyrimidin-4-yl)-3a,6a-dimethylhexahydropyrrolo[3,4-c]pyrrole-2(1H)-carboxylate (12a)

To a solution of 2,4,5-trichloropyrimidine (183 mg, 1 mmol) and 1d (770 mg, crude product, about 1 mmol) in MeCN (40 mL) was added DIEA (388 mg, 3 mmol). The mixture was heated to 90° C. and stirred for 24 h. After cooling to room temperature, the reaction mixture was added with saturated ammonium chloride aqueous solution (50 mL) and extracted with ethyl acetate (3×20 mL). The combined organic phase was washed with saturated brine (50 mL), dried over anhydrous sodium sulfate, filtered, and concentrated to dryness under vacuum. The residue was purified by silica gel column chromatography (petroleum ether/ethyl acetate=100/0 to 7/3) to give the title compound 12a (90 mg, 23%).

MS m/z (ESI): 387 [M+1]

Step 2. Tert-butyl (3aR,6aS)-5-(5-chloro-2-((1-methyl-1H-pyrazol-4-yl)amino)pyrimidin-4-yl)-3a,6a-dimethylhexahydropyrrolo[3,4-c]pyrrole-2(1H)-carboxylate (12b)

To a 30-mL microwave vessel were added 12a (90 mg, 0.23 mmol), 1-methyl-1H-pyrazol-4-amine (23 mg, 0.23 mmol), 1,4-dioxane (5 mL), NaOtBu (49 mg, 0.506 mmol) and RuPhos-Pd-G2 (9 mg, 0.0115 mmol). The reaction mixture was heated to 110° C. in a microwave reactor for 1 h under nitrogen. After cooling to room temperature, the mixture was filtered through a pad of celite. The filtrate was concentrated to dryness under vacuum and the residue was purified by silica gel column chromatography (dichloromethane/ethyl acetate=100/0 to 0/100) to give the title compound 12b (61 mg, 59%).

MS m/z (ESI): 448 [M+1]

Step 3. 5-Chloro-4-((3aR,6aS)-3a,6a-dimethylhexahydropyrrolo[3,4-c]pyrrol-2(1H)-yl)-N-(1-methyl-1H-pyrazol-4-yl)pyrimidin-2-amine hydrochloride (12c)

To a solution of 12b (61 mg, 0.136 mmol) in CH$_2$Cl$_2$ (5 mL) was added TFA (2 mL). The mixture was stirred for 20 h and then concentrated to dryness under vacuum. The residue was dissolved in a mixture of methanol (2 mL) and water (10 mL) and added with a solution of HCl (9 M in ethanol, 0.2 mL). The mixture was concentrated to dryness again to give the title compound 12c (67 mg, 100%) as an HCl salt.

MS m/z (ESI): 348 [M+1]

Step 4. ((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)(cyclopropyl)methanone (12)

To a mixture of 12c (67 mg, 0.136 mmol) and TEA (55 mg, 0.544 mol) in CH$_2$Cl$_2$ (20 mL) at 0° C. was added cyclopropanecarbonyl chloride (14 mg, 0.136 mmol). The mixture was stirred at 0° C. for 30 min and then washed with saturated ammonium chloride solution (20 mL). The organic phase was dried over anhydrous sodium sulfate, filtered and concentrated to dryness under vacuum. The residue was purified by prep-HPLC to give the title compound 12 (1.9 mg, solid, 3%).

MS m/z (ESI): 416 [M+1]
$^1$H NMR (400 MHz, CD$_3$OD) δ 7.83 (s, 1H), 7.75 (s, 1H), 7.53 (s, 1H), 3.97 (dd, J=15.1, 11.8 Hz, 2H), 3.90-3.78 (m, 6H), 3.71 (d, J=10.8 Hz, 1H), 3.59 (d, J=12.4 Hz, 1H), 3.42 (d, J=12.4 Hz, 1H), 1.78 (dd, J=8.7, 3.9 Hz, 1H), 1.21 (s, 3H), 1.18 (s, 3H), 0.92-0.87 (m, 2H), 0.86-0.82 (m, 2H).

Examples 19, 34, 37, 41 and 96 were synthesized according to the procedure for Example 12 except that in step 4, different compounds were used instead of cyclopropanecarbonyl chloride.

| Example | Compound replacing cyclopropanecarbonyl chloride | ¹H NMR | MS m/z (ESI) |
|---|---|---|---|
| 1-((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)ethan-1-one (19) | acetic chloride | ¹H NMR (400 MHz, CD$_3$OD) δ 7.85 (s, 1H), 7.77 (s, 1H), 7.55 (s, 1H), 4.02-3.94 (m, 2H), 3.86 (s, 3H), 3.86-3.80 (m, 2H), 3.71 (d, J = 11.0 Hz, 1H), 3.59 (d, J = 12.5 Hz, 1H), 3.55 (d, J = 11.0 Hz, 1H), 3.43 (d, J = 12.4 Hz, 1H), 2.08 (s, 3H), 1.21 (s, 3H), 1.19 (s, 3H). | 390 [M + 1] |
| 5-chloro-4-((3aR,6aS)-3a,6a-dimethyl-5-(methylsulfonyl)hexahydropyrrolo[3,4-c]pyrrol-2(1H)-yl)-N-(1-methyl-1H-pyrazol-4-yl)pyrimidin-2-amine (34) | methanesulfonyl chloride | ¹H NMR (400 MHz, CD$_3$OD) δ 7.85 (s, 1H), 7.78 (s, 1H), 7.55 (s, 1H), 4.03 (d, J = 11.7 Hz, 2H), 3.87 (s, 3H), 3.81 (d, J = 11.7 Hz, 2H), 3.52 (d, J = 10.1 Hz, 2H), 3.36 (d, J = 10.1 Hz, 2H), 2.96 (s, 3H), 1.21 (s, 6H). | 426 [M + 1] |
| 1-((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)-2-methoxyethan-1-one (37) | 2-methoxyacetyl chloride | ¹H NMR (400 MHz, CD$_3$OD) δ 7.85 (s, 1H), 7.77 (s, 1H), 7.55 (s, 1H), 4.11 (s, 2H), 3.98 (dd, J = 11.7, 4.6 Hz, 2H), 3.86 (s, 3H), 3.83 (dd, J = 11.7, 1.7 Hz, 2H), 3.65 (dd, J = 11.6, 9.2 Hz, 2H), 3.49 (dd, J = 11.6, 9.4 Hz, 2H), 3.42 (s, 3H), 1.20 (d, J = 1.3 Hz, 6H). | 420 [M + 1] |
| 5-chloro-4-((3aR,6aS)-5-(ethylsulfonyl)-3a,6a-dimethylhexahydropyrrolo[3,4-c]pyrrol-2(1H)-yl)-N-(1-methyl-1H-pyrazol-4-yl)pyrimidin-2-amine (41) | ethanesulfonyl chloride | ¹H NMR (400 MHz, CD$_3$OD) δ 7.86 (s, 1H), 7.79 (s, 1H), 7.55 (s, 1H), 4.04 (d, J = 11.7 Hz, 2H), 3.87 (s, 3H), 3.80 (d, J = 11.7 Hz, 2H), 3.55 (d, J = 10.0 Hz, 2H), 3.38 (d, J = 10.0 Hz, 2H), 3.14 (q, J = 7.4 Hz, 2H), 1.34 (t, J = 7.4 Hz, 3H), 1.21 (s, 6H). | 440 [M + 1] |
| 5-chloro-4-((3aR,6aS)-5-(cyclopropylsulfonyl)-3a,6a-dimethylhexahydropyrrolo[3,4-c]pyrrol-2(1H)-yl)-N-(1-methyl-1H-pyrazol-4-yl)pyrimidin-2-amine (96) | cyclopropanesulfonyl chloride | ¹H NMR (400 MHz, DMSO-d$_6$) δ 9.08 (s, 1H), 7.90 (s, 1H), 7.70 (s, 1H), 7.45 (s, 1H), 3.93 (d, J = 11.5 Hz, 2H), 3.78 (s, 3H), 3.69 (d, J = 11.5 Hz, 2H), 3.38 (d, J = 10.1 Hz, 2H), 3.30 (d, J = 10.2 Hz, 2H), 2.77 (s, 1H), 1.12 (s, 6H), 0.94 (dd, J = 8.1, 5.2 Hz, 4H). | 452 [M + 1] |

Example 23, 30 and 32 were synthesized according to the procedure for Example 12 except that, in step 2, different compounds were used instead of 1-methyl-1H-pyrazol-4-amine.

| Example | Compound replacing 1-methyl-1H-pyrazol-4-amine | ¹H NMR | MS m/z (ESI) |
|---|---|---|---|
| ((3aR,6aS)-5-(2-((1H-pyrazol-4-yl)amino)-5-chloropyrimidin-4-yl)-3a,6a-dimethylhexahydropyrrolo[3,4-c]pyrrol-2(1H)-yl)(cyclopropyl)methanone hydrochloride (23) | 1H-pyrazol-4-amine | ¹H NMR (400 MHz, CD$_3$OD) δ 8.04 (s, 2H), 7.96 (s, 1H), 4.31 (d, J = 52.8 Hz, 2H), 4.05-3.80 (m, 3H), 3.75 (d, J = 11.0 Hz, 1H), 3.62 (s, 1H), 3.47 (d, J = 12.6 Hz, 1H), 1.83-1.77 (m, 1H), 1.26 (s, 3H), 1.22 (s, 3H), 0.97-0.89 (m, 2H), 0.89-0.85 (m, 2H). | 402 [M + 1] |
| ((3aR,6aS)-5-(5-chloro-2-((1-(difluoromethyl)-1H-pyrazol-4-yl)amino)pyrimidin-4-yl)-3a,6a-dimethylhexahydropyrrolo[3,4-c]pyrrol-2(1H)-yl)(cyclopropyl)methanone | 1-(difluoromethyl)-1H-pyrazol-4-amine | ¹H NMR (400 MHz, CD$_3$OD) δ 8.23 (s, 1H), 7.92 (s, 1H), 7.78 (s, 1H), 7.41 (t, J = 60.0 Hz, 1H), 4.05-3.95 (m, 2H), 3.87 (td, J = 11.2, 7.5 Hz, 3H), 3.74 (d, J = 10.8 Hz, 1H), 3.61 (d, J = 12.4 Hz, 1H), 3.45 (d, J = 12.4 Hz, 1H), 1.83-1.77 (m, 1H), | 452 [M + 1] |

-continued

| Example | Compound replacing 1-methyl-1H-pyrazol-4-amine | $^1$H NMR | MS m/z (ESI) |
|---|---|---|---|
| (30) | | 1.24 (s, 3H), 1.21 (s, 3H), 0.94-0.90 (m, 2H), 0.88-0.84 (m, 2H). | |
| ((3aR,6aS)-5-(5-chloro-2-((1-(2-hydroxyethyl)-1H-pyrazol-4-yl)amino)pyrimidin-4-yl)-3a,6a-dimethylhexahydropyrrolo[3,4-c]pyrrol-2(1H)-yl)(cyclopropyl)methanone hydrochloride (32) | 2-(4-amino-1H-pyrazol-1-yl)ethan-1-ol | $^1$H NMR (400 MHz, CD$_3$OD) δ 7.99 (s, 1H), 7.91 (s, 1H), 7.63 (s, 1H), 4.37 (d, J = 11.8 Hz, 1H), 4.31-4.15 (m, 3H), 4.02-3.80 (m, 4H), 3.74 (d, J = 10.9 Hz, 1H), 3.65 (d, J = 12.4 Hz, 1H), 3.57 (d, J = 13.3 Hz, 1H), 3.47 (d, J = 12.9 Hz, 1H), 1.80 (s, 1H), 1.25 (s, 3H), 1.22 (s, 3H), 0.96-0.80 (m, 4H). | 446 [M + 1] |

Example 14. 4-((3aR,6aS)-5-(2,2-difluoroethyl)-3a,6a-dimethylhexahydropyrrolo[3,4-c]pyrrol-2(1H)-yl)-5-fluoro-N-(1-methyl-1H-pyrazol-4-yl)pyrimidin-2-amine

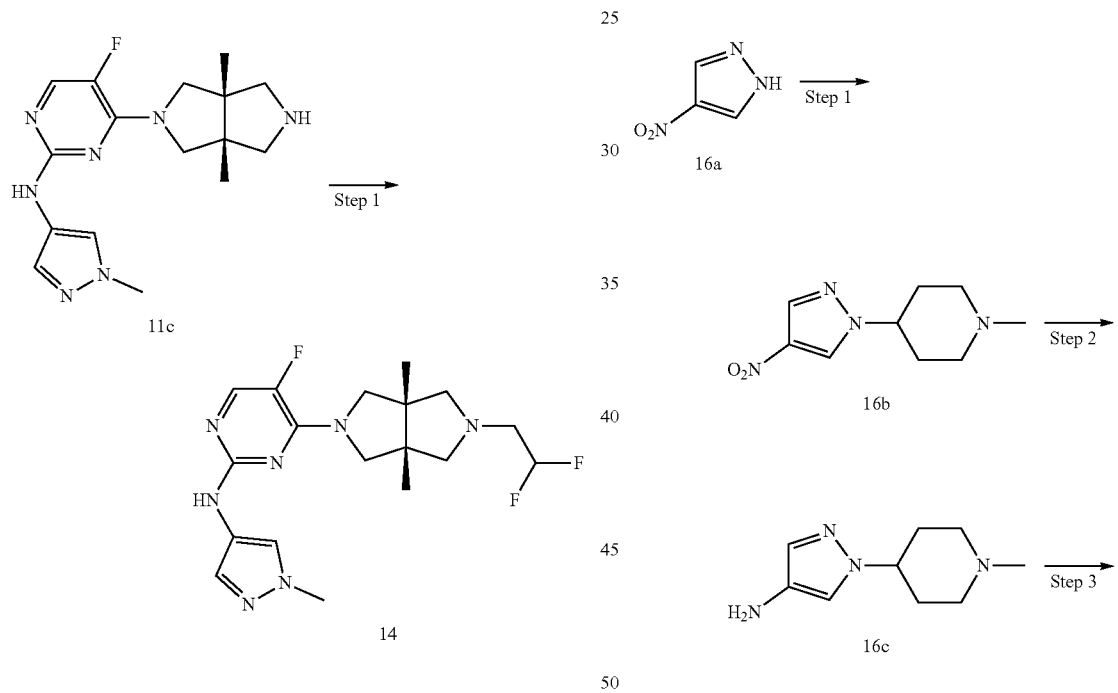

To a solution of 11e (135 mg, 0.255 mmol) in DMF (2 mL) were added DIEA (132 mg, 1.02 mmol) and 1,1-difluoro-2-iodoethane (49 mg, 0.255 mmol), and the mixture was stirred at 70° C. for 24 h. After cooling to room temperature, the mixture was transferred to a 15-mL sealed tube, and then added with DIEA (132 mg, 1.02 mmol) and 1,1-difluoro-2-iodoethane (98 mg, 0.51 mmol). The mixture was stirred in the sealed tube at 80° C. for 72 h. After cooling to room temperature, the mixture was purified by prep-HPLC to give the title compound 14 (16.9 mg, solid, 17%).

MS m/z (ESI): 396 [M+1]

$^1$H NMR (400 MHz, CD$_3$OD) δ 7.77 (s, 1H), 7.74 (d, J=6.2 Hz, 1H), 7.55 (s, 1H), 5.89 (tt, J=56.1, 4.3 Hz, 1H), 3.96 (dd, J=11.7, 1.9 Hz, 21 f), 3.87 (s, 3H), 3.58 (dd, J=11.6, 1.2 Hz, 2H), 2.99 (d, J=9.5 Hz, 2H), 2.89 (td, J=15.3, 4.3 Hz, 2H), 2.66 (d, J=9.5 Hz, 2H), 1.17 (s, 6H).

Example 16. ((3aR,6aS)-5-(5-Chloro-2-((1-(1-methylpiperidin-4-yl)-1H-pyrazol-4-yl)amino)pyrimidin-4-yl)-3a,6a-dimethylhexahydropyrrolo[3,4-c]pyrrol-2(1H)-yl)(cyclopropyl)methanone

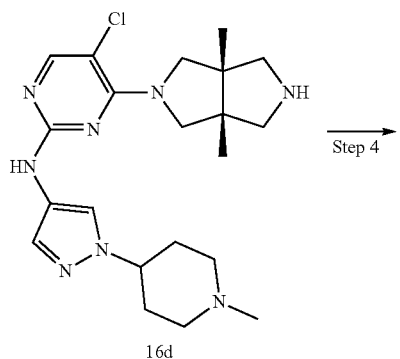

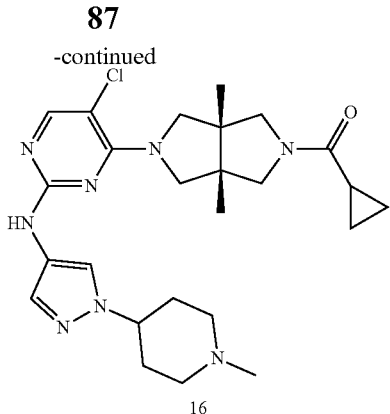

16

Step 1. 1-Methyl-4-(4-nitro-1H-pyrazol-1-yl)piperidine (16b)

To a mixture of 4-nitro-1H-pyrazol 16a (1.13 g, 10 mmol), 1-methyl piperidin-4-ol (1.15 g, mmol), and tri phenyl phosphine (3.15 g, 12 mmol) in THF (25 mL) at 0° C. under nitrogen was added diisopropyl azodicarboxylate (2.63 g, 13 mmol) dropwise. After stirring for 4 h, the mixture was diluted with water (100 mL) and adjusted to pH=1 by addition of 6 N HCl. The resulting mixture was washed with ethyl acetate (2×50 mL). The aqueous layer was added with LiOH solid to adjust to pH=10 and then extracted with ethyl acetate (3×50 mL). The combined organic phase was dried over anhydrous sodium sulfate, filtered and concentrated to dryness under vacuum. The residue was purified by silica gel column chromatography (dichloromethane/methanol=100/0 to 94/6) to give the title compound 16b (800 mg, 38%).

MS m/z (ESI): 211 [M+1]

$^1$H NMR (400 MHz, CDCl$_3$) δ 8.17 (s, 1H), 8.08 (s, 1H), 4.19-4.11 (m, 1H), 3.04-2.96 (m, 2H), 2.35 (s, 3H), 2.24-2.12 (m, 4H), 2.10-2.00 (m, 2H).

Step 2. 1-(1-Methylpiperidin-4-yl)-1H-pyrazol-4-amine (16c)

To a solution of 16b (800 mg, 3.8 mmol) in MeOH (10 mL) was added 10% Pd/C (400 mg). The mixture was stirred under hydrogen for 2 h and then filtered. The filtrate was concentrated to dryness under vacuum to give the title compound 16c (688 mg, 100%). The crude product was used directly in the next step without further purification.

MS m/z (ESI): 18.1 [M+1]

Step 3. 5-Chloro-4-((3aR,6aS)-3a,6a-dimethylhexahydropyrrolo[3,4-c]pyrrol-2(1H)-yl)-N-(1-(1-methylpiperidin-4-yl)-1H-pyrazol-4-yl)pyrimidin-2-amine (16d)

To a 10-mL microwave vessel were added 12a (39 mg, 0.1 mmol), 16c (18 mg, 0.1 mmol), pTsOH (38 mg, 0.2 mmol) and isopropanol (2 mL). The mixture was stirred in a microwave reactor at 100° C. for 1 h. After cooling to room temperature, the mixture was concentrated to dryness under vacuum to give the title compound 16d (60 mg). The crude product was used directly in the next step without further purification.

MS m/z (ESI): 431 [M+1]

Step 4. ((3aR,6aS)-5-(5-chloro-2-((1-(1-methylpiperidin-4-yl)-1H-pyrazol-4-yl)amino)pyrimidin-4-yl)-3a,6a-dimethylhexahydropyrrolo[3,4-c]pyrrol-2(1H)-yl)(cyclopropyl)methanone (16)

To a solution of 16d (60 mg) and TEA (51 mg, 0.5 mmol) in CH$_2$Cl$_2$ (5 mL) was added a solution of cyclopropanecarbonyl chloride (11 mg, 0.1 mmol) in CH$_2$Cl$_2$ (1 mL). The mixture was stirred for 30 min and then concentrated to dryness under vacuum. The residue was purified by prep-HPLC to give the title compound 16 (22.3 mg, solid, 45% over two steps).

MS m/z (ESI): 499 [M+1]

$^1$H NMR (400 MHz, CD$_3$OD) δ 7.92 (s, 1H), 7.85 (s, 1H), 7.56 (s, 1H), 4.19-4.11 (m, 1H), 4.19-4.11 (dd, J=18.7, 11.6 Hz, 2H), 3.89-3.83 (m, 3H), 3.73 (6, J=10.8 Hz, 1H), 3.62 (d, J=12.4 Hz, 1H), 3.44 (d, J=12.4 Hz, 1H), 3.03 (d, J=12.5 Hz, 2H), 2.37 (s, 3H), 2.29 (t, J=11.7 Hz, 2H), 2.16 (d, J=11.6 Hz, 2H), 2.07 (dd, J=16.7, 8.0 Hz, 2H), 1.84-1.76 (m, 1H), 1.24 (s, 3H), 1.21 (s, 3H), 0.94-0.89 (m, 2H), 0.88-0.82 (m, 2H).

Example 17. ((3aR,6aS)-5-(5-Chloro-2-((1-((R)-2-hydroxypropyl)-1H-pyrazol-4-yl)amino)pyrimidin-4-yl)-3a,6a-dimethylhexahydropyrrolo[3,4-c]pyrrol-2(1H)-yl)(cyclopropyl)methanone

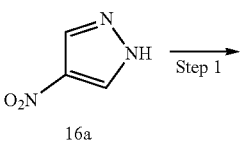

16a

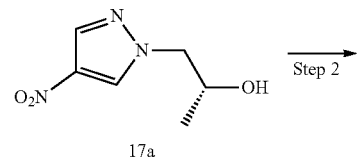

17a

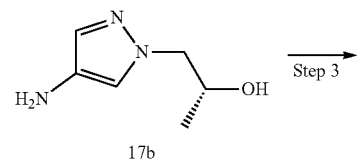

17b

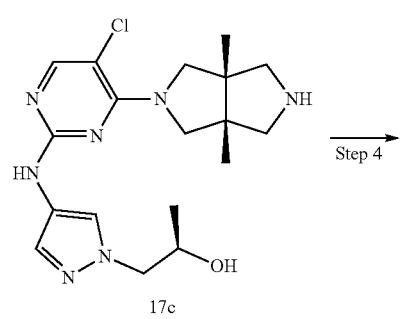

17c

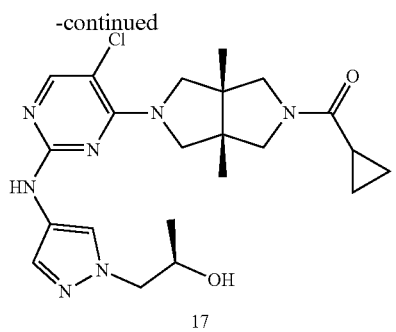

17

Step 1. (R)-1-(4-nitro-1H-pyrazol-1-yl)propan-2-ol (17a)

To a solution of 4-nitro-1H-pyrazol 16a (2.26 g, 20 mmol) and (R)-2-methyloxirane (3.48 g, 60 mmol) in DMF (15 mL) was added cesium carbonate (13 g, 40 mmol). The mixture was stirred in a sealed tube at 100° C. for 4 h. After cooling to room temperature, the mixture was poured into water (100 mL) and extracted with ethyl acetate (3×100 mL). The combined organic phase was washed with water (3×100 mL), dried over anhydrous sodium sulfate, filtered and concentrated to dryness under vacuum. The residue was purified by silica gel column chromatography (petroleum ether/ethyl acetate=100/0 to 7/3), followed by purification by prep-HPLC to give the title compound 17a (1.2 g, 35%).

MS m/z (ESI): 172 [M+1]

1H NMR (400 MHz, DMSO-d6) δ 8.77 (s, 1H), 8.26 (s, 1H), 5.03 (d, J=4.8 Hz, 1H), 4.17-4.09 (m, 1H), 4.06-3.97 (m, 2H), 1.08 (d, J=6.0 Hz, 3H).

Step 2, (R)-1-(4-amino-1H-pyrazol-1-yl)propan-2-ol (17b)

To a solution of 17a (1.2 g, 7 mmol) in MeOH (20 mL) was added 10% Pd/C (120 mg). The mixture was stirred under hydrogen for 16 h and then filtered. The filtrate was concentrated to dryness and the residue was purified by silica gel column chromatography (dichloromethane/methanol=100/0 to 19/1) to give the title compound 17b (848 mg, 86%).

MS m/z (ESI): 142 [M+1]

Step 3. (R)-1-(4-((5-chloro-4-((3aR,6aS)-3a,6a-dimethylhexahydropyrrolo[3,4-c]pyrrol-2(1H)-yl)pyrimidin-2-yl)amino)-1H-pyrazol-1-yl)propan-2-ol (17c)

To a 10-mL microwave vessel was added 12a (39 mg, 0.1 mmol), 17b (15 mg, 0.1 mmol), pTsOH (38 mg, 0.2 mmol) and isopropanol (2 mL). The vessel was stirred in a microwave reactor at 100° C. for 1 h. After cooling to room temperature, the mixture was concentrated to dryness to give the title compound 17c (60 mg). The crude product was used directly in next step without further purification.

MS m/z (ESI): 392 [M+1]

Step 4. ((3aR,6aS)-5-(5-chloro-2-((1-((R)-2-hydroxypropyl)-1H-pyrazol-4-yl)amino)pyrimidin-4-yl)-3a,6a-dimethylhexahydropyrrolo[3,4-c]pyrrol-2(1H)-yl)(cyclopropyl)methanone (17)

To a solution of 17c (60 mg, crude) and TEA (51 mg, 0.5 mmol) in CH$_2$Cl$_2$ (5 mL) was add a solution of cyclopropanecarbonyl chloride (11 mg, 0.1 mmol) in CH$_2$Cl$_2$ (1 mL). The mixture was stirred for 30 min and then concentrated to dryness under vacuum. The residue was purified by prep-HPLC to give the title compound 17 (20.1 mg, solid, 44% over two steps).

MS m/z (ESI): 460 [M+1]

$^1$H NMR (400 MHz, CD$_3$OD) δ 7.92 (s, 1H), 7.84 (s, 1H), 7.54 (s, 1H), 4.13-3.97 (m, 5H), 3.91-3.83 (m, 3H), 3.72 (d, J=10.8 Hz, 1H), 3.61 (dd, J=12.4, 3.7 Hz, 1H), 3.44 (dd, J=12.4, 1.7 Hz, 1H), 1.83-1.77 (m, 1H), 1.23 (s, 3H), 1.20 (s, 3H), 1.17 (d, J=6.1 Hz, 3H) 0.94-0.89 (m, 2H), 0.88-0.82 (m, 2H).

Example 18 was synthesized according to the procedure for Example 12 except that in step 1, (S)-2-methyloxirane was used instead of (R)-2-methyloxirane.

| Example | Compound replacing (R)-2-methyloxirane | $^1$H NMR | MS m/z (ESI) |
|---|---|---|---|
| ((3aR,6aS)-5-(5-chloro-2-((1-((S)-2-hydroxypropyl)-1H-pyrazol-4-yl)amino)pyrimidin-4-yl)-3a,6a-dimethylhexahydropyrrolo[3,4-c]pyrrol-2(1H)-yl)(cyclopropyl)methanone (18) | (S)-2-methyloxirane | $^1$H NMR (400 MHz, CD$_3$OD) δ 7.92 (s, 1H), 7.84 (s, 1H), 7.54 (s, 1H), 4.14-3.95 (m, 5H), 3.92-3.82 (m, 3H), 3.72 (d, J = 10.8 Hz, 1H), 3.61 (dd, J = 12.4, 3.6 Hz, 1H), 3.44 (dd, J = 12.4, 1.4 Hz, 1H), 1.83-1.77 (m, 1H), 1.23 (s, 3H), 1.20 (s, 3H), 1.17 (d, J = 6.1 Hz, 3H), 0.94-0.88 (m, 2H), 0.89-0.81 (m, 2H). | 460 [M + 1] |

Example 20. 3-((3aR,6aS)-5-(5-Chloro-2-((1-methyl-1H-pyrazol-4-yl)amino)pyrimidin-4-yl)-3a,6a-dimethylhexahydropyrrolo[3,4-c]pyrrol-2(1H)-yl)-3-oxopropanenitrile

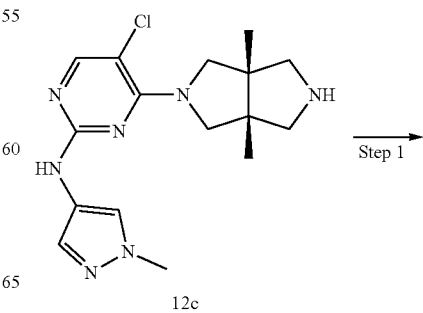

12c

Step 1

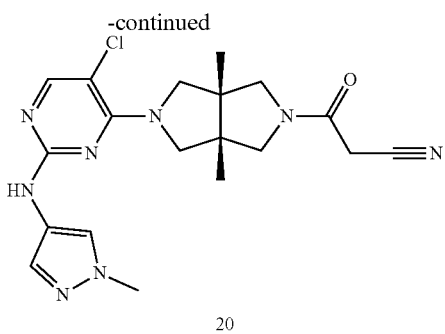

20

A mixture of 12c (35 mg, 0.1 mmol), 2-cyanoacetic acid (9 mg, 0.1 mmol), DIEA (39 mg, 0.3 mmol), and HATU (46 mg, 0.12 mmol) in CH$_2$Cl$_2$ (5 mL) was stirred for 30 min. The mixture was quenched with water (20 mL) and extracted with CH$_2$Cl$_2$ (2×100 mL). The combined organic phase was dried over anhydrous sodium sulfate, filtered and concentrated to dryness under vacuum. The residue was purified by prep-HPLC to give the title compound 20 (10.5 mg, solid, 25%).

MS m/z (ESI): 415 [M+1]

$^1$H NMR (400 MHz, CD$_3$OD) δ 7.84 (s, 1H), 7.77 (s, 1H), 7.55 (s, 1H), 3.99 (t, J=10.8 Hz, 2H), 3.86 (s, 3H), 3.84 (d, J=11.8 Hz, 2H), 3.66 (dd, J=18.8, 11.6 Hz, 2H), 3.50 (dd, J=19.0, 11.6 Hz, 2H), 1.21 (s, 3H), 1.20 (s, 3H).

Examples 21, 22, 35, 36, 39, 42, 43, 44, 45, 46, 47, 48 and 52 were synthesized according to the procedure for Example 20 except that in Step 1, different compounds were used instead of 2-cyanoacetic acid.

| Example | Compound replacing 2-cyanoacetic acid | $^1$H NMR | MS m/z (ESI) |
|---|---|---|---|
| ((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)((R)-2,2-difluorocyclopropyl)methanone (21) | (R)-2,2-difluorocyclopropane-1-carboxylic acid | $^1$H NMR (400 MHz, CD$_3$OD) δ 7.85 (s, 1H), 7.77 (s, 1H), 7.54 (d, J = 9.5 Hz, 1H), 4.08-3.71 (m, 5H), 3.86 (d, J = 2.6 Hz, 3H), 3.68-3.56 (m, 2H), 3.48 (dd, J = 12.5, 2.6 Hz, 1H), 2.89-2.79 (m, 1H), 2.08-2.00 (m, 1H), 1.85-1.73 (m, 1H), 1.23 (d, J = 2.1 Hz, 3H), 1.21 (d, J = 4.9 Hz, 3H). | 452 [M + 1] |
| ((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)((S)-2,2-difluorocyclopropyl)methanone (22) | (S)-2,2-difluorocyclopropane-1-carboxylic acid | $^1$H NMR (400 MHz, CD$_3$OD) δ 7.85 (s, 1H), 7.77 (s, 1H), 7.54 (d, J = 9.4 Hz, 1H), 4.08-3.70 (m, 5H), 3.86 (d, J = 2.6 Hz, 3H), 3.68-3.57 (m, 2H), 3.49 (dd, J = 12.5, 2.5 Hz, 1H), 2.89-2.78 (m, 1H), 2.05-2.00 (m, 1H), 1.84-1.73 (m, 1H), 1.23 (d, J = 2.2 Hz, 3H), 1.21 (d, J = 4.9 Hz, 3H). | 452 [M + 1] |
| 1-((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)-2-hydroxyethan-1-one (35) | 2-hydroxy acetic acid | $^1$H NMR (400 MHz, CD$_3$OD) δ 7.84 (s, 1H), 7.77 (s, 1H), 7.55 (s, 1H), 4.18 (s, 2H), 3.98 (dd, J = 11.7, 4.7 Hz, 2H), 3.86 (s, 3H), 3.84 (d, J = 11.8 Hz, 2H), 3.63 (t, J = 11.4 Hz, 2H), 3.47 (dd, J = 14.6, 11.7 Hz, 2H), 1.20 (s, 3H), 1.20 (s, 3H). | 406 [M + 1] |
| 1-((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)propan-1-one (36) | propionic acid | $^1$H NMR (400 MHz, CD$_3$OD) δ 7.85 (s, 1H), 7.77 (s, 1H), 7.55 (s, 1H), 4.01-3.93 (m, 2H), 3.86 (s, 3H), 3.83 (dd, J = 11.6, 4.9 Hz, 2H), 3.69 (d, J = 11.0 Hz, 1H), 3.60 (d, J = 12.4 Hz, 1H), 3.53 (d, J = 11.0 Hz, 1H), 3.44 (d, J = 12.4 Hz, 1H), 2.37 (q, J = 7.5 Hz, 2H), 1.21 (s, 3H), 1.19 (s, 3H), 1.13 (t, J = 7.5 Hz, 3H). | 404 [M + 1] |
| ((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)(oxetan-3-yl)methanone (39) | oxetane-3-carboxylic acid | $^1$H NMR (400 MHz, CD$_3$OD) δ 7.84 (s, 1H), 7.76 (s, 1H), 7.55 (s, 1H), 4.86-4.81 (m, 4H), 4.15 (dd, J = 15.3, 7.7 Hz, 1H), 3.96 (dd, J = 11.7, 3.4 Hz, 2H), 3.86 (s, 3H), 3.82 (dd, J = 11.7, 2.5 Hz, 2H), 3.64 (d, J = 12.5 Hz, 1H), 3.51 (d, J = 10.8 Hz, 1H), 3.47 (d, J = 12.5 Hz, 1H), 3.36 (d, J = 4.3 Hz, 1H), 1.19 (s, 3H), 1.18 (s, 3H). | 432 [M + 1] |
| 1-((3aR,6aS)-5-(5-chloro-2-((1-methyl-1H-pyrazol-4-yl)amino)pyrimidin-4-yl)-3a,6a- | 1-cyanocyclopropane-1-carboxylic acid | $^1$H NMR (400 MHz, CD$_3$OD) δ 7.74 (s, 1H), 7.66 (s, 1H), 7.42 (s, 1H), 3.99-3.84 (m, 3H), 3.80-3.69 (m, 3H), 3.75 (s, 3H), 3.52 (d, J = 12.7 Hz, 1H), | 441 [M + 1] |

| Example | Compound replacing 2-cyanoacetic acid | ¹H NMR | MS m/z (ESI) |
|---|---|---|---|
| dimethyloctahydropyrrolo[3,4-c]pyrrole-2-carbonyl)cyclopropane-1-carbonitrile (42) | | 3.37 (d, J = 12.7 Hz, 1H), 1.55-1.43 (m, 4H), 1.13 (s, 3H), 1.10 (s, 3H). | |
| ((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)(1-hydroxycyclopropyl)methanone (43) | 1-hydroxycyclopropane-1-carboxylic acid | ¹H NMR (400 MHz, CD₃OD) δ 7.73 (s, 1H), 7.65 (s, 1H), 7.43 (s, 1H), 3.96 (d, J = 12.1 Hz, 1H), 3.89 (d, J = 11.6 Hz, 1H), 3.84 (d, J = 11.7 Hz, 1H), 3.79-3.68 (m, 3H), 3.74 (s, 3H), 3.51 (d, J = 12.6 Hz, 1H), 3.35 (d, J = 12.6 Hz, 1H), 1.09 (s, 6H), 1.04-0.99 (m, 2H), 0.82-0.79 (m, 2H). | 432 [M + 1] |
| 1-((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)-2-hydroxy-2-methylpropan-1-one (44) | 2-hydroxy-2-methylpropionic acid | ¹H NMR (400 MHz, CD₃OD) δ 7.85 (s, 1H), 7.77 (s, 1H), 7.54 (s, 1H), 4.06 (d, J = 12.2 Hz, 1H), 4.01 (d, J = 11.6 Hz, 1H), 3.95 (d, J = 11.7 Hz, 1H), 3.88-3.78 (m, 3H), 3.86 (s, 3H), 3.63 (d, J = 12.8 Hz, 1H), 3.47 (d, J = 12.8 Hz, 1H), 1.42 (d, J = 1.7 Hz, 6H), 1.19 (d, J = 1.9 Hz, 6H). | 434 [M + 1] |
| 3-((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)-2,2-dimethyl-3-oxopropanenitrile (45) | 2-cyano-2-methylpropionic acid | ¹H NMR (400 MHz, CD₃OD) δ 7.86 (s, 1H), 7.78 (s, 1H), 7.52 (s, 1H), 4.10-3.96 (m, 3H), 3.91-3.79 (m, 3H), 3.86 (s, 3H), 3.68 (d, J = 12.9 Hz, 1H), 3.53 (d, J = 12.8 Hz, 1H), 1.62 (d, J = 3.8 Hz, 6H), 1.23 (d, J = 9.2 Hz, 6H). | 443 [M + 1] |
| ((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)(isoxazol-5-yl)methanone (46) | isoxazole-5-carboxylic acid | ¹H NMR (400 MHz, CD₃OD) δ 8.54 (d, J = 1.9 Hz, 1H), 7.85 (s, 1H), 7.77 (s, 1H), 7.55 (s, 1H), 7.00 (d, J = 1.9 Hz, 1H), 4.05 (dd, J = 18.9, 11.7 Hz, 3H), 3.93-3.84 (m, 3H), 3.85 (s, 3H), 3.81 (d, J = 13.1 Hz, 1H), 3.68 (d, J = 13.1 Hz, 1H), 1.25 (d, J = 7.2 Hz, 6H). | 443 [M + 1] |
| ((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)(pyridin-2-yl)methanone (47) | picolinic acid | ¹H NMR (400 MHz, CD₃OD) δ 8.63 (ddd, J = 4.9, 1.6, 0.9 Hz, 1H), 7.97 (td, J = 7.8, 1.7 Hz, 1H), 7.85 (s, 1H), 7.81-7.78 (m, 1H), 7.77 (s, 1H), 7.55 (s, 1H), 7.54-7.51 (m, 1H), 4.11 (d, J = 11.6 Hz, 1H), 3.97 (d, J = 11.7 Hz, 1H), 3.93-3.77 (m, 4H), 3.85 (s, 3H), 3.72 (d, J = 11.9 Hz, 1H), 3.67 (d, J = 12.9 Hz, 1H), 1.27 (s, 3H), 1.17 (s, 3H). | 453 [M + 1] |
| 1-((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)-3,3,3-trifluoropropan-1-one hydrochloride (48) | 3,3,3-trifluoropropionic acid | ¹H NMR (400 MHz, CD₃OD) δ 7.90 (s, 1H), 7.85 (s, 1H), 7.64 (s, 1H), 4.36 (s, 1H), 4.23 (d, 11.4 Hz, 1H), 3.94 (s, 3H), 3.87-3.72 (m, 2H), 3.64 (dd, J = 26.0, 9.5 Hz, 2H), 3.54-3.38 (m, 4H), 1.23 (d, J = 4.5 Hz, 6H). | 458 [M + 1] |
| 1-((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)-3,3-difluoropropan-1-one (52) | 3,3-difluoropropionic acid | ¹H NMR (400 MHz, CD₃OD) δ 7.88 (s, 1H), 7.82 (s, 1H), 7.60 (s, 1H), 6.24 (tt, J = 56.0, 4.7 Hz, 1H), 4.12 (s, 2H), 4.00 (s, 2H), 3.93 (s, 3H), 3.76 (d, J = 10.9 Hz, 1H), 3.60 (t, J = 12.9 Hz, 2H), 3.49 (d, J = 12.4 Hz, 1H), 3.03 (td, J = 16.0, 4.7 Hz, 2H), 1.22 (d, J = 4.9 Hz, 6H). | 440 [M + 1] |

Example 25. 5-Chloro-4-((3aR,6aS)-3a,6a-dimethyl-5-(pyrimidin-4-yl)hexahydropyrrolo[3,4-c]pyrrol-2(1H)-yl)-N-(1-methyl-1H-pyrazol-4-yl)pyrimidin-2-amine

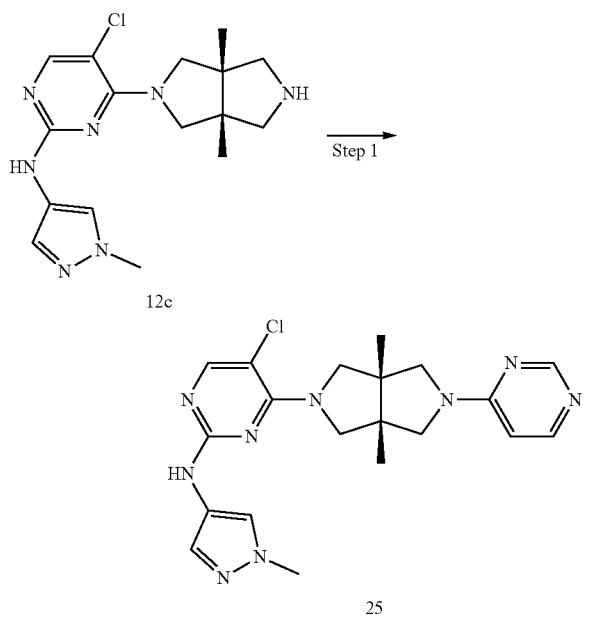

A mixture of 12c (100 mg, 0.26 mmol), 4-chloropyrimidine hydrochloride (59 mg, 0.39 mmol), and DIEA (3.36 mg, 2.6 mmol) in MeCN (4 mL) was heated to 80° C. and stirred for 8 h. After cooling to room temperature, the mixture was concentrated to dryness under vacuum and the residue was purified by prep-HPLC to give the title compound 25 (65.1 mg, solid, 58%).

MS m/z (ESI): 426 [M+1]

$^1$H NMR (400 MHz, DMSO-d$_6$) δ 9.06 (s, 1H), 8.46 (s, 1H), 8.14 (d, J=6.1, 1H), 7.89 (s, 1H), 7.69 (s, 1H), 7.43 (s, 1H), 6.46 (dd, J=6.1, 1.0, 1H), 3.88 (s, 2H), 3.76 (s, 3H), 3.74 (s, 2H), 3.67 (s, 2H), 3.52 (s, 2H), 1.15 (s, 6H).

Example 26. 3-((3aR,6aS)-5-(5-Chloro-2-((1-methyl-1H-pyrazol-4-yl)amino)pyrimidin-4-yl)hexahydropyrrolo[3,4-c]pyrrol-2(1H)-yl)-3-oxopropanenitrile

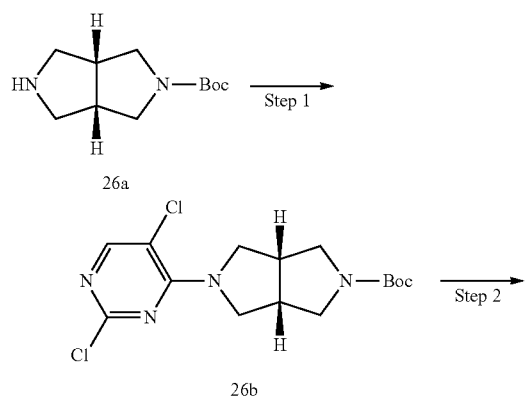

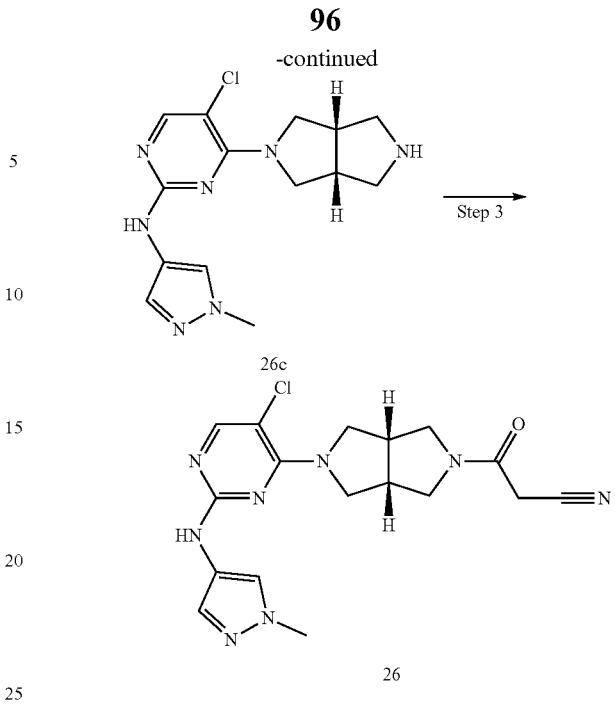

Step 1. Tert-butyl (3aR,6aS)-5-(2,5-dichloropyrimidin-4-yl)hexahydropyrrolo[3,4-c]pyrrole-2(1H)-carboxylate (26b)

To a solution of 2,4,5-trichloropyrimidine (182 mg, 1 mmol) in MeCN (10 mL) were added 26a (212 mg, 1 mmol) and potassium carbonate (207 mg, 1.5 mmol). The mixture was stirred at 80° C. for 3 h and then concentrated to dryness under vacuum. The residue was purified by silica gel column chromatography (petroleum ether/ethyl acetate=100/0 to 3/1) to give the title compound 26b (300 mg, 84%).

MS m/z (ESI): 359 [M+1]

Step 2, 5-Chloro-4-((3aR,6aS)-hexahydropyrrolo[3,4-c]pyrrol-2(1H)-yl)-N-(1-methyl-1H-pyrazol-4-yl)pyrimidin-2-amine (26c)

To a mixture of 26b (300 mg, 0.84 mmol) and 1-methyl-1H-pyrazol-4-amine hydrochloride (81.3 mg, 0.84 mmol) in isopropanol (50 mL) was added pTsOH (318 mg, 1.68 mmol). The mixture was heated to 100° C. in a microwave reactor for 2 h. After cooling to room temperature, the precipitate was collected by filtration to give the title compound 26c (200 mg, 75%).

MS m/z (ESI): 320 [M+1]

Step 3. 3-((3aR, 6aS)-5-(5-Chloro-2-((1-methyl-1H-pyrazol-4-yl)amino)pyrimidin-4-yl)hexahydropyrrolo[3,4-c]pyrrol-2(1H)-yl)-3-oxopropanenitrile (26)

To mixture of 26c (100 mg, 0.313 mmol), 2-cyanoacetic acid (26.6 mg, 0.313 mmol) and TEA (47.5 mg, 0.47 mmol) in DMF (5 mL) was added HATU (178.6 mg, 0.47 mmol). The mixture was stirred for 1 h and then concentrated to dryness under vacuum. The residue was purified by prep-HPLC to give the title compound 26 (61.9 mg, solid, 50%).

MS m/z (ESI): 387 [M+1]

$^1$H NMR (400 MHz, CD$_3$OD) δ 7.85 (s, 1H), 7.78 (s, 1H), 7.54 (s, 1H), 4.19-4.11 (m, 2H), 3.93-3.72 (m, 9H), 3.52-3.45 (m, 2H), 3.18-3.12 (m, 1H), 3.09-3.03 (m, 1H).

Examples 27 was synthesized according to the procedure for Example 26 except that in step 3, (S)-2,2-difluorocyclopropane-1-carboxylic acid was used instead of 2-cyanoacetic acid.

| Example | Compound replacing 2-cyanoacetic acid | ¹H NMR | MS m/z (ESI) |
|---|---|---|---|
| ((3aR,6aS)-5-(5-chloro-2-((1-methyl-1H-pyrazol-4-yl)amino)pyrimidin-4-yl)hexahydropyrrolo[3,4-c]pyrrol-2(1H)-yl)((S)-2,2-difluorocyclopropyl)methanone (27) | (S)-2,2-difluorocyclopropane-1-carboxylic acid | ¹H NMR (400 MHz, CD$_3$OD) δ 7.85 (s, 1H), 7.79 (s, 1H), 7.53 (d, J = 5.1 Hz, 1H), 4.20-4.10 (m, 2H), 4.05-3.90 (m, 2H), 3.90-3.83 (m, 3H), 3.82-3.75 (m, 2H), 3.73-3.60 (m, 1H), 3.53-3.42 (m, 1H), 3.20-3.05 (m, 2H), 2.89-2.81 (m, 1H), 2.09-2.00 (m, 1H), 1.84-1.74 (m, 1H). | 424 [M + 1] |

Example 28. 3-((3aR,6aS)-5-(2-((1H-Pyrazol-4-yl)amino)-5-chloropyrimidin-4-yl)-3a,6a-dimethyl-hexahydropyrrolo[3,4-c]pyrrol-2(1H)-yl)-3-oxopropanenitrile

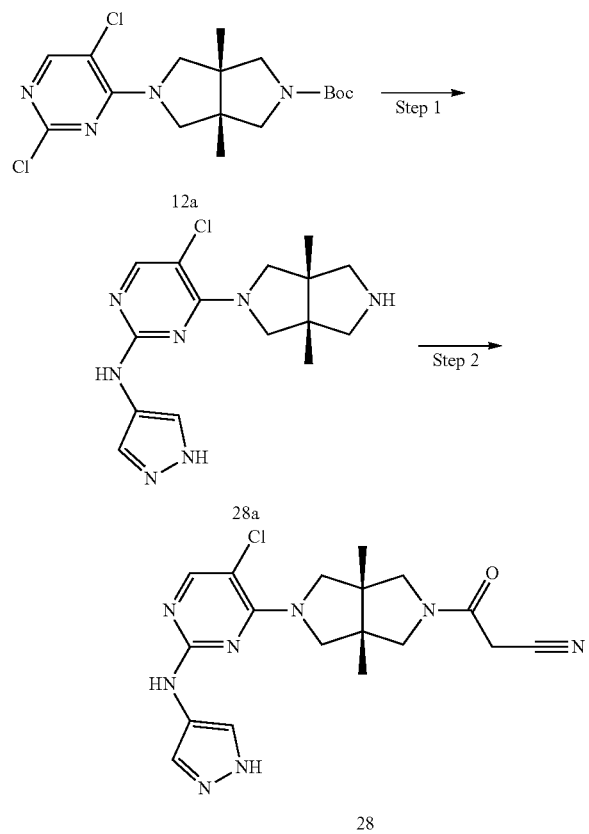

Step 1. 5-chloro-4-((3aR,6aS)-3a,6a-dimethylhexahydropyrrolo[3,4-c]pyrrole-2(1H)-yl)-N-(1H-pyrazol-4-yl)pyrimidine-2-amine (28a)

To a 30-mL microwave vessel were added 12a (161 mg, 0.42 mmol), 1H-pyrazol-4-amine (35 mg, 0.42 mmol), pTsOH (160 mg, 0.84 mmol) and isopropanol (10 mL). The mixture was heated to 100° C. in a microwave reactor for 1 h. The mixture was cooled to room temperature and concentrated to dryness under vacuum to give the title compound 28a (260 mg). The crude product is used directly in the next step without purification.

MS m/z (ESI): 334 [M+1]

Step 2. 3-((3aR,6aS)-5-(2-((1H-Pyrazol-4-yl)amino)-5-chloropyrimidin-4-yl)-3a,6a-dimethyl-hexahydropyrrolo[3,4-c]pyrrol-2(1H)-yl)-3-oxopropanenitrile (28)

To a mixture of 28a (130 mg, crude, 0.21 mmol), 2-cyanoacetic acid (18 mg, 0.21 mmol) and DIEA (82 mg, 0.63 mmol) in DMF (5 mL) was added HATU (80 mg, 0.21 mmol). The mixture was stirred for 1 h and then purified by prep-HPLC to give the title compound 28 (7.6 mg, solid, 9%).

MS m/z (ESI): 401 [M+1]

¹H NMR (400 MHz, CD$_3$OD) δ 7.85 (s, 2H), 7.65 (s, 1H), 4.02 (d, J=11.8 Hz, 1H), 3.98 (d, J=11.8 Hz, 1H), 3.85 (dd, J=11.6, 2.8 Hz, 2H), 3.66 (t, J=12.1 Hz, 2H), 3.53 (d, J=10.7 Hz, 1H), 3.47 (d, J=12.5 Hz, 1H), 1.21 (s, 3H), 1.20 (s, 3H).

Example 29 was synthesized according to the procedure for Example 28 except that in step 2, (S)-2,2-difluorocyclopropane-1-carboxylic acid was used instead of 2-cyanoacetic acid.

| Example | Compound replacing 2-cyanoacetic acid | ¹H NMR | MS m/z (ESI) |
|---|---|---|---|
| ((3aR,6aS)-5-(2-((1H-pyrazol-4-yl)amino)-5-chloropyrimidin-4-yl)-3a,6a-dimethylhexahydropyrrolo[3,4-c]pyrrol-2(1H)-yl)((S)-2,2-difluorocyclopropyl)methanone (29) | (S)-2,2-difluorocyclopropane-1-carboxylic acid | ¹H NMR (400 MHz, CD$_3$OD) δ 7.86 (s, 2H), 7.64 (s, 1H), 4.16-4.03 (m, 1H), 4.02-3.94 (m, 1H), 3.92-3.81 (m, 2H), 3.76 (q, J = 10.9 Hz, 1H), 3.69-3.54 (m, 2H), 3.49 (d, J = 12.6 Hz, 1H), 2.88-2.78 (m, 1H), 2.08-1.99 (m, 1H), 1.84-1.73 (m, 1H), 1.23 (s, 3H), 1.21 (d, J = 3.6 Hz, 3H). | 438 [M + 1] |

Example 31. 3-((3aR,6aS)-5-(5-Chloro-2-((1-(2-hydroxyethyl)-1H-pyrazol-4-yl)amino)pyrimidin-4-yl)-3a,6a-dimethylhexahydropyrrolo[3,4-c]pyrrol-2(1H)-yl)-3-oxopropanenitrile

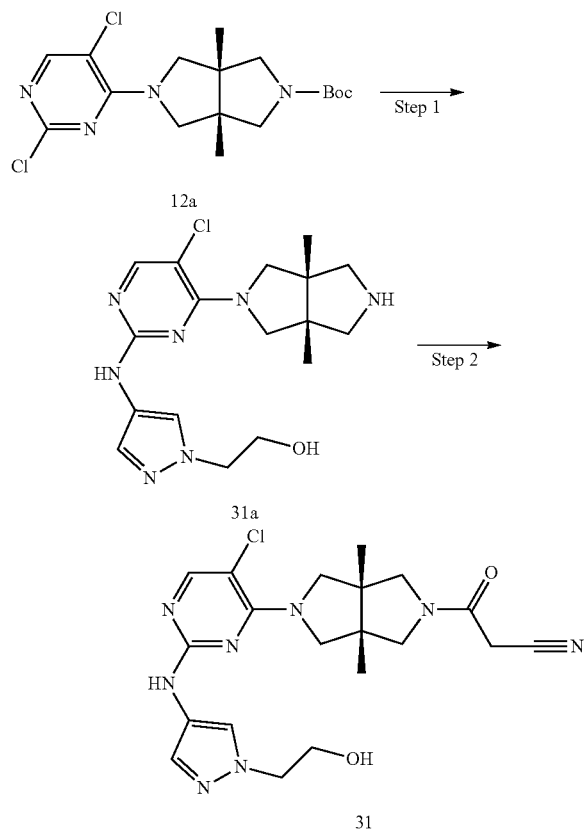

Step 1. 2-(4-((5-Chloro-4-((3aR,6aS)-3a,6a-dimethylhexahydropyrrolo[3,4-c]pyrrol-2(1H)-yl)pyrimidin-2-yl)amino)-1H-pyrazol-1-yl)ethan-1-ol (31a)

To a 30-mL microwave vessel were added 12a (330 mg, 0.852 mmol), 2-(4-amino-1H-pyrazol-1-yl)ethan-1-ol (108 mg, 0.852 mmol), pTsOH (324 mg, 1.704 mmol) and isopropanol (10 mL). The mixture was heated to 100° C. in a microwave reactor for 1 h. After cooling to room temperature, the mixture was concentrated to dryness under vacuum and the residue was purified by prep-HPLC to give the title compound 31a (210 mg, 65%).
MS m/z (ESI): 378 [M+1]

Step 2, 3-((3aR,6aS)-5-(5-Chloro-2-((1-(2-hydroxyethyl)-1H-pyrazol-4-yl)amino)pyrimidin-4-yl)-3a,6a-dimethylhexahydropyrrolo[3,4-c]pyrrol-2(1H)-yl)-3-oxopropanenitrile (31)

To a mixture of 31a (100 mg, 0.26 mmol), 2-cyanoacetic acid (23 mg, 0.26 mmol) and DIEA (101 mg, 0.87 mmol) in CH$_2$Cl$_2$ (10 mL) was added HATU (101 mg, 0.26 mmol). The mixture was stirred for 1 h and then concentrated to dryness under vacuum. The residue was purified by prep-HPLC to give the title compound 31 (18.6 mg, solid, 16%).
MS m/z (ESI): 445 [M+1]

$^1$H NMR (400 MHz, CD$_3$OD) δ 7.96 (s, 1H), 7.84 (s, 1H), 7.53 (s, 1H), 4.20 (t, J=5.2 Hz, 2H), 4.02 (d, J=5.8 Hz, 1H), 3.99 (d, J=5.7 Hz, 1H), 3.92-3.81 (m, 4H), 3.68 (d, J=10.7 Hz, 1H), 3.63 (d, J=12.5 Hz, 1H), 3.52 (d, J=10.7 Hz, 1H), 3.48 (d, J=12.5 Hz, 1H), 1.21 (s, 3H), 1.20 (s, 3H).

Example 33. 2-(4-((5-Chloro-4-((3aR,6aS)-5-(cyclopropanecarbonyl)-3a,6a-dimethylhexahydropyrrolo[3,4-c]pyrrol-2(1H)-yl)pyrimidin-2-yl)amino)-1H-pyrazol-1-yl)acetonitrile

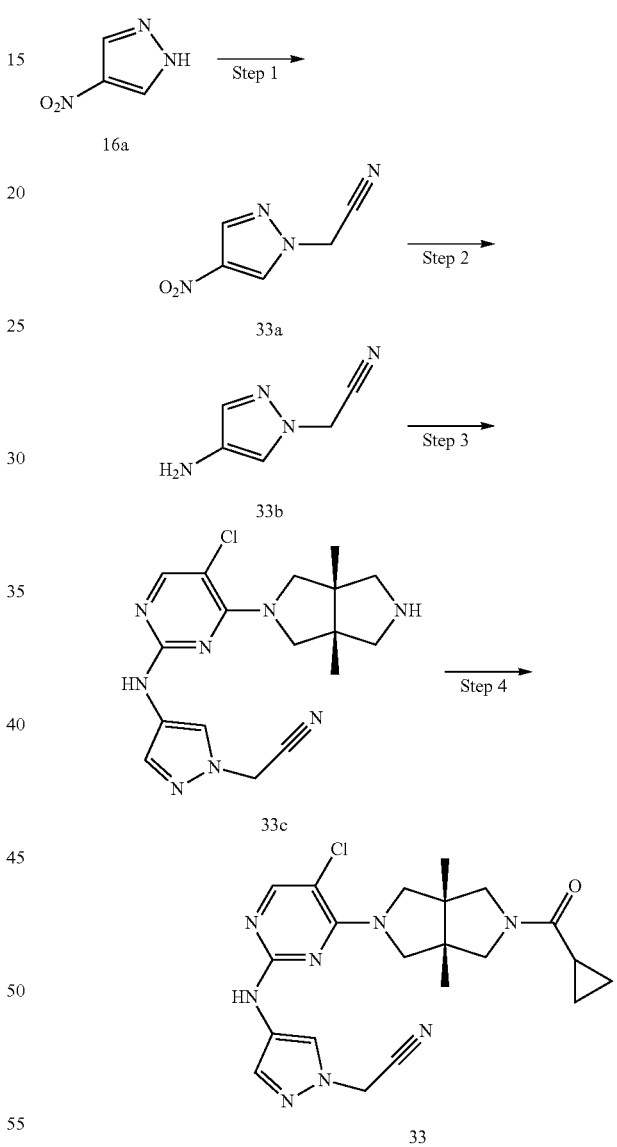

Step 1. 2-(4-Nitro-1H-pyrazol-1-yl)acetonitrile (33a)

To a solution of 4-nitro-1H-pyrazol 16a (1.13 g, 10 mmol) in DMF (12 mL) was added cesium carbonate (9.75 g, 30 mmol). After cooling to 0° C., the mixture was added with 2-bromoacetonitrile (2.4 g, 20 mmol) dropwise. The mixture was stirred for 1 h, diluted with water (150 mL) and extracted with ethyl acetate (3×100 mL). The combined organic phase was washed with water (3×100 mL), dried over anhydrous sodium sulfate, filtered and concentrated to dryness under vacuum. The residue was purified by silica gel column chromatography (petroleum ether/ethyl acetate=100/0 to 1/1) to give the title compound 33a (960 mg, 63%).

MS m/z (ESI): 153 [M+1]

$^1$H NMR (400 MHz, CDCl$_3$) δ 8.36 (s, 1H), 8.16 (s, 1H), 5.15 (s, 2H).

Step 2. 2-(4-Amino-1H-pyrazol-1-yl)acetonitrile (33b)

A mixture of 33a (940 mg, 6.18 mmol), ammonium chloride (6.6 g, 123.6 mmol), ethanol (40 mL) and water (10 mL) was heated to 60° C., and then added with zinc powder (4 g, 61.8 mmol) in batches. The mixture was stirred at 60° C. for 10 min, cooled to room temperature and filtered. The filtrate was diluted with water (80 mL) and extracted with ethyl acetate (3×100 mL). The combined organic phase was washed with saturated brine (50 mL), dried over anhydrous sodium sulfate and filtered. The filtrate was concentrated to dryness under vacuum and the residue was purified by silica gel column chromatography (dichloromethane/methanol=100/0 to 19/1) to give the title compound 33b (130 mg, 17%).

MS m/z (ESI): 123 [M+1]

Step 3. 2-(4-((5-Chloro-4-((3aR,6aS)-3a,6a-dimethylhexahydropyrrolo[3,4-c]pyrrol-2(1H)-yl)pyrimidin-2-yl)amino)-1H-pyrazol-1-yl)acetonitrile (33c)

To a 10-mL microwave flask were added 12a (155 mg, 0.4 mmol), 33b (49 mg, 0.4 mmol), pTsOH (16 mg, 0.08 mmol) and isopropanol (4 mL). The mixture was stirred in a microwave reactor at 100° C. for 1 h. After cooling to room temperature, the mixture was concentrated to dryness under vacuum to give the title compound 33c. The crude product is used directly in the next step without purification.

MS m/z (ESI): 373 [M+1]

Step 4. 2-(4-((5-Chloro-4-((3aR,6aS)-5-(cyclopropanecarbonyl)-3a,6a-dimethylhexahydropyrrolo[3,4-c]pyrrol-2(1H)-yl)pyrimidin-2-yl)amino)-1H-pyrazol-1-yl)acetonitrile (33)

To a mixture of 33c (crude, 0.4 mmol) in CH$_2$Cl$_2$ (20 mL) were added TEA (121 mg, 1.2 mmol) and a solution of cyclopropanecarbonyl chloride (42 mg, 0.4 mmol) in CH$_2$Cl$_2$ (1 mL).

The mixture was stirred for 1 h and then concentrated to dryness under vacuum. The residue was purified by prep-HPLC to give the title compound 2 33 (81 mg, solid, 46% over two steps).

MS m/z (ESI): 441 [M+1]

$^1$H NMR (400 MHz, CD$_3$OD) δ 8.04 (s, 1H), 7.87 (s, 1H), 7.63 (s, 1H), 5.29 (s, 2H), 4.06-3.96 (m, 2H), 3.95-3.82 (m, 3H), 3.72 (d, J=10.8 Hz, 1H), 3.62 (d, J=12.4 Hz, 1H), 3.45 (d, J=12.4 Hz, 1H), 1.83-1.77 (m, 1H), 1.24 (s, 3H), 1.20 (s, 3H), 0.94-0.88 (m, 2H), 0.88-0.82 (m, 2H).

Example 38. Azetidin-3-yl((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)methanone

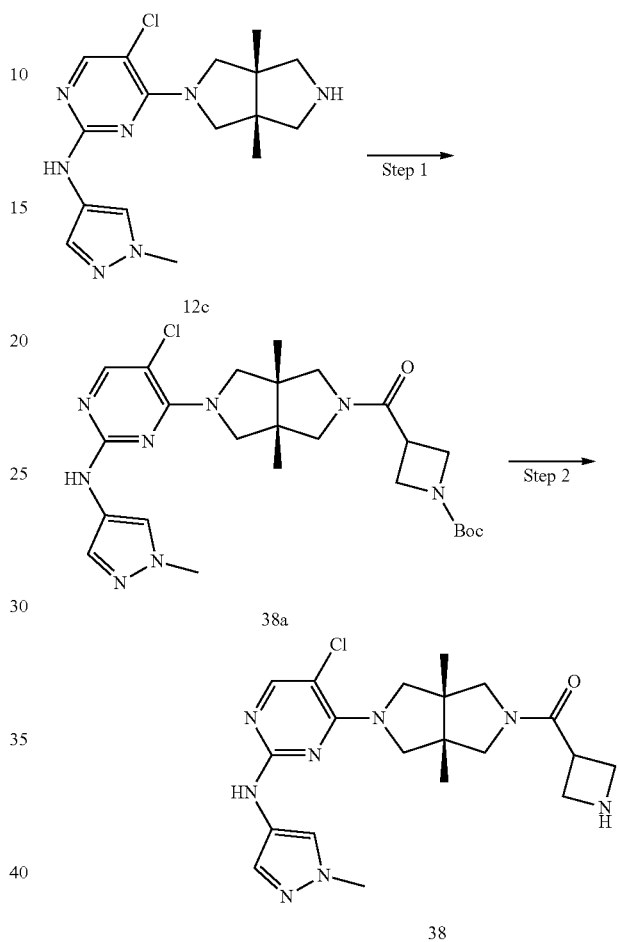

Step 1. Tert-butyl 3-((3aR,6aS)-5-(5-chloro-2-((1-methyl-1H-pyrazol-4-yl)amino)pyrimidin-4-yl)-3a,6a-dimethyloctahydropyrrolo[3,4-c]pyrrole-2-carbonyl)azetidine-1-carboxylate (38a)

To a mixture of 12c (35 mg, 0.1 mmol), 1-(tert-butoxycarbonyl)azetidine-3-carboxylic acid (21 mg, 0.1 mmol) and DIEA (39 mg, 0.3 mmol) in CH$_2$Cl$_2$ (5 mL) was added HATU (38 mg, 0.1 mmol). After stirring at room temperature for 30 min, the mixture was diluted with saturated ammonium chloride solution (20 mL) and extracted with CH$_2$Cl$_2$ (3×20 mL). The combined organic phase was dried over anhydrous sodium sulfate, filtered and concentrated to dryness under vacuum to give the title compound 38a. This crude product, is used directly in the next step without purification.

MS m/z (ESI): 531 [M+1]

Step 2. Azetidin-3-yl((3aR,6aS)-5-(5-chloro-2-((1-methyl-1H-pyrazol-4-yl)amino)pyrimidin-4-yl)-3a,6a-dimethylhexahydropyrrolo[3,4-c]pyrrol-2(1H)-yl)methanone (38)

To a solution of 38a (crude, about 0.1 mmol) in CH₂Cl₂ (2 mL) was added TFA (2 mL). The mixture was stirred for 30 min and then concentrated to dryness under vacuum. The residue was purified by prep-HPLC to give the title compound 38 (19.9 mg, solid, 46% over two steps.

MS m/z (ESI): 431 [M+1]

¹H NMR (400 MHz, CD₃OD) δ 7.85 (s, 1H), 7.76 (s, 1H), 7.55 (s, 1H), 4.05-3.93 (m, 4H), 3.90-3.78 (m, 8H), 3.63 (d, J=12.5 Hz, 1H), 3.57 (d, J=10.8 Hz, 1H), 3.46 (d, J=12.5 Hz, 1H), 3.41 (d, J=10.8 Hz, 1H), 1.19 (s, 6H).

Example 40. 5-Chloro-4-((3aR,6aS)-3a,6a-dimethyl-5-(2,2,2-trifluoroethyl)hexahydropyrrolo[3,4-c]pyrrol-2(1H)-yl)-N-(1-methyl-1H-pyrazol-4-yl)pyrimidin-2-amine

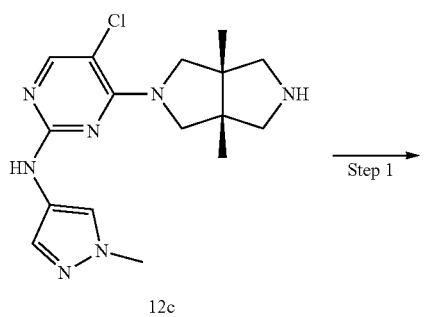

To a mixture of 12c (50 mg, 0.14 mmol) in 1,4-dioxane (4 mL) were added DIEA (54 mg, 0.42 mmol) and 2,2,2-trifluoroethyltrifluoromethanesulfonate (65 mg, 0.28 mmol). The mixture was stirred in a sealed tube at 100° C. for 2 h. After cooling to room temperature, the mixture was concentrated to dryness under vacuum and the residue was purified by prep-HPLC to give the title compound 40 (7.3 mg, solid, 12%).

MS m/z (ESI): 430 [M+1]

¹H NMR (400 MHz, CD₃OD) δ 7.84 (s, 1H), 7.77 (s, 1H), 7.56 (s, 1H), 4.06 (d, J=11.5 Hz, 2H), 3.86 (s, 3H), 3.69 (d, J=11.5 Hz, 2H), 3.22 (q, J=9.8 Hz, 2H), 3.04 (d, J=9.3 Hz, 2H), 2.79 (d, J=9.3 Hz, 2H), 1.16 (s, 6H).

Example 49. 2-((3aR,6aS)-5-(5-Chloro-2-((1-methyl-1H-pyrazol-4-yl)amino)pyrimidin-4-yl)-3a,6a-dimethylhexahydropyrrolo[3,4-c]pyrrol-2(1H)-yl)ethan-1-ol

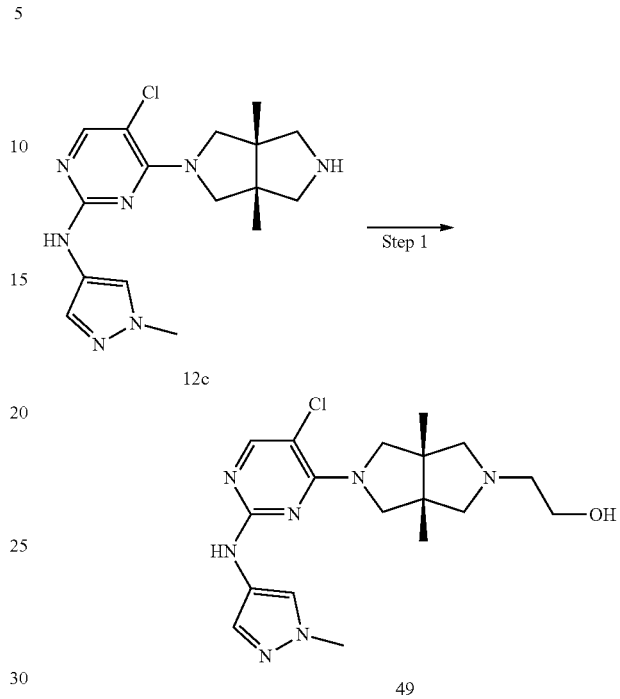

A mixture of 12c (35 mg, 0.1 mmol), 2-bromoethanol (15 mg, 0.12 mmol) and potassium carbonate (42 mg, 0.3 mmol) in MeCN (5 mL) was heated to reflux for 20 h while stirring. After cooling to room temperature, the mixture was concentrated to dryness under vacuum. The residue was dissolved in DMSO (5 mL) and then added with 2-bromoethanol (0.2 mL) and cesium carbonate (98 mg, 0.3 mmol). The mixture was heated to 100° C. for 2 h. After cooling to room temperature, the mixture was filtered and the filtrate was purified by prep-HPLC to give the title compound 49 (16.7 mg, solid, 43%).

MS m/z (ESI): 392 [M+1]

¹H NMR (400 MHz, CD₃OD) δ 7.84 (s, 1H), 7.77 (s, 1H), 7.56 (s, 1H), 4.12 (d, J=11.5 Hz, 2H), 3.87 (s, 3H), 3.65 (dd, J=8.7, 5.1 Hz, 4H), 2.93 (d, J=9.6 Hz, 2H), 2.70-2.61 (m, 4H), 1.17 (s, 6H).

Example 50. 5-Chloro-4-((3aR,6aS)-5-(isoxazoyl-5-ylmethyl)-3a,6a-dimethylhexahydropyrrolo[3,4-c]pyrrol-2(1H)-yl)-N-(1-methyl-1H-pyrazol-4-yl)pyrimidin-2-amine

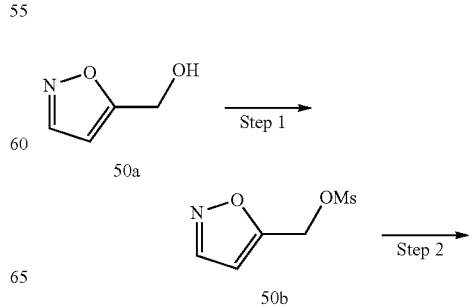

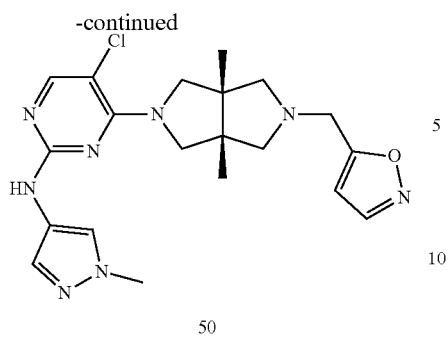

50

Step 1. Isoxazole-5-yl-methylmethanesulfonate (50b)

To a solution of isoxazole-5-ylmethanol 50a (76 mg, 0.77 mmol) in $CH_2Cl_2$ (10 mL) at 0° C. were added TEA (390 mg, 3.85 mmol) and methyl sulfonyl chloride (93 mg, 0.81 mmol). After stirring at room temperature for 1 h, the resulting solution was used directly in the next step.

MS m/z (ESI): 178 [M+1]

Step 2. 5-Chloro-4-((3aR,6aS)-5-(isoxazol-5-ylmethyl)-3a,6a-dimethylhexahydropyrrolo[3,4-c]pyrrol-2(1H)-yl)-N-(1-methyl-1H-pyrazol-4-yl)pyrimidin-2-amine (50)

To a mixture of 12c (70 mg, 0.2 mmol) in $CH_2Cl_2$ (10 mL) was added the solution obtained from Step 1 dropwise. The mixture was stirred for 2 h and concentrated to dryness under vacuum. The residue was dissolved in DMSO (2 mL) and added with cesium carbonate (195 mg, 0.6 mmol). The mixture was heated to 50° C. and then cooled to room temperature immediately. The mixture was then filtered and the filtrate was purified by prep-HPLC to give the title compound 50 (7.7 mg, solid, 9%).

MS m/z (ESI): 429 [M+1]
$^1$H NMR (400 MHz, $CD_3OD$) δ 8.31 (d, J=1.4 Hz, 1H), 7.84 (s, 1H), 7.76 (s, 1H), 7.56 (s, 1H), 6.32 (d, J=1.1 Hz, 1H), 4.08 (d, J=11.5 Hz, 2H), 3.87 (s, 2H), 3.87 (s, 3H), 3.62 (d, J=11.4 Hz, 2H), 2.94 (d, J=9.4 Hz, 2H), 2.66 (d, J=9.4 Hz, 2H), 1.15 (s, 6H).

Example 51. 5-((5-Chloro-4-((3aR,6aS)-5-(cyclopropanecarbonyl)-3a,6a-dimethylhexahydropyrrolo[3,4-c]pyrrol-2(1H)-yl)pyrimidin-2-yl)amino)-N-methylpicolinamide

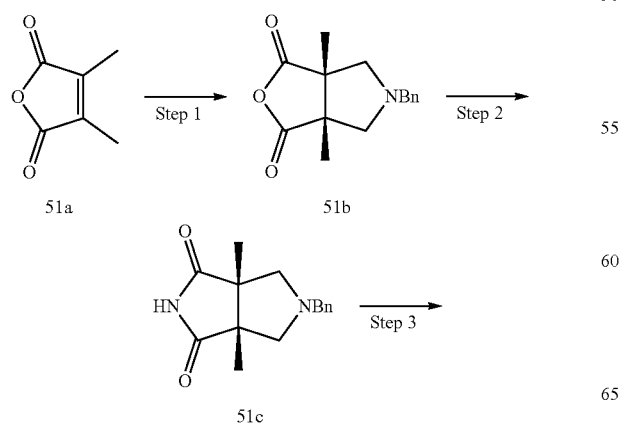

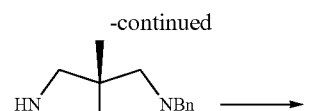

51d

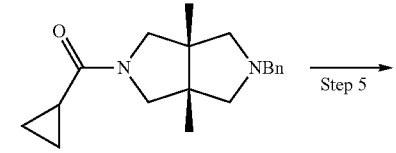

51e

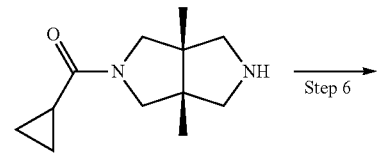

51f

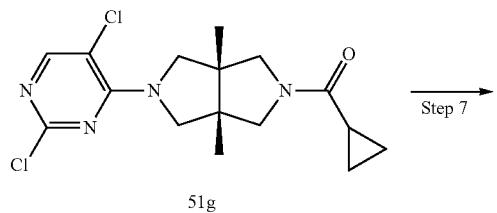

51g

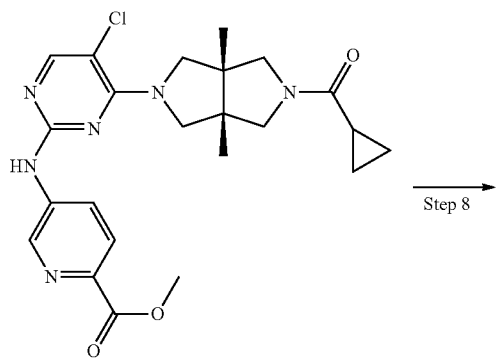

51h

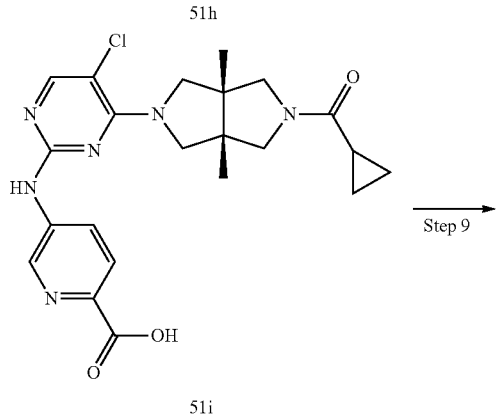

51i

-continued

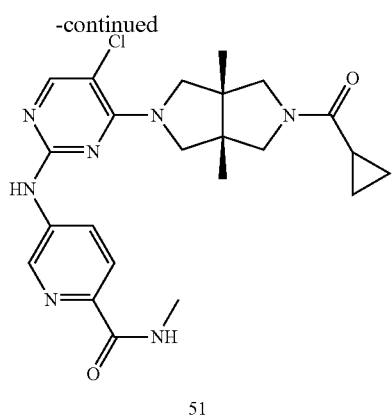

51

Step 1. (3aR,6aS)-5-Benzyl-3a,6a-dimethyltetra-hydro-1H-furo[3,4-c]pyrrole-1,3(3aH)-dione (51b)

To a solution of 3,4-dimethylfuran-2,5-dione 51a (6 g, 47.6 mmol) in CH$_2$Cl$_2$ (120 mL) was added N-benzyl-1-methoxy-N-((trimethylsilyl)methyl)methanamine (14.8 g, 61.9 mmol). After cooling to 0° C., the mixture was added with a solution of TFA (543 mg, 4.76 mmol) in CH$_2$Cl$_2$ (30 mL) dropwise under nitrogen. The resulting mixture was stirred for 3 h and then concentrated to dryness under vacuum to give the title compound 51b (17 g). The crude product was used directly in the next step without further purification.

MS m/z (ESI): 260 [M+1]

$^1$H NMR (400 MHz, CDCl$_3$) δ 7.45-7.18 (m, 5H), 3.53 (s, 2H), 3.46 (d, J=10.2 Hz, 2H), 2.18 (d, J=10.1 Hz, 2H), 1.28 (s, 6H).

Step 2. (3aR,6aS)-5-Benzyl-3a,6a-dimethyltetrahy-dropyrrolo[3,4-c]pyrrole-1,3(2H,3aH)-dione (51c)

To a solution of 51b (17 g, crude product, 47.6 mmol) in THF (60 mL) was added ammonium hydroxide (60 mL). The mixture was heated in a sealed tube at 100° C. for 4 h. After cooling to room temperature, the mixture was concentrated to dryness under vacuum. The residue was diluted with water (150 mL) and extracted with CH$_2$Cl$_2$ (3×150 mL). The combined organic phase was dried over anhydrous sodium sulfate, filtered and concentrated to dryness under vacuum. The residue was purified by silica gel column chromatography (petroleum ether/ethyl acetate=100/0 to 1/4) to give the title compound 51c (7 g, 57% over two steps).

MS m/z (ESI): 259 [M+1]

$^1$H NMR (400 MHz, DMSO-d$_6$) δ 11.24 (s, 1H), 7.35-7.12 (m, 5H), 3.48 (s, 2H), 3.12 (d, J=9.7 Hz, 2H), 2.03 (d, J=9.6 Hz, 2H), 1.09 (s, 6H).

Step 3. (3aR,6aS)-2-Benzyl-3a,6a-dimethyloctahy-dropyrrolo[3,4-c]pyrrole (51d)

To a solution of 51c (2.67 g, 10.34 mmol) in THF (30 mL) was added LAH (1.18 g, 31 mmol) in batches. The mixture was heated to reflux for 2 h while stirring. After cooling to 0° C., the mixture was added with water (8 ml), 20% sodium hydroxide aqueous solution (16 mL) and water (8 mL). The mixture was stirred for 10 min and filtered. The filtrate was concentrated to dryness under vacuum to give the title compound 51d (2.44 g, 100%).

MS m/z (ESI): 231 [M+1]

$^1$H NMR (400 MHz, DMSO-d$_6$) δ 7.34-7.17 (m, 5H), 3.45 (s, 2H), 2.61 (d, J=8.8 Hz, 2H), 2.46 (d, J=8.7 Hz, 2H), 2.24 (dd, J=10.6, 8.9 Hz, 4H), 0.97 (s, 6H)

Step 4. ((3aR,6aS)-5-Benzyl-3a,6a-dimethylhexahy-dropyrrolo[3,4-c]pyrrol-2(1H)-yl)(cyclopropyl)methanone (51e)

To a solution of 51d (2.44 g, 10.34 mmol) in CH$_2$Cl$_2$ (40 mL) were added TEA (3.14 g, 31 mmol) and cyclopropan-ecarbonyl chloride (1.08 g, 10.34 mmol). The mixture was stirred for 1 h and then concentrated to dryness under vacuum. The residue was purified by silica gel column chromatography (petroleum ether/ethyl acetate=100/0 to 1/4) to give the title compound 51e (1.59 g, 52%).

MS m/z (ESI): 299 [M+1]

$^1$H NMR (400 MHz, CDCl$_3$) δ 7.31-7.27 (m, 4H), 7.25-7.20 (m, 1H), 3.81 (d, J=10.4 Hz, 1H), 3.75 (d, J=12.1 Hz, 1H), 3.59 (q, J=13.3 Hz, 2H), 3.46 (d, J=10.4 Hz, 1H), 3.34 (d, J=12.1 Hz, 1H), 2.81 (d, J=9.3 Hz, 1H), 2.77 (d, J=9.2 Hz, 1H), 2.37 (d, J=9.1 Hz, 2H), 1.59 (tt, J=8.0, 4.7 Hz, 1H), 1.09 (s, 3H), 1.05 (s, 3H), 1.03-0.95 (m, 2H), 0.79-0.68 (m, 2H).

Step 5. Cyclopropyl((3aR,6aS)-3a,6a-dimethylhexa-hydropyrrolo[3,4-c]pyrrol-2(1H)-yl)methanone (51f)

To a solution of 51e (1.59 g, 5.38 mmol) in ethanol (30 mL) was added 10% Pd/C (320 mg). The mixture was stirred under hydrogen for 18 h and then filtered. The filtrate was concentrated to dryness under vacuum to give the title compound 51f (1.11 g, 100%).

MS m/z (ESI): 209 [M+1]

Step 6. Cyclopropyl((3aR,6aS)-5-(2,5-dichloropy-rimidin-4-yl)-3a,6a-dimethylhexahydropyrrolo[3,4-c]pyrrol-2(1H)-yl)methanone (51g)

To a solution of 51f (1.11 g, 5.33 mmol) in MeCN (20 mL) were added DIEA (2.07 g, 16 mmol) and 2,4,5-trichloropyrimidine (977 mg, 5.33 mmol). The mixture was stirred for 1 h and then concentrated to dryness under vacuum. The residue was purified by silica gel column chromatography (petroleum ether/ethyl acetate=100/0 to 3/7) to give the title compound 51g (1.59 g, 86%).

MS m/z (ESI): 355 [M+1]

$^1$H NMR (400 MHz, CDCl$_3$) δ 8.02 (s, 1H), 3.96 (s, 2H), 3.87-3.72 (m, 3H), 3.62 (d, J=7.0 Hz, 2H), 3.48 (d, J=12.3 Hz, 1H), 1.60-1.51 (m, 1H), 1.19 (s, 3H), 1.16 (s, 3H), 1.03-1.00 (m, 2H), 0.82-0.75 (m, 2H).

Step 7. Methyl 5-((5-chloro-4-((3aR,6aS)-5-(cyclo-propanecarbonyl)-3a,6a-dimethylhexahydropyrrolo[3,4-c]pyrrol-2(1H)-yl)pyrimidin-2-yl)amino)picoli-nate (51h)

A mixture of 51g (355 mg, 4.74 mmol), methyl 5-ami-nopicolinate (167 mg, 1.1 mmol), cesium carbonate (975 mg, 3 mmol), tris(dibenzylideneacetone)dipalladium (92 mg, 0.1 mmol) and 9,9-dimethyl-4,5-bis(diphenylphos-phino)xanthene (116 mg, 0.2 mmol) in 1,4-dioxane (15 mL) was heated in a microwave reactor to 100° C. for 1 h under nitrogen. After cooling to room temperature, the mixture was filtered, and the filtrate was concentrated to dryness under vacuum. The residue was purified by silica gel column chromatography (dichloromethane/methanol=100/0 to 9/1) to give the title compound 51h (88 mg, 19%).

MS m/z (ESI): 471 [M+1]

Step 8. 5-((5-Chloro-4-((3aR,6aS)-5-(cyclopropanecarbonyl)-3a,6a-dimethylhexahydropyrrolo[3,4-c]pyrrol-2(1H)-yl)pyrimidin-2-yl)amino)picolinic acid (51i)

To a mixture of 51h (88 mg, 0.19 mmol) in THF (2 mL) and MeOH (2 mL) was added 1 N NaOH (4 mL). The mixture was stirred for 2 h and then concentrated to dryness under vacuum. The reside was added with water (10 mL) and washed with ethyl acetate (20 mL). The aqueous layer was adjusted to pH=3 by addition of 1 N HCl and extracted with ethyl acetate (3×20 mL). The combined organic phase was dried over anhydrous sodium sulfate, filtered and concentrated to dryness under vacuum to give the title compound 51i (30 mg, 35%).
MS m/z (ESI): 457 [M+1]

Step 9. 5-((5-Chloro-4-((3aR,6aS)-5-(cyclopropanecarbonyl)-3a,6a-dimethylhexahydropyrrolo[3,4-c]pyrrol-2(1H)-yl)pyrimidin-2-yl)amino)-N-methylpicolinamide (51)

To a solution of 51i (30 mg, 0.066 mmol) in CH$_2$Cl$_2$ (10 mL) were added DIEA (74 mg, 0.57 mmol), HAITI (72 mg, 0.19 mmol) and a methyl amine solution (2 M in THF, 0.05 mL, 1 mmol) sequentially. The resulting mixture was stirred for 1 h and then concentrated to dryness under vacuum. The residue was purified by prep-HPLC to give the title compound 51 (8.2 mg, solid, 27%).
MS m/z (ESI): 470 [M+1]
$^1$H NMR (400 MHz, CD$_3$OD) δ 8.77 (d, J=2.3 Hz, 1H), 8.17 (dd, J=8.6, 2.6 Hz, 1H), 7.88 (d, J=10.1 Hz, 2H), 3.91 (t, J=12.2 Hz, 2H), 3.82-3.73 (m, 3H), 3.62 (d, J=10.8 Hz, 1H), 3.50 (d, J=12.5 Hz, 1H), 3.34 (d, J=12.4 Hz, 1H), 2.85 (s, 3H), 1.72-1.66 (m, 1H), 1.13 (s, 3H), 1.09 (s, 3H), 0.82-0.77 (m, 2H), 0.77-0.71 (m, 2H).

Example 53. ((3aR,6aS)-5-(5-Chloro-2-((6-(morpholine-4-carbonyl)pyridin-3-yl)amino)pyrimidin-4-yl)-3a,6a-dimethylhexahydropyrrolo[3,4-c]pyrrol-2(1H)-yl)(cyclopropyl)methanone

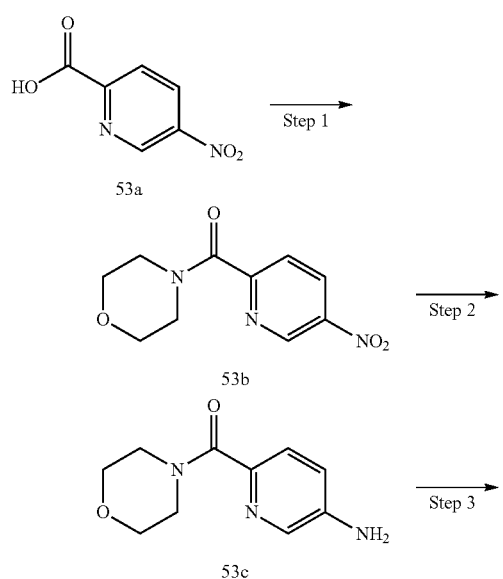

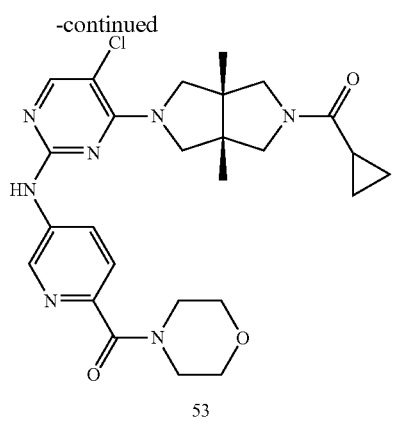

Step 1. Morpholino(5-nitropyridin-2-yl)methanone (53b)

To a solution of 5-nitropicolinic acid 53a (505 mg, 3 mmol) in CH$_2$Cl$_2$ (30 mL) were added morpholine (262 mg, 3 mmol), DIEA (1.16 g, 9 mmol) and HAITI (1.14 g, 3 mmol). The mixture was stirred for 1 h and then concentrated to dryness under vacuum. The residue was purified by silica gel column chromatography (dichloromethane/ethyl acetate=100/0 to 1/4) to give the title compound 53b (880 mg, contaminated with DIEA and tetramethylurea). MS m/z (ESI): 238 [M+1]

Step 2. (5-Aminopyridin-2-yl)(morpholino)methanone (53c)

To a solution of 53b (880 mg, about 3 mmol) in MeOH (20 mL) was added 10% Pd/C (200 mg). The mixture was stirred under hydrogen for 2 h and then filtered. The filtrate was concentrated to dryness under vacuum to give the title compound 53c (740 mg, contaminated with DIEA and tetramethylurea).
MS m/z (ESI): 208 [M+1]

Step 3, ((3aR,6aS)-5-(5-Chloro-2-((6-(morpholine-4-carbonyl)pyridin-3-yl)amino)pyrimidin-4-yl)-3a,6a-dimethylhexahydropyrrolo[3,4-c]pyrrol-2(1H)-yl)(cyclopropyl)methanone (53)

To a mixture of 51g (71 mg, 0.2 mmol) and 53c (42 mg, 0.2 mmol) in 1,4-dioxane (2 mL) were added NaOEt (30 mg, 0.44 mmol) and RuPhos-Pd-G2 (8 mg, 0.01 mmol). The mixture was heated to 100° C. in a microwave reactor under nitrogen for 1 h. After cooling to room temperature, the mixture was filtered, and the filtrate was concentrated to dryness under vacuum. The residue was purified by silica gel column chromatography (dichloromethane/methanol=100/0 to 9/1) and then prep-HPLC to give the title compound 53 (11.4 mg, solid, 11%).
MS m/z (ESI): 526 [M+1]
$^1$H NMR (400 MHz, CD$_3$OD) δ 8.92 (d, J=2.4 Hz, 1H), 8.29 (dd, J=8.6, 2.6 Hz, 1H), 7.99 (s, 1H), 7.62 (d, J=8.6 Hz, 1H), 4.02 (t, J=11.0 Hz, 2H), 3.95-3.58 (m, 13H), 3.46 (d, J=12.4 Hz, 1H), 1.81 (ddd, J=12.8, 7.9, 4.7 Hz, 1H), 1.24 (s, 3H), 1.21 (s, 3H), 0.92 (d, J=5.4, 3.8 Hz, 2H), 0.89-0.81 (m, 2H).

Example 59 was synthesized according to the procedure for Example 53 except that in step 1, 1-methylpiperazine was used instead of morpholine.

| Example | Compound replacing morpholine | ¹H NMR | MS m/z (ESI) |
|---|---|---|---|
| ((3aR,6aS)-5-(5-chloro-2-((6-(4-methylpiperazine-1-carbonyl)pyridin-3-yl)amino)pyrimidin-4-yl)-3a,6a-dimethylhexahydropyrrolo[3,4-c]pyrrol-2(1H)-yl)(cyclopropyl)methanone (59) | 1-methyl piperazine | ¹H NMR (400 MHz, CD$_3$OD) δ 8.91 (d, J = 2.4 Hz, 1H), 8.28 (dd, J = 8.6, 2.5 Hz, 1H), 7.98 (s, 1H), 7.59 (d, J = 8.6 Hz, 1H), 4.02 (t, J = 10.8 Hz, 2H), 3.89 (dd, J = 19.1, 11.1 Hz, 3H), 3.82 (s, 2H), 3.73 (d, J = 10.8 Hz, 1H), 3.64 (s, 2H), 3.61 (d, J = 12.5 Hz, 1H), 3.46 (d, J = 12.4 Hz, 1H), 2.53 (d, J = 35.9 Hz, 4H), 2.35 (s, 3H), 1.84-1.78 (m, 1H), 1.24 (s, 3H), 1.21 (s, 3H), 0.94-0.89 (m, 2H), 0.89-0.82 (m, 2H). | 539 [M + 1] |

Example 54. 5-Chloro-4-((3aR,6aS)-3a,6a-dimethyl-5-(pyridin-2-yl)hexahydropyrrolo[3,4-c]pyrrol-2(1H)-yl)-N-(1-methyl-1H-pyrazol-4-yl)pyrimidin-2-amine Example 55. 4-((3aR,6aS)-3a,6a-Dimethyl-5-(methylsulfonyl)hexahydropyrrolo[3,4-c]pyrrol-2(1H)-yl)-5-methyl-N-(1-methyl-1H-pyrazol-4-yl)pyrimidin-2-amine

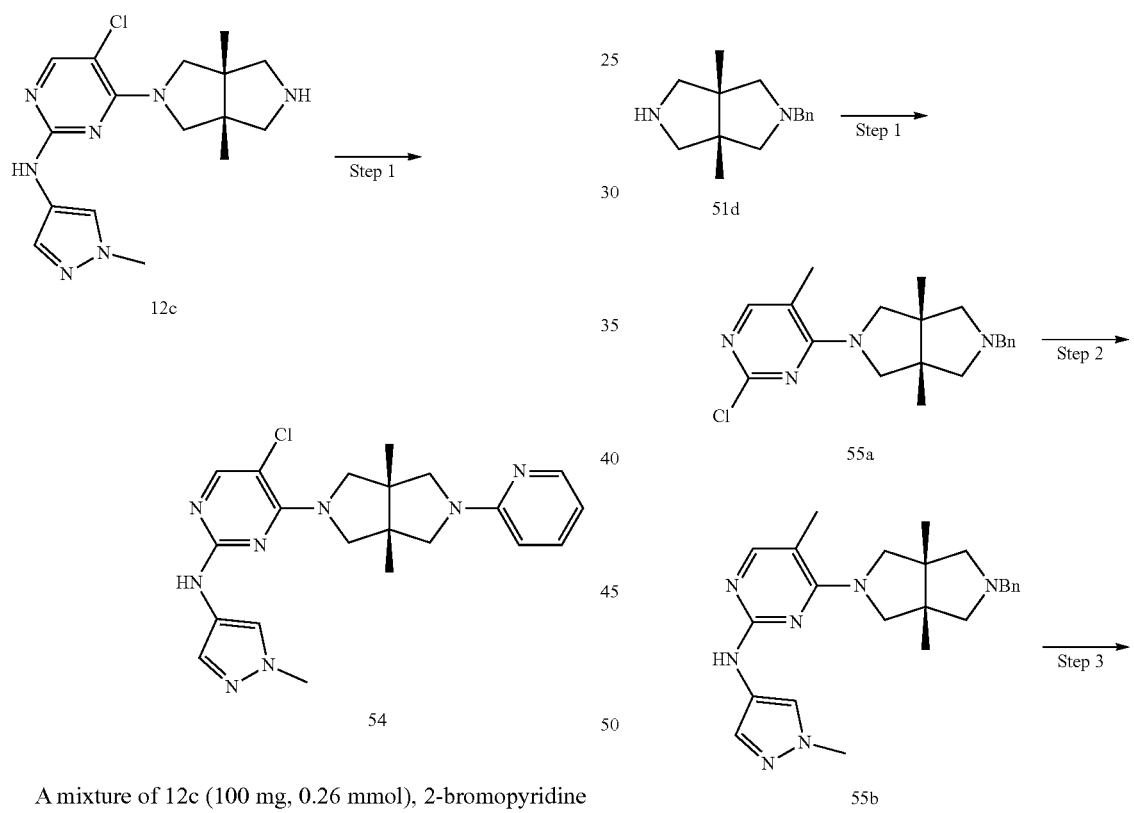

A mixture of 12c (100 mg, 0.26 mmol), 2-bromopyridine (62 mg, 0.39 mmol), DBU (4 mL) was heated to 140° C. and stirred for 16 h. After cooling to room temperature, the mixture was added with water (4 mL) and extracted with ethyl acetate (3×5 mL). The combined organic phase was washed with water (10 mL) and concentrated to dryness under vacuum. The residue was purified by prep-HPLC to give the title compound 54 (36.4 mg, solid, 33%).

MS m/z (ESI): 425 [M+1]

¹H NMR (400 MHz, DMSO-d$_6$) δ 9.05 (s, 1H), 8.04 (d, J=3.7 Hz, 1H), 7.89 (s, 1H), 7.69 (s, 1H), 7.47 (s, 1H), 7.43 (s, 1H), 6.54 (d, J=1.6 Hz, 1H), 6.40 (d, J=8.4 Hz, 1H), 3.89 (d, J=11.4 Hz, 2H), 3.75 (s, 3H), 3.75-3.71 (m, 2H), 3.56 (d, J=10.9 Hz, 2H), 3.38 (d, J=10.8 Hz, 2H), 1.15 (s, 6H).

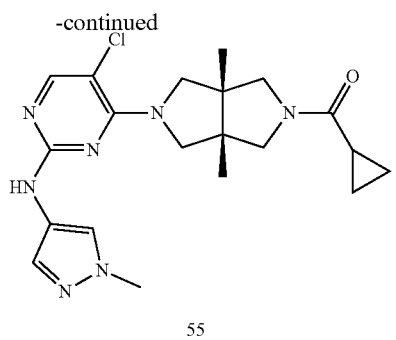

55

Step 1. (3aR,6aS)-2-Benzyl-5-(2-chloro-5-methylpyrimidin-4-yl)-3a,6a-dimethyloctahydropyrrolo[3,4-c]pyrrole (55a)

To a solution of 51d (2.02 g, 8.8 mmol) in MeCN (20 mL) were added 2,4-dichloro-5-methylpyrimidine (1.63 g, 10 mmol) and DIEA (3.88 g, 30 mmol). The mixture was stirred for 2 h and then concentrated to dryness under vacuum. The residue was purified by silica gel column chromatography (petroleum ether/ethyl acetate=100/0 to 45/55) to give the title compound 55a (1.45 g, 46%).

MS m/z (ESI): 357 [M+1]

Step 2. 4-((3aR,6aS)-5-Benzyl-3a,6a-dimethylhexahydropyrrolo[3,4-c]pyrrol-2(1H)-yl)-5-methyl-N-(1-methyl-1H-pyrazol-4-yl)pyrimidin-2-amine (55b)

To a mixture of 55a (1.45 g, 4.1 mmol) and 1-methyl-1H-pyrazol-4-amine hydrochloride (4.1 g, 1 mmol) in isopropanol (40 mL) was added pTsOH (78 mg, 0.41 mmol). The mixture was stirred at 100° C. for 18 h. After cooling to room temperature, the mixture was added with MeOH (20 mL), followed by TEA (0.5 mL). The mixture was stirred for another 5 min and concentrated to dryness under vacuum. The residue was purified by silica gel column chromatography (dichloromethane/methanol=19/1) to give the title compound 55b (540 mg, 32%).

MS m/z (ESI): 418 [M+1]

$^1$H NMR (400 MHz, CDCl$_3$) δ 7.68 (s, 2H), 7.51 (s, 1H), 7.30 (dd, J=6.6, 3.5 Hz, 4H), 7.25-7.20 (m, 1H), 6.86 (s, 1H), 3.85 (d, J=10.8 Hz, 2H), 3.85 (s, 3H), 3.60 (s, 2H), 3.48 (d, J=10.8 Hz, 2H), 2.80 (d, J=9.3 Hz, 2H), 2.41 (d, J=9.3 Hz, 2H), 2.20 (s, 3H), 1.10 (s, 6H).

Step 3. 4-((3aR,6aS)-3a,6a-Dimethylhexahydropyrrolo[3,4-c]pyrrol-2(1H)-yl)-5-methyl-N-(1-methyl-1H-pyrazol-4-yl)pyrimidin-2-amine (55c)

To a solution of 55b (540 mg, 1.29 mmol) in MeOH (30 mL) was added 10% Pd/C (300 mg). The mixture was stirred under hydrogen at 36° C. for 16 h and then filtered. The filtrate was concentrated to dryness under vacuum to give the title compound 55c (340 mg, 81%).

MS m/z (ESI): 328 [M+1]

Step 4. 4-((3aR,6aS)-3a,6a-Dimethyl-5-(methylsulfonyl)hexahydropyrrolo[3,4-c]pyrrol-2(1H)-yl)-5-methyl-N-(1-methyl-1H-pyrazol-4-yl)pyrimidin-2-amine (55)

To a solution of 55c (33 mg, 0.1 mmol) in CH$_2$Cl$_2$ (10 mL) was added TEA (30 mg, 0.3 mmol), followed by a solution of MsCl (12 mg, 0.1 mmol) in CH$_2$Cl$_2$ (1 mL). The mixture was stirred for 1 h and then concentrated to dryness under vacuum. The residue was purified by prep-HPLC to give the title compound 55 (18.7 mg, solid, 46%).

MS m/z (ESI): 406 [M+1]

$^1$H NMR (400 MHz, CD$_3$OD) δ 7.64 (s, 1H), 7.50 (s, 1H), 7.44 (s, 1H), 3.82 (d, J=11.2 Hz, 2H), 3.74 (s, 3H), 3.60 (d, J=11.2 Hz, 2H), 3.40 (d, J=10.1 Hz, 2H), 3.23 (d, J=10.1 Hz, 2H), 2.83 (s, 3H) 2.15 (s, 3H), 1.09 (s, 6H).

Example 56, ((S)-2,2-difluorocyclopropyl)((3aR,6aS)-3a,6a-dimethyl-5-(5-methyl-2-((1-methyl-1H-pyrazol-4-yl)amino)pyrimidin-4-yl)hexahydropyrrolo[3,4-c]pyrrol-2(1H)-yl)methanone

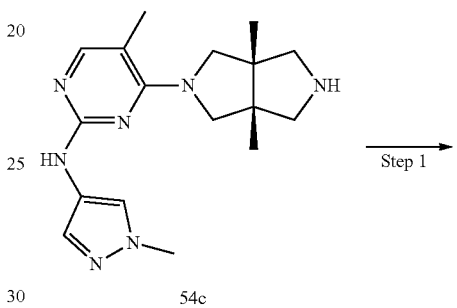

54c

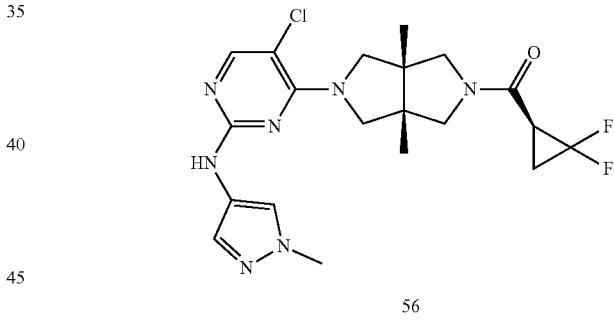

56

To a solution of 54c (33 mg, 0.1 mmol) in CH$_2$Cl$_2$ (10 mL) was added (S)-2,2-difluorocyclopropane-1-carboxylic acid (13 mg, 0.1 mmol) and DIEA (39 mg, 0.3 mmol), followed by HAITI (38 mg, 0.1 mmol). The mixture was stirred for 1 h and then concentrated to dryness under vacuum. The residue was purified by prep-HPLC to give the title compound 56 (21.3 mg, solid, 49%).

MS m/z (ESI): 432 [M+1]

$^1$H NMR (400 MHz, CD$_3$OD) δ 7.76 (d, J=3.1 Hz, 1H), 7.62 (s, 1H), 7.54 (d, J=11.0 Hz, 1H), 3.98-3.88 (m, 2H), 3.86 (d, J=2.7 Hz, 3H), 3.82-3.71 (m, 3H), 3.68-3.56 (m, 2H), 3.48 (dd, J=12.6, 2.7 Hz, 1H), 2.89-2.79 (m, 1H), 2.28 (d, J=5.7 Hz, 3H), 2.08-2.00 (m, 1H), 1.85-1.73 (m, 1H), 1.24 (d, J=3.4 Hz, 2H), 1.21 (d, J=3.9 Hz, 3H).

Example 57, 58 and 60 were synthesized according to the procedure for Example 56 except that in step 1, different compounds were used instead of (S)-2,2-difluorocyclopropane-1-carboxylic acid.

| Example | Compound replacing cyclo(S)-2,2-difluorocyclopropane-1-carboxylic acid | 1H NMR | MS m/z (ESI) |
|---|---|---|---|
| 3-((3aR,6aS)-3a,6a-dimethyl-5-(5-methyl-2-((1-methyl-1H-pyrazol-4-yl)amino)pyrimidin-4-yl)hexahydropyrrolo[3,4-c]pyrrol-2(1H)-yl)-3-oxopropanenitrile (57) | 2-cyanoacetic acid | 1H NMR (400 MHz, CD3OD) δ 7.75 (s, 1H), 7.62 (s, 1H), 7.55 (s, 1H), 3.92 (dd, J = 11.2, 2.9 Hz, 2H), 3.86 (s, 3H), 3.75 (d, J = 11.2 Hz, 2H), 3.68 (d, J = 10.7 Hz, 1H), 3.64 (d, J = 12.5 Hz, 1H), 3.52 (d, J = 10.7 Hz, 1H), 3.47 (d, J = 12.4 Hz, 1H), 2.28 (s, 3H), 1.21 (s, 3H), 1.20 (s, 3H). | 395 [M + 1] |
| ((3aR,6aS)-3a,6a-dimethyl-5-(5-methyl-2-((1-methyl-1H-pyrazol-4-yl)amino)pyrimidin-4-yl)hexahydropyrrolo[3,4-c]pyrrol-2(1H)-yl)(isoxazol-5-yl)methanone (58) | isoxazole-5-carboxylic acid | 1H NMR (400 MHz, CD3OD) δ 8.42 (d, J = 1.8 Hz, 1H), 7.63 (s, 1H), 7.50 (s, 1H), 7.43 (s, 1H), 6.88 (d, J = 1.8 Hz, 1H), 3.96 (d, J = 11.6 Hz, 1H), 3.87 (d, J = 11.3 Hz, 1H), 3.83 (d, J = 11.4 Hz, 1H), 3.79 (d, J = 11.6 Hz, 1H), 3.73 (s, 3H), 3.72-3.63 (m, 3H), 3.55 (d, J = 13.1 Hz, 1H), 2.16 (s, 3H), 1.14 (s, 3H), 1.12 (s, 3H). | 423 [M + 1] |
| 1-((3aR,6aS)-3a,6a-dimethyl-5-(5-methyl-2-((1-methyl-1H-pyrazol-4-yl)amino)pyrimidin-4-yl)hexahydropyrrolo[3,4-c]pyrrol-2(1H)-yl)-3,3,3-trifluoropropan-1-one hydrochloride (60) | 3,3,3-trifluoropropionic acid | 1H NMR (400 MHz, CD3OD) δ 7.83 (s, 1H), 7.62 (s, 1H), 7.47 (s, 1H), 4.28-4.16 (m, 1H), 4.13-4.02 (m, 1H), 3.99-3.85 (m, 1H), 3.93 (s, 3H), 3.84-3.56 (m, 4H), 3.53-3.39 (m, 3H), 2.38 (s, 3H), 1.23 (s, 3H), 1.22 (s, 3H). | 428 [M + 1] |

Example 61. Cis-5-chloro-N-(1-methyl-1H-pyrazol-4-yl)-4-(3a-methyl-5-(methylsulfonyl)hexahydropyrrolo[3,4-c]pyrrol-2(1H)-yl)pyrimidin-2-amine

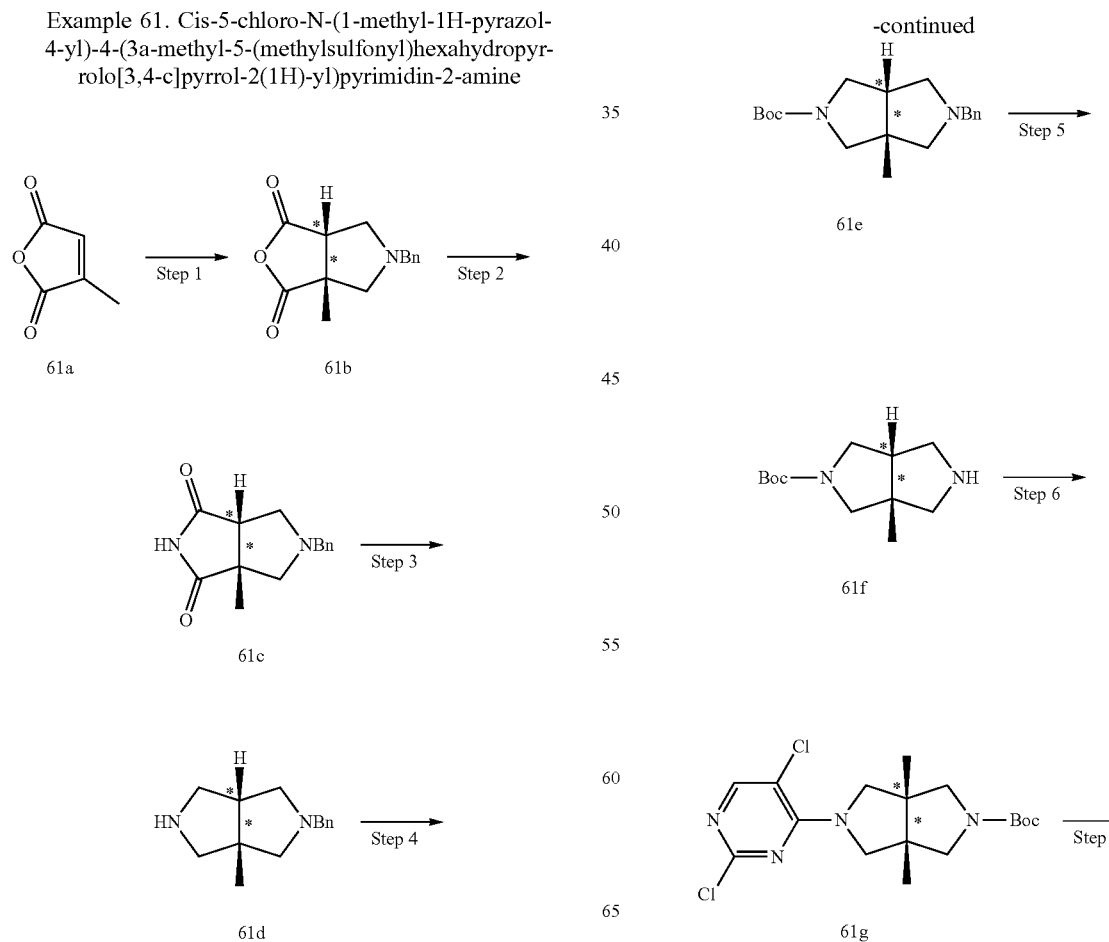

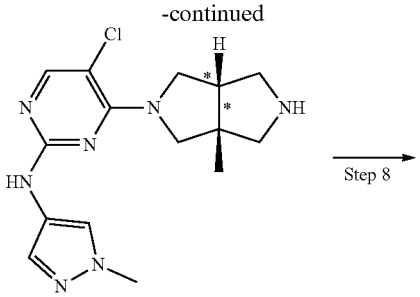

61h

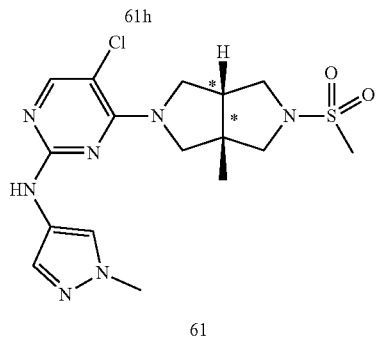

61

Step 1. Cis-5-benzyl-3a-methyltetrahydro-1H-furo[3,4-c]pyrrole-1,3(3aH)-dione (61b)

To a solution of 3-methylfuran-2,5-dione (5.33 g, 47.6 mmol) and N-benzyl-1-methoxy-N-((trimethylsilyl)methyl)methanamine (14.8 g, 61.9 mmol) in $CH_2Cl_2$ (170 mL) was added trifluoroacetic acid (543 mg, 4.76 mmol). The mixture was stirred for 3 h and then concentrated to dryness under vacuum to give the title compound 61b (11.62 g). The crude product was used directly in the next, step without further purification MS m/z (ESI): 246 [M+1]

Step 2. Cis-5-benzyl-3a-methyltetrahydropyrrolo[3,4-c]pyrrole-1,3(2H,3aH)-dione (61c)

To a solution of 61b (11.66 g, about 47.6 mmol) in THF (60 mL) was added ammonium hydroxide (60 mL). The mixture was heated in a sealed tube at 100° C. for 5 h. After cooling to room temperature, the mixture was concentrated to dryness under vacuum and the residue was dissolved in $CH_2Cl_2$ (200 mL). The resulting mixture was washed with water (20 mL) and concentrated to dryness under vacuum. The residue was purified by silica gel column chromatography (petroleum ether/ethyl acetate=100/1 to 1/1) to give the title compound 61c (8 g, 68%).

MS m/z (ESI): 245 [M+1]

Step 3. Cis-2-benzyl-3a-methyloctahydropyrrolo[3,4-c]pyrrole (61 d)

To a solution of 61c (8 g, 32. 8 mmol) in THF (100 mL) was added LAH (3.73 g, 98.36 mmol). The mixture was heated to 70° C. and stirred for 3 h. After cooling to 0° C., the mixture was added with water (10 mL), a 20% NaOH solution (20 mL) and water (10 mL) sequentially. The mixture was stirred for 10 min and then filtered. The filtrate was concentrated to dryness under vacuum to give the title compound (8 g). The crude product was used directly in the next step without further purification.

MS m/z (ESI): 217 [M+1]

Step 4. Tert-butyl cis-5-benzyl-3a-methylhexahydropyrrolo[3,4-c]pyrrole-2(1H)-carboxylate (61e)

To a solution of 61d (8 g, crude) and TEA (7.48 g, 74.07 mmol) in $CH_2Cl_2$ (100 mL) was added di-tert-butyl dicarbonate (8.07 g, 37.03 mmol). The mixture was stirred for 3 h and concentrated to dryness under vacuum. The residue was purified by silica gel column chromatography (petroleum ether/ethyl acetate=100/1 to 7/3) to give the title compound 61e (10 g, 96% over two steps).

MS m/z (ESI): 317 [M+1]

Step 5. Tert-butyl cis-3a-methylhexahydropyrrolo[3,4-c]pyrrole-2(1H)-carboxylate (61f)

To a solution of 61e (TO g, 31.64 mmol) in MeOH (100 mL) was added 10% Pd/C (1 g). The mixture was stirred under hydrogen for 18 h and then filtered. The filtrated was concentrated to dryness under vacuum to give the title compound 61f (7 g, 97%).

MS m/z (ESI): 227 [M+1]

Step 6. Tert-butyl cis-5-(2,5-dichloropyrimidin-4-yl)-3a-methylhexahydropyrrolo[3,4-c]pyrrole-2(1H)-carboxylate (61g)

To a solution of 2,4,5-trichloropyrimidine (546 mg, 3 mmol) in MeCN (10 mL) were added 61f (678 mg, 3 mmol) and potassium carbonate (828 mg, 6 mmol). The mixture was heated to 80° C. and stirred for 3 h. After cooling to room temperature, the mixture was concentrated to dryness under vacuum and the residue was purified by silica gel column chromatography (petroleum ether/ethyl acetate=100/0 to 9/1) to give the title compound 61g (850 mg, 76%).

MS m/z (ESI): 373 [M+1]

Step 7. Cis-5-chloro-N-(1-methyl-1H-pyrazol-4-yl)-4-(3a-methylhexahydropyrrolo[3,4-c]pyrrol-2(1H)-yl)pyrimidin-2-amine hydrochloride (61h)

To a mixture of 61g (850 mg, 2.28 mmol) and 1-methyl-1H-pyrazol-4-amine hydrochloride (221 mg, 2.28 mmol) in isopropanol (10 mL) was added pTsOH (868 mg, 4.57 mmol). The mixture was heated in a microwave reactor at 100° C. for 2 h. After cooling to room temperature, the precipitate was collected by filtration to give the title compound 61 h (200 mg, 75%) as an HCl salt.

MS m/z (ESI): 334 [M+1]

Step 8. Cis-5-chloro-N-(1-methyl-1H-pyrazol-4-yl)-4-(3a-methyl-5-(methylsulfonyl)hexahydropyrrolo[3,4-c]pyrrol-2(1H)-yl)pyrimidin-2-amine (61)

To a mixture of 61h (33.3 mg, 0.1 mmol) and TEA (20.2 mg, 0.2 mmol) in $CH_2Cl_2$ (5 mL) was added MsCl (11.4 mg, 0.1 mmol). The mixture was stirred for 1 h and concentrated to dryness under vacuum. The residue was purified by prep-HPLC to give the title compound 61 (15.4 mg, solid, 37%).

MS m/z (ESI): 412 [M+1]

$^1$H NMR (400 MHz, $CD_3OD$) δ 7.74 (s, 1H), 7.66 (s, 1H), 7.43 (s, 1H), 4.06-4.01 (m, 1H), 3.88 (d, J=11.5 Hz, 1H), 3.76-3.64 (m, 6H), 3.61-3.56 (m, 1H), 3.35 (d, J=9.9 Hz, 2H), 2.83 (s, 3H), 2.56-2.51 (m, 1H), 1.22 (s, 3H).

Example 62 was synthesized according to the procedure for Example 61 except that in step 8, cyclopropanecarbonyl chloride was used instead of MsCl.

| Example | Compound replacing methanesulfonyl chloride | ¹H NMR | MS m/z (ESI) |
|---|---|---|---|
| cis-(5-(5-chloro-2-((1-methyl-1H-pyrazol-4-yl)amino)pyrimidin-4-yl)-3a-methylhexahydropyrrolo[3,4-c]pyrrol-2(1H)-yl)(cyclopropyl)methanone (62) | cyclopropanecarbonyl chloride | ¹H NMR (400 MHz, CD₃OD) δ 7.73 (s, 1H), 7.66 (s, 1H), 7.43 (s, 1H), 4.11-3.92 (m, 2H), 3.88-3.80 (m, 1H), 3.76-3.66 (m, 6H), 3.61-3.55 (m, 1H), 3.35-3.29 (m, 1H), 2.61-2.48 (m, 1H), 1.73-1.66(m, 1H), 1.21 (d, J = 11.8 Hz, 3H), 0.82-0.71 (m, 4H). | 402 [M + 1] |

Example 63. Cis-3-(5-(5-chloro-2-((1-methyl-1H-pyrazol-4-yl)amino)pyrimidin-4-yl)-3a-methylhexahydropyrrolo[3,4-c]pyrrol-2(1H)-yl)-3-oxopropanenitrile

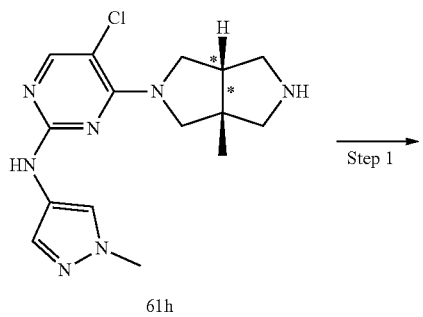

61h

Step 1

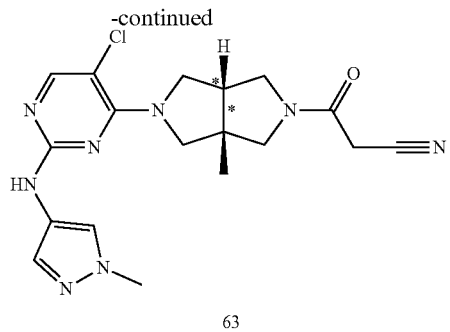

63

To a solution of 61h (66.6 mg, 0.2 mmol), HATU (152 mg, 0.4 mmol) and TEA (40.4 mg, 0.4 mmol) in CH₂Cl₂ (5 mL) was added 2-cyanoacetic acid (17 mg, 0.2 mmol). The mixture was stirred for 2 h and then concentrated to dryness under vacuum. The residue was purified by prep-HPLC to give the title compound 63 (12.4 mg, solid, 16%).

MS m/z (ESI): 401 [M+1]

¹H NMR (400 MHz, CD₃OD) δ 7.85 (s, 1H), 7.78 (s, 1H), 7.54 (s, 1H), 4.20-4.15 (m, 1H), 4.00-3.92 (m, 1H), 3.88-3.79 (m, 6H), 3.66-3.61 (m, 1H), 3.52-3.45 (m, 2H), 2.71-2.62 (m, 1H), 1.32 (d, J=4.0 Hz, 3H).

Example 64, 65 and 68 were synthesized according to the procedure for Example 63 except that in step 1, different compounds were used instead of 2-cyanoacetic acid.

| Example | Compound replacing 2-cyanoacetic acid | ¹H NMR | MS m/z (ESI) |
|---|---|---|---|
| cis-(5-(5-chloro-2-((1-methyl-1H-pyrazol-4-yl)amino)pyrimidin-4-yl)-3a-methylhexahydropyrrolo[3,4-c]pyrrol-2(1H)-yl)(isoxazol-5-yl)methanone (64) | isoxazole-5-carboxlic acid | ¹H NMR (400 MHz, CD₃OD) δ 8.54 (d, J = 1.7 Hz, 1H), 7.85 (s, 1H), 7.78 (s, 1H), 7.54 (s, 1H), 7.00 (t, J = 1.6 Hz, 1H), 4.31-4.14 (m, 2H), 4.06-3.97 (m, 2H), 3.94-3.79 (m, 6H), 3.68-3.62 (m, 1H), 2.78-2.68 (m, 1H), 1.36 (d, J = 7.9 Hz, 3H). | 429 [M + 1] |
| cis-(5-(5-chloro-2-((1-methyl-1H-pyrazol-4-yl)amino)pvrimidin-4-yl)-3a-methylhexahydropyrrolo[3,4-c]pyrrol-2(1H)-yl)((S)-2,2-difluorocyclopropyl)methanone (65) | (S)-2,2-difluorocyclopropane-1-carboxylic acid | ¹H NMR (400 MHz, CD₃OD) δ 7.86 (s, 1H), 7.78 (s, 1H), 7.54 (d, J = 7.5 Hz, 1H), 4.23-4.14 (m, 1H), 4.11-4.00 (m, 1H), 3.99-3.91 (m, 1H), 3.90-3.78 (m, 5H), 3.76-3.67 (m, 1H), 3.64-3.55 (m, 1H), 3.52-3.44 (m, 1H), 2.89-2.81 (m, 1H), 2.75-2.64 (m, 1H), 2.08-2.00 (m, 1H), 1.83-1.74 (m, 1H), 1.34 (dd, J = 9.0, 4.6 Hz, 3H). | 438 [M + 1] |
| cis-1-(5-(5-chloro-2-((1-methyl-1H-pyrazol-4-yl)amino)pyrimidin-4-yl)-3a-methylhexahydropyrrolo | 3,3,3-trifluoropropionic acid | ¹H NMR (400 MHz, CD₃OD) δ 7.99-7.79 (m, 2H), 7.63 (s, 1H), 4.68-4.46 (m, 1H) 4.35-4.13 (m, 2H), 4.00-3.70 (m, 5H), 3.67-3.38 (m, 5H), 2.80-2.65(m, | 444 [M + 1] |

| Example | Compound replacing 2-cyanoacetic acid | ¹H NMR | MS m/z (ESI) |
|---|---|---|---|
| [3,4-c]pyrrol-2(1H)-yl)-3,3,3-trifluoropropan-1-one (68) | | 1H), 1.34 (d, J = 3.9 Hz, 3H). | |

Example 66. 5-Chloro-4-((3aR,6aS)-5-(isoxazoyl-5-yl)-3a,6a-dimethylhexahydropyrrolo[3,4-c]pyrrol-2(1H)-yl)-N-(1-methyl-1H-pyrazol-4-yl)pyrimidin-2-amine

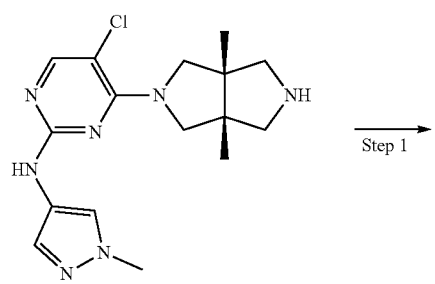

12c

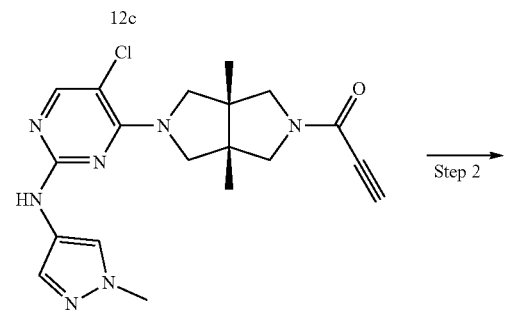

66a

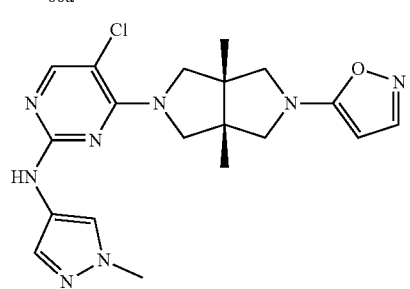

66

Step 1. 01-((3aR,6aS)-5-(5-Chloro-2-((1-methyl-1H-pyrazol-4-yl)amino)pyrimidin-4-yl)-3a,6a-dimethylhexahydropyrrolo[3,4-c]pyrrol-2(1H)-yl)prop-2-yn-1-one (66a)

To a mixture of 12c (139 mg, 0.4 mmol) in CH$_2$Cl$_2$ (20 mL) were added propiolic acid (28 mg, 0.4 mmol), DIEA (155 mg, 1.2 mmol) and HATU (152 mg, 0.4 mmol). The mixture was stirred for 1 h and then concentrated to dryness under vacuum. The residue was purified by silica gel column chromatography (dichloromethane/methanol=100/0 to 19/1) to give the title compound 66a (90 mg, 56%).

MS m/z (ESI): 400 [M+1]

Step 2. 5-Chloro-4-((3aR,6aS)-5-(isoxazol-5-yl)-3a,6a-dimethylhexahydropyrrolo[3,4-c]pyrrol-2(1H)-yl)-N-(1-methyl-1H-pyrazol-4-yl)pyrimidin-2-amine (66)

To a solution of 66a (90 mg, 0.225 mmol) in THF (2 mL) were added water (2 mL), ammonium chloride (60 mg, 1.125 mmol) and sodium azide (73 mg, 1.125 mmol). The mixture was stirred for 18 h, and then heated to 70° C. and stirred for another 2 h. After cooling to room temperature, the mixture was diluted with water (20 mL) and extracted with ethyl acetate (2×20 mL). The combined organic phase was dried over anhydrous sodium sulfate, filtered and concentrated to dryness under vacuum. The residue was purified by prep-HPLC to give the title compound 66 (12.1 mg, solid, 13%).

MS m/z (ESI): 415 [M+1]

¹H NMR (400 MHz, CD$_3$OD) δ 8.06 (d, J=2.1 Hz, 1H), 7.85 (s, 1H), 7.76 (s, 1H), 7.54 (s, 1H), 5.00 (d, J=2.1 Hz, 1H), 4.01 (d, J=11.6 Hz, 2H), 3.86 (d, J=11.5 Hz, 2H), 3.85 (s, 3H), 3.62 (d, J=10.3 Hz, 2H), 3.47 (d, J=10.3 Hz, 2H), 1.24 (s, 6H).

Example 69. Cis-4-(5-(isoxazol-5-ylmethyl)-3a-methylhexahydropyrrolo[3,4-c]pyrrol-2(1H)-yl)-N-(1-methyl-1H-pyrazol-4-yl)pyrimidin-2-amine

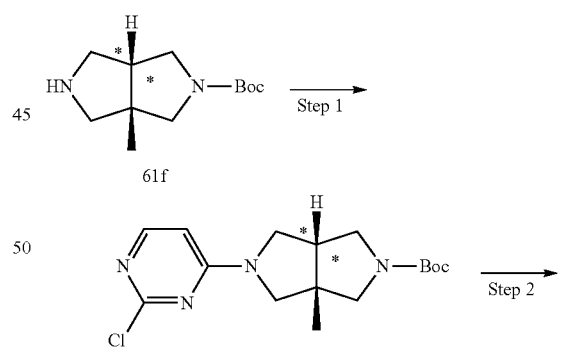

61f

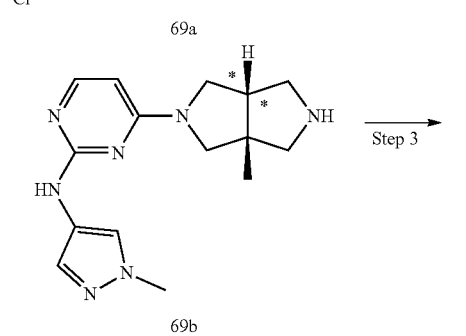

69a

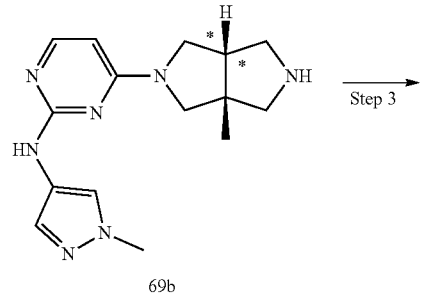

69b

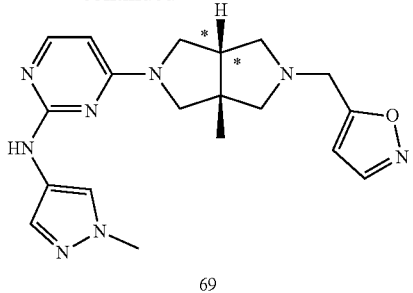

69

Step 1. Tert-butyl cis-5-(2-chloropyrimidin-4-yl)-3a-methylhexahydropyrrolo[3,4-c]pyrrole-2(1H)-carboxylate (69a)

To a solution of 2,4-dichloropyrimidine (444 mg, 3 mmol) in MeCN (10 mL) were added 61f (678 mg, 3 mmol) and potassium carbonate (621 mg, 4.5 mmol). The mixture was stirred at 8° C. for 3 h and then cooled to room temperature. The mixture was filtered, and the filtrate was concentrated to dryness under vacuum to give the title compound 69a (700 mg, 69%).

MS m/z (ESI): 339 [M+1]

Step 2. Cis-N-(1-methyl-1H-pyrazol-4-yl)-4-(3a-methylhexahydropyrrolo[3,4-c]pyrrol-2(1H)-yl)pyrimidin-2-amine (69b)

To a mixture of 69a (700 mg, 2.07 mmol) and 1-methyl-1H-pyrazol-4-amine hydrochloride (200 mg, 2.07 mmol) in isopropanol (15 mL) was added pTsOH (787 mg, 4.14 mmol). The mixture was stirred at 100° C. for 18 h. After cooling to room temperature, the mixture was concentrated to dryness under vacuum. The residue was purified by silica gel column chromatography ($CH_2Cl_2$/MeOH=100/1 to 4/1) to give the title compound 69b (300 mg, 48%).

MS m/z (ESI): 300 [M+1]

Step 3. Cis-4-(5-(isoxazol-5-ylmethyl)-3a-methyl-hexahydropyrrolo[3,4-c]pyrrol-2(1H)-yl)-N-(1-methyl-1H-pyrazol-4-yl)pyrimidin-2-amine (69)

Compound 69 was synthesized according to Step 2 in Example 50 except that 69b was used instead of 12c.

MS m/z (ESI): 381 [M+1]

$^1$H NMR (400 MHz, $CD_3OD$) δ 8.33 (d, J=1.8 Hz, 1H), 7.83-7.80 (m, 2H), 7.58 (s, 1H), 6.35 (d, J=1.8 Hz, 1H), 5.92 (d, J=6.1 Hz, 1H), 3.87 (s, 5H), 3.82 (s, 2H), 3.63 (s, 1H), 3.52 (s, 1H), 2.98 (del, J=9.4, 7.8 Hz, 1H), 2.84 (d, J=9.2 Hz, 1H), 2.69 (dd, J=9.5, 4.6 Hz, 1H), 2.58 (d, J=9.3 Hz, 1H), 2.55-2.49 (m, IB), 1.32 (s, 3H).

Example 73 and 74 were synthesized according to Step 2 in Example 50 except that different chemicals were used instead of 12c,

| Example | Compounds replacing 12c | $^1$H NMR | MS m/z (ESI) |
|---|---|---|---|
| cis-4-(5-(isoxazol-5-ylmethyl)-3a-methylhexahydropyrrolo[3,4-c]pyrrol-2(1H)-yl)-5-methyl-N-(1-methyl-1H-pyrazol-4-yl)pyrimidin-2-amine (73) | cis-5-methyl-N-(1-methyl-1H-pyrazol-4-yl)-4-(3a-methylhexahydropyrrolo[3,4-c]pyrrol-2(1H)-yl)pyrimidin-2-amine hydrochloride 70b | $^1$H NMR (400 MHz, $CD_3OD$) δ 8.33 (d, J = 1.8 Hz, 1H), 7.77 (s, 1H), 7.63 (s, 1H), 7.56 (s, 1H), 6.35 (d, J = 1.8 Hz, 1H), 3.93 (dd, J = 11.3, 7.9 Hz, 1H), 3.87 (s, 2H), 3.86 (s, 3H), 3.83 (d, J = 10.8 Hz, 1H), 3.69 (dd, J = 11.4, 3.6 Hz, 1H), 3.53 (d, J = 10.9 Hz, 1H), 3.00 (dd, J = 9.4, 7.8 Hz, 1H), 2.80 (d, J = 9.3 Hz, 1H), 2.66 (dd, J = 9.4, 4.9 Hz, 1H), 2.60 (d, J = 9.2 Hz, 1H), 2.48-2.41 (m, 1H), 2.23 (s, 3H), 1.31 (s, 3H). | 395 [M + 1] |
| cis-5-chloro-4-(5-(isoxazol-5-ylmethyl)-3a-methylhexahydropyrrolo[3,4-c]pyrrol-2(1H)-yl)-N-(1-methyl-1H-pyrazol-4-yl)pyrimidin-2-amine (74) | cis-5-chloro-N-(1-methyl-1H-pyrazol-4-yl)-4-(3a-methylhexahydropyrrolo[3,4-c]pyrrol-2(1H)-yl)pyrimidin-2-amine hydrochloride 61h | $^1$H NMR (400 MHz, $CD_3OD$) δ 8.33 (d, J = 1.7 Hz, 1H), 7.85 (s, 1H), 7.78 (s, 1H), 7.55 (s, 1H), 6.35 (d, J = 1.7 Hz, 1H), 4.05 (dd, J = 11.7, 8.0 Hz, 1H), 3.98 (d, J = 11.3 Hz, 1H), 3.87 (s, 2H), 3.87 (s, 2H), 3.84 (dd, J = 11.8, 3.7 Hz, 1H), 3.67 (d, J = 11.3 Hz, 1H), 2.99 (dd, J = 9.8, 8.1 Hz, 1H), 2.81 (d, J = 9.2 Hz, 1H), 2.67 (dd, J = 9.5, 4.8 Hz, 1H), 2.59 (d, J = 9.3 Hz, 1H), 2.46 (ddd, J = 12.1, 7.9, 4.1 Hz, 1H), 1.30 (s, 3H). | 415 [M + 1] |

Example 70. Cis-cyclopropyl(3a-methyl-5-(5-methyl-2-((1-methyl-1H-pyrazol-4-yl)amino)pyrimidin-4-yl)hexahydropyrrolo[3,4-c]pyrrol-2(1H)-yl)methanone

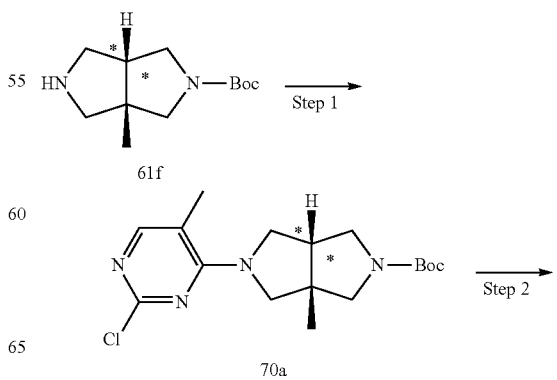

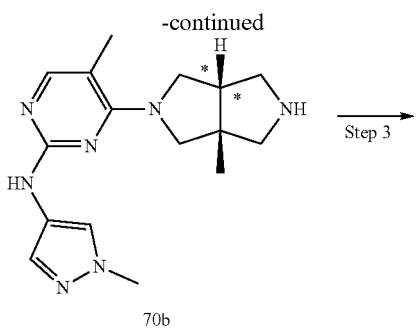

70b

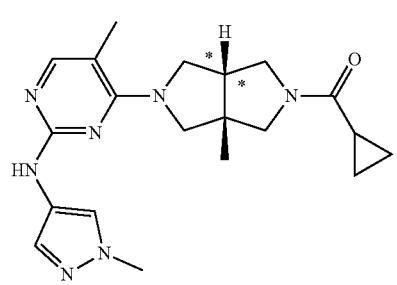

70

Step 1. Tert-butyl cis-5-(2-chloro-5-methylpyrimidin-4-yl)-3a-methylhexahydropyrrolo[3,4-c]pyrrole-2(1H)-carboxylate (70a)

To a solution of 2,4-dichloro-5-methylpyrimidine (324 mg, 2 mmol) in MeCN (10 mL) were added 61f (452 mg, 2 mmol) and potassium carbonate (552 mg, 4 mmol). The mixture was stirred at 80° C. for 3 h and then cooled to room temperature. The mixture was concentrated to dryness under vacuum and the residue was purified by silica gel column chromatography (petroleum ether/ethyl acetate=100/0 to 7/3) to give the title compound 70a (600 mg, 85%).

MS m/z (ESI): 353 [M+1]

Step 2. Cis-5-methyl-N-(1-methyl-1H-pyrazol-4-yl)-4-(3a-methylhexahydropyrrolo[3,4-c]pyrrol-2(1H)-yl)pyrimidin-2-amine hydrochloride (70b)

To a mixture of 70a (600 mg, 1.7 mmol) and 1-methyl-1H-pyrazol-4-amine hydrochloride (165 mg, 1.7 mmol) in isopropanol (15 mL) was added pTsOH (646 mg, 3.4 mmol). The mixture was heated at 100° C. in a microwave reactor for 1 h. After cooling to room temperature, the mixture was filtered, and the filtrate concentrated to dryness under vacuum. The residue was purified by silica gel column chromatography (CH$_2$Cl$_2$/MeOH=100/1 to 67/33) to give the title compound 70b as an HCl salt (400 mg, 75%).

MS m/z (ESI): 314 [M+1]

Step 3. Cis-cyclopropyl(3a-methyl-5-(5-methyl-2-((1-methyl-1H-pyrazol-4-yl)amino)pyrimidin-4-yl)hexahydropyrrolo[3,4-c]pyrrol-2(1H)-yl)methanone (70)

To a mixture of 70b (62.6 mg, 0.2 mmol) in CH$_2$Cl$_2$ (5 mL) were added TEA (30.3 mg, 0.3 mmol) and cyclopropanecarbonyl chloride (20.8 mg, 0.2 mmol). The mixture was stirred at room temperature for 1 h and then concentrated to dryness under vacuum. The residue was purified by prep-HPLC to give the title compound 70 (7.3 mg, solid, 10%).

MS m/z (ESI): 382 [M+1]

$^1$H NMR (400 MHz, CD$_3$OD) δ 7.65 (s, 1H) 7.49 (s, 1H), 7.43 (s, 1H), 4.05-3.92 (m, 2H), 3.81-3.71 (m, 4H), 3.69-3.48 (m, 41 f), 3.36-3.29 (m, 1H), 2.60-2.47 (m, 1H), 2.17 (s, 3H), 1.74-1.66 (m, 1H), 1.22 (d, J=12.1 Hz, 3H), 0.84-0.66 (m, 4H).

Example 71. Cis-3-(3a-methyl-5-(5-methyl-2-((1-methyl-1H-pyrazol-4-yl)amino)pyrimidin-4-yl)hexahydropyrrolo[3,4-c]pyrrol-2(1H)-yl)-3-oxopropanenitrile

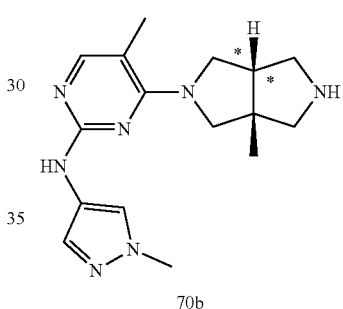

70b

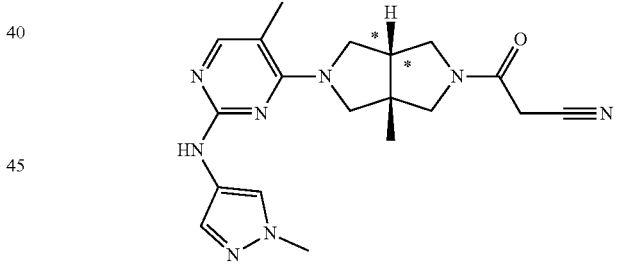

71

To a mixture of 70b (62.6 mg, 0.2 mmol) in CH$_2$Cl$_2$ (5 mL) were added 2-cyanoacetic acid (17 mg, 0.2 mmol), TEA (40.4 mg, 0.4 mmol) and HATU (114 mg, 0.3 mmol). The mixture was stirred for 2 h and then concentrated to dryness under vacuum. The residue was purified by prep-HPLC to give the title compound 71 (9.4 mg, solid, 10%).

MS m/z (ESI): 382 [M+1]

$^1$H NMR (400 MHz, CD$_3$OD) δ 7.64 (s, 1H), 7.50 (s, 1H), 7.43 (s, 1H), 4.01-3.93 (m, 1H), 3.83-3.56 (m, 8H), 3.54-3.49 (m, 1H), 3.43-3.27 (m, 3H), 2.59-2.49 (m, 1H), 2.15 (d, J=12.8 Hz, 3H), 1.22 (dd, J=10.7, 3.4 Hz, 3H).

Example 72 was synthesized according to the procedure for Example 71 except that in step 1, (S)-2,2-difluorocyclopropane-1-carboxylic acid was used instead of 2-cyanoacetic acid.

| Example | Compound replacing 2-cyanoacetic acid | ¹H NMR | MS m/z (ESI) |
|---|---|---|---|
| cis-((S)-2,2-difluorocyclopropyl)(3a-methyl-5-(5-methyl-2-((1-methyl-1H-pyrazol-4-yl)amino)pyrimidin-4-yl)hexahydropyrrolo[3,4-c]pyrrol-2(1H)-yl)methanone (72) | (S)-2,2-difluorocyclopropane-1-carboxylic acid | ¹H NMR (400 MHz, CD₃OD) δ 7.77 (d, J = 2.4 Hz, 1H), 7.62 (s, 1H), 7.57-7.50 (m, 1H), 4.14-4.08 (m, 1H), 3.90-3.42 (m, 10H), 2.89-2.81 (m, 1H), 2.73-2.63 (m, 1H), 2.28 (d, J = 5.8 Hz, 3H), 2.07-2.01 (m, 1H), 1.83-1.75 (m, 1H), 1.38-1.29 (m, 3H). | 418 [M + 1] |

Example 75. 5-Chloro-4-((3aR,6aS)-3a,6a-dimethyl-5-((1-methyl-1H-pyrazol-3-yl)methyl)hexahydropyrrolo[3,4-c]pyrrol-2(1H)-yl)-N-(1-methyl-1H-pyrazol-4-yl)pyrimidin-2-amine Hydrochloride

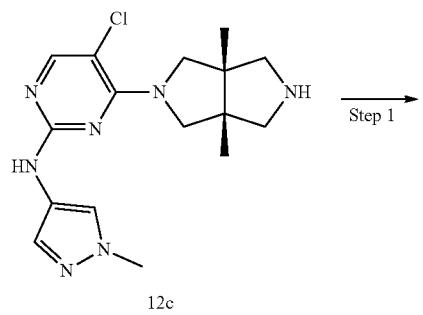

12c

Step 1

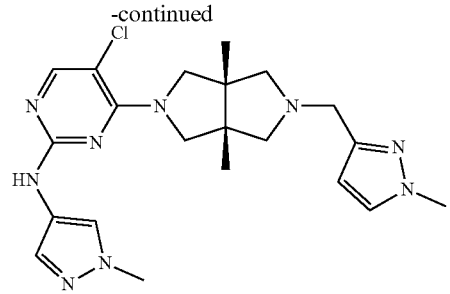

75

To a mixture of 12c (35 mg, 0.1 mmol) in DMF (4 mL) were added cesium carbonate (98 mg, 0.3 mmol) and 33-(chloromethyl)-1-methyl-1H-pyrazole (14 mg, 0.11 mmol). The mixture was stirred for 20 h and then filtered. The filtrate was purified directly by prep-HPLC to give the title compound 75 as an HCl salt (3.4 mg, solid, 8%).

MS m/z (ESI): 442 [M+1]
¹H NMR (400 MHz, CD₃OD) δ 7.94 (t, J=31.0 Hz, 2H), 7.74-7.56 (m, 2H), 6.56 (d, J=5.3 Hz, 1H), 4.45 (d, J=6.5 Hz, 2H), 4.15-3.85 (m, 6H), 3.81 (d, J=12.8 Hz, 2H), 3.71 (d, J=11.8 Hz, 2H), 3.60 (d, J=11.9 Hz, 2H), 3.54-3.48 (m, 2H), 1.28 (s, 3H), 1.22 (s, 3H).

Example 76, 77, 78, 79, 80, 81 and 82 were synthesized according to the procedure for Example 75 except that in step, different compounds were used instead of 1,3-(chloromethyl)-1-methyl-1H-pyrazole.

| Example | Compound replacing 3-(chloromethyl)-1-methyl-1H-pyrazole | ¹H NMR | MS m/z (ESI) |
|---|---|---|---|
| 5-chloro-4-((3aR,6aS)-3a,6a-dimethyl-5-((1-methyl-1H-pyrazol-4-yl)methyl)hexahydropyrrolo[3,4-c]pyrrol-2(1H)-yl)-N-(1-methyl-1H-pyrazol-4-yl)pyrimidin-2-amine hydrochloride (76) | (1-methyl-1H-pyrazol-4-yl)methyl methanesulfonate | ¹H NMR (400 MHz, CD₃OD) δ 8.29-7.59 (m, 5H), 4.92 (s, 2H), 4.50-4.40 (m, 3H), 4.02-3.91 (m, 6H), 3.78 (d, J = 11.0 Hz, 2H), 3.64-3.53 (m, 2H), 3.43-3.35 (m, 1H), 1.29 (s, 6H). | 442 [M + 1] |
| 5-chloro-4-((3aR,6aS)-3a,6a-dimethyl-5-((1-methyl-1H-1,2,4-triazol-3-yl)methyl)hexahydropyrrolo[3,4-c]pyrrol-2(1H)-yl)-N-(1-methyl-1H-pyrazol-4-yl)pyrimidin-2-amine (77) | 3-(chloromethyl)-1-methyl-1H-1,2,4-triazole | ¹H NMR (400 MHz, CD₃OD) δ 8.24 (s, 1H), 7.75 (s, 1H), 7.64 (s, 1H), 7.44 (s, 1H), 3.95 (d, J = 11.7 Hz, 4H), 3.79 (s, 3H), 3.75 (s, 3H), 3.50 (d, J = 11.5 Hz, 2H), 3.25 (s, 2H), 2.97 (s, 2H), 1.08 (s, 6H). | 443 [M + 1] |
| 5-chloro-4-((3aR,6aS)-3a,6a-dimethyl-5-((3-methylisoxazol-5-yl)methyl)hexahydropyrrolo[3,4-c]pyrrol-2(1H)-yl)-N-(1-methyl-1H-pyrazol-4-yl)pyrimidin-2-amine (78) | (3-methylisoxazol-5-yl)methyl methanesulfonate | ¹H NMR (400 MHz, CD₃OD) δ 7.84 (s, 1H), 7.76 (s, 1H), 7.56 (s, 1H), 6.17 (s, 1H), 4.09 (d, J = 11.5 Hz, 2H), 3.87 (s, 3H), 3.80 (s, 2H), 3.62 (d, J = 11.5 Hz, 2H), 2.94 (d, J = 9.5 Hz, 2H), 2.65 (d, J = 9.5 Hz, | 443 [M + 1] |

-continued

| Example | Compound replacing 3-(chloromethyl)-1-methyl-1H-pyrazole | 1H NMR | MS m/z (ESI) |
|---|---|---|---|
| 4-((3aR,6aS)-5-((1H-pyrazol-4-yl)methyl)-3a,6a-dimethylhexahydropyrrolo[3,4-c]pyrrol-2(1H)-yl)-5-chloro-N-(1-methyl-1H-pyrazol-4-yl)pyrimidin-2-amine (79) | 4-(chloromethyl)-1H-pyrazole | 1H NMR (400 MHz, CD3OD) δ 7.84 (s, 1H), 7.76 (s, 1H), 7.65-7.48 (m, 3H), 4.08 (d, J = 11.5 Hz, 2H), 3.86 (s, 3H), 3.67-3.56 (m, 4H), 2.92-2.85 (m, 2H), 2.63 (d, J = 9.9 Hz, 2H), 2.24 (s, 3H), 1.15 (s, 6H). | 428 [M + 1] |
| 5-chloro-4-((3aR,6aS)-3a,6a-dimethyl-5-((2-methyloxazol-5-yl)methyl)hexahydropyrrolo[3,4-c]pyrrol-2(1H)-yl)-N-(1-methyl-1H-pyrazol-4-yl)pyrimidin-2-amine (80) | 2-(chloromethyl)-5-methyl-1,3,4-oxadiazole | 1H NMR (400 MHz, CD3OD) δ 7.84 (s, 1H), 7.76 (s, 1H), 7.55 (s, 1H), 4.08 (d, J = 11.5 Hz, 2H), 3.93 (s, 3H), 3.87 (brs, 2H), 3.64 (d, J = 11.5 Hz, 2H), 2.98 (d, J = 9.4 Hz, 2H), 2.70 (d, J = 9.4 Hz, 2H), 2.51 (s, 3H), 1.16 (s, 6H). | 444 [M + 1] |
| 4-((3aR,6aS)-5-((1H-pyrazol-3-yl)methyl)-3a,6a-dimethylhexahydropyrrolo[3,4-c]pyrrol-2(1H)-yl)-5-chloro-N-(1-methyl-1H-pyrazol-4-yl)pyrimidin-2-amine (81) | 3-(chloromethyl)-1H-pyrazole | 1H NMR (400 MHz, CD3OD) δ 7.83 (s, 1H), 7.76 (s, 1H), 7.59 (s, 1H), 7.55 (s, 1H), 6.29 (s, 1H), 4.05 (d, J = 11.4 Hz, 2H), 3.86 (s, 3H), 3.73 (s, 2H), 3.61 (d, J = 11.3 Hz, 2H), 2.90 (s, 2H), 2.62 (s, 2H), 1.14 (s, 6H). | 428 [M + 1] |
| 5-chloro-4-((3aR,6aS)-3a,6a-dimethyl-5-((3-methyl-1,2,4-oxadiazol-5-yl)methyl)hexahydropyrrolo[3,4-c]pyrrol-2(1H)-yl)-N-(1-methyl-1H-pyrazol-4-yl)pyrimidin-2-amine (82) | 5-(chloromethyl)-3-methyl-1,2,4-oxadiazole | 1H NMR (400 MHz, CD3OD) δ 7.84 (s, 1H), 7.77 (s, 1H), 7.55 (s, 1H), 4.08 (d, J = 11.5 Hz, 2H), 4.00 (s, 2H), 3.87 (s, 3H), 3.65 (d, J = 11.5 Hz, 2H), 3.02 (d, J = 9.3 Hz, 2H), 2.75 (d, J = 9.3 Hz, 2H), 2.35 (s, 3H), 1.16 (s, 6H). | 444 [M + 1] |

Example 83. 5-Chloro-4-((3aR,6aS)-3a,6a-dimethyl-5-(5-methyl-1,3,4-oxadiazol-2-yl)hexahydropyrrolo[3,4-c]pyrrol-2(1H)-yl)-N-(1-methyl-1H-pyrazol-4-yl)pyrimidin-2-amine

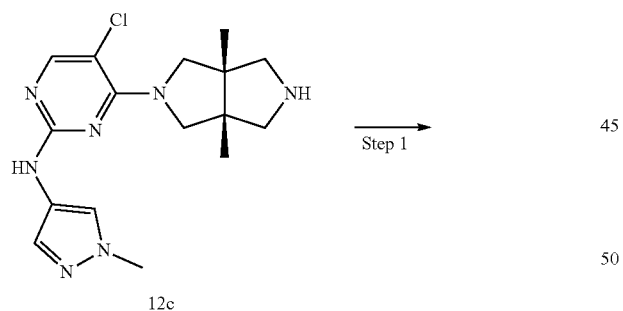

12c

To a mixture of 12c (80 mg, 0.208 mmol) in DMF (3 mL) were added 5-methyl-1,3,4-oxadiazol-2(3H)-one (21 mg, 0.208 mmol) and DIEA (161 mg, 1.25 mmol). The mixture was stirred at for 5 min and then added with (benzotriazol1yloxy)tris(dimethylamino)phosphonium hexafluophosphate (101 mg, 0.229 mmol). The resulting mixture was heated to 50° C. and stirred to for 12 h. After cooling to room temperature, the mixture was added with water (5 mL) and extracted with ethyl acetate (3×5 mL). The combined organic phase was concentrated to dryness under vacuum and the residue was purified by prep-HPLC to give the title compound 83 (8.5 mg, solid, 10%).

MS m/z (ESI): 430 [M+1]

1H NMR (400 MHz, DMSO-d6) δ 9.06 (s, 1H), 7.89 (s, 1H), 7.70 (s, 1H), 7.44 (s, 1H), 3.92 (d, J=11.6 Hz, 2H), 3.77 (s, 3H), 3.73 (d, J=11.3 Hz, 2H), 3.57 (d, J=10.4 Hz, 2H), 3.40 (d, J=10.4 Hz, 2H), 2.31 (s, 3H), 1.14 (s, 6H).

Example 84. 5-Chloro-4-((3aR,6aS)-5-(Cyclopropylmethyl)-3a,6a-dimethylhexahydropyrrolo[3,4-c]pyrrol-2(1H)-yl)-N-(1-methyl-1H-pyrazol-4-yl)pyrimidin-2-amine

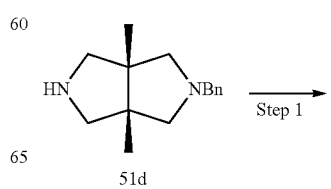

51d

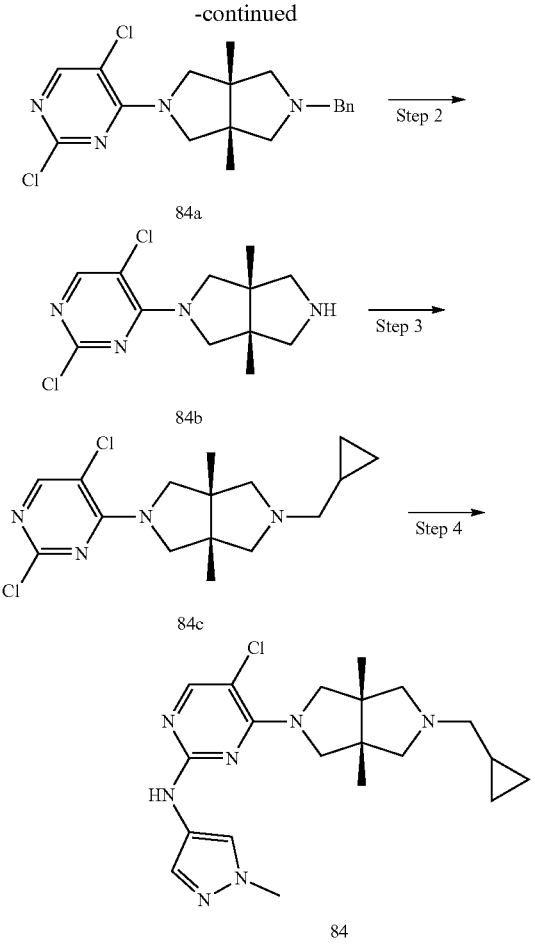

Step 3. (3aR,6aS)-2-(Cyclopropylmethyl)-5-(2,5-dichloropyrimidin-4-yl)-3a,6a-dimethyloctahydropyrrolo[3,4-c]pyrrole (84c)

A mixture of (bromomethyl)cyclopropane (56.3 mg, 0.42 mmol), 84b (60 mg, 0.21 mmol), potassium carbonate (87 mg, 0.63 mmol) in MeCN (4 mL) was heated to 50° C. and stirred for 16 h. After cooling to room temperature, the mixture was concentrated to dryness under vacuum and the residue was purified by silica gel column chromatography (petroleum ether/ethyl acetate=100/0 to 2/3) to give the title compound 84e (50 mg, 70%).

MS m/z (ESI): 341 [M+1]

Step 4. 5-Chloro-4-((3aR,6aS)-5-(cyclopropylmethyl)-3a,6a-dimethylhexahydropyrrolo[3,4-c]pyrrol-2(1H)-yl)-N-(1-methyl-1H-pyrazol-4-yl)pyrimidin-2-amine (84)

A mixture of 84c (50 mg, 0.147 mmol), 1-methyl-1H-pyrazol-4-amine (21 mg, 0.122 mmol) and pTsOH (55 mg, 0.284 mmol) in isopropanol (2 mL) was heated to 100° C. and stirred for 4 h. After coding to room temperature, the mixture was concentrated to dryness under vacuum and the residue was purified by prep-HPLC to give the title compound 84 (16.4 mg, solid, 28%).

MS m/z (ESI): 402 [M+1]

$^1$H NMR (400 MHz, DMSO-d$_6$) δ 9.06 (s, 1H), 7.89 (s, 1H), 7.70 (s, 1H), 7.45 (s, 1H), 3.98 (d, J=10.9 Hz, 2H), 3.77 (s, 3H), 3.56 (d, J=11.2 Hz, 2H), 2.82 (s, 2H), 2.32 (d, J=63.4 Hz, 4H), 1.07 (s, 6H), 0.79 (s, 1H), 0.41 (d, J=6.1 Hz, 2H), 0.05 (s, 2H).

Example 85. 2-((3aR,6aS)-5-(5-Chloro-2-((1-methyl-1H-pyrazol-4-yl)amino)pyrimidin-4-yl)-3a,6a-dimethylhexahydropyrrolo[3,4-c]pyrrol-2(1H)-yl)acetonitrile

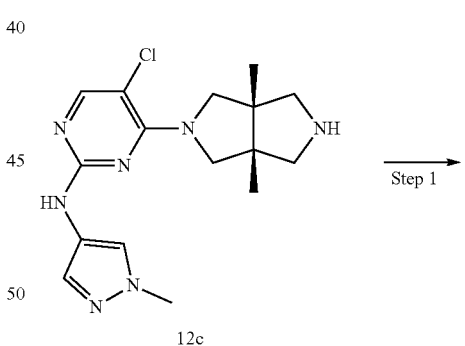

Step 1. (3aR,6aS)-2-benzyl-5-(2,5-dichloropyrimidin-4-yl)-3a,6a-dimethyloctahydropyrrolo[3,4-c]pyrrole (84a)

To a solution of 51d (400 mg, 1.74 mmol) in MeCN (10 mL) were added potassium carbonate (720 mg, 5.22 mmol) and 2,4,5-trichloropyrimidine (410 mg, 2.26 mmol). The mixture was stirred for 2 h and then concentrated to dryness under vacuum. The residue was purified by silica gel column chromatography (petroleum ether/ethyl acetate=100/0 to 3/2) to give the title compound 84a (200 mg, 31%).

MS m/z (ESI): 377 [M+1]

Step 2. (3aR,6aS)-2-(2,5-dichloropyrimidin-4-yl)-3a,6a-dimethyloctahydropyrrolo[3,4-c]pyrrole (84b)

To a solution of 84a (0.2 g, 0.53 mmol) in CH$_2$Cl$_2$ (10 mL) was added 1-chloroethyl chloroformate (226 mg, 1.59 mmol). The mixture was heated to reflux for 2 h. After cooling to room temperature, the mixture was concentrated to dryness under vacuum and then added with MeOH (10 mL). The mixture was heated to reflux for another 2 h and then cooled to room temperature. The mixture was concentrated to dryness under vacuum and the residue was purified by silica gel column chromatography (CH$_2$C$_{1-2}$/MeOH=9/1) to give the title compound 84b (140 mg, 92%).

MS m/z (ESI): 287 [M+1]

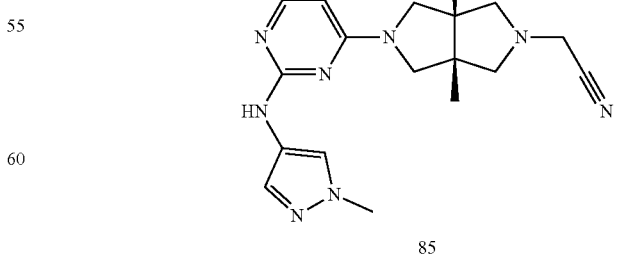

A mixture of 12c (42 mg, 0.115 mmol), 2-bromoacetonitrile (30 mg, 0.23 mmol), TEA (50 mg, 0.46 mmol) in THF (1 mL) was stirred for 2 h and then concentrated to dryness under vacuum. The residue was purified by prep-HPLC to give the title compound 85 (16 mg, solid, 34%).

MS m/z (ESI): 402 [M+1]

$^1$H NMR (400 MHz, DMSO-$d_6$) δ 9.07 (s, 1H), 7.89 (s, 1H), 7.71 (s, 1H), 7.44 (s, 1H), 4.00 (d, J=11.3 Hz, 2H), 3.80 (s, 2H), 3.77 (s, 3H), 3.56 (d, J=11.3 Hz, 2H), 2.85 (d, J=9.2 Hz, 2H), 2.55 (d, J=9.3 Hz, 2H), 1.09 (s, 6H).

Example 86. ((3aS,6aR)-5-(5-Chloro-2-((1-methyl-1H-pyrazol-4-yl)amino)pyrimidin-4-yl)-3a-methyl-hexahydropyrrolo[3,4-c]pyrrol-2(1H)-yl)(cyclopropyl)methanone

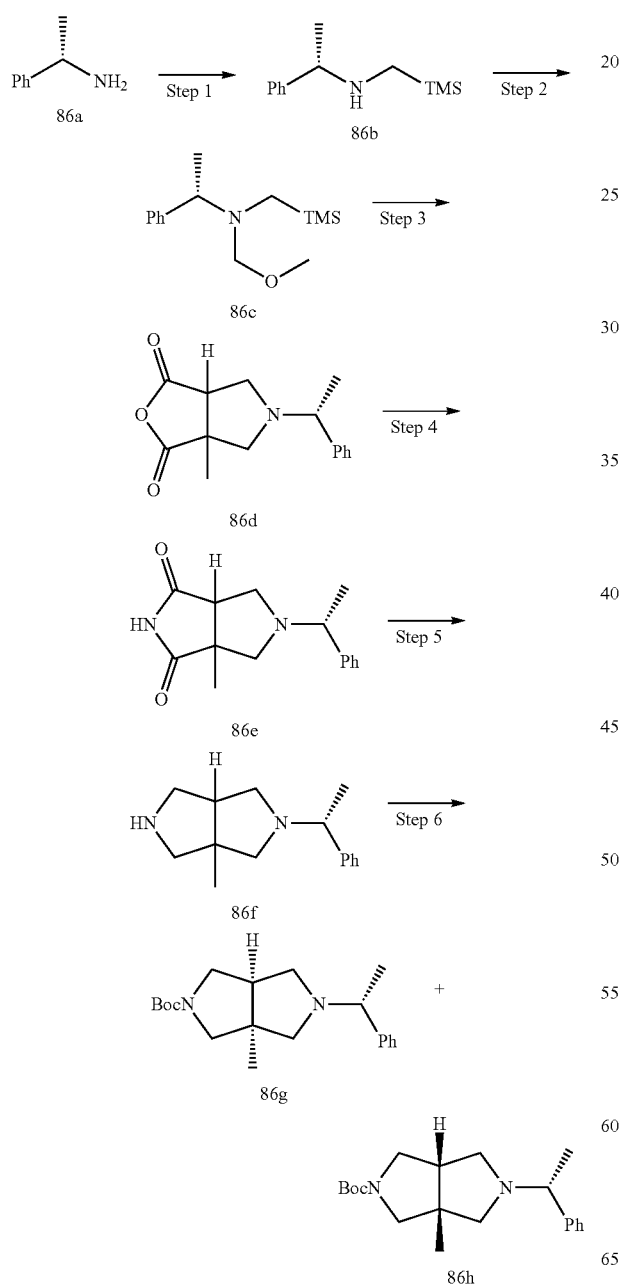

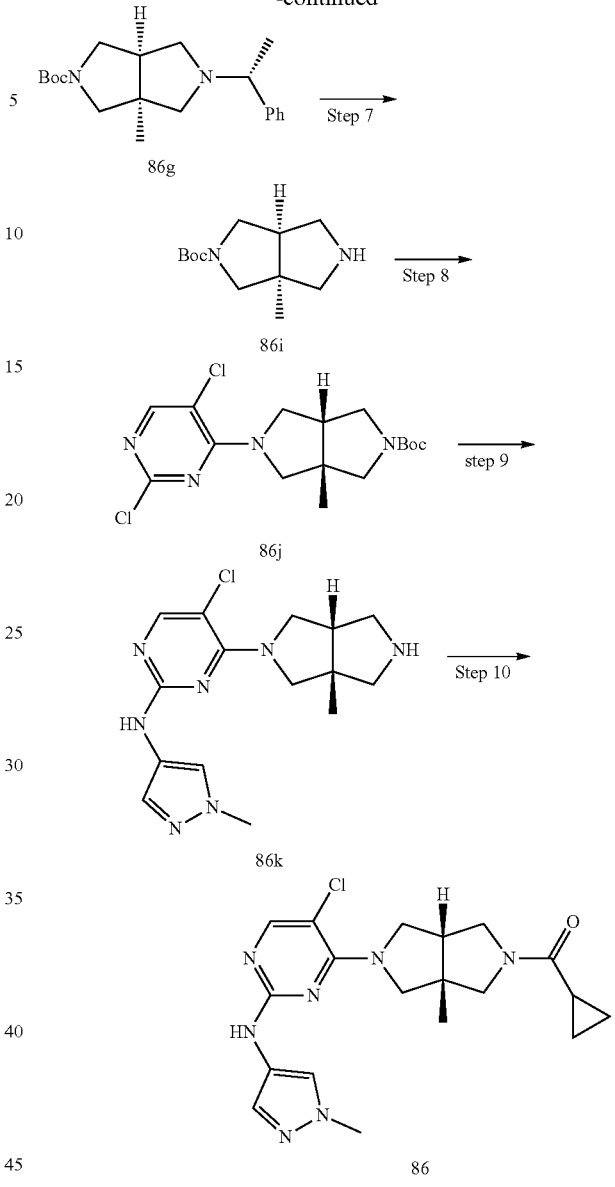

Step 1. (S)-1-Phenyl-N-((trimethylsilyl)methyl)ethan-1-amine (86b)

A mixture of (chloromethyl)trimethylsilane (20.24 g, 165 mmol), 86a (20 g, 165 mmol) and TEA (20 g, 165 mmol) was heated to reflux for 16 h. After cooling to room temperature, the mixture was added with n-heptane (500 mL), stirred and filtered. The filtrate was concentrated to dryness under vacuum and the residue was purified by silica gel column chromatography (petroleum ether/ethyl acetate=1/20) to give the title compound 86b (26 g, 76%).

MS m/z (ESI): 208 [M+1]

Step 2. (S)—N-(methoxymethyl)-1-phenyl-N-((trimethylsilyl)methyl)ethan-1-amine (86c)

To a 37% formaldehyde aqueous solution (6.6 g, 81.49 mmol) at 0° C. was added 86b (13.0 g, 62.68 mmol). The mixture was stirred at 0° C. for 0.5 h and then added with MeOH (3.4 g, 106.56 mmol) and potassium carbonate (8.7 g, 62.68 mmol). The mixture was stirred at 0° C. for another 2 h, added with water (50 mL) and extracted with ethyl acetate (3×50 mL). The combined organic phase was dried over anhydrous sodium sulfate, filtered and concentrated to dryness under vacuum. The residue was purified by distillation to give the title compound 86c (6.816 g, 43%).

$^1$H NMR (400 MHz, DMSO-d$_6$) δ 7.35-7.30 (m, 4H), 7.23 (s, 1H), 4.18 (d, J=9.3 Hz, 1H), 3.99 (d, J=9.3 Hz, 1H), 3.90 (d, J=6.8 Hz, 1H), 3.14 (s, 3H), 2.06 (q, J=14.4 Hz, 2H), 1.33 (d, J=6.8 Hz, 3H), 0.00 (s, 9H).

Step 3. Cis-3a-methyl-5-((R)-1-phenylethyl)tetrahydro-1H-furo[3,4-c]pyrrole-1,3(3aH)-dione (86d)

To a solution of 86c (6.62 g, 26.34 mmol) in CH$_2$Cl$_2$ (25 mL) at 0³C was added a solution of 3-methylfuran-2,5-dione (2.95 g, 26.34 mmol) in CH$_2$Cl$_2$ (10 mL), followed by addition of a solution of TFA (0.3 g, 2.63 mmol) in CH$_2$Cl$_2$ (5 mL) dropwise. The resulting mixture was stirred for 6 h and then concentrated to dryness under vacuum to give the title compound 86d (6.83 g). The crude product was used directly in the next step without further purification.

MS m/z (ESI): 260 [M+1]

Step 4. Cis-3a-methyl-5-((R)-1-phenylethyl)tetrahydropyrrolo[3,4-c]pyrrole-1,3(2H,3aH)-dione (86e)

To a solution of 86d (6.83 g, 26.34 mmol) in THF (30 mL) was added ammonium hydroxide (30 mL). The resulting mixture was heated to 100° C. in sealed tube and stirred for 3 h. After cooling to room temperature, the mixture was concentrated to dryness under vacuum. The residue was purified by silica gel column chromatography (petroleum ether/ethyl acetate=1/2) to give the title compound 86e (4.30 g, 63%).

MS m/z (ESI): 259 [M+1]

Step 5. Cis-3a-methyl-2-((R)-1-phenylethyl)octahydropyrrolo[3,4-c]pyrrole (86f)

To a solution of 86e (4.3 g, 16.65 mmol) in THF (80 mL) at 0° C. was added LAH (1.90 g, 49.95 mmol) in batches. The mixture was heated to 70° C. and stirred for 2 h. After cooling to 0° C., the mixture was quenched with saturated sodium sulfate solution (20 mL) and filtered. The filtrate was concentrated to dryness under vacuum to give the title compound 86f (3.62 g, 94%).

MS m/z (ESI): 23.1 [M+1]

Step 6. Tert-butyl (3aS,6aR)-3a-methyl-5-((R)-1-phenylethyl)hexahydropyrrolo[3,4-c]pyrrole-2(1H)-carboxylate (86g) and tert-butyl (3aR,6aS)-3a-methyl-5-((R)-1-phenylethyl)hexahydropyrrolo[3,4-c]pyrrole-2(1H)-carboxylate (86h)

To a solution of 86f (3.62 g, 15.73 mmol) in CH$_2$Cl$_2$ (40 mL) at 0° C. were added TEA (3.18 g, 31.46 mmol) and a solution of di-tert-butyl pyrocarbonate (4.12 g, 18.88 mmol) in CH$_2$C$_{1-2}$ (10 mL). The mixture was stirred for 1 h, added with v/ater (20 mL) and extracted with CH$_2$Cl$_2$ (3×50 mL). The combined organic phase was dried over anhydrous sodium sulfate, filtered and concentrated to dryness under vacuum. The residue was purified by silica gel column chromatography (petroleum ether/ethyl acetate=20/1) to give the title compound 86g (1.89 g) and 86h (1.65 g), as well as a mixture of § 6g and 86h (1.04 g). The total yield of 86g and 86h was 88%.

Tert-butyl (3aS,6aR)-3a-methyl-5-((R)-1-phenylethyl)hexahydropyrrolo[3,4-c]pyrrole-2(1H)-carboxylate 86g MS m/z (ESI): 331 [M+1]

$^1$H NMR (400 MHz, DMSO-d$_6$) δ 7.29 (d, J=4.5 Hz, 4H), 7.21 (d, J=4.2 Hz, 1H) 3.57-3.48 (m, 1H), 3.25 (d, J=10.8 Hz, 1H), 3.22-3.14 (m, 2H), 3.06 (d, J=10.8 Hz, 1H), 2.54 (dd, J=5.5, 3.8 Hz, 2H), 2.35 (d, J 9.1 Hz, 1H), 2.18 (s, 1H), 2.12 (d, J=9.1 Hz, 1H), 1.40 (s, 9H), 1.24 (d, J=6.5 Hz, 3H), 1.08 (s, 3H).

Tert-butyl (3aR,6aS)-3a-methyl-5-((R)-1-phenylethyl)hexahydropyrrolo[3,4-c]pyrrole-2(1H)-carboxylate 86h MS m/z (ESI): 331 [M+1]

$^1$H NMR (400 MHz, DMSO-d6) δ 7.29 (d, J=4.4 Hz, 4H), 7.21 (d, J=4.3 Hz, 1H), 3.49-3.41 (m, 1H), 3.34 (d, J=10.9 Hz, 1H), 3.20 (d, J=6.6 Hz, 1H), 3.10 (dd, J=11.3, 3.5 Hz, 1H), 3.06 (d, J=11.0 Hz, 1H), 2.65 (s, 1H), 2.57 (d, J=8.9 Hz, 1H), 2.18 (d, J=3.5 Hz, 1H), 2.16 (s, 2H), 1.39 (s, 9H), 1.24 (d, J=6.5 Hz, 3H), 1.11 (s, 3H).

Step 7. Tert-butyl (3aS,6aR)-3a-methylhexahydropyrrolo[3,4-c]pyrrole-2(1H)-carboxylate (86i)

To a solution of 86g (1.89 g, 5.72 mmol) in MeOH (50 mL) was added 10% Pd/C (0.19 g). The mixture was stirred under hydrogen for 12 h and then concentrated to dryness under vacuum to give the title compound 86i (1.30 g, 100%).

MS m/z (ESI): 227 [M+1]

Step 8. Tert-butyl (3aS,6aR)-5-(2,5-dichloropyrimidin-4-yl)-3a-methylhexahydropyrrolo[3,4-c]pyrrole-2(1H)-carboxylate (86j)

To a solution of 86i (1.3 g, 5.73 mmol) in MeCN (40 mL) were added DIEA (1.48 g, 11.46 mmol) and 2,4,5-trichloropyrimidine (1.05 g, 5.73 mmol). The mixture was stirred for 2 h and concentrated to dryness under vacuum. The residue was purified by silica gel column chromatography (petroleum ether/ethyl acetate=7/3) to give the title compound 86j (1.83 g, 86%).

MS m/z (ESI): 373 [M+1]

Step 9. 5-Chloro-N-(1-methyl-1H-pyrazol-4-yl)-4-((3aR,6aS)-3a-methylhexahydropyrrolo[3,4-c]pyrrol-2(1H)-yl)pyrimidin-2-amine (86k)

To a solution of 86j (1.83 g, 4.91 mmol) in isopropanol (30 mL) were added 1-methyl-1H-pyrazol-4-amine hydrochloride (656 mg, 4.91 mmol) and pTsOH (93 mg, 0.49 mmol). The mixture was heated to 100° C. and stirred for 12 h. After cooling to room temperature, the reaction mixture was filtered and the filter cake was collected to give the title compound 86k (1.28 g, 82%) as an HCl salt.

MS m/z (ESI): 334 [M+1]

Step 10. ((3aS,6aR)-5-(5-Chloro-2-((1-methyl-1H-pyrazol-4-yl)amino)pyrimidin-4-yl)-3a-methylhexahydropyrrolo[3,4-c]pyrrol-2(1H)-yl)(cyclopropyl)methanone (86)

To a solution of 86k (100 mg, 0.27 mmol) in CH$_2$Cl$_2$ (5 mL) were added cyclopropanecarboxylic acid (23 mg, 0.27 mmol) and DIEA (175 mg, 1.35 mmol). The mixture was stirred for 10 min and then added with HATU (205 mg, 0.54 mmol). The mixture was stirred for another 2 h, added with water (5 mL) and extracted with ethyl acetate (3×5 mL). The combined organic phase was concentrated to dryness under vacuum and the residue was purified by prep-HPLC to give the title compound 86 (64.3 mg, solid, 59%).

MS m/z (ESI): 402 [M+1]

Specific rotation $[\alpha]_D^{20}=-9.2°\times dm^2/kg$ $^1$H NMR (400 MHz, DMSO-d$_6$) δ 9.06 (s, 1H), 7.89 (s, 1H), 7.71 (s, 1H), 7.44 (s, 1H), 4.04 (s, 1H), 3.95 (dd, J=10.7, 7.7 Hz, 1H), 3.88-3.80 (m, 1H), 3.78 (s, 3H), 3.75-3.69 (m, 1H), 3.65 (dd, J=13.6, 6.6 Hz, 1H), 3.58 (dd, J=12.7, 8.0 Hz, 1H), 3.44 (d, J=12.2 Hz, 1H), 3.28 (s, 1H), 2.69-2.60 (m, 1H), 1.73 (dd, J=13.0, 6.2 Hz, 1H), 1.23 (d, J=12.9 Hz, 3H), 0.77-0.66 (m, 4H).

Example 87, 88, 89, 90 and 91 were synthesized according to the procedure for Example 86 except that in Step 7, different compounds were used instead of 86g, and in Step 10, different compounds were used instead of cyclopropanecarboxylic acid.

| Example | Compound replacing 86g | Compound replacing cyclopropanecarboxylic acid |
|---|---|---|
| 87 | 86h | cyclopropanecarboxylic acid |
| 88 | 86g | 2-cyanoacetic acid |
| 89 | 86h | 2-cyanoacetic acid |
| 90 | 86g | (S)-2,2-difluorocyclopropane-1-carboxylic acid |
| 91 | 86h | (S)-2,2-difluorocyclopropane-1-carboxylic acid |

The characterization data of Example 87, 88, 89, 90 and 91 are shown below

| Example | $^1$H NMR | MS m/z (ESI) | $[\alpha]_D^{20}$ (° × dm$^2$/kg) |
|---|---|---|---|
| ((3aR,6aS)-5-(5-chloro-2-((1-methyl-1H-pyrazol-4-yl)amino)pyrimidin-4-yl)-3a-methylhexahydropyrrolo[3,4-c]pyrrol-2(1H)-yl)(cyclopropyl)methanone (87) | $^1$H NMR (400 MHz, DMSO-d$_6$) δ 9.06 (s, 1H), 7.89 (s, 1H), 7.71 (s, 1H), 7.44 (s, 1H), 4.04 (s, 1H), 3.95 (d, J = 3.0 Hz, 1H), 3.83 (s, 1H), 3.78 (s, 3H), 3.75-3.69 (m, 1H), 3.68-3.61 (m, 1H), 3.61-3.54 (m, 1H), 3.44 (d, J = 12.0 Hz, 1H), 3.29-3.23 (m, 1H), 2.66 (d, J = 11.2 Hz, 1H), 1.73 (dd, J = 13.2, 6.4 Hz, 1H), 1.23(d, J = 12.9 Hz, 3H), 0.77-0.66 (m, 4H). | 402 [M + 1] | +9.1 |
| 3-((3aS,6aR)-5-(5-chloro-2-((1-methyl-1H-pyrazol-4-yl)amino)pyrimidin-4-yl)-3a-methylhexahydropyrrolo[3,4-c]pyrrol-2(1H)-yl)-3-oxopropanenitrile (88) | $^1$H NMR (400 MHz, DMSO-d$_6$) δ 9.06 (s, 1H), 7.89 (s, 1H), 7.71 (s, 1H), 7.44 (s, 1H), 4.03 (d, J = 5.3 Hz, 1H), 3.92 (d, J = 3.1 Hz, 2H), 3.86 (d, J = 11.4 Hz, 1H), 3.81 (d, J = 11.1 Hz, 1H), 3.78 (s, 3H), 3.69 (s, 1H), 3.64 (dd, J = 12.1, 6.9 Hz, 1H), 3.49 (dd, J = 28.2, 11.3 Hz, 1H), 3.37 (s, 1H), 3.33 (d, J = 10.1 Hz, 1H), 2.61(s, 1H), 1.21 (d, J = 3.1 Hz, 3H). | 401 [M + 1] | −12 |
| 3-((3aR,6aS)-5-(5-chloro-2-((1-methyl-1H-pyrazol-4-yl)amino)pyrimidin-4-yl)-3a-methylhexahydropyrrolo[3,4-c]pyrrol-2(1H)-yl)-3-oxopropanenitrile (89) | $^1$H NMR (400 MHz, DMSO-d$_6$) δ 9.06 (s, 1H), 7.89 (s, 1H), 7.71 (s, 1H), 7.44 (s, 1H), 4.03 (d, J = 4.9 Hz, 1H), 3.92 (d, J = 3.1 Hz, 2H), 3.84 (dd, J = 18.6, 11.3Hz, 1H), 3.78 (s, 3H), 3.71 (d, J = 7.8 Hz, 1H), 3.68 (d, J = 10.8 Hz, 1H), 3.65-3.60 (m, 1H), 3.49 (dd, J = 28.1, 11.3 Hz, 1H), 3.37 (s, 1H), 3.33 (d, J = 10.7 Hz, 1H), 2.61 (s, 1H), 1.25-1.18 (m, 3H). | 401 [M + 1] | +12 |
| ((3aS,6aR)-5-(5-chloro-2-((1-methyl-1H-pyrazol-4-yl)amino)pyrimidin-4-yl)-3a-methylhexahydropyrrolo[3,4-c]pyrrol-2(1H)-yl)((S)-2,2-difluorocyclopropyl)methanone (90) | $^1$H NMR (400 MHz, DMSO-d$_6$) δ 9.07 (s, 1H), 7.89 (s, 1H), 7.71 (s, 1H), 7.43 (d, J = 7.4 Hz, 1H), 4.04 (s, 1H), 3.82 (s, 1H), 3.77 (d, J = 3.0 Hz, 3H), 3.72 (dd, J = 16.5, 5.8 Hz, 2H), 3.67 (d, J = 2.4 Hz, 1H), 3.63 (s, 1H), 3.49 (d, J = 12.4 Hz, 1H), 3.34 (d, J = 5.4 Hz, 1H), 2.93 (dd, J = 15.4, 9.6 Hz, 1H), 2.67 (s, 1H), 1.89(dd, J = 21.7, 16.7 Hz, 2H), 1.23 (d, J = 16.9 Hz, 3H). | 438 [M + 1] | +27 |
| ((3aR,6aS)-5-(5-chloro-2-((1-methyl-1H-pyrazol-4-yl)amino)pyrimidin-4-yl)-3a-methylhexahydropyrrolo[3,4-c]pyrrol-2(1H)-yl)((S)-2,2-difluorocyclopropyl)methanone (91) | $^1$H NMR (400 MHz, DMSO-d$_6$) δ 9.06 (s, 1H), 7.89 (s, 1H), 7.71 (s, 1H), 7.43 (d, J = 4.8 Hz, 1H), 4.06 (s, 1H), 3.89 (s, 1H), 3.85-3.79 (m, 1H), 3.77 (d, J = 3.6 Hz, 3H), 3.73-3.62 (m, 2H), 3.47 (d, J = 12.4 Hz, 1H), 3.41 (d, J = 10.6 Hz, 1H), 3.38-3.31 (m, 1H), 2.93 (d, J = 10.1 Hz, 1H), 2.63 (dd, J = 23.4, 18.8 Hz, 1H), 1.91 (s, 2H), 1.24 (d, J = 4.0 Hz, 3H). | 438 [M + 1] | +40 |

Example 92. Cis-2-(5-(5-chloro-2-((1-methyl-1H-pyrazol-4-yl)amino)pyrimidin-4-yl)-3a,6a-dimethyl-1-oxohexahydropyrrolo[3,4-c]pyrrol-2(1H)-yl)acetonitrile

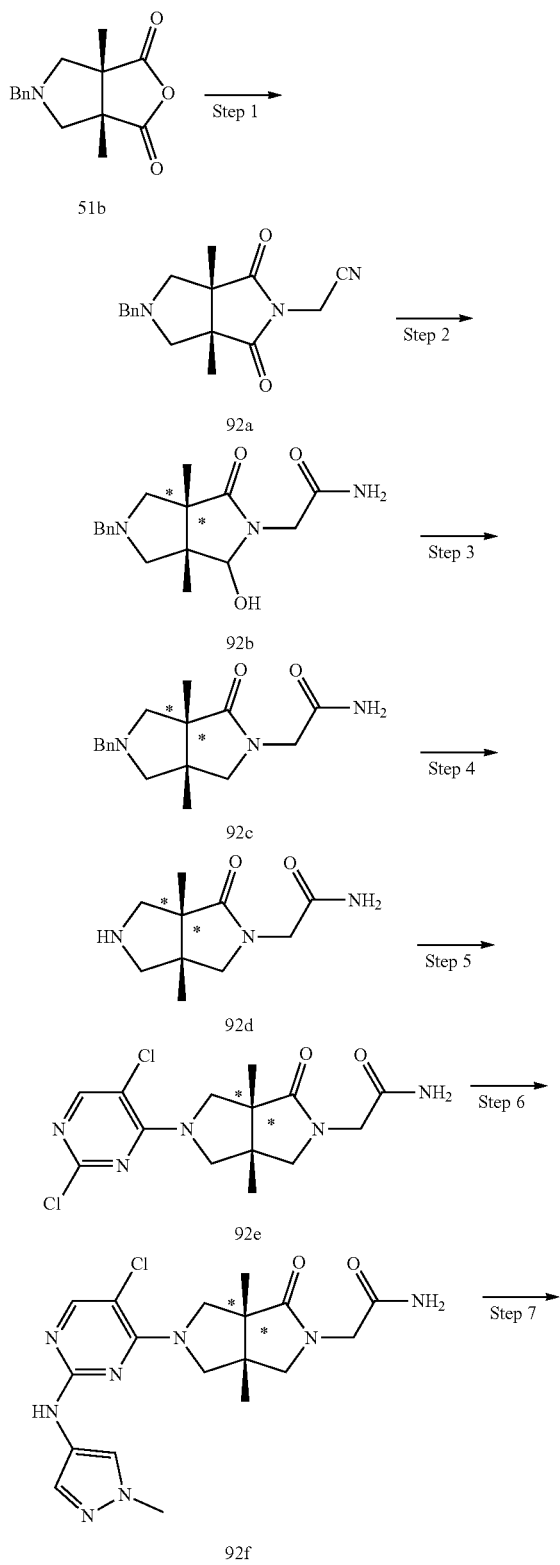

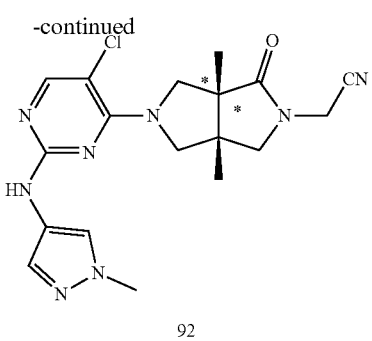

Step 1. 2-((3aR,6aS)-5-Benzyl-3a,6a-dimethyl-1,3-dioxohexahydropyrrolo[3,4-c]pyrrol-2(1H)-yl)acetonitrile (92a)

To a mixture of 51b (1.5 g, 5.4 mmol) and 2-aminoacetonitrile (500 mg, 5.4 mmol) in 1,2-dichloroethane (6 mL) was added TEA (1.6 g, 16.2 mmol). The resulting solution was heated to 60° C. and stirred for 12 h. After cooling to room temperature, the mixture was concentrated to dryness under vacuum and the residue was purified by prep-HPLC to give the title compound 92a (1 g, 62%).

MS m/z (ESI): 298 [M+1]

Step 2. Cis-2-(5-benzyl-1-hydroxy-3a,6a-dimethyl-3-oxohexahydropyrrolo[3,4-c]pyrrol-2(1H)-yl)acetamide (92b)

To a solution of 92a (800 mg, 2.7 mmol) in EtOH (10 mL) at 0° C. was added sodium borohydride (260 mg, 6.7 mmol). The mixture was heated to reflux for 12 h. After cooling to room temperature, the residue was concentrated to dryness under vacuum. The residue was diluted with $CH_2Cl_2$ (10 mL) and filtered. The filtrate was concentrated to dryness under vacuum to give the title compound 92b (900 mg). The crude product was used directly in next step without further purification.

MS m/z (ESI): 318 [M+1]

Step 3. Cis-2-(5-Benzyl-3a,6a-dimethyl-1-oxohexahydropyrrolo[3,4-c]pyrrol-2(1H)-yl)acetamide (92c)

To a solution of 92b (900 mg, crude product) in TFA (8 mL) was added triethylsilane (4 mL). The solution was heated to 120°C in a sealed tube and stirred for 48 h. After cooling to room temperature, the solution was concentrated to dryness under vacuum. The residue was purified by prep-HPLC to give the title compound 92c (130 mg, 16% over two steps).

MS m/z (ESI): 302 [M+1]

Step 4. Cis-2-(3a,6a-dimethyl-1-oxohexahydropyrrolo[3,4-c]pyrrol-2(1H)-yl)acetamide (92d)

To a solution of 92c (130 mg, 0.42 mmol) in MeOH (5 mL) was added 10% Pd/C (50 mg). The mixture was stirred under hydrogen for 3 h and then filtered. The filtrate was concentrated to dryness under vacuum to give the title compound 92d (90 mg, 100%).

MS m/z (ESI): 212 [M+1]

Step 5. Cis-2-(5-(2,5-dichloropyrimidin-4-yl)-3a,6a-dimethyl-1-oxohexahydropyrrolo[3,4-c]pyrrol-2 (1H)-yl)acetamide (92e)

A mixture of 92d (90 mg, 0.42 mmol), 2,4,5-trichloropyrimidine (91 mg, 0.5 mmol) and DIEA (0.3 mL) in MeCN (2 mL) was heated to 50° C. and stirred for 12 h. After cooling to room temperature, the mixture was concentrated to dryness under vacuum and the residue was purified by prep-HPLC to give the title compound 92e (150 mg, 99%).
MS m/z (ESI): 358 [M+1]

Step 6. Cis-2-(5-(5-chloro-2-((1-methyl-1H-pyrazol-4-yl)amino)pyrimidin-4-yl)-3a,6a-dimethyl-1-oxo-hexahydropyrrolo[3,4-c]pyrrol-2(1H)-yl)acetamide (92f)

A mixture of 92e (100 mg, 0.26 mmol), 1-methyl-1H-pyrazol-4-amine hydrochloride (40 mg, 0.29 mmol) and pTsOH (6 mg, 0.026 mmol) in isopropanol (4 mL) was heated to 120° C. and stirred for 1 h. After cooling to room temperature, the mixture was concentrated to dryness under vacuum to give the title compound 92f (150 mg). The crude product was used directly in the next step without further purification.
MS m/z (ESI): 419 [M+1]

Step 7. Cis-2-(5-(5-chloro-2-((1-methyl-1H-pyrazol-4-yl)amino)pyrimidin-4-yl)-3a,6a-dimethyl-1-oxo-hexahydropyrrolo[3,4-c]pyrrol-2(1H)-yl)acetonitrile (92)

A mixture of 92f (150 mg, crude product) in trichlorophosphorus oxide (2 mL) was heated to 100° C. for 12 h while stirring. After cooling to room temperature, the mixture was concentrated to dryness under vacuum and dissolved in MeCN (5 mL) to which was added slowly TEA until pH=7. The mixture was concentrated to dryness under vacuum and the residue was purified by prep-HPLC to give the title compound 92 (15 mg, solid, 14% over two steps).
MS m/z (ESI): 401 [M+1]
$^1$H NMR (400 MHz, DMSO-d$_6$) δ 9.11 (brs, 1H), 7.91 (s, 1H), 7.70 (s, 1H), 7.44 (s, 1H), 4.44 (s, 2H), 4.15 (d, J=11.4 Hz, 1H), 3.81 (d, J=11.8 Hz, 1H), 3.78 (s, 3H), 3.70 (d, J=11.8 Hz, 1H), 3.65 (d, J=12.1 Hz, 1H), 3.43 (d, J=10.0 Hz, 1H), 3.34 (d, J=4.8 Hz, 1H), 1.18 (s, 3H), 1.09 (s, 3H).

Example 93. ((3aR,6aS)-5-(5-chloro-2-((5-methylisoxazol-3-yl)amino)pyrimidin-4-yl)-3a,6a-dimethylhexahydropyrrolo[3,4-c]pyrrol-2(1H)-yl)(cyclopropyl)methanone

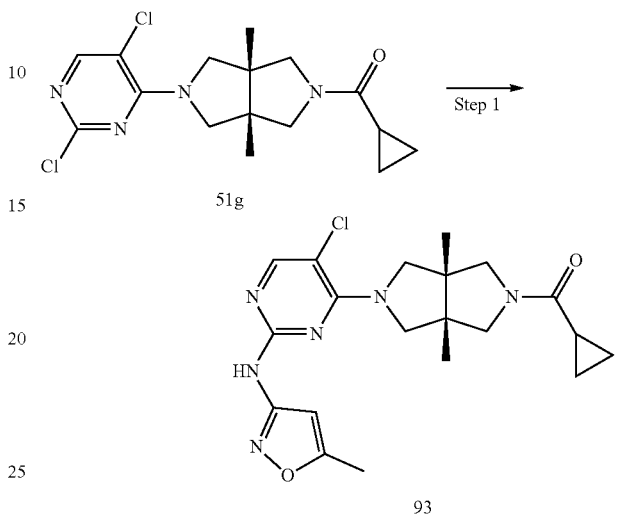

To a solution of 51 g (0.25 g, 0.71 mmol) and 5-methylisoxazol-3-amine (83 mg, 0.85 mmol) in isopropanol (6 mL) was added pTsOH (270 mg, 1.42 mmol). The mixture was stirred at 100° C. for 18 h and then cooled to room temperature. The mixture was concentrated to dryness under vacuum and the residue was purified by prep-HPLC to give the title compound 93 (51.3 mg, solid, 17%).
MS m/z (ESI): 417 [M+1]
$^1$H NMR (400 MHz, DMSO-d$_6$) δ 9.91 (s, 1H), 7.97 (s, 1H), 6.65 (s, 1H), 3.92-3.66 (m, 5H), 3.59 (d, J=10.7 Hz, 1H), 3.47 (d, J=12.3 Hz, 1H), 3.29 (d, J=12.5 Hz, 1H), 2.36 (s, 3H), 1.76-1.64 (m, 1H), 1.10 (d, J=12.9 Hz, 6H), 0.77-0.65 (m, 4H).

Example 94 and 95 were synthesized according to the procedure for Example 93 except that in Step 1, different compounds were used instead of 5-methylisoxazol-3-amine.

| Example | Compound replacing 5-methylisoxazole-3-amine | $^1$H NMR | MS m/z (ESI) |
|---|---|---|---|
| ((3aR,6aS)-5-(5-chloro-2-((1-methyl-1H-pyrazol-3-yl)amino)pyrimidin-4-yl)-3a,6a-dimethylhexahydropyrrolo[3,4-c]pyrrol-2(1H)-yl)(cyclopropyl)methanone (94) | 1-methyl-1H-pyrazol-3-amine | $^1$H NMR (400 MHz, DMSO-d$_6$) δ 9.31 (s, 1H), 7.90 (s, 1H), 7.51 (d, J = 2.1 Hz, 1H), 6.47 (d. J = 2.2 Hz, 1H), 3.92-3.65 (m, 8H), 3.59 (d, J = 10.7 Hz, 1H), 3.45 (d, J = 12.3 Hz, 1H), 3.31 (d, J = 4.9 Hz, 1H), 1.70 (dd, J = 12.0, 6.0 Hz, 1H), 1.10 (d, J = 13.2 Hz, 6H), 0.77-0.62 (m, 4H). | 416 [M + 1] |
| ((3aR,6aS)-5-(2-((1H-pyrazol-3-yl)amino)-5-chloropyrimidin-4-yl)-3a,6a-dimethylhexahydropyrrolo[3,4-c]pyrrol-2(1H)-yl)(cyclopropyl)methanone (95) | 1H-pyrazol-3-amine | $^1$H NMR (400 MHz, DMSO-d$_6$) δ 8.20 (d, J = 2.7 Hz, 1H), 8.12 (s, 1H), 5.78 (d, J = 2.7 Hz, 1H), 5.27 (s, 2H), 3.91 (t, J = 11.9 Hz, 2H), 3.78 (dd, J = 22.8, 10.7 Hz, 3H), 3.59 (d, J = 10.7 Hz, 1H), 3.47 (d, J = 12.3 Hz, 1H), 3.29 (d, J = 12.4 Hz, 1H), 1.71 (ddd, J = 12.7, 10.9, 6.9 Hz, 1H), 1.11 (d, J = 13.5 Hz, 6H), 0.71 (dd, J = 8.7, 4.8 Hz, 4H). | 402 [M + 1] |

Example 97. 3-((3aR,6aS)-5-(5-Methoxy-2-((1-methyl-1H-pyrazol-4-yl)amino)pyrimidin-4-yl)-3a,6a-dimethylhexahydropyrrolo[3,4-c]pyrrol-2(1H)-yl)-3-oxopropanenitrile

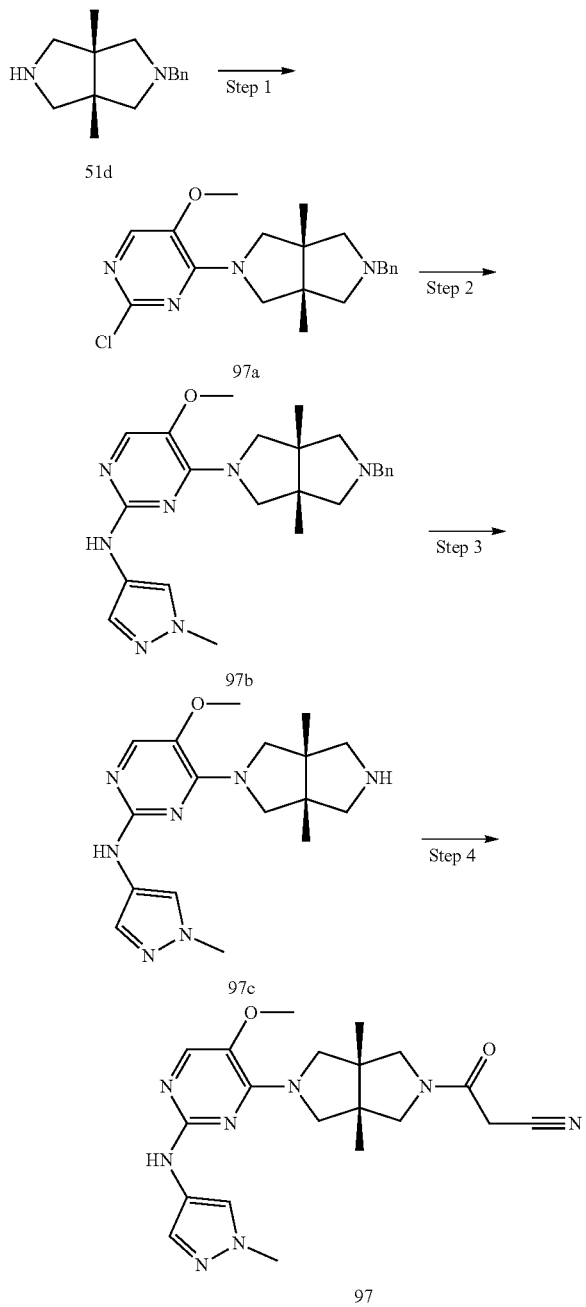

Step 1. (3aR,6aS)-2-Benzyl-5-(2-chloro-5-methoxypyrimidin-4-yl)-3a,6a-dimethyloctahydropyrrolo[3,4-c]pyrrole (97a)

To a solution of 51d (0.26 g, 1.13 mmol) in MeCN (10 mL) were added potassium carbonate (0.47 g, 3.39 mmol) and 2,4-dichloro-5-methoxypyrimidine (0.263 mg, 1.47 mmol). The mixture was stirred for 2 h and then concentrated to dryness under vacuum. The residue was purified by silica gel column chromatography (petroleum ether/ethyl acetate=100/0 to 0/100) to give the title compound 97a (70 mg, 20%).

MS m/z (ESI): 373 [M+1]

Step 2, 4-((3aR,6aS)-5-Benzyl-3a,6a-dimethylhexahydropyrrolo[3,4-c]pyrrol-2(1H)-yl)-5-methoxy-N-(1-methyl-1H-pyrazol-4-yl)pyrimidin-2-amine (97b)

A mixture of 97a (70 mg, 0.188 mmol), 1-methyl-1H-pyrazol-4-amine (27.3 mg, 0.182 mmol) and pTsOH (71.4 mg, 0.376 mmol) in n-butanol (5 mL) was stirred at 120° C. for 8 h. After cooling to room temperature, the mixture was concentrated to dryness under vacuum and the residue was purified by silica gel column chromatography ($CH_2Cl_{1-2}$/MeOH=9/1) to give the title compound 97b (70 mg, 86%).

MS m/z (ESI): 434 [M+1]

Step 3. 4-((3aR,6aS)-3a,6a-Dimethylhexahydropyrrolo[3,4-c]pyrrol-2(1H)-yl)-5-methoxy-N-(1-methyl-1H-pyrazol-4-yl)pyrimidin-2-amine (97c)

To a solution of 97b (70 mg, 0.16 mmol) in MeOH (5 mL) was added 10% Pd/C (34 mg, 0.32 mmol). The mixture was stirred under hydrogen for 3 h and then filtered. The filtrate was concentrated to dryness under vacuum to give the title compound 97c (50 mg, 91%).

MS m/z (ESI): 344 [M+1]

Step 4. 3-((3aR,6aS)-5-(5-Methoxy-2-((1-methyl-1H-pyrazol-4-yl)amino)pyrimidin-4-yl)-3a,6a-dimethylhexahydropyrrolo[3,4-c]pyrrol-2(1H)-yl)-3-oxopropanenitrile (97)

To a mixture of 97c (50 mg, 0.146 mmol), 2-cyanoacetic acid (25 mg, 0.292 mmol), DIEA (38 mg, 0.292 mmol) in DMF (1 mL) was added HATU (67 mg, 0.175 mmol). The mixture was stirred for 1 h and then purified by prep-HPLC to give the title compound 97 (31.9 mg, solid, 53%).

MS m/z (ESI): 411[M+1]

$^1$H NMR (400 MHz, DMSO-$d_6$) δ 8.56 (s, 1H), 7.70 (s, 1H), 7.67 (s, 1H), 7.41 (s, 1H), 3.91 (d, J=1.1 Hz, 2H), 3.82-3.71 (m, 5H), 3.66 (s, 3H), 3.63-3.52 (m, 3H), 3.47 (d, J=12.2 Hz, 1H), 3.39 (d, J=10.5 Hz, 1H), 3.31 (d, J=5.3 Hz, 1H), 1.07 (t, J=7.5 Hz, 6H).

Example 98. 3-((3aS,6aR)-5-(2-((1H-pyrazol-4-yl)amino)-5-chloropyrimidin-4-yl)-3a-methylhexahydropyrrolo[3,4-c]pyrrol-2(1H)-yl)-3-oxopropanenitrile

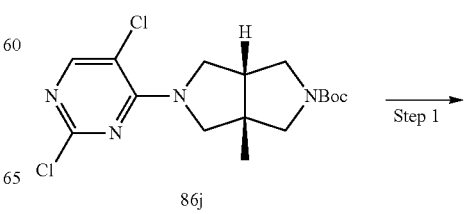

86j

J=15.7, 7.9 Hz, 1H), 3.29 (d, J=12.3 Hz, 1H), 2.57 (d, J=33.9 Hz, 1H), 1.21 (d, J=2.7 Hz, 3H).

Example 99. 3-((3aS,6aR)-5-(5-Chloro-2-((1-(methyl-d3)-1H-pyrazol-4-yl)amino)pyrimidin-4-yl)-3a-methylhexahydropyrrolo[3,4-c]pyrrol-2(1H)-yl)-3-oxopropanenitrile

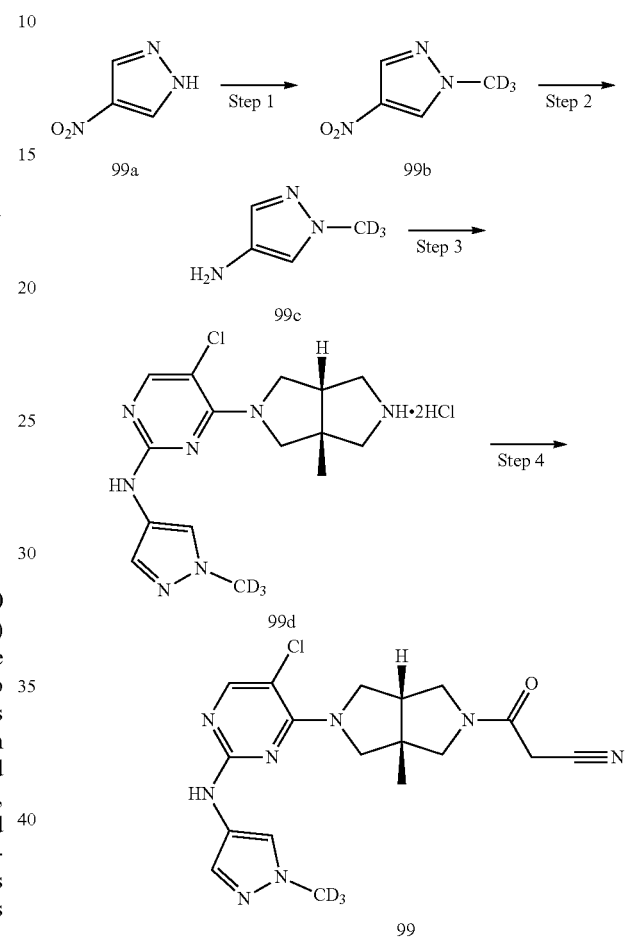

Step 1. 1-(Methyl-d$_3$)-4-nitro-1H-pyrazole (99b)

To a solution of 4-nitro-1H-pyrazol 99a (2.5 g, 22.11 mmol) in MeCN (20 mL) were added iodomethane-uh (3.85 g, 26.53 mmol) and potassium carbonate (4.58 g, 33.17 mmol). The mixture was heated to 70° C. and stirred for 12 h. After cooling to room temperature, the mixture was concentrated to dryness under vacuum. The residue was added with water (50 mL) and extracted with CH$_2$Cl$_2$ (3×50 mL). The combined organic phase was dried over anhydrous sodium sulfate, filtered and concentrated to dryness under vacuum. The residue was purified by silica gel column chromatography (petroleum ether/ethyl acetate=4/1) to give the title compound 99b (2.50 g, 87%).
MS m/z (ESI): 131 [M+1]

Step 2. 1-(Methyl-d$_3$)-1H-pyrazol-4-amine (99c)

To a solution of 99b (2.50 g, 19.2 mmol) in MeOH (30 mL) was added 10% Pd/C (0.5 g). The mixture was stirred

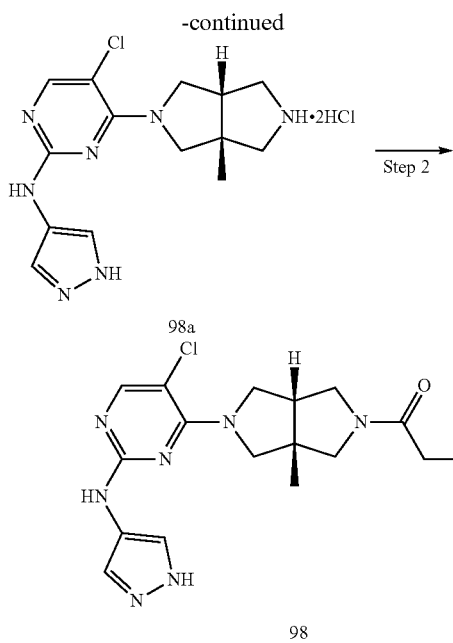

Step 1. 5-Chloro-4-((3aR,6aS)-3a-methylhexahydro-pyrrolo[3,4-c]pyrrol-2(1H)-yl)-N-(1H-pyrazol-4-yl)pyrimidin-2-amine dihydrochloride (98a)

To a solution of 86j (4.00 g, 10.72 mmol) in EtOH (50 mL) were added 1H-pyrazol-4-amine (1.16 g, 13.94 mmol) and pTsOH monohydrate (0.21 g, 1.07 mmol). The mixture was heated to 70° C. and stirred for 16 h. After cooling to room temperature, the mixture was concentrated to dryness under vacuum and added with a solution of HCl (10 N in ethanol, 50 mL). The mixture was heated to 50° C. and stirred for another 1 h. After cooling to room temperature, the mixture was concentrated to dryness under vacuum, and added with a mixture of methanol and 2-methoxy-2-methylpropane (60 mL, 1/1 v/v). The resulting mixture was stirred for 30 min and then filtered. The filter cake was collected and dried to give the title compound 98a (3.4 g, 81%) as an HCl salt.
MS m/z (ESI): 320 [M+1]

Step 2. 3-((3aS,6aR)-5-(2-((1H-pyrazol-4-yl)amino)-5-chloropyrimidin-4-yl)-3a-methylhexahydropyrrolo[3,4-c]pyrrol-2(1H)-yl)-3-oxopropanenitrile hemiformate (98)

To a solution of 98a (3.30 g, 8.40 mmol) in methanol (40 mL) were added ethyl cyanoacetate (1.90 g, 16.80 mmol) and 1,8-diazabicyclo[5.4.0]undec-7-ene (5.10 g, 33.60 mmol). The mixture was stirred for 5 h and concentrated to dryness under vacuum. The residue was purified by prep-HPLC to give the title compound 98 (1.04 g, solid, 30%) as a formic acid salt.
MS m/z (ESI): 387 [M+1]
Specific rotation [α]$_D^{20}$=−4.6°×dm$^2$/kg
$^1$H NMR (400 MHz, DMSO-d$_6$) δ 12.50 (s, 1.5H), 9.07 (s, 1H), 8.13 (s, 0.5H), 7.89 (s, 1H), 7.65 (s, 2H), 4.09-3.99 (m, 1H), 3.92 (d, J=2.7 Hz, 2H), 3.84 (dd, J=26.5, 11.3 Hz, 1H), 3.76-3.72 (m, 1H), 3.69 (d, J=11.1 Hz, 1H), 3.64 (dd, J=12.5, 7.3 Hz, 1H), 3.49 (dd, J=22.9, 11.3 Hz, 1H), 3.38 (dd, under hydrogen for 16 h and then filtered. The filtrate was concentrated to dryness under vacuum to give the title compound 99c (1.92 g, 100%).

MS m/z (ESI): 101 [M+1]

Step 3. 5-Chloro-N-(1-(methyl-<&>)-1H-pyrazol-4-yl)-4-((3aR,6aS)-3a-methylhexahydropyrrolo[3,4-c]pyrrol-2(1H)-yl)pyrimidin-2-amine dihydrochloride (99d)

To a solution of 86j (3.00 g, 8.04 mmol) in EtOH (50 mL) were added 99c (1.05 g, 10.45 mmol) and pTsOH monohydrate (0.15 g, 0.80 mmol). The mixture was heated to 70° C. and stirred for 8 h. After cooling to room temperature, the mixture was added with an ethanol solution of HCl (10 N, 50 mL). The mixture was heated to 50° C. again and stirred for 1 h. After cooling to room temperature, the mixture was concentrated to dryness under vacuum. The residue was added with a mixture of methanol and 2-methoxy-2-methylpropane (60 mL, 1/1 v/v). After stirring for 30 min, the mixture was filtered. The filter cake was collected and dried to give the title compound 99d (3.3 g, 100%) as an HCl salt.

MS m/z (ESI): 337 [M+1]

Step 4. 3-((3aS,6aR)-5-(5-Chloro-2-((1-(methyl-$d_3$)-1H-pyrazol-4-yl)amino)pyrimidin-4-yl)-3a-methylhexahydropyrrolo[3,4-c]pyrrol-2(1H)-yl)-3-oxopropanenitrile (99)

To a mixture of 99d (3.30 g, 8.05 mmol) in MeCN (35 mL) were added ethyl cyanoacetate (1.82 g, 16.10 mmol) and DBU (4.90 g, 32.2 mmol). The mixture was heated to 30° C. and stirred for 4 h. The mixture was concentrated to dryness under vacuum and then added with EtOH (20 mL). After stirring for 1 h, the mixture was filtered and the filter cake was collected to give the title compound 99 (2.60 g, solid, 80%).

MS m/z (ESI): 404 [M+1]

Specific rotation $[\alpha]_D^{20}=-7.2°\times dm^2/kg$ $^1$H NMR (400 MHz, DMSO-$d_6$) δ 9.07 (s, 1H), 7.89 (s, 1H), 7.71 (s, 1H), 7.44 (s, 1H), 4.03 (dd, J=11.2, 5.9 Hz, 1H), 3.93 (d, J=3.0 Hz, 2H), 3.84 (dd, J=18.6, 11.5 Hz, 1H), 3.73 (d, J=10.2 Hz, 1H), 3.69 (s, 1H), 3.64 (dd, J=12.1, 7.1 Hz, 1H), 3.49 (dd, J=27.8, 11.2 Hz, 1H), 3.42-3.33 (m, 1H), 3.33-3.24 (m, 1H), 2.57 (d, J=31.9 Hz, 1H), 1.20 (t, J=8.1 Hz, 3H).

Example 100. Trans-3-(5-(5-chloro-2-((1-methyl-1H-pyrazol-4-yl)amino)pyrimidin-4-yl)-3a-methylhexahydropyrrolo[3,4-C]pyrrol-2(1H)-yl)-3-oxopropanenitrile

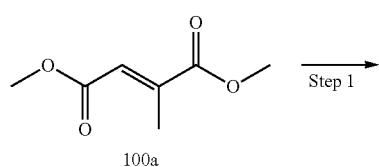

100a

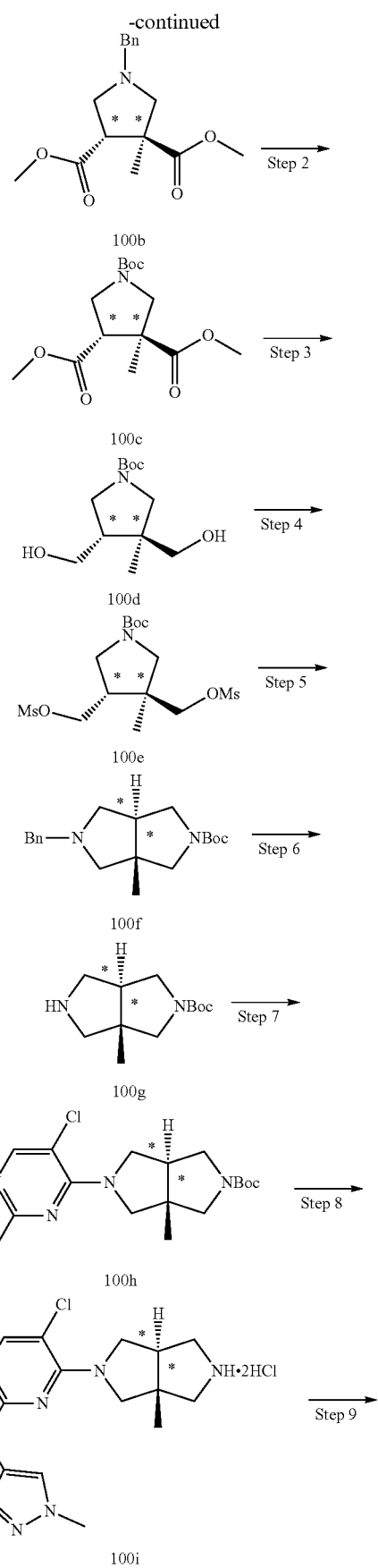

-continued

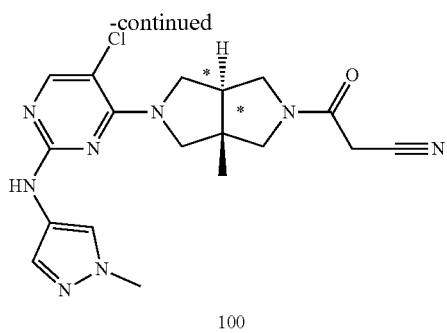

100

Step 1. Dimethyl trails-1-benzyl-3-methylpyrrolidine-3,4-dicarboxylate (100b)

To a mixture of dimethyl 2-methylfumarate 100a (9.63 g, 60.89 mmol) and TFA (0.69 g, 6.09 mmol) in $CH_2Cl_2$ (10 mL) at 0° C. was added slowly a solution of N-benzyl-1-methoxy-N-((trimethylsilyl)methyl)methanamine (17.35 g, 73.07 mmol) in $CHCl_2$ (200 mL). After addition, the resulting yellow solution was gradually warmed to room temperature within 16 h, and then added with a saturated sodium bicarbonate aqueous solution (200 mL) and $CH_2Cl_2$ (200 mL). The mixture was stirred for 15 min. The separated organic phase was washed with saturated brine, dried over anhydrous sodium sulfate and filtered. The filtrate was concentrated to dryness under vacuum to give a residue which was purified by silica gel column chromatography ($CH_2C_{1-2}$/MeOH=100/3) to give the title compound 100b (17.74 g, 100%).
MS m/z (ESI): 292 [M+1]

Step 2. 1-(Tert-butyl) 3,4-dimethyl trans-3-methylpyrrolidine-1,3,4-tricarboxylate (100c)

To a mixture of 100b (17.74 g, 60.79 mmol) and di-tert-butyl pyrocarbonate (14.62 g, 66.67 mmol) in MeOH (200 mL) was added 10% Pd/C (1.8 g). The resulting mixture was heated to 50° C. under hydrogen and stirred for 20 h. After cooling to room temperature, the mixture was filtered, and the filtrate was concentrated to dryness under vacuum. The residue was purified by silica gel column chromatography (petroleum ether/ethyl acetate=1/1) to give the title compound 100c (18.00 g, 98%).
MS m/z (ESI): 202 [M+1−100]

Step 3. Tert-butyl trans-3,4-bis(hydroxymethyl)-3-methylpyrrolidine-1-carboxylate (100d)

To a solution of 100c (18.00 g, 22.75 mmol) in THF (200 mL) at 0° C. was add a solution of lithium borohydride (2M in THF, 65 mL, 131.41 mmol). After stirring for 30 min, the mixture was gradually warmed to room temperature and stirred for additional 16 h. The mixture was cooled to 0° C. again and added slowly with 1 N HCl until the pH was 1. The resulting solution was extracted with $CH_2Cl_2$ (400 mL). The organic phase was washed with water and brine in sequence, dried it over anhydrous sodium sulfate and filtered. The filtrate was concentrated to dryness under vacuum and the residue was purified by silica gel column chromatography (petroleum ether/ethyl acetate=2/1) to give the title compound 100d (14.00 g, 96%).
MS m/z (ESI): 190 [M+1−56]

Step 4. Tert-butyl trans-3-methyl-3,4-bis(((methylsulfonyl)oxy)methy l)pyrrolidine-1-carboxylate (100c)

To a solution of 100d (14.00 g, 57.07 mmol) and DIEA (44.00 g, 342.41 mmol) in $CH_2Cl_2$ (200 mL) at 0° C. was added MsCl (20.00 g, 171.21 mmol) dropwise. The mixture was stirred for 1 h and then added with a saturated ammonium chloride aqueous solution (100 mL) and $CH_2Cl_2$ (200 mL). The mixture was stirred for 10 min and allowed to stand. The separated organic layer was washed with saturated brine and saturated sodium bicarbonate solution in sequence, dried over anhydrous sodium sulfate, filtered and concentrated to dryness under vacuum. The residue was purified by silica gel column chromatography (petroleum ether/ethyl acetate=10/1) to give the title compound 100e (8.00 g, 35%).
MS m/z (ESI): 346 [M+1−56]

Step 5. Tert-butyl trans-5-benzyl-3a-methylhexahydropyrrolo[3,4-c]pyrrole-2(1H)-carboxylate (100f)

A mixture of 100e (8.00 g, 19.93 mmol), TEA (12.10 g, 119.55 mmol) and benzyl amine (8.54 g, 79.72 mmol) in toluene (100 mL) was heated to reflux for 16 h. After cooling to room temperature, the reaction mixture was added with 1 N NaOH (100 mL) and saturated brine. The mixture was stirred for 10 min and the separated organic phase was dried over anhydrous sodium sulfate. After filtration, the filtrate was concentrated to dryness under vacuum and the residue was purified by silica gel column chromatography (petroleum ether/ethyl acetate=5/1) to give the title compound 100f (3.00 g, 48%).
MS m/z (ESI): 317 [M+1]

Step 6. Tert-butyl trans-3a-methylhexahydropyrrolo[3,4-c]pyrrole-2(1H)-carboxylate (100g)

To a solution of 100f (3.00 g, 9.48 mmol) in MeOH (100 mL) was added 20% Pd/C (0.6 g). The mixture was heated to 50° C. under hydrogen and stirred for 12 h. After cooling to room temperature, the mixture was filtered and the filtrate was concentrated to dryness under vacuum to give the title compound 100g (2.15 g, 100%).
MS m/z (ESI): 227 [M+1]

Step 7. Tert-butyl trans-5-(2,5-dichloropyrimidin-4-yl)-3a-methylhexahydropyrrolo[3,4-c]pyrrole-2(1H)-carboxylate (100b)

To a solution of 100g (2.15 g, 9.50 mmol) in ethyl acetate (40 mL) at 0° C. were added DIEA (1.47 g, 11.40 mmol) and 2,4,5-trichloropyrimidine (1.74 g, 9.50 mmol). The mixture was stirred for 1 h and then concentrated to dryness under vacuum. The residue was purified by silica gel column chromatography (petroleum ether/ethyl acetate=10/3) to give the title compound 100h (3.30 g, 93%).
MS m/z (ESI): 373 [M+1]

Step 8. Trans-5-chloro-N-(1-methyl-1H-pyrazol-4-yl)-4-(3a-methylhexahydropyrrolo[3,4-c]pyrrol-2(1H)-yl)pyrimidin-2-amine dihydrochloride (100i)

To a solution of 100b (3.30 g, 8.84 mmol) in ethanol (40 mL) were added 1-methyl-1H-pyrazol-4-amine hydrochloride (1.54 g, 11.49 mmol) and pTsOH monohydrate (0.17 g, 0.88 mmol). The mixture was heat to 70° C. and stirred for 16 h. After cooling to room temperature, the mixture was concentrated to dryness and added with a mixture of 2-methoxy-2-methylpropane and methanol (40 mL, 1/1 v/v). After stirring for 30 min, the mixture was filtered and the filter cake was collected to give the title compound 100i (3.15 g, 88%) as an HCl salt.

MS m/z (ESI): 334 [M+1]

Step 9. Trans-3-(5-(5-chloro-2-((1-methyl-1H-pyrazol-4-yl)amino)pyrimidin-4-yl)-3a-methylhexahydropyrrolo[3,4-c]pyrrol-2(1H)-yl)-3-oxopropanenitrile (100)

A mixture of 100i (2.00 g, 4.92 mmol) in acetonitrile (40 mL) were added ethyl 2-cyanoacetate (1.11 g, 9.84 mmol) and DBU (3.74 g, 24.60 mmol). The mixture was heated to 30° C. and stirred for 2 h. The mixture was concentrated to dryness, added with ethanol (30 mL) and stirred at room temperature for 1 h. The mixture was filtered, and the filer cake was collected to give the title compound 100 (1.15 g, solid, 58%).

MS m/z (ESI): 401 [M+1]

$^1$H NMR (400 MHz, DMSO-$d_6$) δ 9.10 (s, 1H), 7.90 (s, 1H), 7.70 (s, 1H), 7.46 (s, 1H), 4.00-3.90 (m, 3H), 3.78 (s, 3H), 3.69-3.47 (m, 4H), 3.42-3.33 (m, 1H), 3.28 (dd, J=11.9, 9.3 Hz, 1H), 3.09 (dd, J=20.0, 10.8 Hz, 1H), 2.40 (dd, J=24.7, 17.6 Hz, 1H), 0.94 (d, J=8.8 Hz, 3H).

Example 101. Biological Experiments

JAK2 Inhibition Assay

The effect of the compounds of the present invention on the enzymatic activity of JAK2 was assessed by detecting the substrate phosphorylation level in a kinase reaction using the HTRF kinase assay detection kit (Cisbio, Cat. No. 62TK0PEC).

The experimental method is generally described below:

A reaction buffer contained the following components: an enzyme reaction buffer (1×), 5 mM $MgCl_2$, 1 mM DTT and 0.01% Brij35 from the kit. A JAK2 kinase solution contained a human recombinant JAK2 protein (Carna Biosciences, 08-045) diluted in the reaction buffer to 0.15 ng/μL. A substrate reaction solution contained 2.5 μM ATP and 0.25 μM of a biotinylated tyrosine kinase substrate from the kit in the reaction buffer. A detection solution contained 0.1 ng/μL $Eu^{3+}$-labeled cage antibody (Cisbio, 61T66KLB) and 12.5 nM streptavidin-labeled XL665 (Cisbio, 610SAXLB) in the reaction buffer.

The test compound was dissolved in DMSO to 10 μM, followed by a serial 4-fold dilution with DMSO to a minimum concentration of 0.061 nM. Each concentration was further diluted 40-fold with the reaction buffer.

To a 384-well assay plate (Corning, 3674) were added 4 μL of compound solution and 2 μL of JAK2 kinase solution. The mixture was mixed and incubated at room temperature for 15 minutes, and then added with 4 μL of the substrate reaction solution. After further incubation at room temperature for 30 minutes, the reaction mixture was added with an equal volume of 10 μL detection solution and allowed to stand at room temperature for 30 minutes. An Envision plate reader (Perkin Elmer) was then used to measure the progress of the reaction at 620 nm and 665 nm. The ratio of absorbances at 665 nm and 620 nm was positively correlated with the degree of substrate phosphorylation, therefore the activity of JAK2 kinase was detected. In the experiment, the group without JAK2 kinase protein was treated as the 100% inhibition group, and the group with JAK2 kinase protein but not the test compound was treated as the 0% inhibition group. The percentage of inhibition on JAK2 kinase activity by the test compound was calculated using the following formula:

Percentage of inhibition=100−100*(ratio$_{compound}$−ratio$_{100\% \ inhibition}$)/(ratio$_{0\% \ inhibition}$−ratio$_{100\% \ inhibition}$)

The $IC_{50}$ value of the test compound was calculated from 8 concentration points using the XLfit software (ID Business Solutions Ltd., UK) by the following formula:

$Y$=Bottom+(Top−Bottom)/(1+10^((log $IC50$−$X$)×slope factor))

Where Y was the percentage of inhibition, X was the logarithm of the concentration of the test compound. Bottom was the bottom plateau value of the S-shaped curve, Top was the top plateau value of the S-shaped curve, and slope factor was the slope coefficient of the curve.

TYK2 Inhibition Assay

The effect of the compounds of the present invention on the enzymatic activity of TYK2 was assessed by detecting the substrate phosphorylation level in a kinase reaction using the HTRF kinase assay detection kit (Cisbio, Cat. No. 62TK0PEC).

The experimental method is generally described below:

A reaction buffer contained the following components: an enzyme reaction buffer (1×), 5 mM $MgCl_2$ mM DTT and 0.01% Brij35 from the kit. A TYK2 kinase solution contained human recombinant TYK2 protein (Carna Biosciences, 08-147) diluted in the reaction buffer to 0.25 ng/μL. A substrate reaction solution contained 11.25 μM ATP and 0.5 μM of a biotinylated tyrosine kinase substrate from the kit in the reaction buffer. A detection solution contained 0.1 ng/μL $Eu^{3+}$-labeled cage antibody (Cisbio, 61T66KLB) and 25 nM streptavidin-1 added XL665 (Cisbio, 610SAXLB) in the reaction buffer.

The test compound was dissolved in DMSO to 10 μM, followed by a serial 4-fold dilution with DMSO to a minimum concentration of 0.061 nM. Each concentration was further diluted 40-fold with the reaction buffer.

To a 384-well assay plate (Corning, 3674) were added 4 μL of compound solution and 2 μL of TYK2 kinase solution. The mixture was mixed and incubated at room temperature for 15 minutes, and then added with 4 μL of the substrate reaction solution. After further incubation at room temperature for 40 minutes, the reaction mixture was added with an equal volume of 10 μL detection solution and allowed to stand at room temperature for 30 minutes. An Envision plate reader (Perkin Elmer) was then used to measure the progress of the reaction at 620 nm and 665 nm. The ratio of absorbances at 665 nm and 620 nm was positively correlated with the degree of substrate phosphorylation, therefore the activity of TYK2 kinase was detected. In the experiment, the group without TYK2 kinase protein was treated as the 100% inhibition group, and the group with TYK2 kinase protein but not the test compound was treated as the 0% inhibition group. The percentage of inhibition on TYK2 kinase activity by the test, compound was calculated using the following formula:

Percentage of inhibition=100−100*(ratio$_{compound}$−ratio$_{100\% \ inhibition}$)/(ratio$_{0\% \ inhibition}$−ratio$_{100\% \ inhibition}$)

The IC50 value of the test compound was calculated from 8 concentration points using the XLfit software (ID Business Solutions Ltd., UK) by the following formula:

$Y$=Bottom+(Top−Bottom)/(1+10^((log $IC50$−$X$)slope factor))

Where Y was the percentage of inhibition, X was the logarithm of the concentration of the test compound, Bottom was the bottom plateau value of the S-shaped curve, Top was the top plateau value of the S-shaped curve, and slope factor was the slope coefficient of the curve.

| Compound No. | IC$_{50}$ (nM) JAK2 | IC$_{50}$ (nM) TYK2 |
| --- | --- | --- |
| 1. | 319 | 125 |
| 2. | 478 | 62 |
| 3. | 113 | 23 |
| 4. | 126 | 49 |
| 5. | 82 | 75 |
| 6. | 113 | 127 |
| 7. | 138 | 186 |
| 8. | 25 | 66 |
| 9. | 38 | 13 |
| 10. | 15 | 2.4 |
| 11. | 137 | 21 |
| 12. | 4.2 | 1.1 |
| 13. | 170 | 8.5 |
| 14. | 68 | 14 |
| 15. | 551 | 186 |
| 16. | 0.9 | 1.2 |
| 17. | 3.2 | 1.6 |
| 18. | 3.5 | 1.6 |
| 19. | 8.8 | 14 |
| 20. | 1.2 | 0.5 |
| 21. | 10 | 2.0 |
| 22. | 1.4 | 0.8 |
| 23. | 3.0 | 1.0 |
| 24. | 20 | 4.1 |
| 25. | 0.9 | 0.3 |
| 26. | 10 | 6.1 |
| 27. | 15 | 16 |
| 28. | 0.4 | 0.2 |
| 29. | 0.5 | 0.4 |
| 30. | 4.6 | 1.4 |
| 31. | 0.4 | 0.5 |
| 32. | 1.0 | 0.5 |
| 33. | 6.2 | 2.9 |
| 34. | 1.8 | 0.6 |
| 35. | 3.3 | 0.6 |
| 36. | 4.1 | 1.8 |
| 37. | 15 | 12 |
| 38. | 50 | 43 |
| 39. | 11 | 4.4 |
| 40. | 1.2 | 0.4 |
| 41. | 1.7 | 1.3 |
| 42. | 20 | 5.7 |
| 43. | 18 | 4.5 |
| 44. | 20 | 8.6 |
| 45. | 19 | 12 |
| 46. | 3.9 | 0.9 |
| 47. | 51 | 13 |
| 48. | 2.5 | 0.7 |
| 49. | 71 | 52 |
| 50. | 0.1 | 0.3 |
| 51. | 7.3 | 2.7 |
| 52. | 1.8 | 0.9 |
| 53. | 3.8 | 3.2 |
| 54. | 0.9 | 0.2 |
| 55. | 3.7 | 1.7 |
| 56. | 2.5 | 1.7 |
| 57. | 3.2 | 2.3 |
| 58. | 6.5 | 5.6 |
| 59. | 5.1 | 5.0 |
| 60. | 5.9 | 2.2 |
| 61. | 8.9 | 1.6 |
| 62. | 2.6 | 0.6 |
| 63. | 1.2 | 0.3 |
| 64. | 3.3 | 0.5 |
| 65. | 1.3 | 0.5 |
| 66. | 0.3 | 0.2 |
| 67. | 2.2 | 6.0 |
| 68. | 31 | 1.4 |
| 69. | 156 | 98 |
| 70. | 17 | 5.3 |
| 71. | 3.3 | 1.2 |
| 72. | 4.5 | 3.4 |
| 73. | 6.0 | 3.3 |
| 74. | 2.4 | 1.6 |
| 75. | 325 | 98 |
| 76. | 475 | 149 |
| 77. | 136 | 30 |
| 78. | 7.6 | 4.2 |
| 79. | 40 | 51 |
| 80. | 16 | 19 |
| 81. | 16 | 50 |
| 82. | 14 | 16 |
| 83. | 13 | 7.4 |
| 84. | 477 | 186 |
| 85. | 1.7 | 2.4 |
| 86. | 1.7 | 0.3 |
| 87. | 9.0 | 6.0 |
| 88. | 0.5 | 0.2 |
| 89. | 4.5 | 2.6 |
| 90. | 0.6 | 0.1 |
| 91. | 2.6 | 3.2 |
| 92. | 4.1 | 1.1 |
| 93. | 91 | 158 |
| 94. | 34 | 224 |
| 95. | 19 | 42 |
| 96. | 3.0 | 3.4 |
| 97. | 8.1 | 56 |
| 98. | 0.7 | 0.1 |
| 99. | 0.5 | 0.1 |
| 100. | 5.0 | 2.2 |

The compounds of the present invention have a significant inhibitory effect on the activity of TYK2, preferably with an IC$_{50}$ of 10 to 100 nM, and more preferably with an IC$_{50}$ of less than 10 nM.

Inhibition of IL-12-induced IFN-γ Secretion in NK92 Cells

The effect of the compounds of the present invention on IFN-γ secretion induced by IL-12 in NK92 cells was evaluated by an enzyme-linked immunosorbent assay (ELISA).

IL-12 receptor is mainly expressed in activated T-cells, NK cells (NK92 is a NK cell line), DC cells, and B-cells. When binding to IL-12, it activates JAK2/TYK2 signal transduction pathway within NK cells and T lymphocytes, thereby inducing secretion of IFN-γ.

The experimental method is generally described below:

The test compound was dissolved in DMSO to 2.5 mM, followed by a serial 4-fold dilution with DMSO to a minimum concentration of 0.31 μM. Each concentration was further diluted 50-fold with an FBS-free MEMα medium (Gibco, 12561-056).

NK92 cells (Nanjing Cobioer, CBP60980) were cultured in a complete MEMα medium containing 12.5% FBS (Ausbian, VS500T), 12.5% horse serum (Gibco, 16050-122), 0.02 mM folic acid (Sigma, F8758), 0.2 mM inositol (Sigma, 17850), 0.55 mM β-mercaptoethanol (Gibco, 21985-023), 200 U/mL IL-2 (R&D Systems, 202-1L), and 100 U/mL penicillin (Thermofisher, 15140122). When covering 80-90% of the culture container surface, the cells were dispersed and plated on a 96-well plate (Thermofisher, 167425) with 100,000 cells per well (80 μL of the complete MEMα medium without IL-2). The 96-well plate was then incubated overnight in a 37° C./5% CO2 incubator.

After overnight incubation, 10 μL of the test compound and 10 μL of 50 ng/mL IL-12 (R & D Systems, 219-1L) were added to each well and mix gently, and the 96-well plate was incubated in the 37° C./5% CO2 incubator for additional 24 hours. The plate as centrifuged at 800 rpm for 10 minutes at room temperature and 50 μL of the supernatant from each well was transferred to another 96-well plate (Sigma, CLS3695) coated with anti-IFN-γ antibody. The amount of IFN-γ secretion was detected following the instruction from the Human IFN-γ DuoSet ELISA kit (R & D Systems, DY285B). In the experiment, the group with IL-12 and the test compound being replaced with the MEMα medium was the non-stimulated control group (100% inhibition), and the group with IL-12 and 0.2% DMSO was the stimulated group (0% inhibition). The percentage of inhibition on IL-12 induced IFN-γ secretion in NK-92 cells by the test compound was calculated using the following formula:

Percentage of inhibition=100−100*(signal$_{compound}$−signal$_{non-stimulated\ control}$)/(signal$_{stimulated\ control}$−signal$_{non-stimulated\ control}$)

The IC$_{50}$ value of the test compound was calculated front 8 concentration points using the XLfit software (ID Business Solutions Ltd., UK) by the following formula:

$Y$=Bottom+(Top−Bottom)/(1+10^((log $IC50$−$X$)×slope factor))

Where Y was the percentage of inhibition, X was the logarithm of the concentration of the test compound, Bottom was the bottom plateau value of the S-shaped curve, Top was the top plateau value of the S-shaped curve, and slope factor was the slope coefficient of the curve.

| Compound No. | IC$_{50}$ (NK92_IL12/IFNγ) (nM) |
|---|---|
| 10 | 3795 |
| 11 | 6773 |
| 12 | 419 |
| 13 | 4144 |
| 14 | 1317 |
| 16 | 1007 |
| 17 | 1046 |
| 18 | 617 |
| 19 | 713 |
| 20 | 233 |
| 21 | 490 |
| 22 | 305 |
| 23 | 551 |
| 24 | 1069 |
| 25 | 399 |
| 26 | 652 |
| 27 | 847 |
| 28 | 2210 |
| 29 | 380 |
| 30 | 1211 |
| 31 | 2783 |
| 32 | 668 |
| 33 | 215 |
| 34 | 287 |
| 35 | 453 |
| 36 | 592 |
| 37 | 2098 |
| 39 | 919 |
| 40 | 422 |
| 41 | 635 |
| 42 | 3468 |
| 43 | 3387 |
| 44 | 3615 |
| 45 | 5393 |
| 46 | 591 |
| 47 | 7919 |
| 48 | 709 |
| 50 | 43 |
| 51 | 597 |
| 52 | 289 |
| 53 | 918 |

-continued

| Compound No. | IC$_{50}$ (NK92_IL12/IFNγ) (nM) |
|---|---|
| 54 | 934 |
| 55 | 413 |
| 56 | 505 |
| 57 | 5242 |
| 58 | 564 |
| 59 | 2392 |
| 60 | 1384 |
| 61 | 578 |
| 62 | 269 |
| 63 | 267 |
| 64 | 162 |
| 65 | 136 |
| 66 | 66 |
| 67 | 291 |
| 68 | 330 |
| 69 | 7063 |
| 70 | 1199 |
| 71 | 3540 |
| 72 | 824 |
| 73 | 278 |
| 74 | 209 |
| 78 | 2756 |
| 79 | 3967 |
| 80 | 4090 |
| 81 | 3971 |
| 82 | 2870 |
| 83 | 4552 |
| 84 | 8747 |
| 85 | 5349 |
| 86 | 99 |
| 87 | 959 |
| 88 | 67 |
| 89 | 729 |
| 90 | 96 |
| 91 | 388 |
| 92 | 398 |
| 95 | 5852 |
| 96 | 646 |
| 98 | 516 |
| 99 | 158 |
| 100 | 763 |

The compounds of the present invention have a significant inhibitory effect on IFN-γ secretion induced by IL-12 in NK92 cells, and the IC50 is preferably less than 1000 nM.

What is claimed is:
1. A compound of Formula (I), or a pharmaceutical acceptable salt, stable isotope, stereoisomer thereof:

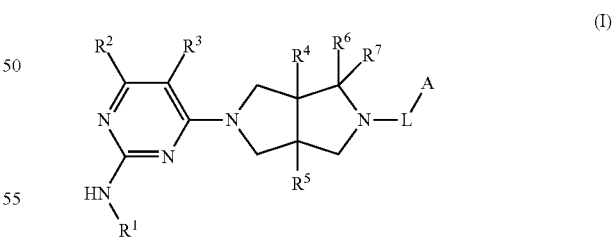

(I)

wherein:
R$^1$ is aryl or heteroaryl, where one or more hydrogens of the aryl and heteroaryl are optionally substituted by D, halogen, cyano, —OR$^b$, —NR$^b$R$^c$, —COOR$^b$, —C(O)R$^b$, —NR$^b$C(O)R$^c$, —C(O)NR$^b$R$^c$, —S(O)$_2$R$^b$, —S(O)$_2$ NR$^b$R$^c$, —S(O)(NR$^b$)R$^c$, —P(O)(CH$_3$)$_2$, C$_{1-6}$ alkyl, C$_{3-6}$ cycloalkyl, 3- to 8-membered heterocyclyl or 5- to 6-membered heteroaryl;
R$^2$ is H, D or —NHR$^a$;

R³ is H, D, halogen, cyano, C₁₋₆ alkyl, C₃₋₆ cycloalkyl or OC₁₋₆ alkyl, where one or more hydrogens of the alkyl and cycloalkyl are optionally substituted by D or F;

R⁴ and R⁵ are independently selected from H, D, halogen, C₁₋₆ alkyl or OC₁₋₆ alkyl, where one or more hydrogens of the alkyl are optionally substituted by D or F;

R⁶ and R⁷ are independently selected from H, D, cyano or C₁₋₆ alkyl, where one or more hydrogens of the alkyl is optionally substituted by D or F, or R⁶ and R⁷ combine as oxo;

L is a bond, C₁₋₆ alkylene, —C(O)—, —C(O)O—, —C(O)N(Rᵃ)—, —S(O)₂— or —S(O)₂N(Rᵃ)—;

A is H, C₁₋₆ alkyl, C₃₋₆ cycloalkyl, 3- to 8-membered heterocyclyl, aryl or heteroaryl, where one or more hydrogens of the alkyl, cycloalkyl, heterocyclyl, aryl and heteroaryl are optionally substituted by D, halogen, cyano, —ORᵈ, —NRᵈRᵉ, C₁₋₆ alkyl, C₃₋₆ cycloalkyl or 3- to 8-membered heterocyclyl;

Rᵃ is H, C₁₋₆ alkyl or C₃₋₆ cycloalkyl, where one or more hydrogens of the alkyl and cycloalkyl are optionally substituted by D or F;

Rᵇ and Rᶜ are independently selected from H, C₁₋₆ alkyl, C₃₋₆ cycloalkyl or 3- to 8-membered heterocyclyl containing N and/or O, where one or more hydrogens of the alkyl, cycloalkyl and heterocyclyl are optionally further substituted by D, halogen, CN, —OH, —NH₂, C₁₋₆ alkyl and —OC₁₋₆ alkyl, and Rᵈ and Rᵉ are independently selected from H, C₁₋₆ alkyl, C₃₋₆ cycloalkyl or 3- to 8-membered heterocyclyl, where one or more hydrogens of the alkyl, cycloalkyl and heterocyclyl are optionally further substituted by D or F.

2. The compound of claim 1, which is a compound of Formula (II), or a pharmaceutical acceptable salt, stable isotope, stereoisomer thereof:

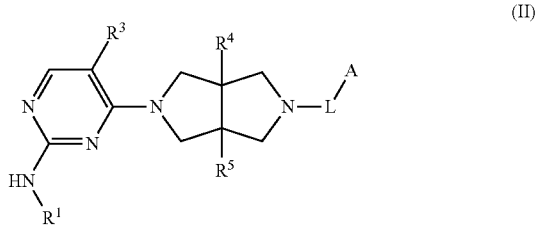

(II)

wherein:

R¹ is phenyl, pyridyl or pyrazolyl, where one or more hydrogens of the phenyl, pyridyl and pyrazolyl are optionally substituted by halogen, C₁₋₆ alkyl, 4- to 6-membered heterocyclyl containing N and/or O, —C(O)Rᵇ or —C(O)NRᵇRᶜ, and one or more hydrogens of the alkyl and heterocyclyl are optionally further substituted by D, F, CN, —OH or C₁₋₆ alkyl;

Rᵇ and Rᶜ are independently selected from H, C₁₋₆ alkyl, C₃₋₆ cycloalkyl or 4- to 6-membered heterocyclyl containing N and/or O, where one or more hydrogens of the alkyl, cycloalkyl and heterocyclyl are optionally further substituted by C₁₋₂ alkyl;

R³ is H, halogen, cyano, C₁₋₆ alkyl or OC₁₋₆ alkyl;

R⁴ and R⁵ are independently H or C₁₋₆ alkyl;

L is a bond, C₁₋₆ alkylene, —C(O)—, —C(O)O—, —C(O)NH— or —S(O)₂—, and

A is C₁₋₆ alkyl, C₃₋₆ cycloalkyl, 4- to 6-membered heterocyclyl containing N and/or O, pyridyl, pyrimidyl or 5-membered heteroaryl, where one or more hydrogens of the alkyl and cycloalkyl are optionally substituted by D, halogen, cyano, —OH, —OC₁₋₂ alkyl or C₁₋₂ alkyl, and those of the heterocyclyl and heteroaryl are optionally substituted by C₁₋₂ alkyl.

3. The compound of claim 1, wherein R¹ is pyrazolyl.

4. The compound of claim 1, wherein L is —C(O)—.

5. The compound of claim 1, wherein A is C₁₋₆ alkyl or C₃₋₆ cycloalkyl, where one or more hydrogens of the alkyl and cycloalkyl are optionally substituted by halogen, cyano, —OH or —OC₁₋₂ alkyl.

6. The compound of claim 2, which is a compound of Formula (III), or a pharmaceutical acceptable salt, stable isotope, stereoisomer thereof:

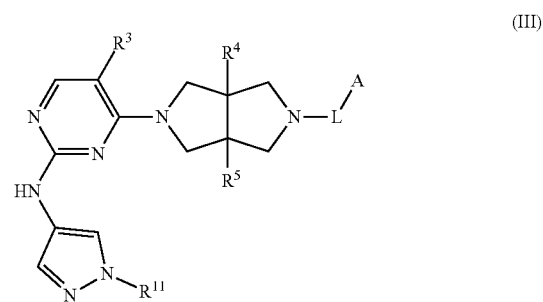

(III)

where:

R³ is H, halogen, cyano, C₁₋₆ alkyl, or OC₁₋₆ alkyl;

R⁴ and R⁵ are independently H or C₁₋₆ alkyl;

L is a bond, C₁₋₆ alkylene, —C(O)—, —C(O)O—, —C(O)NH—, or —S(O)₂—;

A is C₁₋₆ alkyl, C₃₋₆ cycloalkyl, 4- to 6-membered heterocyclyl containing N and/or O pyridyl, pyrimidyl, or 5-membered heteroaryl, where one or more hydrogens of the alkyl and cycloalkyl are optionally substituted by D, halogen, cyano, —OH, —OC₁₋₂ alkyl or C₁₋₂ alkyl, and one or more hydrogens of the heterocyclyl and heteroaryl are optionally substituted by C₁₋₂ alkyl, and R¹¹ is H, C₁₋₆ alkyl or 4- to 6-membered heterocyclyl containing N and/or O, where one or more hydrogens of the alkyl and heterocyclyl are optionally substituted by D, F, CN, —OH or C₁₋₆ alkyl.

7. The compound of claim 6, wherein A is C₁₋₆ alkyl or C₃₋₆ cycloalkyl, where one or more hydrogens of the alkyl and cycloalkyl are optionally substituted by halogen, cyano, —OH or —OC₁₋₂ alkyl.

8. The compound of claim 6, wherein R¹¹ is C₁₋₆ alkyl, wherein one or more hydrogens of the alkyl are optionally substituted by D, F, CN, —OH, or C₁₋₆ alkyl.

9. The compound according to claim 1, or a pharmaceutical acceptable salt, stable isotope, stereoisomer thereof, the compound structure is shown below:

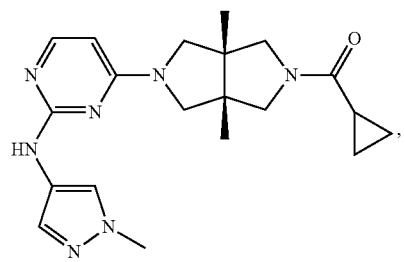

159
-continued
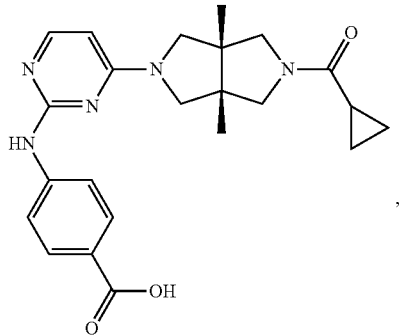
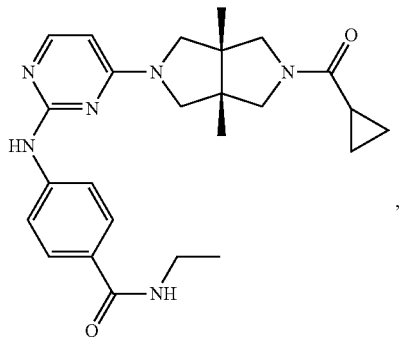
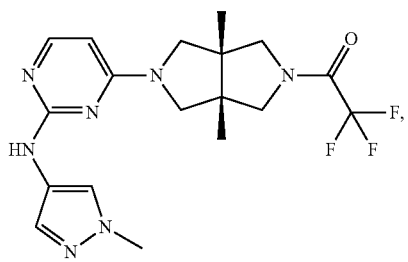
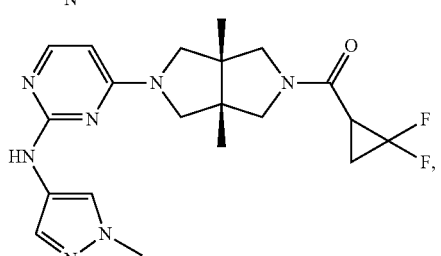
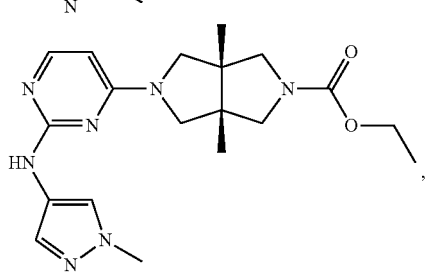
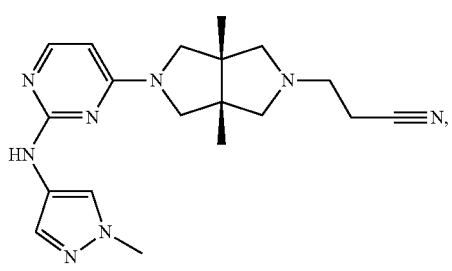
160
-continued
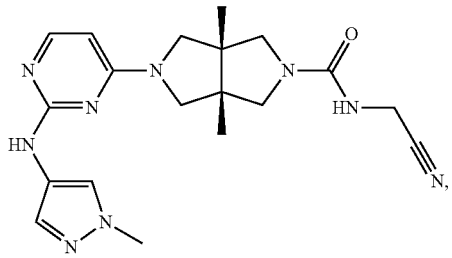
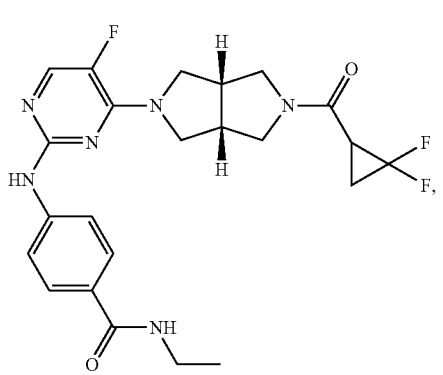
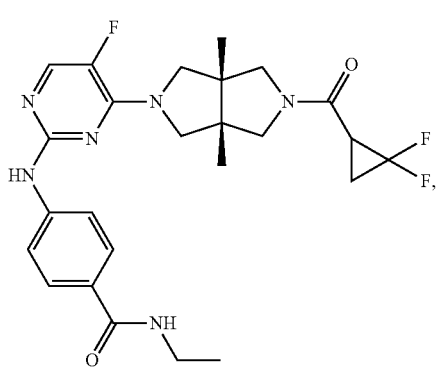
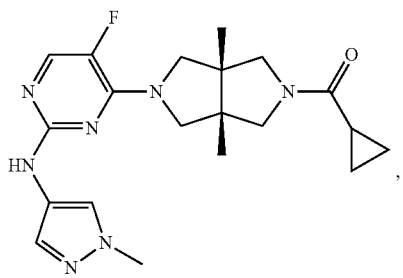
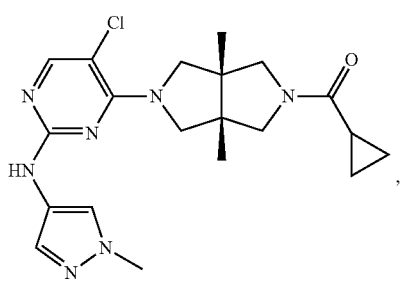

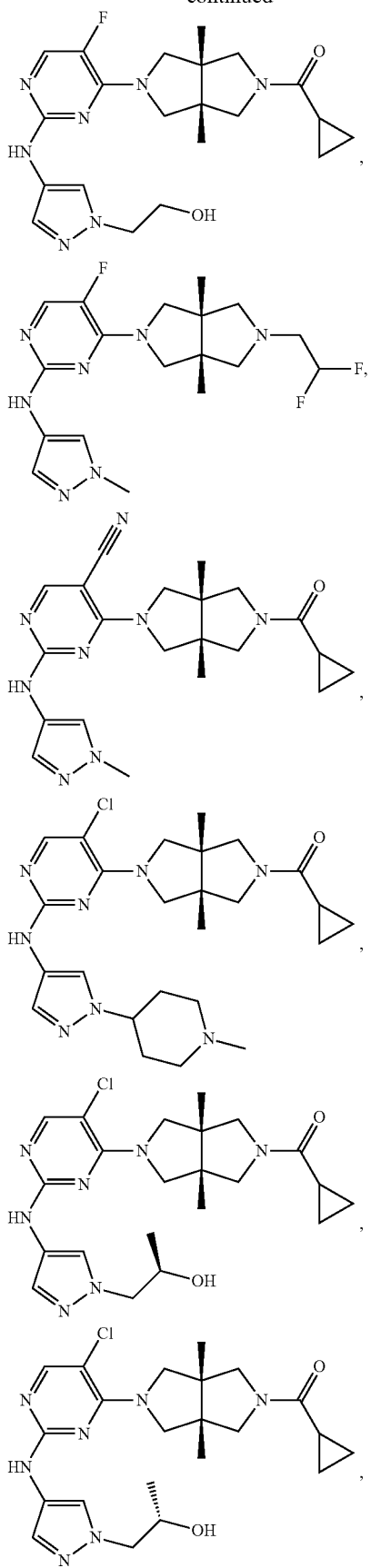
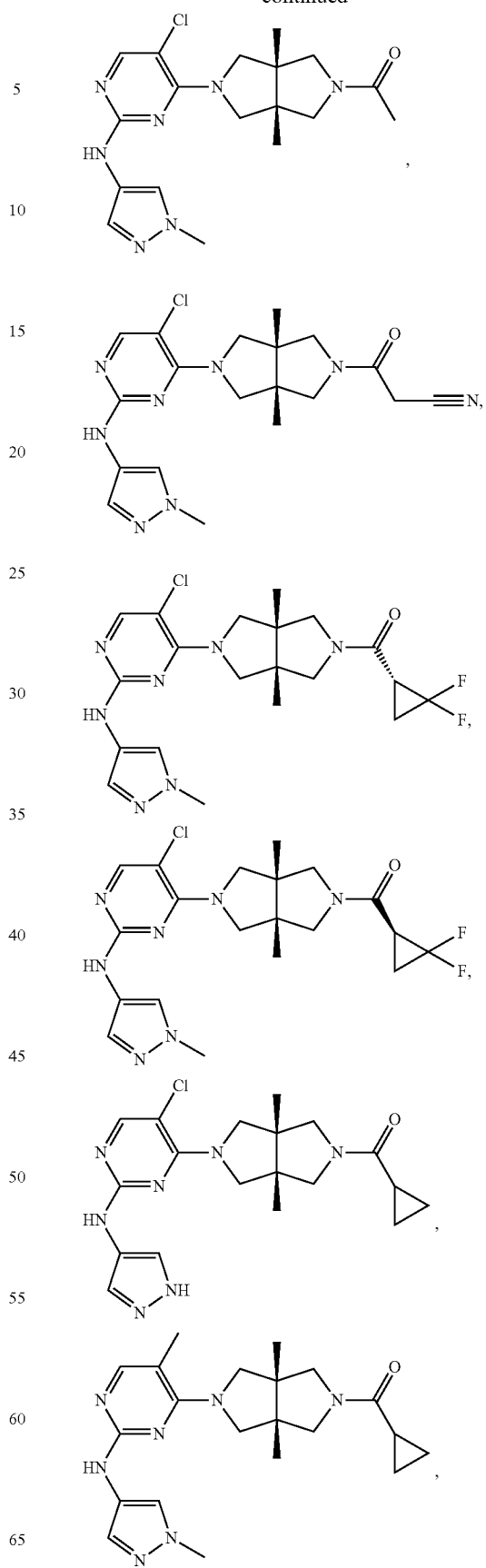

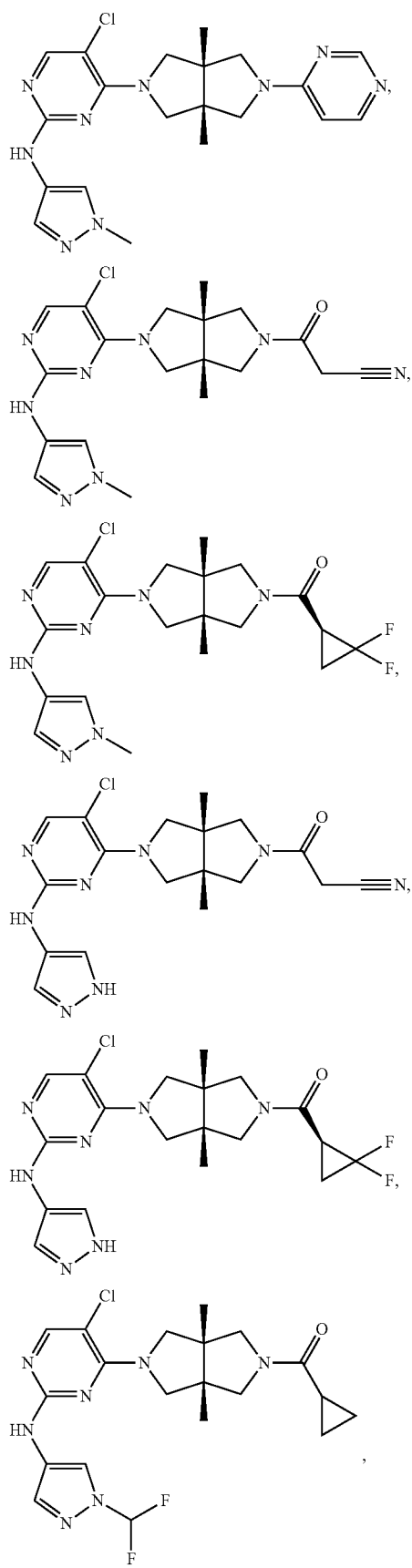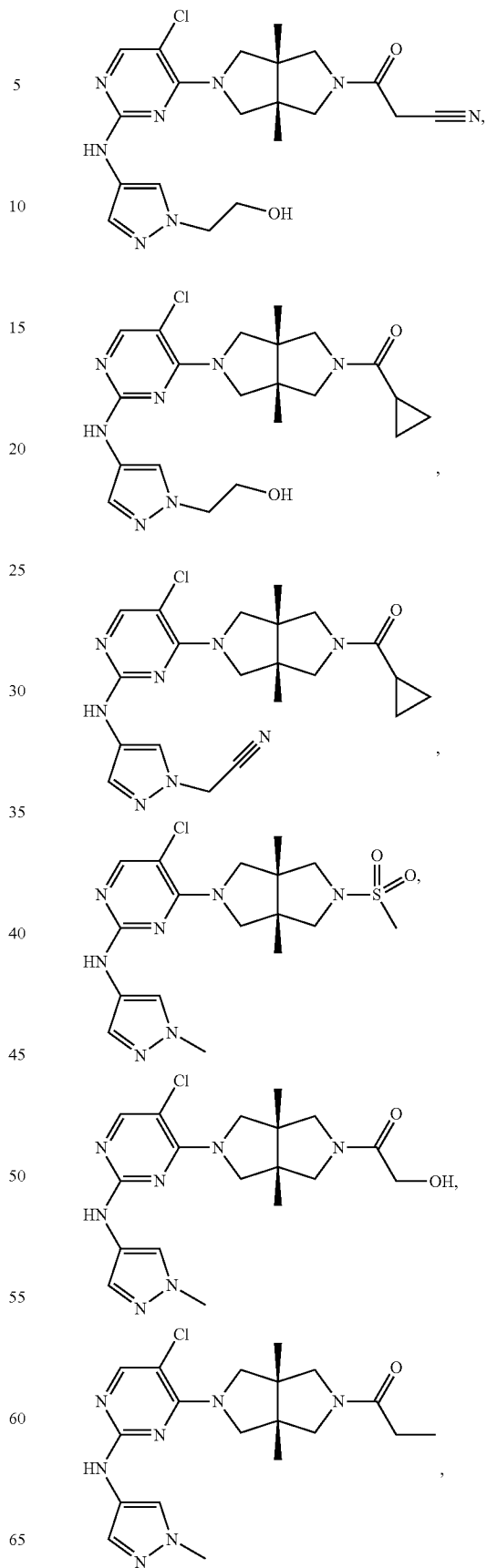

165
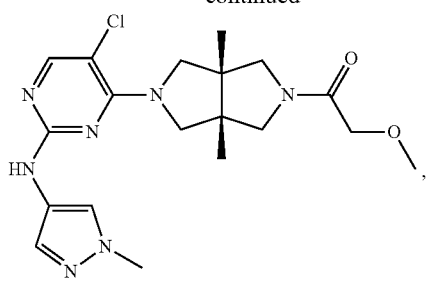
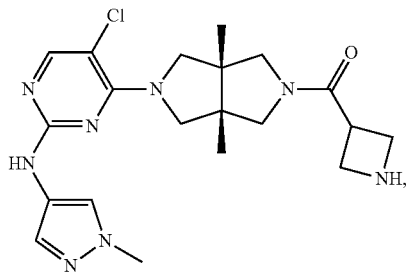
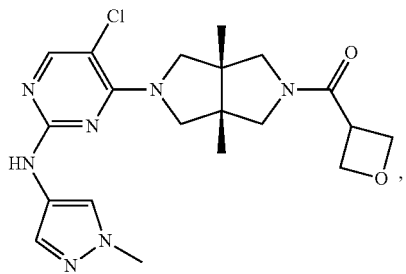
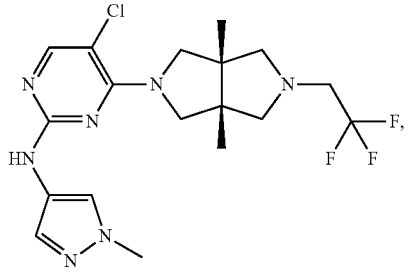
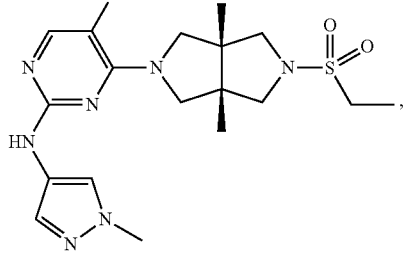
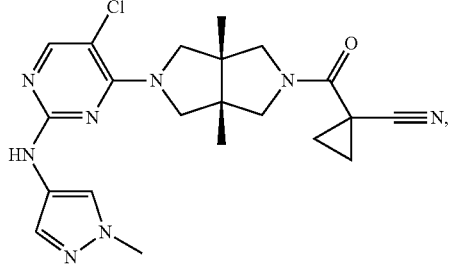
166
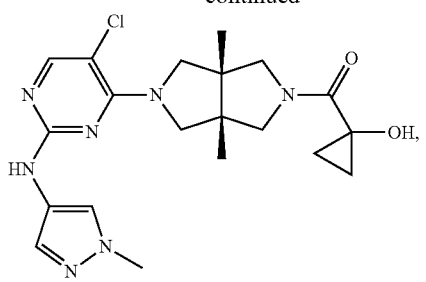
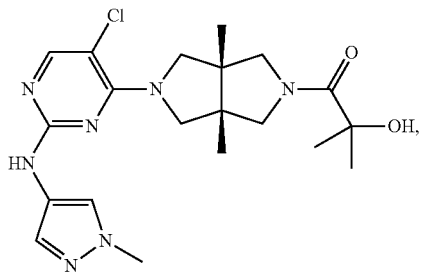
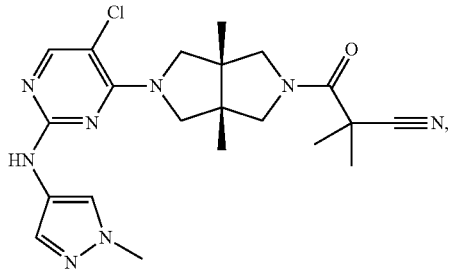
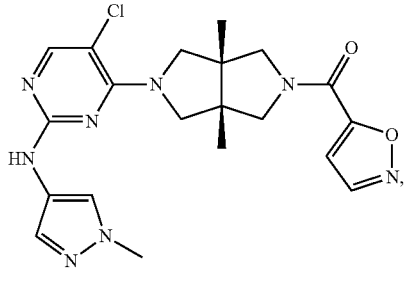
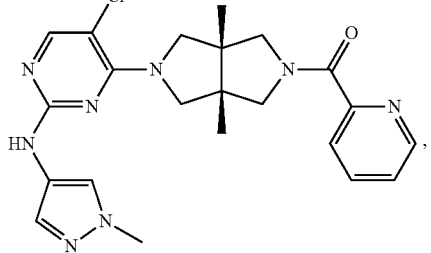
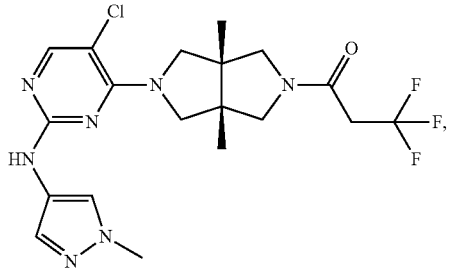

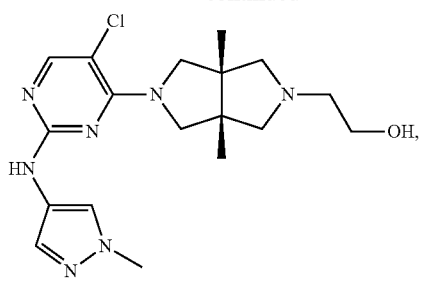
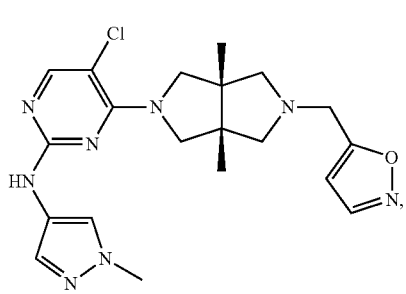
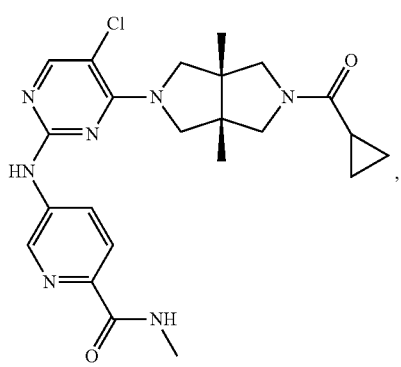
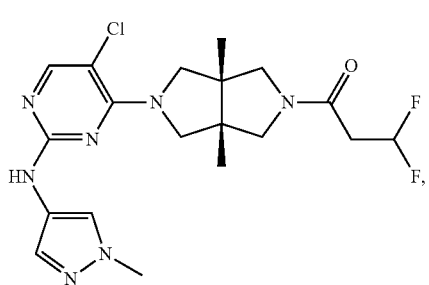
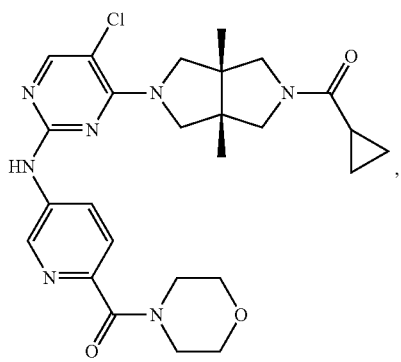
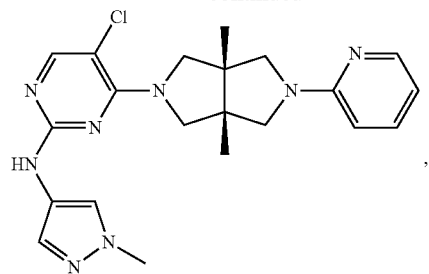
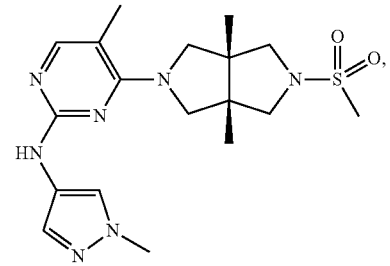
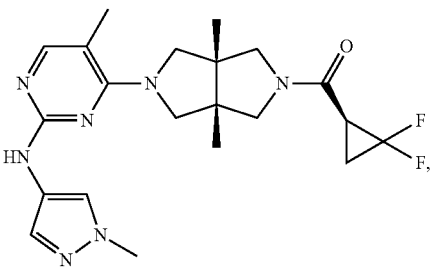
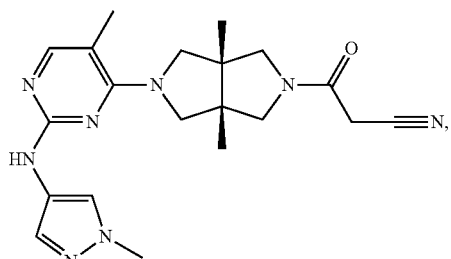
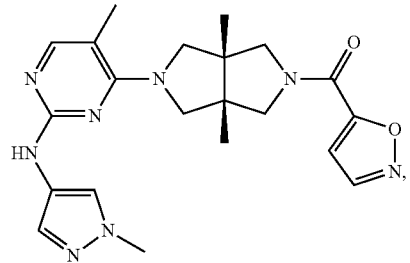
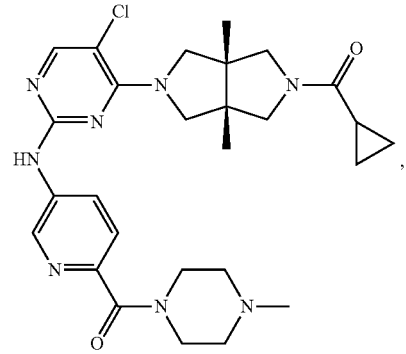

169
-continued
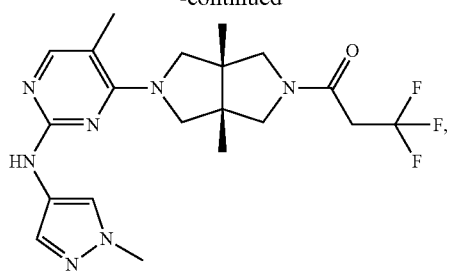
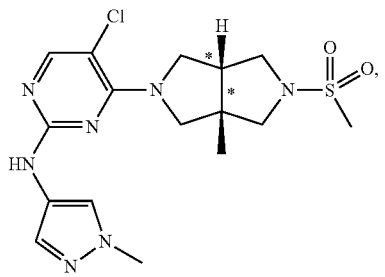
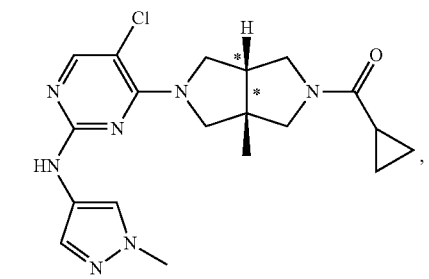
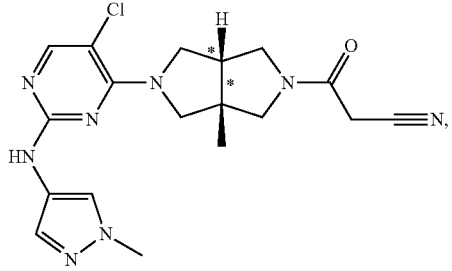
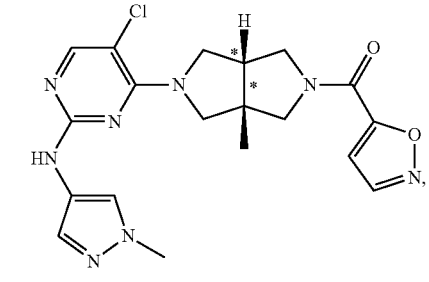
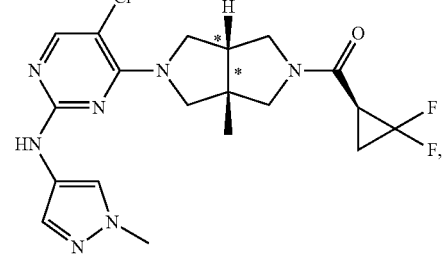
170
-continued
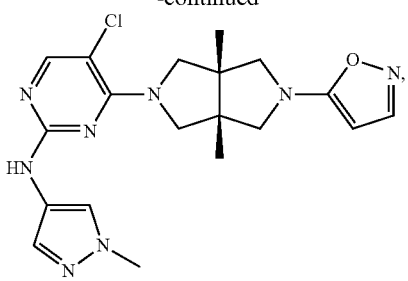
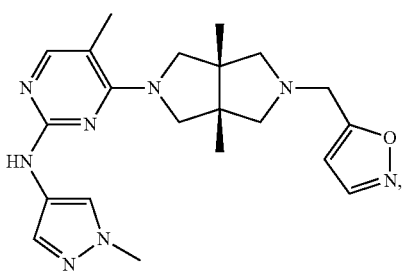
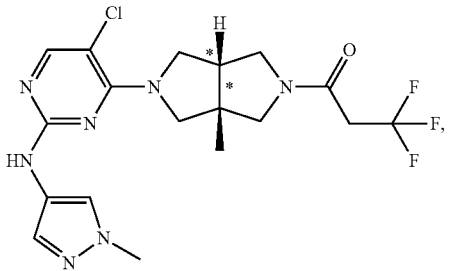
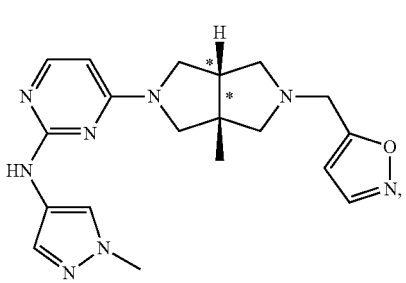
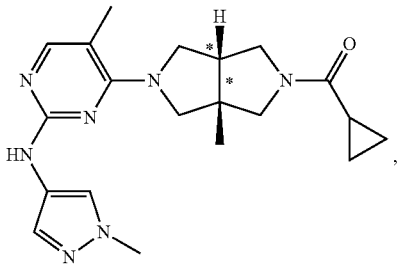
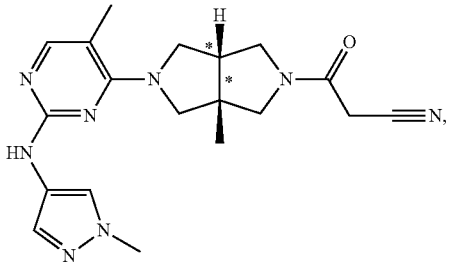

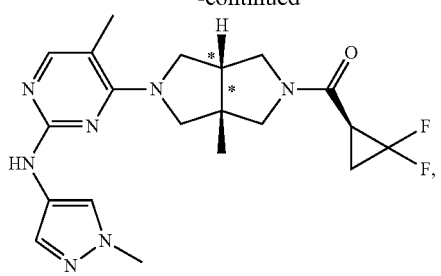
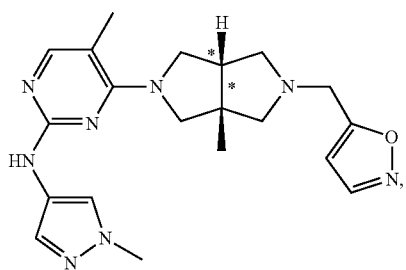
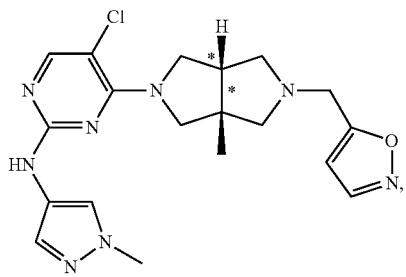
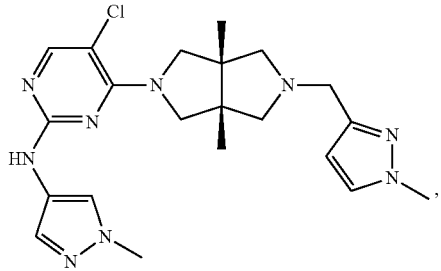
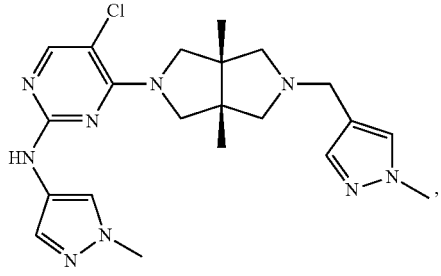
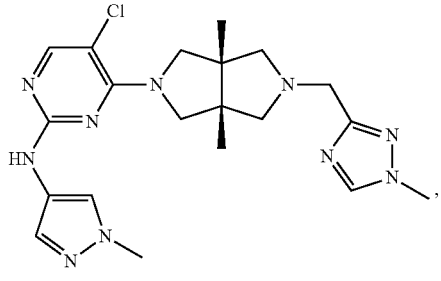
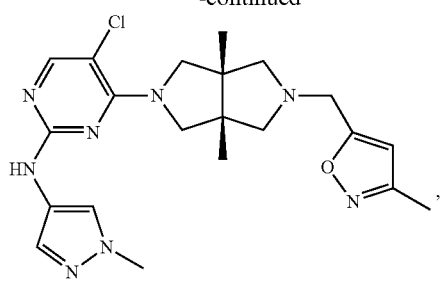
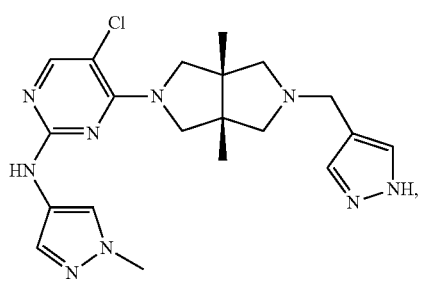
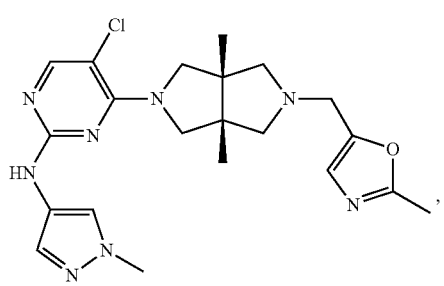
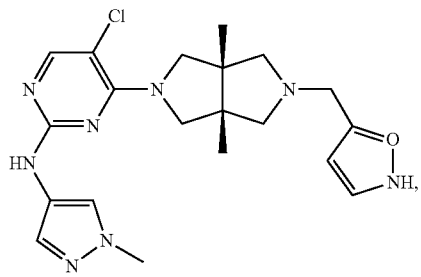
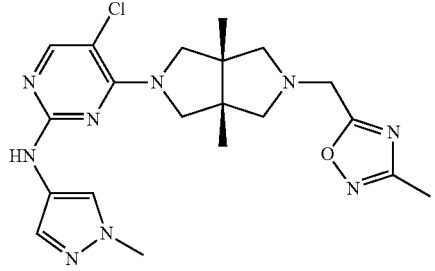
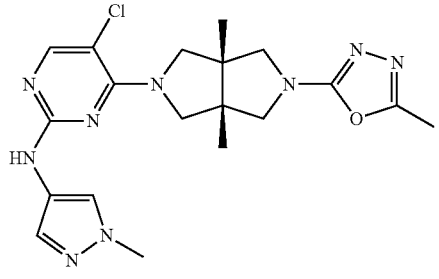

173
-continued
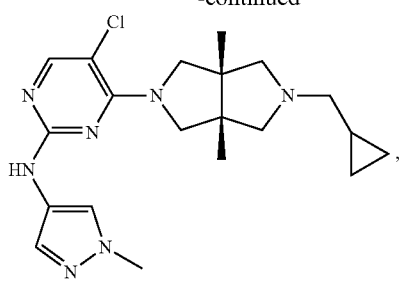
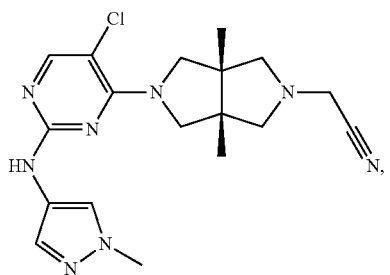
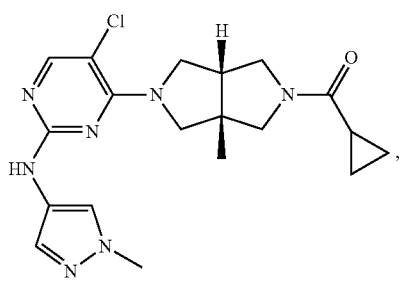
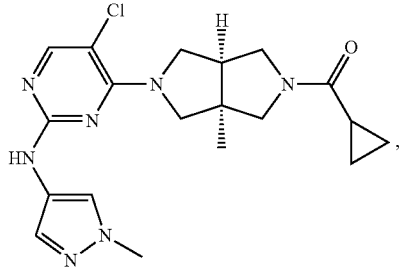
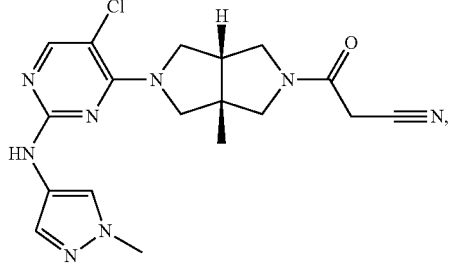
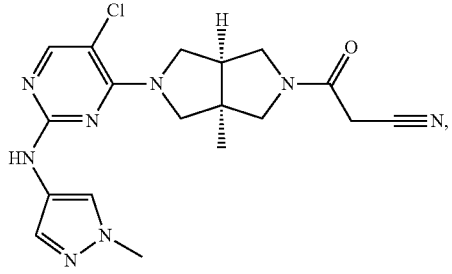
174
-continued
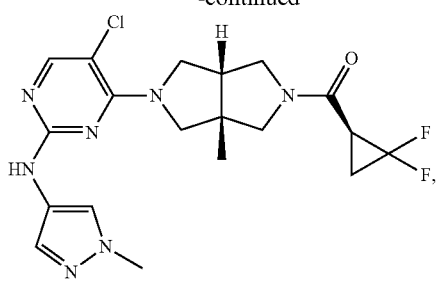
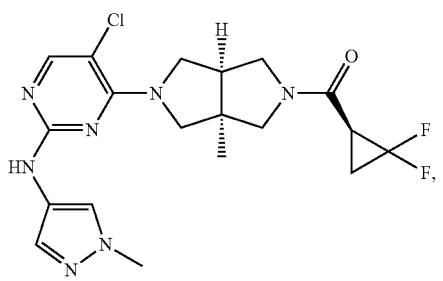
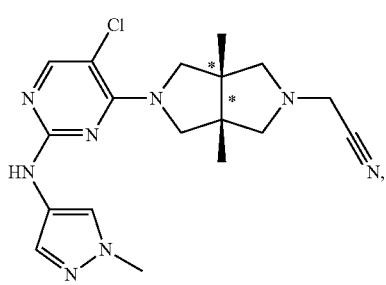
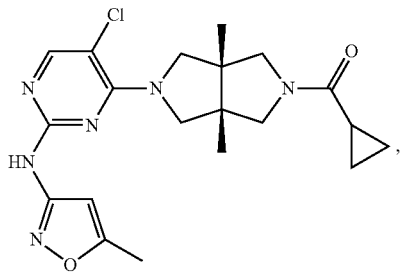
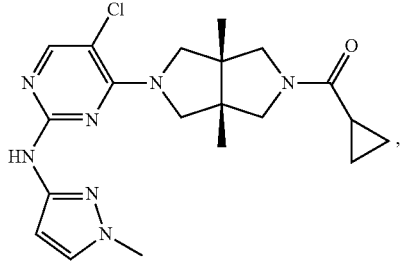
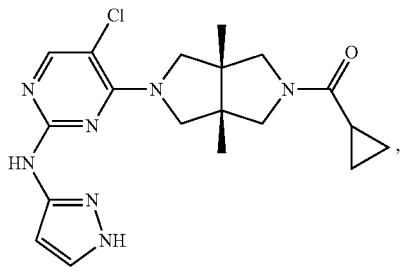

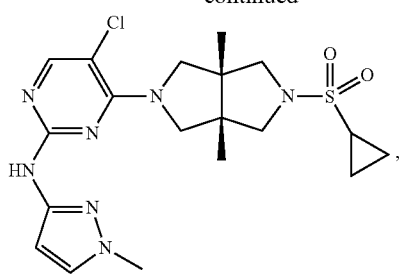
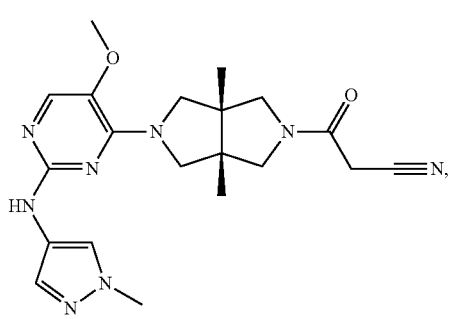
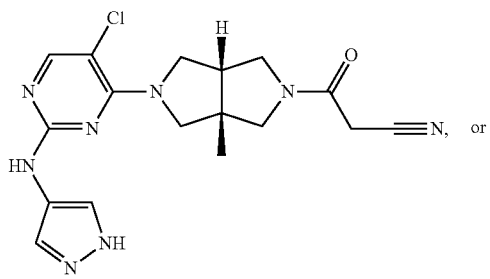
, or
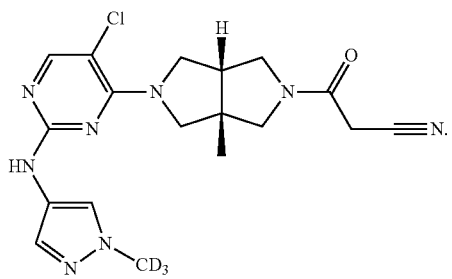
.
10. The compound of claim 9, which is:
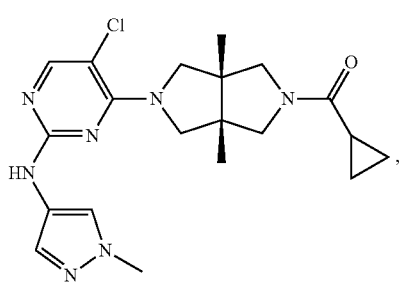
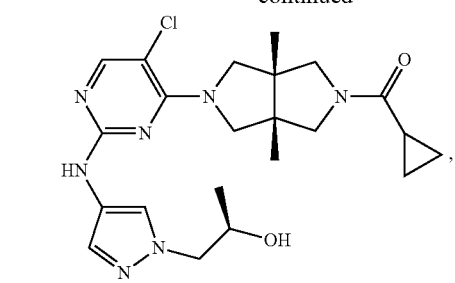
,
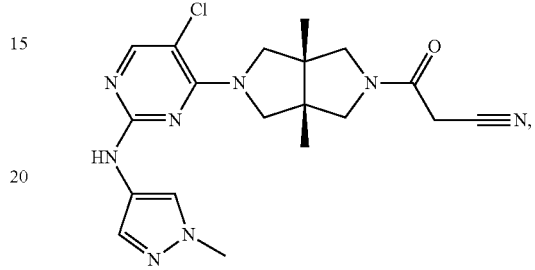
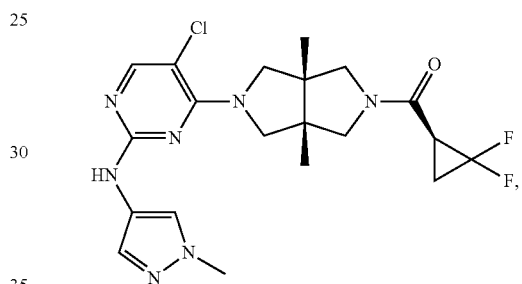
,
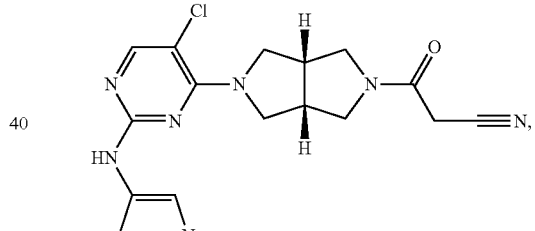
,
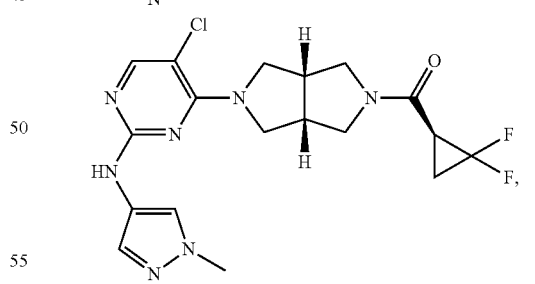
,
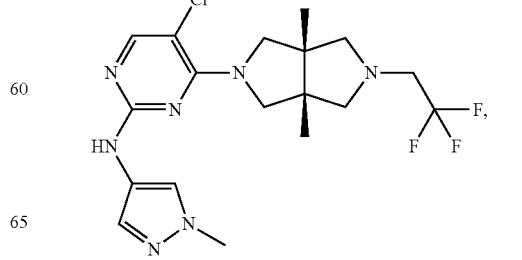
,

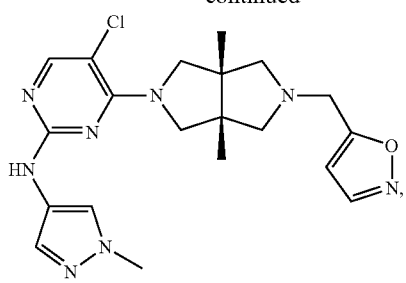
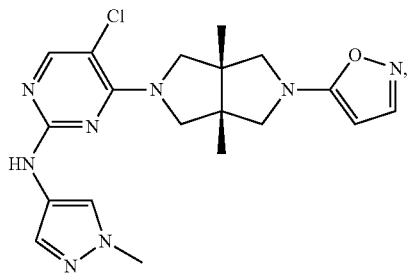
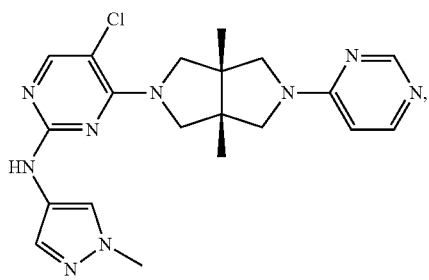
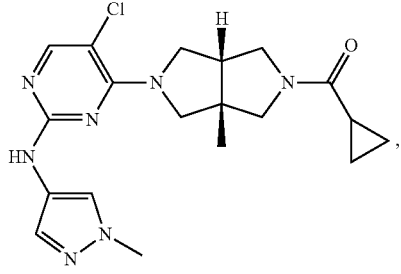
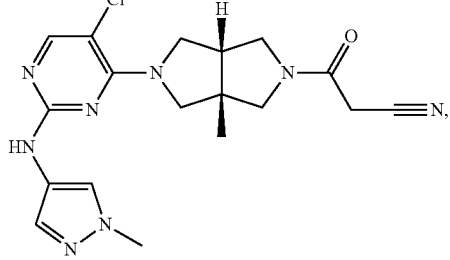
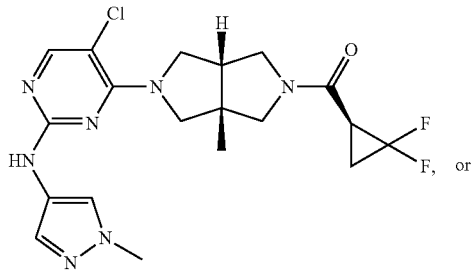
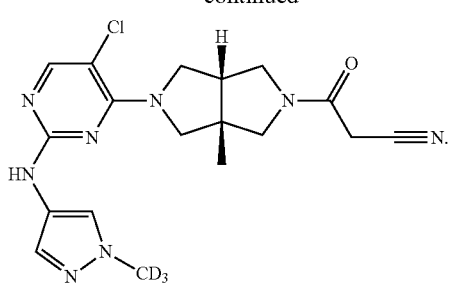
11. The compound of claim 9, which is:
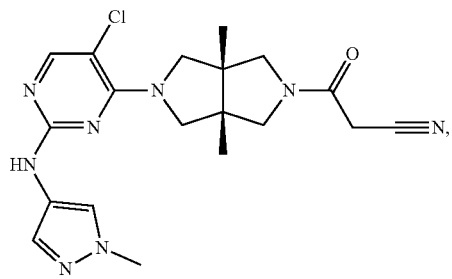
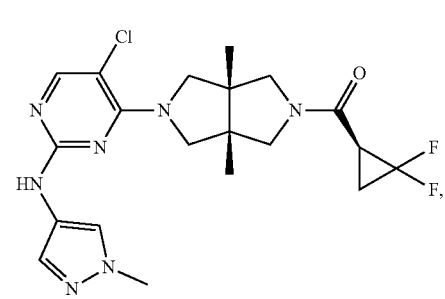
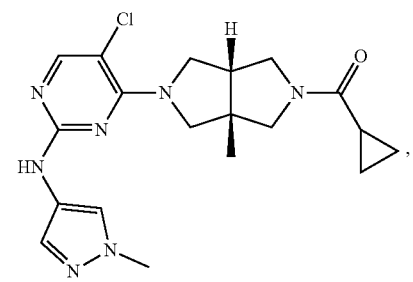
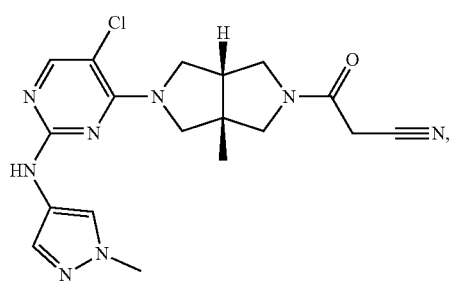

-continued

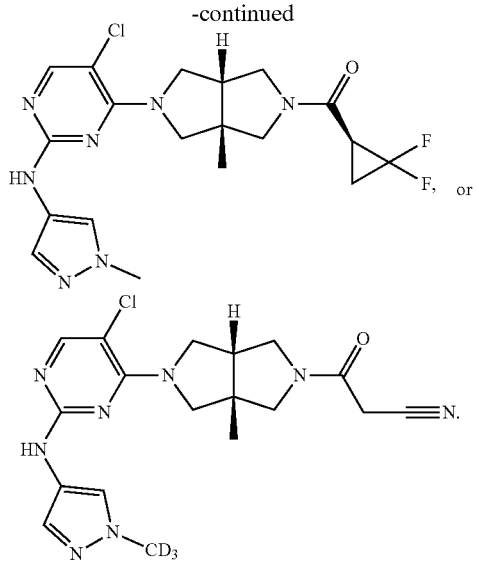

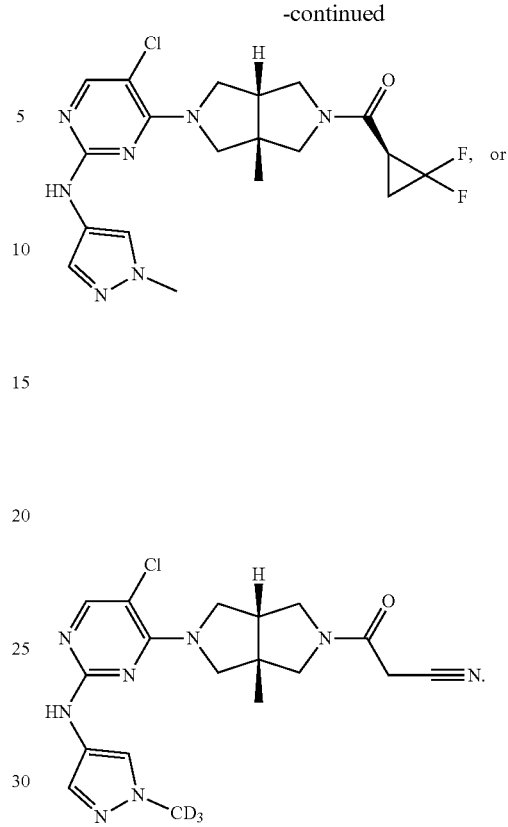

12. A pharmaceutical composition comprising the compound of claim 1 and a pharmaceutically acceptable carrier or excipient thereof.

13. A method for treating a disease mediated by tyrosine kinase 2 (TYK2), comprising administering to a patient in need thereof a therapeutically effective amount of the compound of claim 1, or pharmaceutically acceptable salts, stable isotope derivatives, stereoisomers thereof, wherein the disease mediated by TYK2 is autoimmune diseases, inflammatory diseases, intestinal diseases, cancers, skin diseases, diabetes, eye diseases, neurodegenerative diseases, anaphylaxis, asthma, obstructive airway diseases, or transplant rejection.

14. The method of claim 13, wherein the disease is psoriasis, psoriatic arthritis, ulcerative colitis, Crohn's disease, systemic lupus erythematosu, lupus nephritis, vitiligo, areata alopecia, dermatitis, or atopic eczema.

15. The compound of claim 11, which is

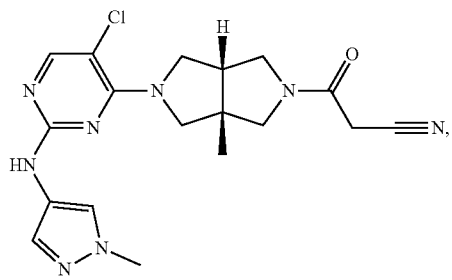

16. The compound of claim 2, wherein $R^1$ is pyrazolyl.

17. The compound of claim 16, wherein L is —C(O)—.

18. The compound of claim 17, wherein A is $C_{1-6}$ alkyl or $C_{3-6}$ cycloalkyl, where one or more hydrogens of the alkyl and cycloalkyl are optionally substituted by halogen, cyano, —OH or —$OC_{1-2}$ alkyl.

19. The compound of claim 6, wherein L is —C(O)—.

20. The compound of claim 19, wherein A is $C_{1-6}$ alkyl or $C_{3-6}$ cycloalkyl, where one or more hydrogens of the alkyl and cycloalkyl are optionally substituted by halogen, cyano, —OH or —$OC_{1-2}$ alkyl.

21. The compound of claim 3, where one or more hydrogens of the pyrazolyl are optionally substituted by D, halogen, cyano, —$OR^b$, —$NR^bR^c$, —$COOR^b$, —C(O)R, —$NR^bC(O)R^c$, —$C(O)NR^bR^c$, —$S(O)_2R^b$, —$S(O)_2NR^bR^c$, —$S(O)(NR^b)R^c$, —$P(O)(CH_3)_2$, $C_{1-6}$ alkyl, or $C_{3-6}$ cycloalky.

* * * * *